INVENTOR.
ROBERT B. TROUSDALE
BY F. H. Henson
AGENT

April 8, 1958 R. B. TROUSDALE 2,830,123

ELECTRONIC TELEPHONE SYSTEM

Filed March 4, 1955 47 Sheets-Sheet 5

April 8, 1958 R. B. TROUSDALE 2,830,123

ELECTRONIC TELEPHONE SYSTEM

Filed March 4, 1955 47 Sheets-Sheet 7

BUSY LEAD CONVERTER 4
EMERGENCY SERVICE NUMBER CIRCUIT 21

BUSY LEAD CONVERTER & EMERGENCY SERVICE NUMBER CIRCUIT 21

April 8, 1958 R. B. TROUSDALE 2,830,123

ELECTRONIC TELEPHONE SYSTEM

Filed March 4, 1955 47 Sheets-Sheet 11

April 8, 1958 R. B. TROUSDALE 2,830,123

ELECTRONIC TELEPHONE SYSTEM

Filed March 4, 1955 47 Sheets-Sheet 12

April 8, 1958 R. B. TROUSDALE 2,830,123

ELECTRONIC TELEPHONE SYSTEM

Filed March 4, 1955 47 Sheets-Sheet 14

April 8, 1958 R. B. TROUSDALE 2,830,123

ELECTRONIC TELEPHONE SYSTEM

Filed March 4, 1955 47 Sheets-Sheet 15

LINE FINDER 17A

April 8, 1958 R. B. TROUSDALE 2,830,123

ELECTRONIC TELEPHONE SYSTEM

Filed March 4, 1955 47 Sheets-Sheet 19

April 8, 1958 R. B. TROUSDALE 2,830,123

ELECTRONIC TELEPHONE SYSTEM

Filed March 4, 1955 47 Sheets-Sheet 22

April 8, 1958 R. B. TROUSDALE 2,830,123

ELECTRONIC TELEPHONE SYSTEM

Filed March 4, 1955 47 Sheets-Sheet 24

RINGING GENERATOR 39

RINGING INTERRUPTER 37

CONNECTOR 18A
(CONTROL SECTION)

April 8, 1958 R. B. TROUSDALE 2,830,123

ELECTRONIC TELEPHONE SYSTEM

Filed March 4, 1955 47 Sheets-Sheet 34

CONNECTOR 18A
(CONTROL SECTION)

April 8, 1958 R. B. TROUSDALE 2,830,123

ELECTRONIC TELEPHONE SYSTEM

Filed March 4, 1955 47 Sheets-Sheet 39

April 8, 1958 R. B. TROUSDALE 2,830,123

ELECTRONIC TELEPHONE SYSTEM

Filed March 4, 1955 47 Sheets-Sheet 41

April 8, 1958 R. B. TROUSDALE 2,830,123

ELECTRONIC TELEPHONE SYSTEM

Filed March 4, 1955 47 Sheets-Sheet 43

BASE BISTABLE CHARACTERISTIC

EMITTER MONOSTABLE CHARACTERISTIC

RING CIRCUIT

April 8, 1958 R. B. TROUSDALE 2,830,123

ELECTRONIC TELEPHONE SYSTEM

Filed March 4, 1955 47 Sheets-Sheet 46

April 8, 1958 R. B. TROUSDALE 2,830,123

ELECTRONIC TELEPHONE SYSTEM

Filed March 4, 1955 47 Sheets-Sheet 47

2,830,123
Patented Apr. 8, 1958

2,830,123

ELECTRONIC TELEPHONE SYSTEM

Robert B. Trousdale, Webster, N. Y., assignor, by mesne assignments, to General Dynamics Corporation, a corporation of Delaware Application March 4, 1955, Serial No. 492,067

41 Claims. (Cl. 179—18)

This invention relates in general to electronic telephone systems and more particularly to special subscriber services in electronic telephone systems.

Many types of automatic switching systems have been developed for connecting the lines of telephone, telegraph, and other communication systems together for the purpose of transmitting signals between the lines. Most of the switching systems developed for this purpose have utilized electromechanical devices such as relays and stepping switches. In recent years, several electronic multiplexing switching systems have been proposed to overcome the inherent limitations of slowness, physical size, and maintenance problems of the electromechanical devices.

However, for an electronic system to compete on a practical basis with the present day electromechanical systems, it is necessary that the electronic system provide all of the features which have come to be considered indispensable in the telephone art. Two such features are executive cut-in on a busy line and emergency service which allows any calling line to cut-in on a particular line. The problem of providing these features in a multiplex system is unique since, unlike the electromechanical systems, each line cannot be physically or wire connected to the link or control equipment. In the electromechanical systems the type of service to be given a particular line can readily be marked in the finder or connector bank appearance of the line. However, in a multiplex system, each line is represented only by a pulse in a particular time position and marking must be accomplished by means other than a direct wire connection.

Accordingly, it is the general object of this invention to provide a new and improved electronic telephone system.

It is a further object of this invention to provide a time division multiplex telephone system which includes the executive cut-in and emergency service number features.

It is a more particular object of the invention to provide a new and improved connector circuit capable of functioning in a time division multiplex telephone system having the executive cut-in and emergency service features.

The invention has been illustrated as embodied in a bi-path system wherein the supervisory and communication paths are separate and distinct. It is to be understood that the invention is not limited to use in such a system but rather may find use in any time division multiplex system. For example, the invention could be used in a multiplex system in which the pulses in the time position of any line are modulated with both supervisory and speech signals. Such a system is disclosed and claimed in a copending application of Robert B. Trousdale and Frank A. Morris, Serial No. 134,974, filed on December 24, 1949, and assigned to the same assignee as the present invention.

In the fundamentally new electronic switching telephone system herein disclosed, the line circuits of the system serve to separate the supervisory signals from the communication signals received over their associated lines. The supervisory signals, such as on hook supervision, off hook supervision, and dial impulses, are connected to the supervisory path and serve to control the line finder-connector links of the system to control the selection and connection of the lines for communication purposes.

In the illustrated embodiment of the invention, which is intended as an example only, the individual line circuits of the system terminate in a plurality of line connecting switches, one for each line finder-connector link of the system. The communication signals, such as, for example, speech currents, are connected to the line connecting switches associated with the line circuit. The line connecting switches associated with any particular link terminate in a common link multiple point or communication path for that link. In the disclosed 100 line system, the line connecting switches comprise normally nonconducting diodes and thus have been designated as diode switches. As the description proceeds, it will be readily apparent to those skilled in the art that gas tubes or any other polarity sensitive device can be used in place of the diodes. The normally non-conductive diodes serve to block speech current flow between their associated line circuits and the link multiple point or communication path.

Selection of the diode switches associated with calling and called lines is performed on a time sharing multiplex basis. Each line of the system is assigned a particular pulse time position in each of the repetitive pulse frames, each pulse frame comprising 100 pulse time positions. The multiplexer circuit samples each of the 100 line circuits of the group in turn for supervisory information. If a line is off hook, an input pulse is generated by the multiplexer in the assigned time position of that line. During dial interruptions and during periods when the line is on hook, no pulse is generated. The multiplexer output is multipled to all line finders and connectors of the system.

The line finders of the system respond to the appearance of pulses on the multiplexer lead, and, under control of the link allotter provided in the system, one of the line finders is activated to seize the calling line. The responding line finder seizes the line by generating a gating pulse in the same time position as the calling line multiplexer pulse. This pulse is then utilized to operate certain circuits in the associated connector, to render the diode switch associated with that particular line finder-connector link and the calling line, conductive, and to serve as a busy pulse, which indicates to the other links of the system that the calling line has been seized.

The connector, associated with the responding line finder, is then controlled in accordance with dial pulses appearing in the time position of the calling line to select the desired called line. If the called line is idle, the connector functions to generate a gating pulse in the time position of the called line. This gating pulse is utilized to render the diode switch, associated with that particular line finder-connector link and the called line, conductive, and to produce a busy pulse which indicates to the other links of the system that the called line is busy. When the diode switch associated with the called line is rendered conductive, a talking or communication connection is completed from the calling line circuit to the called line circuit by way of the diode switch associated with the calling line, the link multiple point, and the diode switch associated with the called line.

The diode switches are designed in such a way that they will lock up in response to an applied short pulse. Thus, through time division multiplexing principles, it is possible to provide a single control conductor, for all of the diode switches associated with each link, to which is applied short pulses originating in the line finder-connector link. In setting up a call through the system, two pulses are applied during each time division frame to this switch control pulse conductor. As previously mentioned, one of these pulses is generated in the line finder and serves to operate the diode switch associated with the calling line, and the other pulse is generated in the connector circuit and serves to operate the diode switch associated with the called line. When the call is completed, a release pulse is applied to a common release pulse conductor, multipled to all of the diode switches associated with the link, and acts to deenergize the diode switches locked up during the progress of the call.

Dial tone and busy tone signals are introduced into the talking path at the link multiple point. These tones are generated in the common equipment and their application is controlled by circuits in the connector. Ringback tone is generated in the called line circuit and is routed back over the previously completed talking connection to the calling line.

Ringing of the called line is accomplished with time division multiplex principles by the transmission of a ringing control pulse, generated in the connector, over a ringing control conductor multipled to all of the connectors and line circuits of the system. The ringing facilities in each line circuit are made responsive to pulses on this control conductor on a fully selective basis depending on the relative timing of the pulse, so that the proper line is rung. The first or second party is rung in accordance with a secondary time multiplexing system, wherein the tip sides of the lines are all rung during a first one-second interval, and the ring sides of the lines are all rung during a second one-second interval. These two ringing intervals are spaced by one-second off periods so that a four-second cycle is provided. Ringing selection is controlled by the particular value of a digit prefixed to the line number. In the disclosed system, a prefix digit "119" is used to identify parties to be rung on the ring conductor while any other prefix digit identifies parties to be rung on the tip conductor.

The executive-cut-in feature is provided in the system by marking, on an executive-cut-in lead, the time positions of those lines chosen to have the feature. The executive-cut-in marking conductor is then multipled to all of the connectors of the system which respond by giving the feature to any calling line possessing a time position agreeing with one of the marking pulses.

The trunk hunting feature is provided in the system by marking, on a trunk hunting marking conductor, the time positions of each line in each trunk group except the last line of the group. The trunk hunting marking conductor is then multipled to all of the connectors of the system, which respond by performing the trunk hunting operation when lines within the group are dialed by the calling line. Provision is made in the conector to allow trunk hunting to take place in preference to executive-cut-in so that only the last line in a trunk group is vulnerable to intrusion from an executive-cut-in line.

An emergency service number feature is provided in the disclosed system since it is contemplated that the disclosed system may be utilized as the telephone system for an acean-going ship. An emergency service line circuit is assigned for this purpose. A manual switch is provided on the line side of the emergency service line circuit so that the line connections can be wired in multiple either to the pilot house telephone line circuit or to the quarter-deck telephone line circuit. Calls may be made to the latter two telephones either through the regularly assigned line circuit or through the emergency service number line circuit. When these telephones originate calls, the switchboard is so arranged that the normally assigned line circuit will handle the call, thus leaving the emergency service line circuit free to handle emergency calls incoming to the selected one of these lines. This is accomplished by providing gating circuits within the busy lead converter circuit to operate on the busy pulses in a predetermined manner as follows:

(1) A permanent busy pulse is provided in the time position of the emergency service line circuit on the finder busy lead. The finders of the system are thus enable to respond to a call originating from this line circuit.

(2) A permanent absence of a busy pulse is provided in the time position of the emergency service line circuit on the connector busy conductor. Thus, all connectors are able to cut through to the emergency service line circuit regardless of its idle or busy condition.

(3) The busy lead converter functions to make the pilot house line circuit or the quarter-deck line circuit, as the case may be, artificially busy in the event that the emergency service number is dialed. This prevents the undesired calling in of a line finder incident to the answering of an emergency service call at the pilot house or quarter-deck telephone since the calling connector does not provide a busy pulse to cover these lines when the emergency service number is dialed. It also prevents a connector from seizing the regular line circuit and thus breaking in on an emergency call when the emergency service line circuit is in use.

Further objects and advantages of the invention will become apparent as the following description proceeds and the features of novelty which characterize the invention will be pointed out in particularity in the claims annexed to and forming a part of this specification.

For a better understanding of the invention, reference may be had to the accompanying drawings which consist of 50 figures on 47 sheets.

Figs. 1–6, inclusive, show the trunking diagram of the disclosed system in block form.

Figs. 9–41, inclusive, illustrate the details of the system shown in Figs. 1–6, inclusive.

Figure 42:
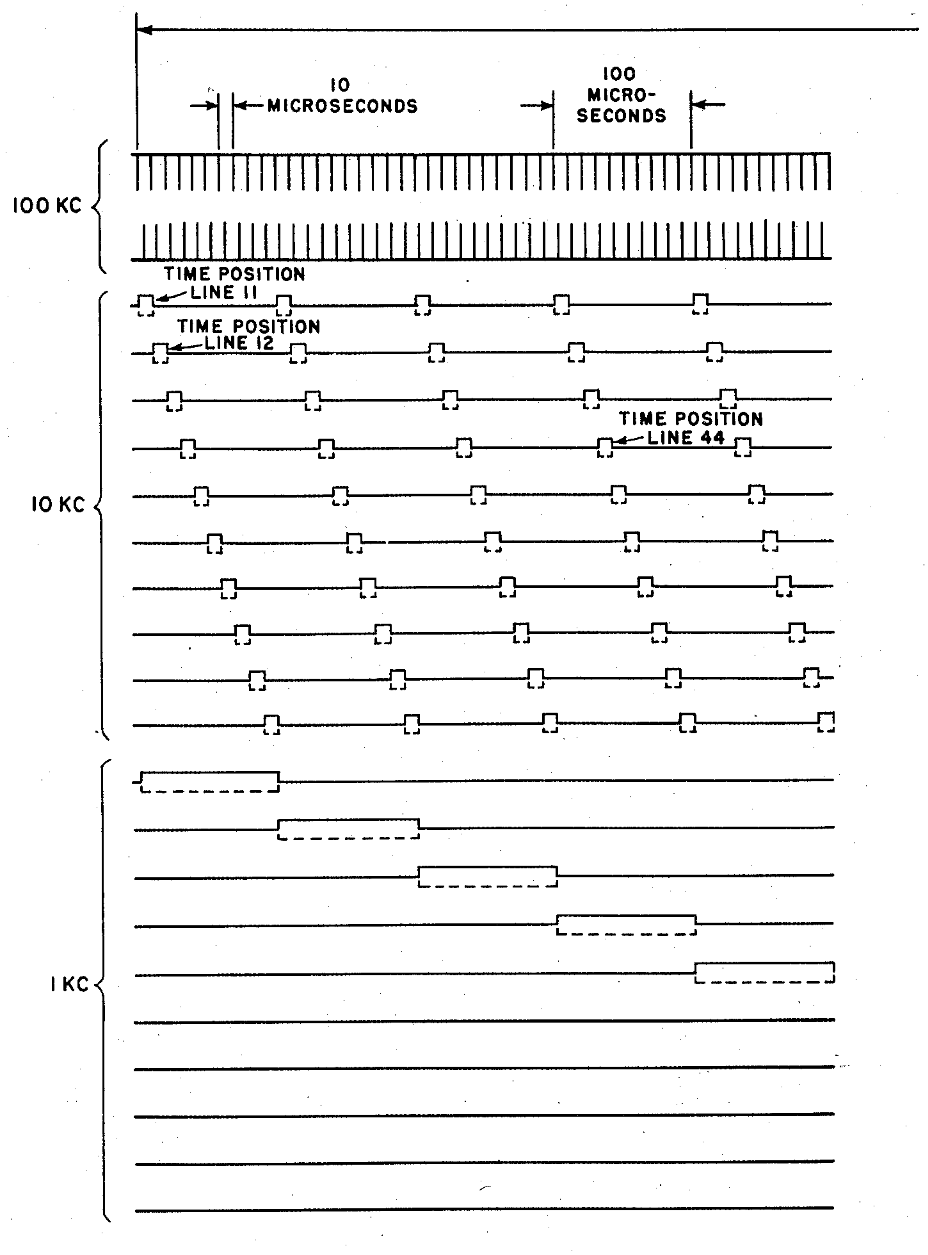
Figure 43:
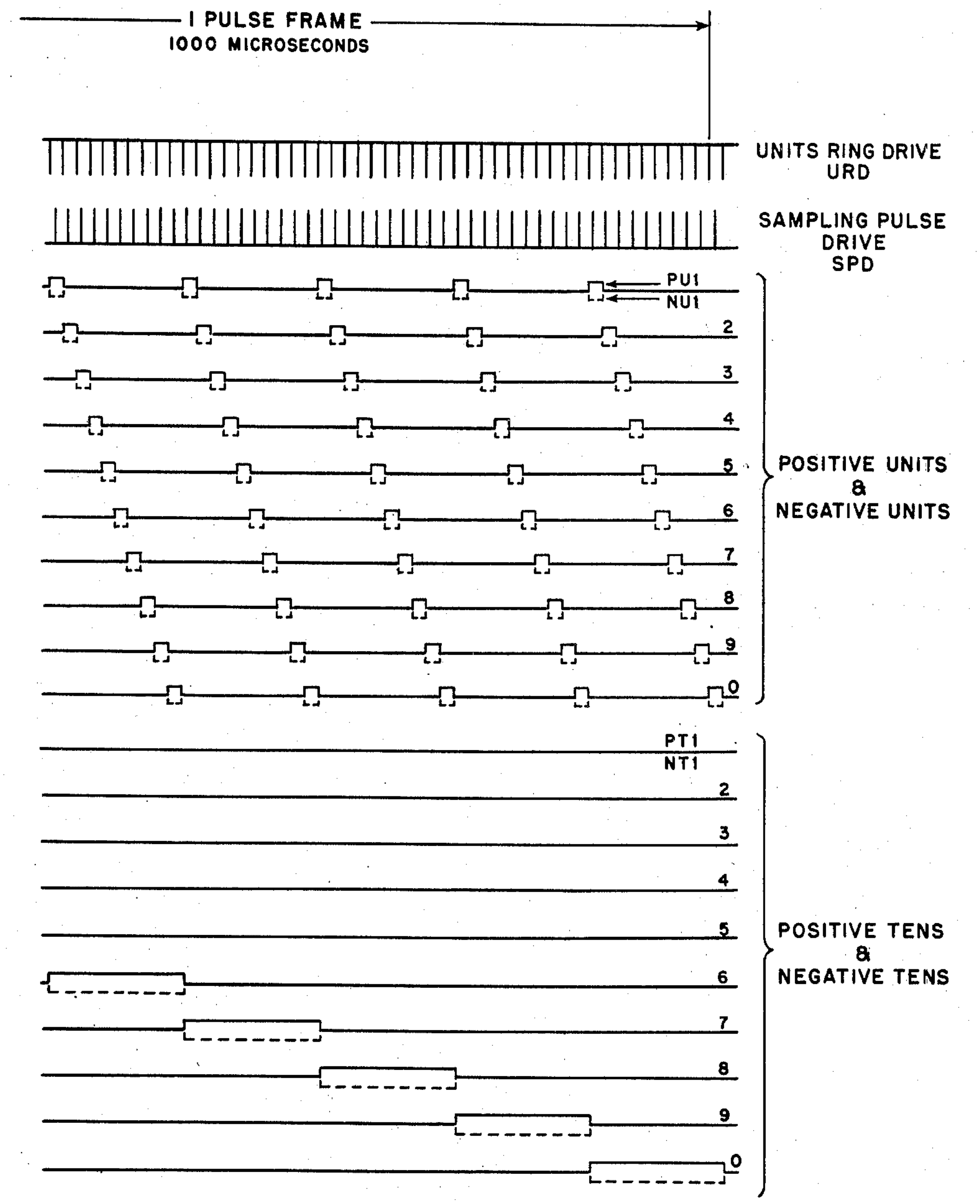

Figs. 42 and 43, when arranged with Fig. 43 to the right of Fig. 42, graphically illustrate the time relationships between certain of the pulses developed and utilized in the various components of the system.

Figure 44:
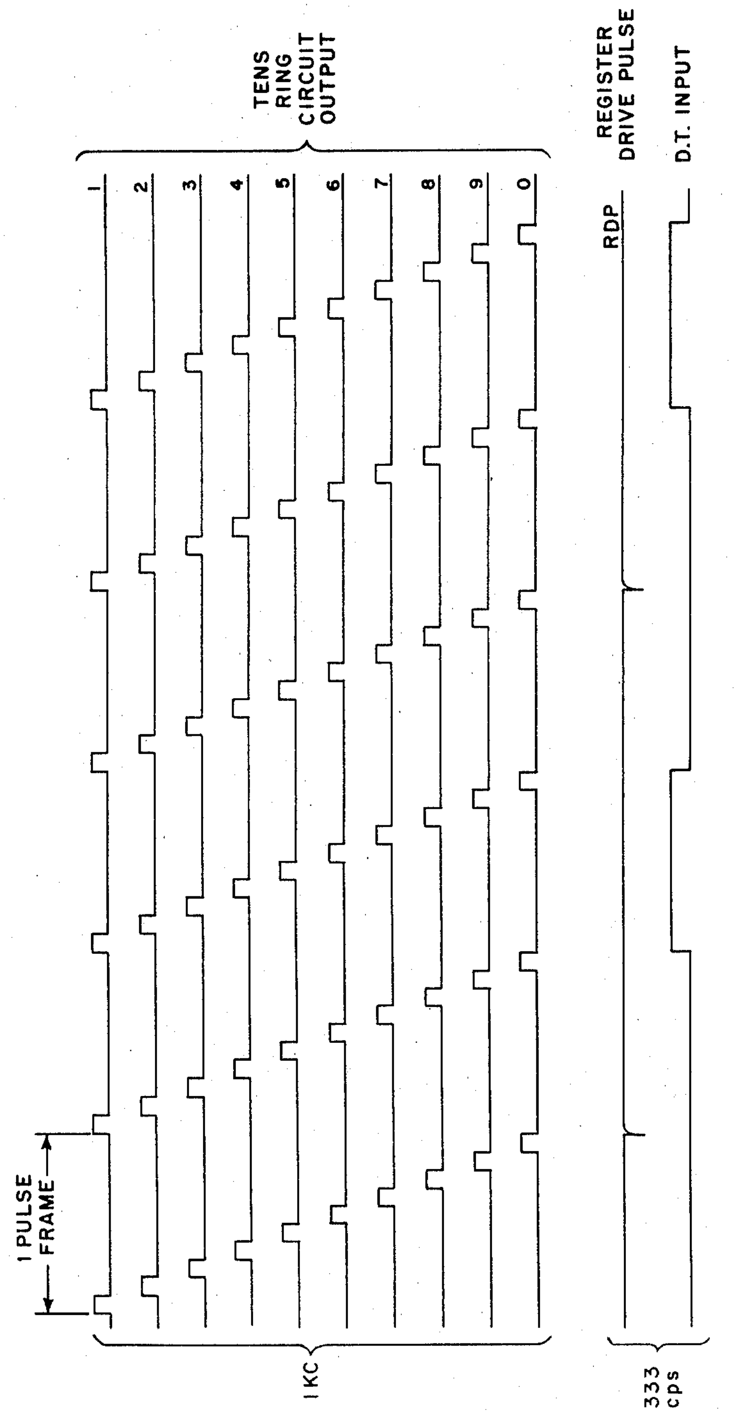

Fig. 44 graphically illustrates the time relationships between certain of the pulses developed and utilized in the various components of the system.

Figure 45:
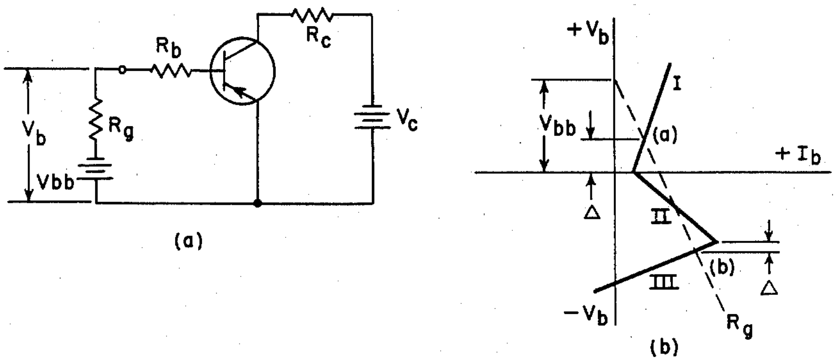
Figure 46:
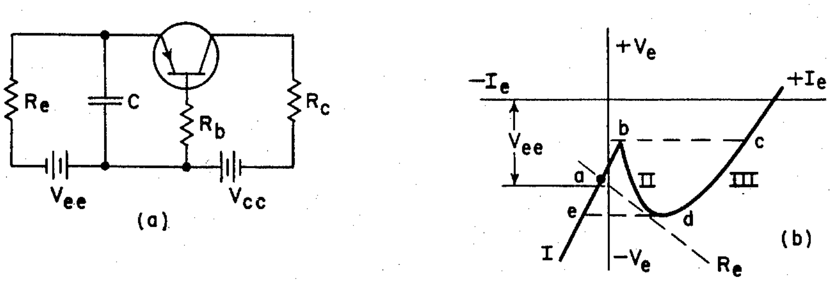
Figure 47:
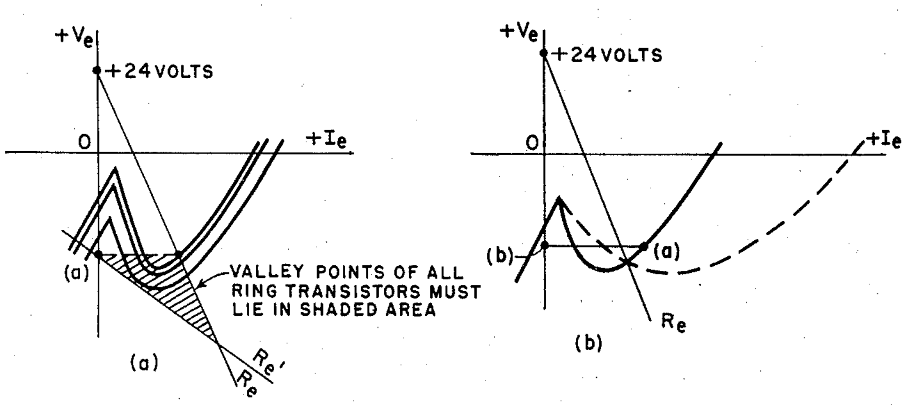

Figs. 45, 46, and 47 illustrate the characteristics of certain transistor circuits utilized in the system.

Figure 48:
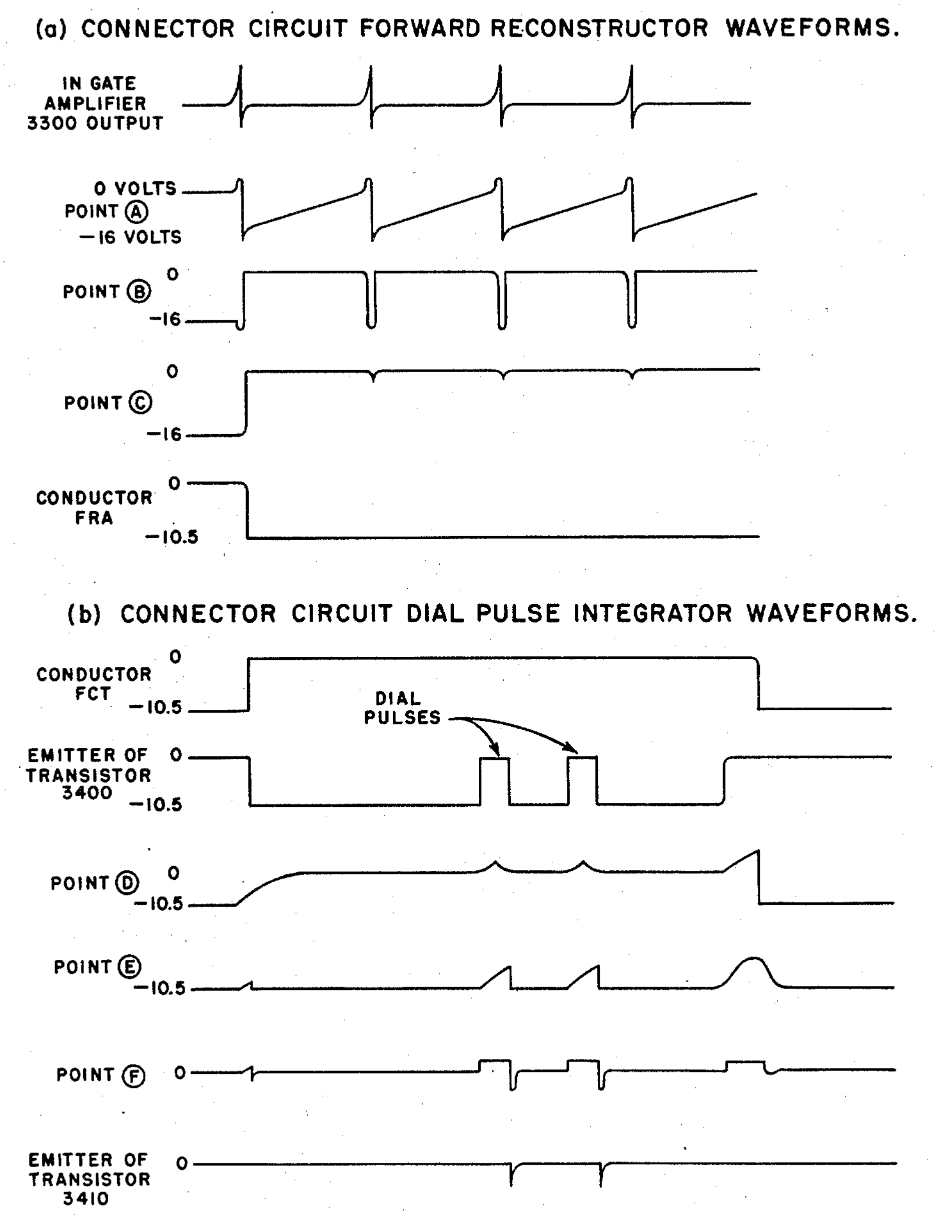
Figure 49:
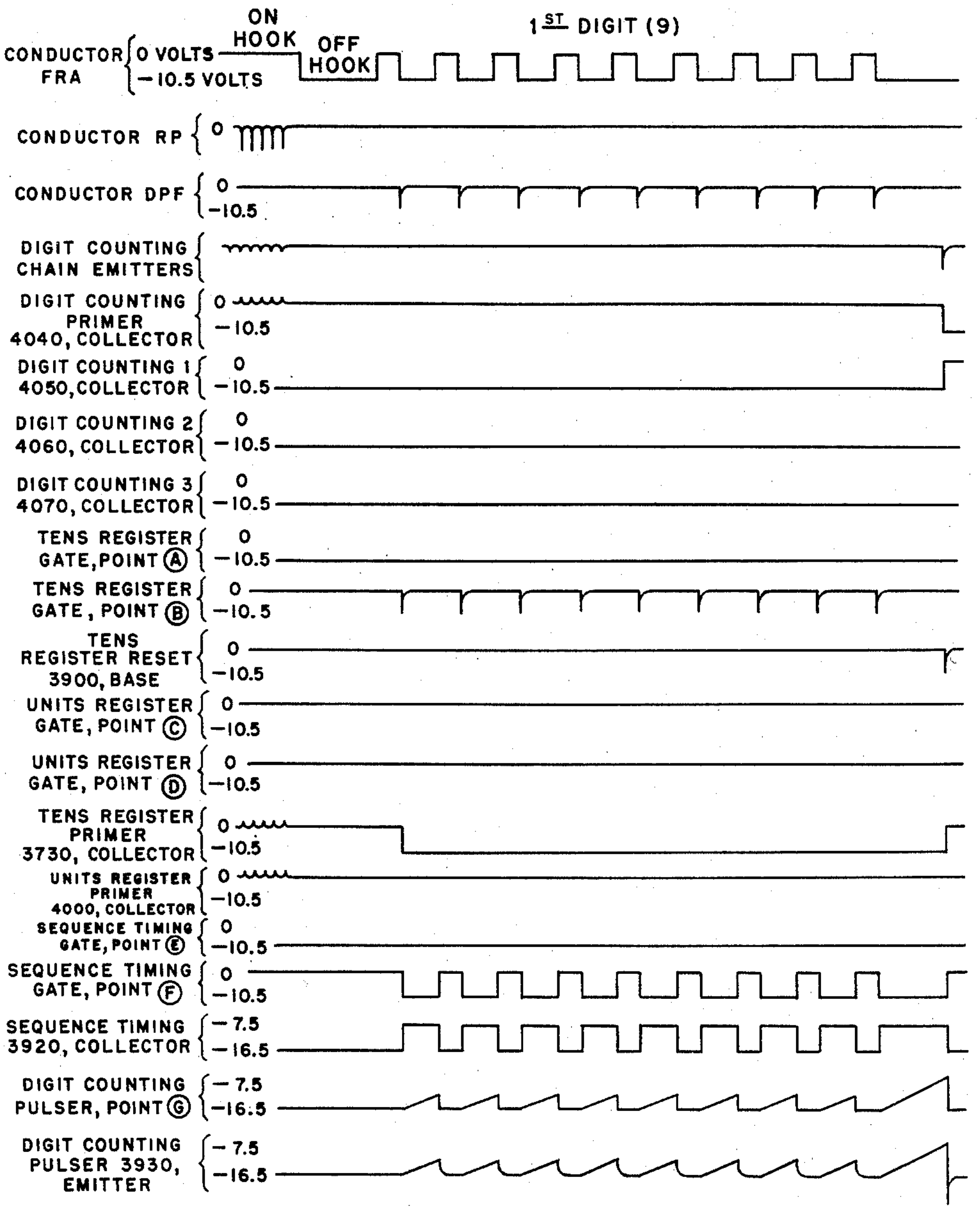
Figure 50:
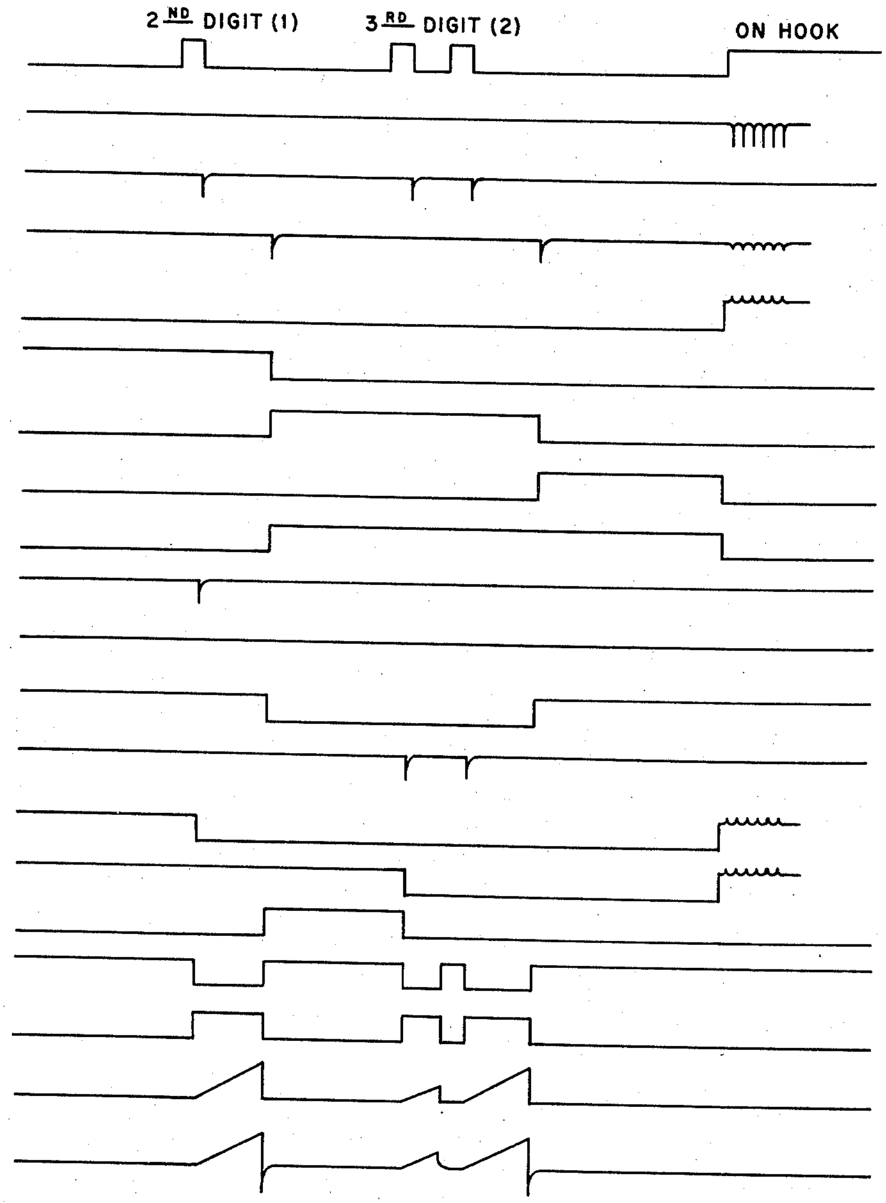

Figs. 48–50, inclusive, illustrate waveforms found in certain components of the connector circuit. Fig. 48 is independent but Fig. 50 is to be placed to the right of Fig. 49.

GENERAL DESCRIPTION

The general operation of the system can best be understood by reference to the trunking diagram shown in Figs. 1–6, inclusive. The system has been illustrated as comprising two lines, namely, the lines associated with line circuits 11 and 12, and three links, namely, links A, B, and C. Link A is identical to links B and C and comprises line finder 17A, connector 18A, and associated link equipment comprising link multiple point circuit 13A, release pulse generator 15A, release pulse amplifier 14A, and switch control circuit 16A.

It is to be understood, of course, that in practice there would be up to 100 line circuits, identical to line circuits 11 and 12, associated with each group of links. The number of links required per 100 line circuits is of course dictated by traffic conditions; although the trunking diagram shows just links A, B, and C, from 10 to 15 links will normally be required to handle the traffic of each 100 line group.

As illustrated, the line circuits 11 and 12 terminate two or three conductor lines extending from the associated substations STA211 and STA912, respectively. Three conductor lines are used only on party lines. The third conductor, S, is used for ringing return on divided line ringing. This departure from standard practice is necessitated when the disclosed system is used aboard a ship or in any other location where ground potential is not available at the substation. For land installations, only two line conductors are required since the ringers are connected from either tip or ring to ground at the substation in the conventional manner.

Each of the line circuits terminates in a plurality of diode switches, one for each line finder-connector link. As illustrated, line circuit 11 is connected by cable 11*a* to diode switch 11A which is associated with link A, by cable 11*b* to the link B diode switch 11B, and by cable 11*c* to link C diode switch 11C. Similarly, line circuit 12 terminates in diode switches 12A, 12B, and 12C. Thus, each link will have 100 diode switches, corresponding to the 100 line circuits of the group, associated with it.

The 100 diode switches associated with each link are connected over cables such as A11 and A12, associated with diode switches 11A and 12A, respectively, to link multiple point 13A. The link multiple point serves to tie all of the diode switches, associated with the particular link, together so that a talking circuit can be completed between any two selected diode switches. The link multiple point may also be described as a communication path individual to the link and adapted to have selected lines connected thereto. It also serves as an insertion point for supervisory tones, such as dial tone and busy tone, which are necessary in any high quality telephone system. The tones-out conductor is shown connected from connector 18A to link multiple point 13A for this purpose.

*Common equipment*

Figure 4:
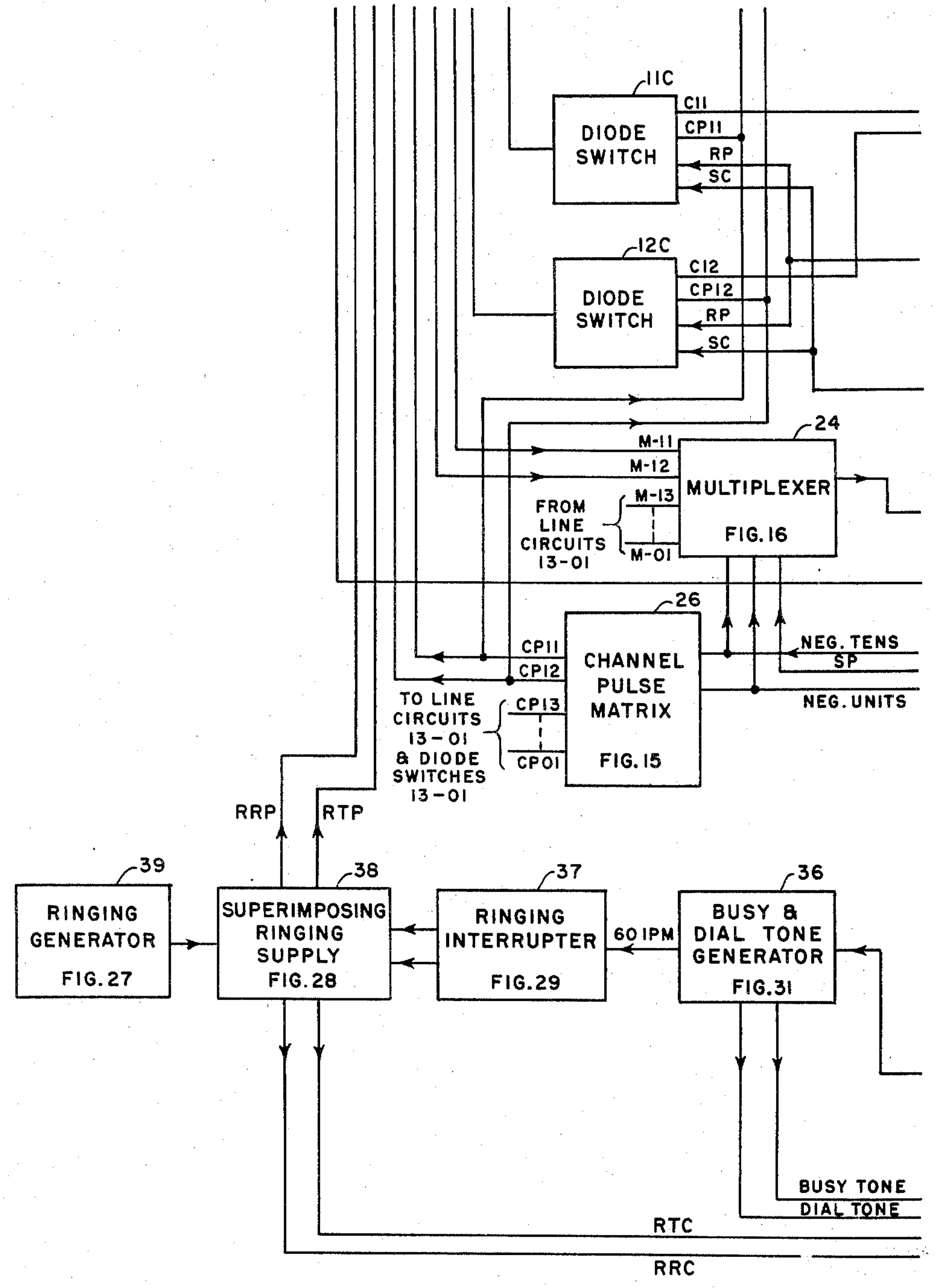
Figure 5:
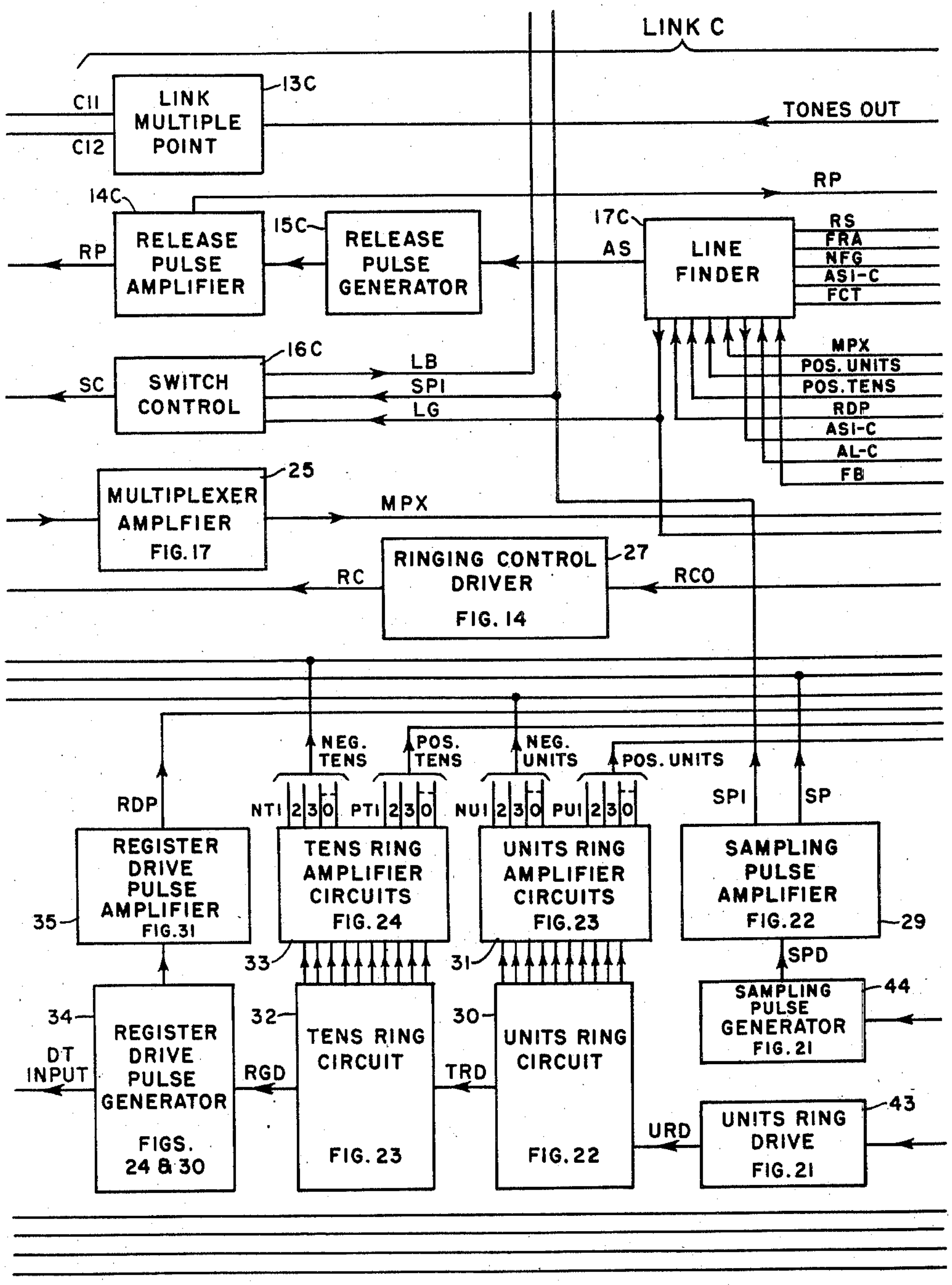
Figure 6:
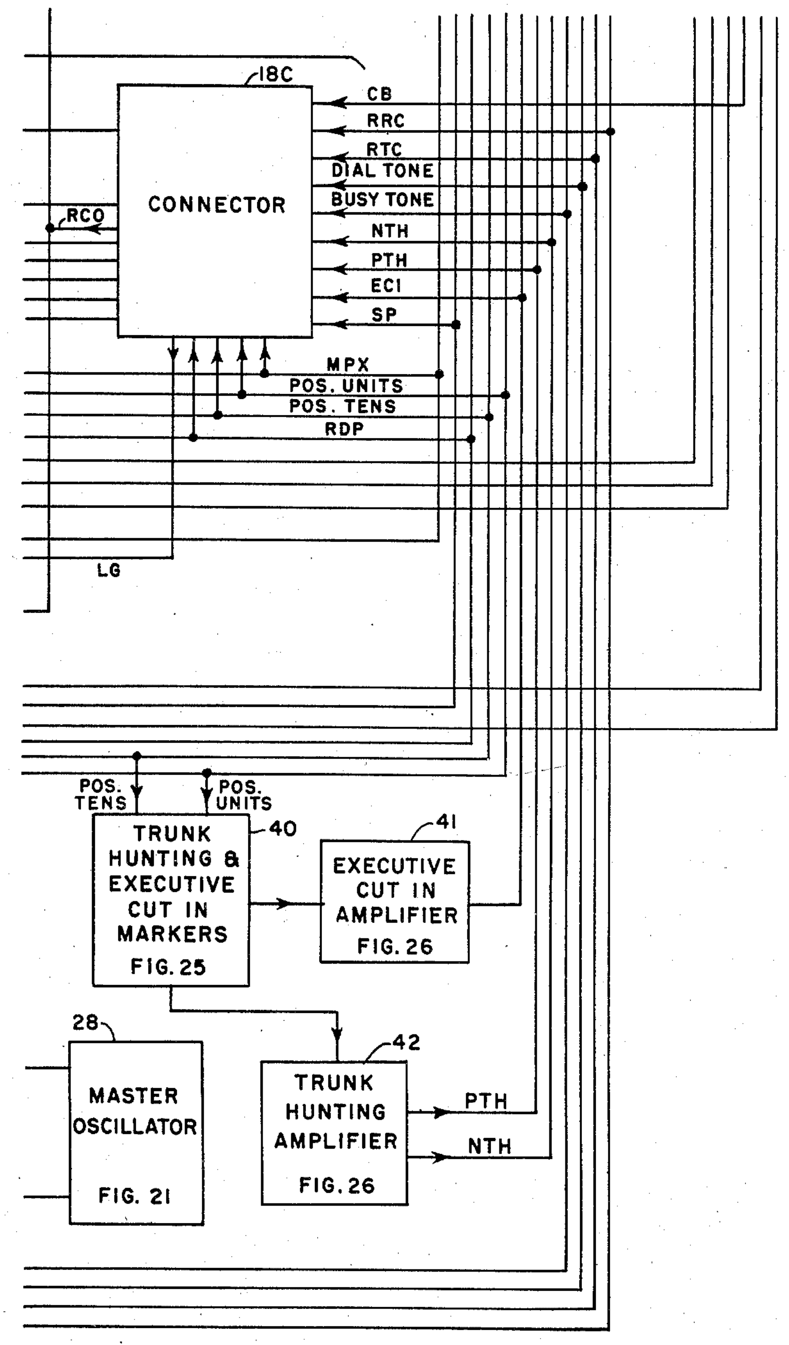
Figure 8:
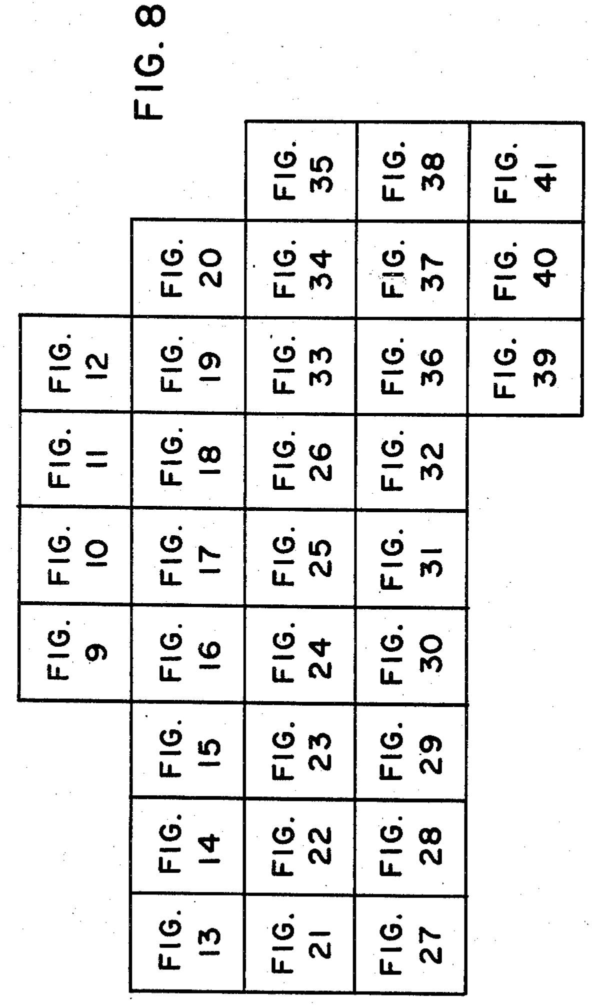
Fig. 8 shows the recommended arrangement of the detailed drawings to show the invention.
Figure 7:
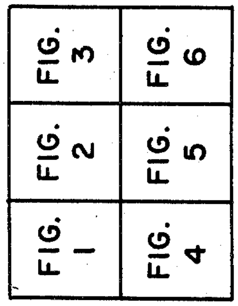
Fig. 7 shows the recommended arrangement of the block diagram drawings.

It is believed expedient to the more complete understanding of the invention to describe the common and link common equipment before proceeding to trace a call through the system. The common equipment is that equipment which is common to the entire switchboard. No duplication of these circuits would be required for a switchboard containing more than 100 lines. The common equipment, which is shown in Figs. 4 and 5, comprises the master oscillator circuit 28, the units ring drive circuit 43, the sampling pulse generator circuit 44, the sampling pulse amplifier circuit 29, the units ring circuit 30, units ring amplifier circuits 31, tens ring circuit 32, tens ring amplifier circuits 33, register drive pulse generator circuit 34, register drive pulse amplifier circuit 35, busy and dial tone generator 36, ringing interrupter 37, superimposing ringing supply circuit 38, ringing generator 39, and the channel pulse matrix circuit 26.

The purpose of the pulse generating circuits of the common equipment is to set up the 100 channel pulse multiplex timing frame and to transmit suitable timing pulses to the various switching components in accordance with the basic multiplex frame. A frame is defined as the time period required for the multiplexing circuits to scan all of the 100 lines of the system. In the disclosed arrangement, the time period is 1,000 microseconds, corresponding to a scanning frequency of 1,000 C. P. S. The frame is divided into 100 10-microsecond intervals, each of which is allotted to one of the 100 lines of the system. Through the action of a 100 kc. master oscillator and two ten stage ring circuits, pulses are generated which define the individual time channels and the frame as a whole.

Two output signals, 180° out of phase, are taken from the master oscillator 28 and utilized to drive the pulse forming and shaping circuits, sampling pulse generator 44, and units ring drive circuit 43. The sampling pulse generator 44 serves to generate positive pulses, of approximately 2 microseconds' duration which are coupled by sampling pulse drive conductor SPD to the sampling pulse amplifier circuit 29 where they are amplified and inverted. Two outputs are taken from sampling pulse amplifier 29, both supplying equal amplitude negative pulses but at different reference voltages. One output, SP, is coupled to the multiplexer circuit 24 (Fig. 4) and to the connectors 18A, 18B, and 18C (see Figs. 3 and 6). The second output, SP1, is connected to the switch control circuits 16A, 16B, and 16C (see Figs. 2 and 5).

The units ring drive circuit 43 serves to generate short negative impulses which are coupled by units ring drive conductor URD to the units ring circuit 30. The pulses on conductor URD are 180° out of phase with the pulses on conductor SPD, as previously mentioned. The pulses appearing on conductors URD and SPD are graphically illustrated in Figures 42 and 43.

Figure 1:
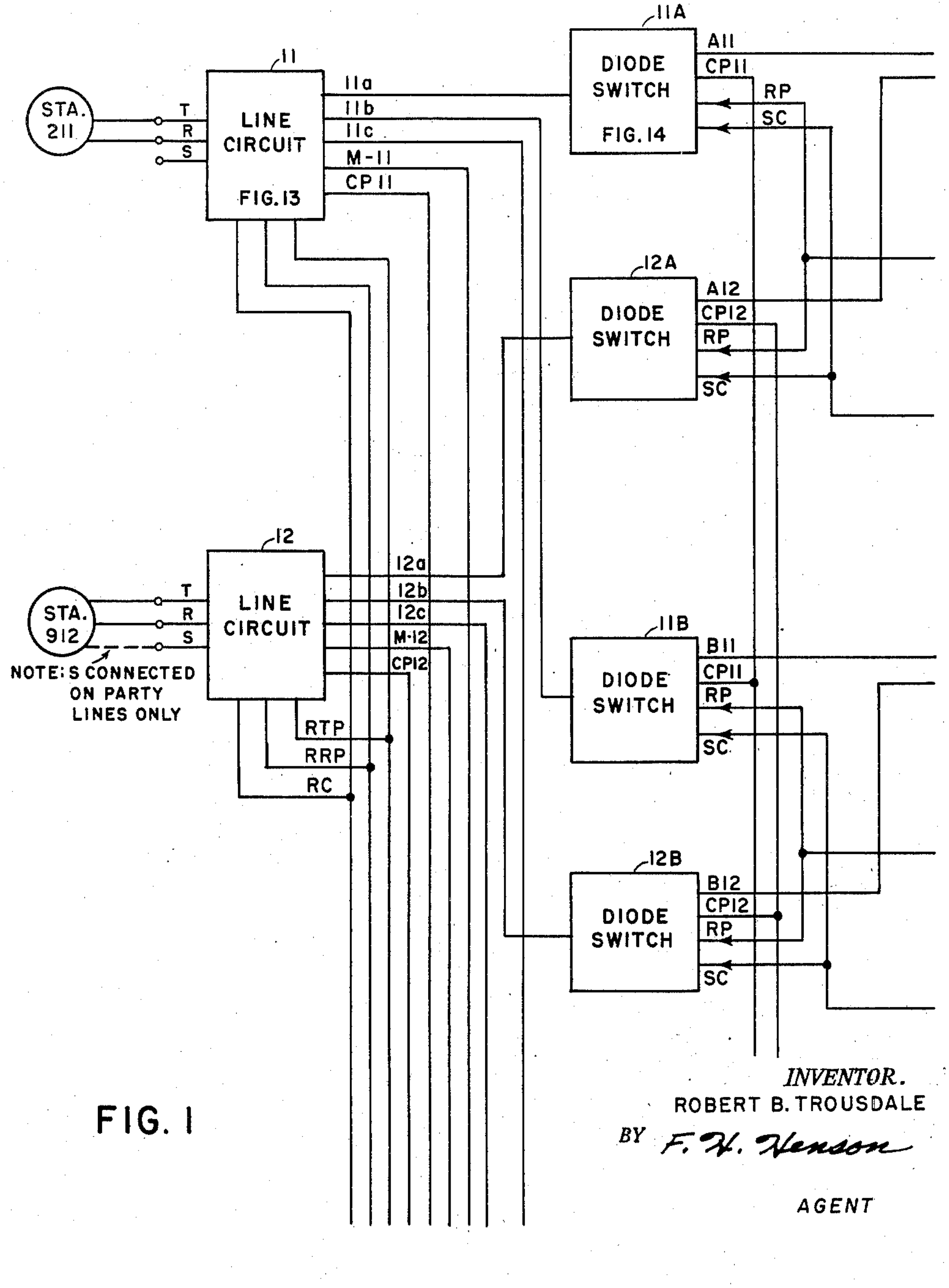
Figure 2:
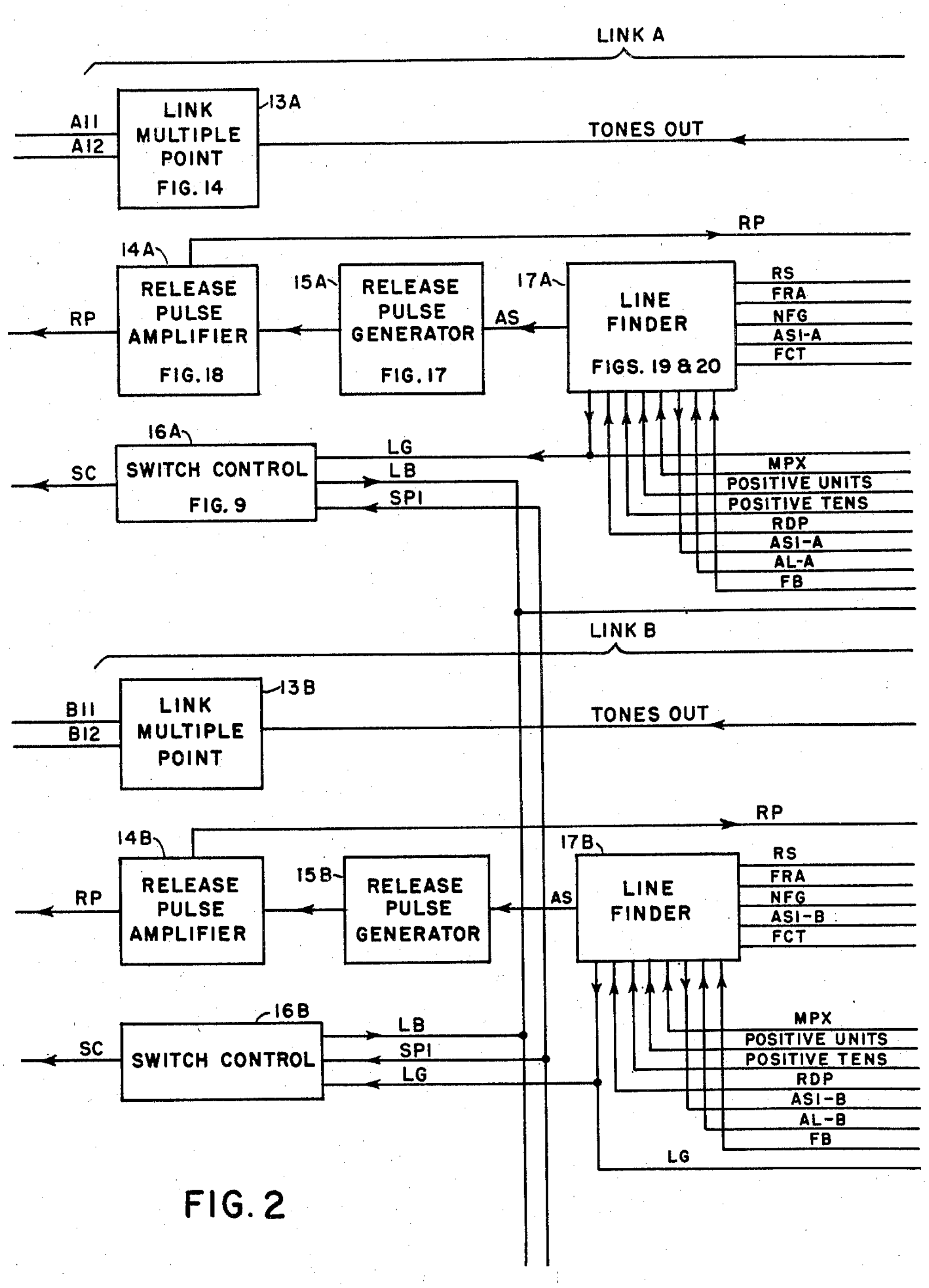
Figure 3:
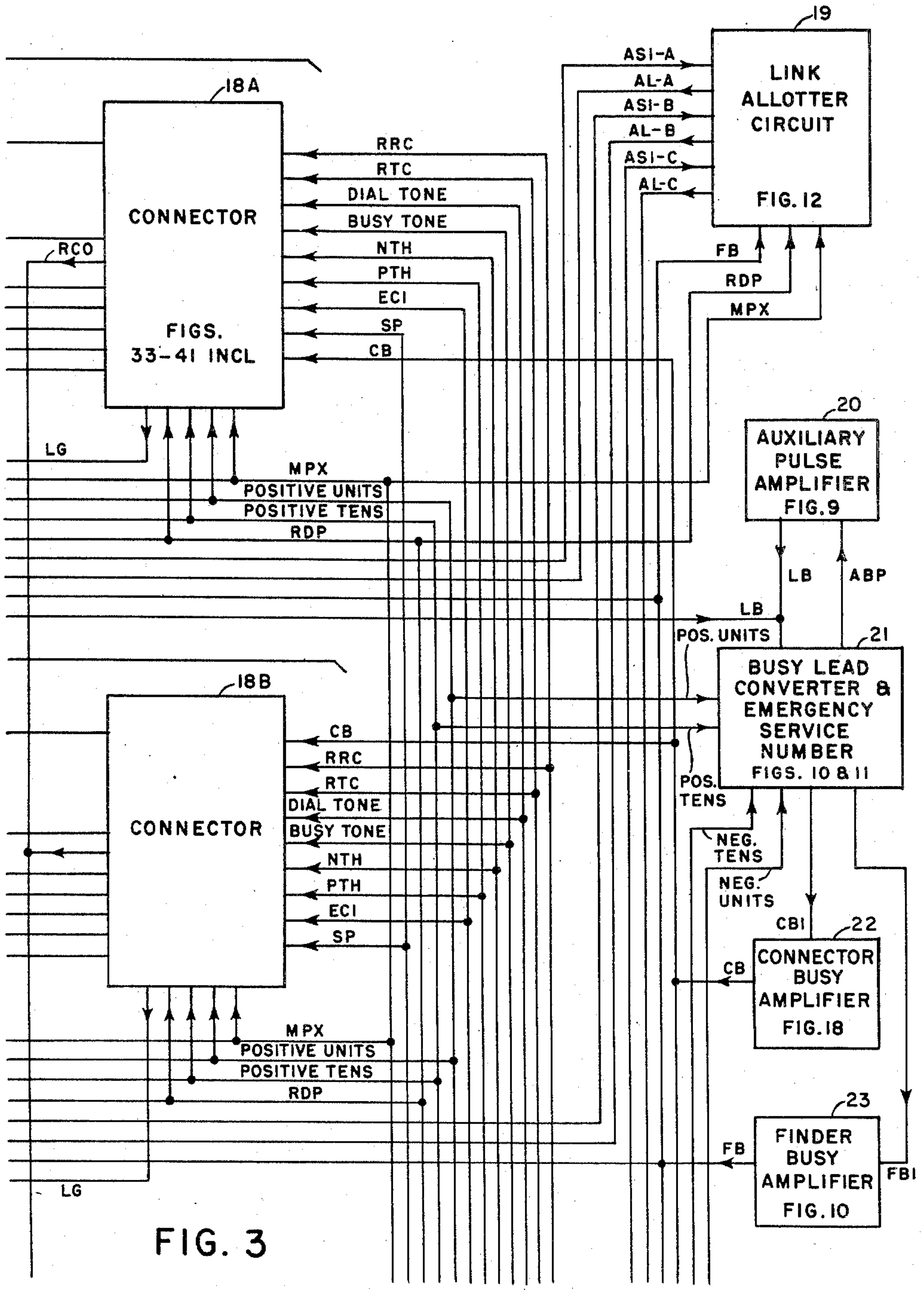

The units ring circuit 30 comprises a ten stage ring which serves to commutate the pulses from conductor URD to ten output conductors in sequential order. It should be readily apparent that the 100 kc. pulses on conductor URD are thus converted to 10 kc. impulses of 10 microsecond duration appearing on ten output conductors which are individually coupled to a corresponding amplifier in the units ring amplifier circuits 31. Two outputs, one positive and one negative, are taken from each of the units ring amplifiers and coupled to the various circuits of the system. The positive units cable POS units, comprising conductors PU1–PU0, inclusive, is coupled to the trunk hunting and executive-cut-in markers 40 (Fig. 6), to all of the line finder and connector circuits of the system, and to the busy lead converted and emergency service number circuit 21 (Fig. 3). The negative units cable NEG units, comprising conductors NU1–NU0, inclusive, is coupled to the channel pulse matrix circuit 26 (Fig. 4), multiplexer 24, and to the busy lead converter and emergency service number circuit 21.

As illustrated in Figs. 42 and 43, each positive and negative units conductor carries impulses of 10 microsecond duration at a frequency of 10 kc. As previously mentioned, these impulses define the individual time channels of the lines of the system.

The tens ring circuit 32 is driven from pulses appearing in the output of the tenth units ring stage by way of the tens ring drive conductor TRD. The tens ring circuit 32 comprises a ten stage ring circuit which serves to commutate the pulses on conductor TRD to ten output conductors in sequential order. Thus, the 10 kc. pulses appearing on conductor TRD are converted to 1 kc. pulses of 100 microsecond duration and appear on ten output conductors which are individually coupled to a corresponding amplifier in the tens ring amplifier circuits 33. Two outputs, one positive and one negative, are taken from each of the tens ring amplifiers and coupled to the various circuits of the system. The positive tens cable POS tens, comprising conductors PT1–PT0, inclusive, is coupled to the trunk hunting and executive-cut-in markers circuit 40, to all of the line finder and connector circuits of the system, and to the busy lead converter and emergency service number circuit 21. The negative tens cable NEG tens, comprising conductors NT1–NT0, inclusive, is coupled to the channel pulse matrix circuit 26, multiplexer 24, and to the busy lead converter and emergency service number circuit 21.

As illustrated in Figures 42 and 43, each positive and negative tens conductor carries impulses of 100 microsecond duration at a frequency of 1 kc. The positive and negative tens pulses are employed to gate the positive and negative unit pulses, respectively, throughout the system. Thus, the first ten pulse time positions of each pulse frame, which are respectively assigned to the lines of the system having directory number designations 11, 12–10, are defined by the first tens pulse period of the frame within which the first ten unit pulse periods occur. Similarly, the second group of ten pulse time positions of each pulse frame, which are respectively assigned to the lines of the system having directory number designations 21, 22–20, are defined by the second tens pulse period of the frame within which the second group of unit pulse periods occur, etc.

The register drive pulse generator 34 is driven from pulses appearing in the output of the tenth tens ring stage by way of the register generator drive conductor RGD. The register drive pulse generator circuit 34 comprises a three stage ring circuit. A first output signal is taken from the first stage of the ring and converted into a short positive pulse which is coupled to the input of the register drive pulse amplifier 35. The inverted and amplified output of the register drive pulse amplifier 35 is coupled by conductor RDP to all of the line finders and connectors of the system and to the link-allotter circuit 19. Negative going impulses appear on conductor RDP at a frequency of 333 C. P. S, as illustrated in Fig. 44.

A second output signal is taken from the third stage of the register drive pulse generator ring circuit and coupled by way of conductor DT input to the busy tone and dial tone generator circuit 36. The impulses appearing on the DT input conductor, which are illustrated in Fig. 44, comprise a rectangular wave with a positive excursion time of 1,000 microseconds and a negative excursion time of 2,000 microseconds. This is the basic waveform used in the dial and busy tone circuits and represents a signal having a fundamental frequency of 333 C. P. S. and containing a large number of both odd and even harmonics.

The busy and dial tone generator 36 serves to amplify the DT input signal and transmit it to the dial tone conductor which is coupled to the connectors of the system. The DT input signal is also keyed at 60 interruptions per minute and transmitted by way of the busy tone conductor to the connectors of the system. The 60 I. P. M. keying signal, generated by the busy and dial tone generator circuit, is also coupled to the ringing interrupter circuit 37 via the conductor 60 I. P. M.

The ringing interrupter circuit, which is designed to provide a pair of keying output signals suitable for controlling the ringing in the system, comprises a four stage ring circuit which is driven by the pulses appearing on conductor 60 I. P. M. Two output signals are taken from the ring, one from the first stage, and one from the third stage, and coupled to the two output conductors which lead to the superimposing ringing supply circuit 38. The signal on each of these output conductors is a rectangular wave which comprises positive going alternations of one second duration separated by three second negative alternations.

The ringing generator circuit 39 serves to generate the ringing frequency for the system. The output of circuit 39 is coupled to the superimposing ringing supply circuit 38. In accordance with the keying signals received from the ringing interrupter circuit 37, circuit 38 first applies ringing power to the ring tip power conductor RTP and ground to the ring tip control conductor RTC for a one second interval. After a one second interval succeeding the discontinuance of the above-mentioned operation, ringing power is applied to the ring-ring power conductor RRP and ground is simultaneously applied to the ring-ring control conductor RRC for a one second interval. Thus, the ringing cycle comprises one second on tip, one second silent period, one second on ring, and one second silent period. The conductors RTP and RRP are connected to all of the line circuits of the system while the conductors RTC and RRC are connected to all of the connectors of the system.

The final circuit to be discussed as part of the common equipment is the channel pulse matrix 26. The purpose of this circuit is to commutate to one hundred output conductors the individual time positions assigned to each of the 100 lines in each group of lines in response to pulses on the twenty input conductors comprising the NEG tens and NEG units cables. The matrix is made up of 100 identical "and" gates composed of two diodes each. An "and" gate is defined as a logic gate in which an output is realized only when a predetermined type of signal is connected to all inputs simultaneously. When a tens pulse and a units pulse occur simultaneously, an output is realized from one of the "and" gates. For any one gate this simultaneous occurrence exists during one of the ten microsecond channel intervals and repeats once each frame.

The output of the channel pulse matrix is coupled to the diode switches and to the line circuits of the system. It can be seen from the trunking diagram that conductor CP11, which carries pulses in time position 11, is connected to line circuit 11 and to diode switches 11A, 11B, and 11C. Similarly, conductor CP12, which carries pulses in time position 12, is connected to line circuit 12 and to diode switches 12A, 12B, and 12C. Each diode switch is thus conditioned in accordance with the time position identity of the line to which it is connected so that it will respond only to switch control pulses appearing in the time position of its associated line. In a similar manner, the ringing control facilities in each line circuit are conditioned in accordance with the time position of its associated line so that ringing control pulses will act to operate the proper line circuit in accordance with the relative timing of the pulses.

*Link common equipment*

The link common equipment will now be described with reference to the trunking diagram. The circuits included under this heading are those which are common to each link group within the switchboard. If the lines are divided into 100 line groups, the group of finders and connectors serving one of the line groups is considered a single link group and thus would be served by one set of the link common equipment. For a 100 line switchboard, only one link group would be provided and hence only one set of link common equipment would be necessary. The circuits included in this category are the multiplexer 24 (Fig. 4), the multiplexer amplifier 25 (Fig. 5), ringing control driver 27 (Fig. 5), busy lead converter and emergency service number circuit 21 (Fig. 3), auxiliary pulse amplifier 20 (Fig. 3), connector busy amplifier 22 (Fig. 3), finder busy amplifier 25 (Fig. 3), trunk hunting and executive-cut-in markers 40 (Fig. 6), trunk hunting amplifier 42 (Fig. 6), executive-cut-in amplifier 41 (Fig. 6), and the link-allotter circuit 19 (Fig. 3).

The purpose of the multiplexer 24 is to commutate the 100 supervisory signals received over the multiplexer control conductors, such as M–11 and M–12 of line circuits 11 and 12, respectively, from the 100 line circuits in such a way that each line is sampled at a precise predetermined time occurring once during the 1,000 microsecond frame. During the channel interval, which corresponds to a units pulse having a duration of 10 microseconds, a short sample of the supervisory information is taken in such a way that if the line is on hook, no output signal is derived, and if line current is flowing, a full amplitude output signal in the form of a 2 microsecond pulse occurring at the center of the channel pulse interval is derived. The individual channel interval for each line is, of course, derived from the gating of the NEG units pulses with the NEG tens pulses in the same manner as described in conjunction with the channel pulse matrix circuit. The channel pulse interval for any particular line is further gated by the multiplexer control conductor, such as M–11, from the particular line circuit and by the sampling pulse on conductor SP. It will be recalled that the sampling pulses are 180° out of phase with the units ring drive pulses on conductor URD and will thus occur in the center portion of the units pulses. The relationship is graphically illustrated in Figs. 42 and 43 of the drawings where it can be seen that the pulses on conductor SPD fall in the approximate center of each of the units pulses. The pulses on conductor SP differ from the illustrated SPD pulses only in polarity. The samples from all of the lines are combined in the multiplexer and appear on a single output conductor which is connected to the multiplexer amplifier circuit 25. The pulses are amplified and inverted by the multiplexer amplifier 25 and distributed to all of the line finders and connectors of the link group and to the link allotter circuit 19 over conductor MPX.

The ringing control driver 27 serves to combine and amplify ringing control output signals received from all the connectors in the link group over multiple conductor RCO. The output of circuit 27 is multipled to all of the line circuits of the 100 line group over ringing control conductor RC.

The busy lead converter and emergency service number circuit 21 serves to amplify busy pulses received from the finders and connectors, to generate artificial pulses in accordance with the emergency service requirements and to redistribute the busy signals to the finders and connectors of the system. Busy pulses in the time position of the calling and called lines are generated by the finder and connector circuits, respectively, and coupled over the link gate conductor LG to the switch control circuit individually associated with that particular link. These pulses are then combined through an "or" gate, a portion of the gate being associated with each switch control circuit, and connected by the multiple link busy conductor LB to circuit 21. An "or" gate is defined as a logic gate in which an output is realized whenever a predetermined type of signal is connected to any one of its inputs.

It will be remembered that it is necessary to generate a busy pulse in the time position of the line circuit connected in multiple with the emergency service line circuit when the emergency service number is dialed. Whenever a busy pulse is received over conductor LB in the time position of the emergency service line circuit, circuit 21 generates an artificial busy pulse which is connected to the auxiliary pulse amplifier circuit 20 over the artificial busy pulse conductor ABP. The auxiliary pulse amplifier circuit 20 amplifies this pulse and transmits the amplified pulse to conductor LB. Thus, the artificial busy pulses are processed and repeated as if they were bona fide busy pulses originating in one of the line finder-connector links.

Circuit 21 repeats the pulses received over the LB conductor to the conductor CBI with the exception that the busy pulses appearing in the time position of the emergency service number are removed so that the line will appear idle to connectors at all times. The busy pulses on conductor CBI are amplified by the connector busy amplifier 22 and connected to all of the connectors of the link group by way of the connector busy conductor CB. Circuit 21 also repeats the pulses received over conductor LB to conductor FBI. In addition, the permanent busy pulse in the time position of the emergency line is placed on conductor FBI. The busy pulses on conductor FBI are amplified by the finder busy amplifier 23 and connected to all of the finders of the link group by way of the finder busy conductor FB.

The trunk hunting and executive-cut-in markers circuit 40 comprises a matrix which can be wired in any desired manner to provide one or more pulses within the time position frame so that lines in trunk groups may be identified. The circuit also comprises a matrix used to generate the marking pulses for calling lines which are to be given the executive-cut-in feature. The positive tens conductors and the positive units conductors in the incoming cables POS tens and POS units, respectively, are connected in the matrix so as to be capable of producing pulses in the time positions of all of the lines of the 100 line group. Outputs are taken from the crosspoints which correspond to all but the last line of the trunk group lines. These pulses are then amplified in the trunk hunting amplifier circuit 42 and distributed to all of the connectors of the link group over the positive trunk hunting and negative trunk hunting conductors PTH and NTH, respectively.

Similarly, the POS tens conductors and the POS units conductors are connected in the executive-cut-in matrix so as to be capable of producing pulses in the time position of all of the lines of the group and outputs are taken from the crosspoints corresponding to calling lines which are to be given the executive-cut-in feature. These pulses are then amplified in the executive-cut-in amplifier circuit 41 and distributed to all of the connectors in the link group over the executive-cut-in conductor ECI.

The link allotter circuit 19 is employed to allocate the line finder-connector links, in sequence, to handle calls. The heart of the allotter is a ring circuit having one stage for each finder-connector link of the system. Referring to Figure 3, it can be seen that the allotter is connected to the individual finders of the system by way of conductors identified by reference letters AS1 and AL. Allotter 19 is connected to line finder 17A by conductors AS1–A and AL–A, to finder 17B by conductors AS1–B and AL–B, and to line finder 17C by conductors AS1–C and AL–C. The AS1 lead from any particular finder is at positive potential if the finder is idle. A negative potential is placed on the selected finder AL conductor by the allotter to enable that finder to find a calling line. When the line has been found by the enabled finder, the line finder returns a negative potential over the corresponding AS1 conductor. The negative potential returned over the AS1 conductor gates the register drive pulse received over conductor RDP so that the allotter ring circuit is stepped ahead and the allotter thus preselects the next idle finder.

The allotter also comprises an emergency pulse generator circuit which is utilized to advance the allotter in the event that the selected finder fails to find the calling line. A monitor circuit is incorporated within the allotter which examines the multiplexer pulses on conductor MPX and compares them with the finder busy pulses on conductor FB. In normal operation of the system, each multiplexer pulse will have a companion busy pulse originating in either a line finder or a connector. The multiplexer pulses in the time position of a calling line are, of course, not guarded by busy pulses during the finding time of the allotted finder. If the unguarded pulses persist longer than the normal finding time, the emergency pulse generator circuit is brought into action to generate a single emergency pulse which is utilized to advance the allotter to the next step. If the next selected link happens to be busy, the register drive pulses will be effective to drive the allotter to a succeeding idle link.

*Call from station 211 to station 912*

It is believed that the remaining components of the system, namely, the line finder, the connector, and certain portions of the link equipment and line circuit, may best be generally described in conjunction with the trunking diagram by tracing a call through the system. For this purpose, assume that station 211 is calling station 912 and that link A has been preselected by allotter 19.

When the subscriber at station 211 removes his handset from its cradle, a loop circuit is completed over conductors T and R to seize line circuit 11. In response to this seizure, line circuit 11 functions to alter the potential on conductor M–11, which is connected to multiplexer 24, in such manner that the multiplexer functions to produce a multiplexer pulse in the time position of line circuit 11. As previously explained, this pulse is amplified by multiplexer amplifier 25 and connected over conductor MPX to the switching components of the system.

It is necessary to digress for a moment at this time to describe certain operations in the line finder 17A. The line finders of the system comprise two endless ring circuits, namely, a units ring and a tens ring. When the finder is idle, the units ring is stepped under control of register drive pulses on conductor RDP and the tens ring is stepped from the tenth stage of the units ring. Each register stage gates through to a common conductor, internal to the line finder, a corresponding POS units or POS tens pulse while that particular register stage is conducting. The POS units pulse is then gated with the POS tens pulse to produce a single pulse having a duration of one pulse channel and having a repetition rate of one pulse frame. Due to the method of connecting the registers, this selected finder gate pulse will step through the frame one at a time, channel after channel, in a continuous fashion so long as the finder is idle. As will be described later, the finder must generate an artificial pulse in the time position of the calling line. Thus it is necessary to have a settable register which assumes a position corresponding to the time position of the calling line.

The MPX conductor, which is now carrying unguarded pulses in time position 11, is connected to one input of a five input "and" gate in line finder 17A. The pulses generated by the line finder register rings are connected to a second input, the finder busy conductor FB is connected to a third input, the allotter control conductor AL–1 is connected to a fourth input, and the connector reset conductor RS, which carries information back to the finder that the connector is reset and ready to handle the call, is connected to the fifth input of the gate. It is evident therefore that an output will be obtained from the "and" gate only when line finder 17A is allotted by the link-allotter (AL–1), when the connector 18A is reset (RS), when a multiplexer pulse (11) exists in a time position not covered by a busy pulse (MPX and FB), and when the register chains of the finder are driven to a setting agreeing in time position with the unguarded pulse in time position 11 on conductor MPX.

It might be well to point out at this time that the units ring of the finder is driven at 333 C. P. S. from the register drive pulse on conductor RDP and the tens ring is driven at 33 C. P. S. from the tenth stage of the units ring. Thus, since the basic multiplexing frame is 1,000 C. P. S., any given pulse, generated by the finder register chains, will persist for three consecutive frames and it will require one-third of a second for the register chain to complete a cycle for the 100 lines. This represents the maximum possible line finding time.

The output pulse from the "and" gate serves to "cut through" the line finder. As a result of cut through, the register rings of the line finder are stopped in position 11, a negative potential is applied to the AS1–A conductor which is multipled to the link allotter 19 and connector 18A, the register ring generated pulse in time position 11 is released over link gate conductor LG to switch control circuit 16A and over the negative finder gate conductor NFG to connector 18A, negative potential is applied over conductor AS to the release pulse generator 15A to terminate its operation, and positive potential is applied to the finder cut-through conductor FCT which connects to connector 18A.

In response to the negative potential applied to conductor AS1–A, link allotter 19 functions to preselect the next idle finder for use on the next call. The pulse on conductor LG in time position 11 is amplified in switch control circuit 16A and one output is connected to the links busy conductor LB. As previously described, the busy lead converter and emergency service number circuit 21 repeats this pulse to finder busy amplifier 23 which in turn amplifies the pulse and returns it over the finder busy conductor FB to the finders of the link group. Connector busy amplifier 22 transmits an amplified pulse corresponding to line 11 over conductor CB to mark the line as busy to all connector circuits. Since the line 11 is marked as busy to all of the line finders and even though the MPX and register chain pulses persist, no further output is obtained from the line finder 17A "and" gate.

A second output is obtained from the switch control circuit 16A and connected by switch control conductor SC to all of the diode switch circuits associated with link A. The pulses on conductor SC comprise the amplified pulse in time position 11, derived from the conductor LG, gated with the very narrow sampling pulse on conductor SP1. Although conductor SC is multipled to all of the diode switches, only the one switch corresponding to the calling line is operated. The SC pulse is applied to one input of a two input "and" gate in each of the diode switch circuits. The other input is connected to the channel pulse matrix circuit 26 by individual conductors, such as CP11 and CP12 which correspond to lines 11 and 12, respectively. Thus, only diode switch 11A will respond since the pulses on conductor SC are in the same time position as those on conductor CP11. Diode switch 11A is thus rendered operative and serves to cut through line circuit 11 and thus station 211 to the link multiple point 13A. The calling subscriber now hears dial tone which originates in the busy and dial tone generator 36 and is conducted over the dial tone conductor to the connector circuit where it is gated to the tones-out conductor while the connector is in the reset condition.

As previously mentioned, the line finder connects a negative potential to conductor AS1–A and pulses in time position 11 over conductor NFG to connector 18A. These two conductors in addition to the conductor MPX connect to the three inputs of an "and" gate in the connector circuit. It will be remembered that conductor MPX carries signals from all lines which are off hook. It thus can be seen that the pulses on conductor NFG, which are in time position 11, serve to gate through to the connector only those multiplexer pulses corresponding to line circuit 11. The potential applied to conductor FCT by the finder is utilized in the connector to prevent a false pulse upon seizure of the link. The calling subscriber, hearing the dial tone, now proceeds to dial the first digit "9" of the called line number. As previously mentioned, a prefix digit of "9" signifies that the called party is to be rung on the ring side of the line. In accordance with the dial impulses, the multiplexer pulses on conductor MPX disappear and reappear nine times corresponding to the nine break and nine remake intervals, respectively, of the dial. The nine make pulses following the break intervals serve to step a register circuit in the connector to register the first digit. A ring-ring storage circuit in the connector is operated responsive to the registration of the digit "9" and the register is then reset so that it may register the tens digit of the called line number. Incident to the receipt of the first pulse of the first digit, dial tone is removed from the tones-out conductor leading to the link multiple point 13A.

The break intervals of the impulses of each digit are repeated to conductor FRA which connects back to a delay circuit in the line finder 17A. This delay circuit is designed to remain inoperative on dial pulses but to operate when the calling line hangs up for a substantial period of time. Operation of the delay circuit serves to release the link as will be described subsequently. In this manner, the finder is made to lock to a calling line even during dial interruptions and releases only after a suitable release delay timing interval.

When the calling party dials the second digit "1," the register circuit used to record the ringing digit is re-used to record the tens digit "1." The units digit "2" dialed by the calling party is then stored in a second register circuit. At the completion of the units digit, the connector tens and units registers are effective to release pulses in the time position of the called line. These pulses are produced by the gating of the POS units pulses, corresponding to the setting of the units register, with the POS tens pulses corresponding to the setting of the tens register. A busy test is now made to determine if the generated pulses in the time position of the called line coincide with busy pulses on the connector busy conductor CB. If the desired line is not marked as busy on conductor CB, switch-through occurs. The connector pulses, in the time position of the called line, are thereby released to the link gate conductor LG. As previously described, these pulses are amplified by the switch control circuit 16A and transmitted to the switch control conductor SC and to the busy lead converter and emergency service number circuit 21 over conductor LB. The pulses are further amplified by the finder busy amplifier 23 and the connector busy amplifier 22 and returned to the finders and connectors of the link group over conductors FB and CB, respectively. Thus the called line is marked as busy when seized by connector 18A. Diode switch 12A operates in response to the pulses received over conductor SC since the time position of these pulses coincides with the time position of the channel pulse 12 pulses which are received over conductor CP12 from the channel pulse matrix circuit 26. A communication connection is now completed from line circuit 11 to line circuit 12 through the medium of diode switch 11A, link multiple point 13A, and diode switch 12A, as previously described.

Ringing control signals are now released in the time position of the called line to the ringing control driver circuit 27 over conductor RCO. Since the called party is to be rung on the ring side of the line, as denoted by the operation of the ring-ring storage circuit, these pulses are released only during the interval when potential appears on the ring-ring control conductor RRC, which originates in the superimposing ringing supply circuit 38. If the called party is to be rung on the tip side of the line, the connector will function to release pulses to conductor RCO only while potential appears on conductor RTC.

The pulses occurring on conductor RCO are amplified by the ringing control driver circuit 27 and transmitted over ringing control conductor RC to all of the line circuits of the 100 line group. Here again, only line circuit 12 responds to these pulses since the time position of the pulses received over conductor RC coincides with the time position of the channel pulse 12 pulses which are received over conductor CP12 from the channel pulse matrix circuit 26. Since the application of control potential to conductor RRC by circuit 38 coincides with the application of ringing power to conductor RRP, the combination of the pulse on conductor RC and the pulse on conductor CP12 is effective to release ringing power to the ring conductor terminating in station 912. Ringing power at greatly reduced amplitude is also coupled, within the line circuit 12, to cable **12*a*** and thus back over the communication connection to the calling party at station 211. This low amplitude ringing power is known as ringback tone and serves to inform the calling party that the called line is being rung.

When the called party at station 912 answers, line circuit 12 functions to prevent further application of ringing to the called line and also to alter the potential on conductor M12. The multiplexer circuit 24 then functions to generate a pulse on conductor MPX in the time position of line 12, which pulse is effective in connector 18A to terminate transmission of ringing control signals to the called line circuit. The subscribers may now converse over the previously completed communication connection.

When the calling party hangs-up, multiplexer pulses, in the time position of the calling line, disappear from conductor MPX and thus the potential of conductor FRA is altered for a sufficient period of time to enable the time delay circuit in finder 17A to become operative. As a result of this operation, the potential on conductor AS, which connects to the release pulse generator circuit 15A, is altered and circuit 15A is thereby conditioned to generate release pulses which are amplified by release pulse amplifier circuit 14A and transmitted over the release pulse conductor RP to the diode switches associated with link A and to connector 18A. The release pulses serve to restore the diode switches to their non-conducting condition and to restore the connector circuit 18A to normal. Also, in response to the operation of the finder delay circuit, the potentials of conductors NFG, AS1–A, and FCT, which connect finder 17A to connector 18A, are restored to the normal condition. When connector 18A is fully released, the potential on conductor RS is altered to inform finder 17A of this fact so that it may be enabled to serve on another call.

It is now necessary to return to the consideration of connector circuit 18A and its operation with regard to selection of a busy line, trunk hunting, and executive-cut-in. It will be remembered that the connector register circuits generate connector pulses in the time position of the called line at the completion of the units digit. The trunk hunting and executive-cut-in marker circuit 40 generates pulses in the time position of calling lines requiring the executive-cut-in feature, the pulses are amplified by circuit 41 and connected over conductor ECI to the connector, the circuit 40 also generates pulses in the time position of each line but the last line of each trunk hunting group, and these pulses are amplified by circuit 42 and connected by the positive trunk hunting and negative trunk hunting conductors PTH and NTH to the connector circuits.

As previously mentioned, a busy test is made at the completion of the units digit. If the pulses generated by the connector register circuits coincide in time position with busy pulses on conductor CB and the pulses in the time position of the calling line on conductor NFG do not coincide with an executive-cut-in pulse on conductor ECI, switch-through does not occur, but instead, the busy circuit operates. The connector is locked in this position until the call is abandoned by the calling party. Busy tone is gated to the tones-out conductor and thence to the link multiple point and the calling subscriber. If the pulses in the called line time position coincide with busy pulses and the pulse in the calling line time position coincides with an executive-cut-in marking pulse on conductor ECI, an executive-cut-in circuit in the connector operates to allow switch through provided that the pulses in the position of the called line do not coincide with pulses on the trunk hunting conductors PTH and NTH.

If the pulses in the called line time position coincide with busy pulses as well as trunk hunting marking pulses, a trunk hunting circuit in the connector operates regardless of whether or not the pulses on conductor NFG coincide in time position with the pulses on conductor ECI. The trunk hunting circuit serves to gate the register drive pulses on conductor RDP so that the units ring of the connector is driven one step and into the position of the next line of the trunk hunting group. If all of the lines of the trunk line group are busy, this operation continues until the last line of the group is reached. The units ring remains in a setting corresponding to the last line of the group since there is no trunk hunting pulse in the time position of the last line of the group. If the calling line is an executive-cut-in line, switch through occurs. If the calling line is not entitled to the executive-cut-in feature, the busy circuit operates and busy tone is returned to the calling party.

DETAILED DESCRIPTION

In the detailed description which follows, the components of the system have been dvided into four categories, namely, talking path and line ringing circuits, common equipment, link common equipment, and link equipment, which will be described in turn.

In considering the detailed circuitry of the system components briefly described above, operation of these components will be analyzed insofar as possible in terms of functions which they perform in establishing the above described connection between lines 11 and 12 when the subscriber 211 initiates a call.

Throughout the detailed description of the system, the transistor and tube types, which were employed in a tested model of the system, are specifically identified. Those tubes of the system which are of the gas-filled or thyratron type are so identified in the drawings through the use of a small dot within the tube envelope circle and opposite the tube cathode. Moreover, the transistors utilized in the system have been illustrated in the drawings with the base, emitter, and collector electrodes enclosed in a circle in the conventional manner. The transistors are identified as to whether they are of the junction type or point contact type by the inclusion of either the letter "J" or the letter "P," respectively, within the circle. Also in the conventional manner, the direction of the arrow, which is superimposed on the emitter, designates whether the particular transistor is of the N or P type. Thus, an N type point contact transistor is identified by a P within the circle and by the arrow on the emitter pointing toward the base electrode. A P type point contact transistor is identified by a P within the circle and by the arrow on the emitter pointing away from the base electrode. A PNP junction transistor is identified by a J within the circle and an emitter arrow which points toward the base electrode, and an NPN junction transistor is identified by a J within the circle and an emitter arrow which points away from the base electrode.

It might be well to mention at this time that insofar as the base and emitter of a transistor are concerned, the transistor is biased for conduction whenever the N type material is negative with respect to the P type material. Thus, a PNP junction transistor, or an N type point contact transistor, is biased for conduction whenever the base is negative with respect to the emitter. Similarly, an NPN junction transistor, or a P type point contact transistor, is biased for conduction whenever the base is positive with respect to the emitter. The base and collector are always biased in the non-conducting or high impedance direction.

TALKING PATH AND LINE RINGING CIRCUITS

*Line circuit 11*

Figure 13:
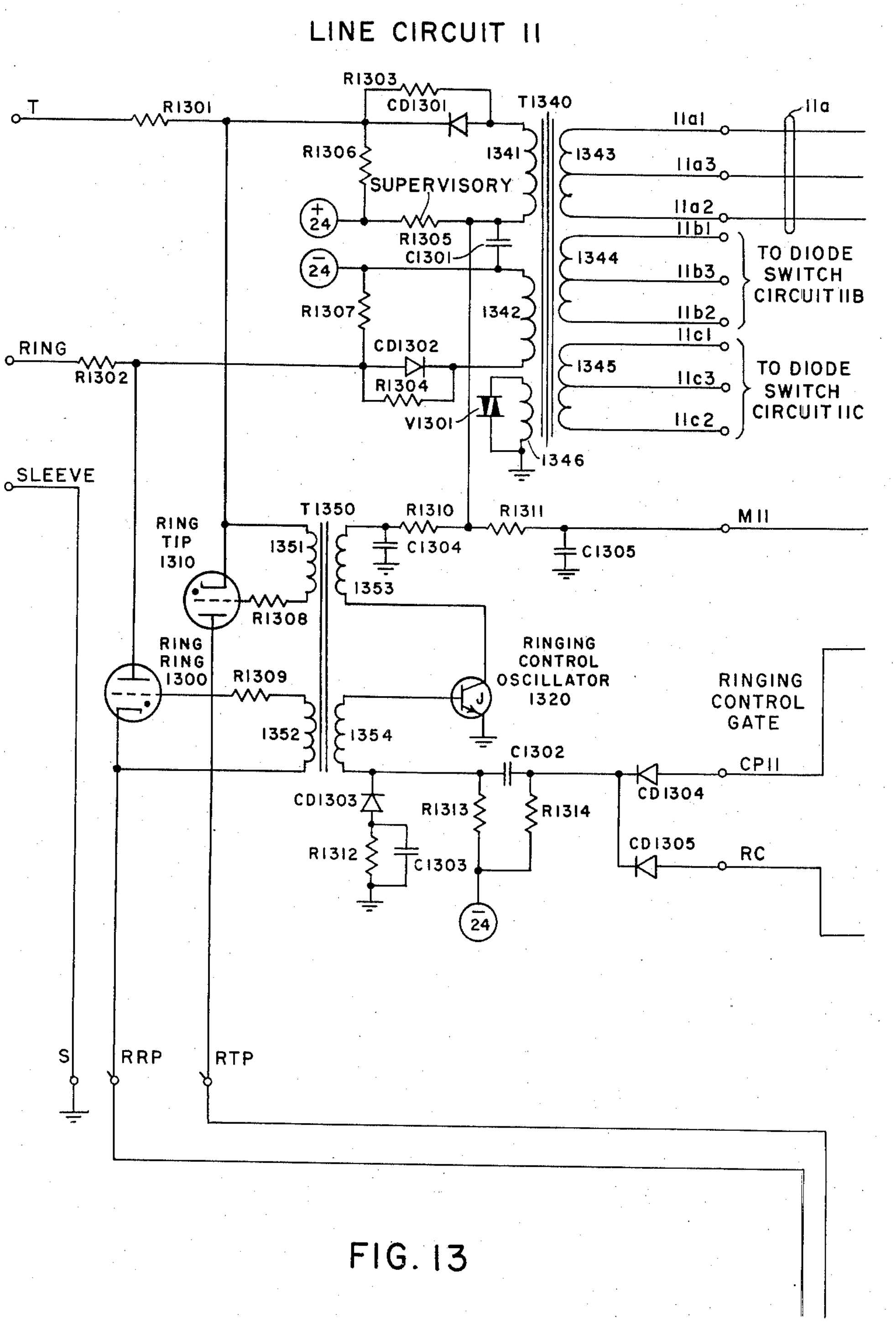

Line circuit 11, which is shown in Figure 13, may be used either for single party service or for two-party service. As mentioned above, the ringer at the associated station is bridged across the line for single party service, while for two-party service, the ringers at the associated stations are connected from tip to sleeve and from ring to sleeve, respectively.

Transformer T1340, which is shown at the upper right of Fig. 13, serves the function of coupling voice currents through to the diode switch circuits associated with line circuit 11. It can be seen from the drawing that transformer T1340 comprises two primary windings 1341 and 1342, a plurality of secondary windings, the number of secondary windings corresponding to the number of links in the system, and a tertiary winding 1346. Transformer T1340 has been illustrated as comprising three secondary windings, namely, 1343, 1344 and 1345, but in practice the transformer would probably comprise fifteen secondary windings corresponding to the maximum number of links which might be used in conjunction with the 100-line group. Each secondary winding is connected to a diode switch associated with one link of the system. Thus, winding 1343 is connected by the conductors of cable 11*a* to diode switch 11A which is associated with link A. Battery feed is given the associated station, or stations, through the primary windings of transformer T1340.

Assume that a station associated with line circuit 11 goes off hook. Line current flows over the extended loop circuit from +24 volts through supervisory resistor R1305, winding 1341 of transformer T1340, the parallel combination of crystal diode CD1301 and resistor R1303, resistor R1301, over the tip conductor, through the station subset and back to the ring conductor, through resistor R1302, the parallel combination of diode CD1302 and resistor R1304, and through winding 1342 on transformer T1340 to −24 volts. The diffused junction germanium diodes CD1301 and CD1302, which may be type IN93, are poled so as to conduct. It is to be noted that when the station on the line is on hook, there is no voltage drop across supervisory resistor R1305 so that the M11 conductor, which connects to multiplexer 24, stands at +24 volts. Because of the line current flow when the station is off hook, a voltage drop exists across resistor R1305 and the potential of conductor M11 drops to +18 volts or less depending upon the length of the extended loop. This reduced voltage level serves to indicate to the multiplexer that line 11 is off hook. Dial impulses generated at the subset will, of course, be reproduced on conductor M11 as the current flow through resistor R1305 is interrupted and reestablished and the corresponding voltage drop across said resistor disappears and reappears, respectively.

Talking signals appear across the primary windings of transformer T1340 and are induced in the other windings at impedance levels depending upon the particular turns ratio. Capacitor C1301 by-passes the supervisory resistor R1305 to voice frequencies but permits dial impulses to appear across the resistor and hence on conductor M11. A varistor V1301 is placed across the tertiary winding 1346 as a limiting device to prevent signals of excessive amplitude from appearing across the secondary windings. This limiting level is placed safely above the normal peak talking signal levels encountered on the tip and ring conductors of the line, but is below the point at which the diode switches might be overdriven and thus cause system crosstalk. On short loops where dialing transients might become severe, current limiting resistors, such as R1301 and R1302, are placed in series with the tip and ring conductors of the line.

The lower half of Fig. 13 shows the ringing facilities of line circuit 11. It will be remembered from the general description that each connector of the system is arranged to release a series of ring control pulses in the time position of the called line over conductor RCO, which is common to all of the connectors of the system. These pulses are released incident to switch-through and are terminated incident to ringing trip. Further, they are keyed in accordance with the ringing pattern set up by the ringing interrupter 37 and select the tip party or the ring party according to the relative timing of the release of pulses with respect to the ringing cycle. This timing is set up under control of the first digit dialed into the connector.

Ringing control driver 27 mixes the various ringing control pulses received from the connectors and transmits them over conductor RC to the 100 line circuits of the system. At each line circuit a gate is used to separate out the ringing control pulses intended for that line circuit apart from those pulses intended for other line circuits. A channel pulse, derived from channel pulse matrix 26, in the time position assigned to the particular line in question is applied to one input of a two diode "and" gate, which is designated "ringing control gate" in line circuit 11. The ringing control pulses appearing on conductor RC are applied to the other input of the gate in such a way that negative ringing control pulses are gated through only in the time position assigned to the particular line.

As shown, the ringing control gate comprises two diodes CD1304 and CD1305, which may be point contact germanium diodes of type CK705. Conductor CP11 connects to the anode terminal of CD1304 and conductor RC connects to the anode terminal of CD1305. Conductor RC is maintained at +6 volts except when a negative ringing pulse is applied thereto. Conductor CP11 is also maintained at +6 volts except during the negative pulse in the time position of line circuit 11. Thus, the diodes are normally conducting from +6 volts to −24 volts through resistor R1314. Because of the high value of resistor R1314, the output of the gate is substantially +6 volts. A negative pulse appearing on conductor RC at any time other than during the time of channel pulse 11 merely serves to cut off diode CD1305 since its cathode terminal remains at +6 volts because of the conduction through diode CD1304. However, when the time position of the negative pulse on conductor RC coincides with the negative channel pulse, a negative output pulse is realized from the gate circuit.

The output of the "and" gate is coupled through a peaking circuit, which comprises capacitor C1302 and resistor R1313, and through winding 1354 of transformer T1350 to the base of ringing control oscillator 1320, which may be type TI201. The peaking circuit provides a positive spike at the trailing edge of the ringing control pulse of suitable amplitude to trigger the oscillator. The oscillator is normally biased below cutoff by a resistive bleeder network in the base circuit. Bias is derived from ground through resistor R1312, diode CD1303, and through resistor R1313 to −24 volts. Diode CD1303 is provided in the base circuit to allow the positive triggering signal to be transmitted in full to the base of the transistor. Collector supply voltage for transistor 1320 is derived from +24 volts through resistors R1305 and R1310 and winding 1353 on transformer T1350.

When the oscillator responds by firing, the voltage rise in the collector winding 1353 is reflected into winding 1354 in such direction so as to make the base terminal of transistor 1320 more positive and thus assist in the build up to saturation. A heavy base current flows from ground through capacitor C1303, diode CD1303, winding 1354 of transformer T1350, and through the base and emitter of transistor 1320 back to ground. This current decreases exponentially as capacitor C1303 is charged, so that transistor 1320 is held saturated for a time period determined by the magnitude of capacitor C1303. The inductance of transformer T1350 is sufficiently large that the pulse duration is controlled solely by the capacitor C1303, and not by saturation effects in the transformer T1350. During this period, the collector voltage, normally +24 volts, stands substantially at ground potential. When the base current decreases sufficiently to bring transistor 1320 out of saturation, the collector voltage rises once more, and transformer winding 1353 reflects this change into the base winding 1354 in such a direction as to make the base terminal more negative and thus further cut off the transistor. Thus, a collector pulse having a steep front, an essentially flat top, and a steep trailing edge is produced.

Transformer T1350 is designed in such a manner that the pulses produced in winding 1353 induce output pulses of approximately 150 volts in the secondary windings 1351 and 1352. Secondary winding 1351 is connected between the starting anode and cathode, through current limiting resistor R1308, of the cold cathode ring tip tube 1310, while winding 1352 is connected between the starting anode and cathode of cold cathode ring-ring tube 1300. Tubes 1300 and 1310 may be of the 5823 type.

It will be remembered from the general description that when the party on the ring side of the line is selected, a ringing control pulse is received from the connector during the ring ringing interval. This interval corresponds to the time when ringing power is applied to the ring power conductor RRP. Ringing control oscillator 1320 responds to the control pulses by firing once in response to each such pulse and a triggering pulse is applied to the starting anodes of both of the cold cathode tubes. Only the ring-ring tube 1300 is supplied operating potential at this time so that it fires and applies the ringing power on conductor RRP to the ring side of the line. Ground on sleeve conductor S serves as the ringing return since the ringer is connected at the station between the ring and sleeve conductors. Since the positive extreme of the ringing voltage on conductor RRP is clamped to ground in superimposing ringing supply circuit 38, the ringing voltage on conductor RRP swings between ground and approximately −230 volts. Tube 1300 is extinguished as the ringing voltage approaches ground potential after a negative excursion, and is refired during each negative excursion of the ringing voltage so long as ringing control pulses persist. A portion of the ringing power applied to the ring conductor is coupled through resistor R1304 and through winding 1342 on transformer T1340 to −24 volts. Since only negative going ringing voltage is applied to the ring conductor, diode CD1302 is poled for non-conduction throughout the ringing interval. The ringback tone present in winding 1342 is, of course, coupled to the secondary winding of transformer T1340. Due to the squarewave shape of the ringing voltage, many high order harmonics are present which are clearly audible to the line at the calling end of the connection. It will be shown that a communication connection is completed between the calling line and the called line circuit at the instant of connector switch-through so that ringback tone may be transmitted from the called line circuit to the calling line. In the event of ringing circuit failure within a called line circuit, no ringback tone will be heard by the calling subscriber so that he is informed of the faulty operation of the system. In a like manner, no tone will be returned if a non-existent line is selected by the calling subscriber.

The tip side of the line is rung in a similar manner through the firing of ring tip tube 1310 which is connected between the ring tip power conductor RTP and the tip side of the line. Tube 1310 is selected by the transmission of ringing control pulses during a tip ringing interval. Since the negative extreme of the ringing voltage on conductor RTP is clamped to ground in superimposing ringing supply circuit 38, the ringing voltage on conductor RTP swings between ground and approximately +230 volts. Tube 1310 is extinguished as the ringing voltage approaches ground potential after a positive excursion and is refired during each positive excursion of the ringing voltage so long as ringing control pulses persist. When ringing is applied to the tip conductor, ringback tone is provided by coupling a portion of the ringing power through resistor R1303, winding 1341 of transformer T1340, and through supervisory resistor R1305 to +24 volts. Since only positive going ringing voltage is connected to the tip conductor, diode CD1301 is poled for non-conduction throughout the ringing interval.

Telephones connected as bridged ringing telephones, for single party service, are assigned tip ringing prefix digits and thus are rung through the firing of the ring tip tube 1310. The ringing power is traversing the line returns by way of the ring conductor through diode CD1302 and winding 1342 of transformer T1340 to −24 volts.

Resistors R1306 and R1307 are employed to bleed off the accumulated charge built up across the ringer capacitor located in series with the ringer at each substation telephone. The ringing power, being applied through rectifying gas tubes, contains a large D. C. component which must be bled off for satisfactory ringing operation. Resistors R1306 and R1307 are sufficiently large that they present negligible shunting of audio frequencies during conversation periods.

As previously mentioned, the collector supply potential for the ringing control oscillator 1320 is derived through the supervisory resistor R1305. Under normal conditions of ringing, the telephones attached to the line are on hook and no line current flows to cause a voltage drop in this resistor. Thus, a full +24 volts is made available for the oscillator. When a telephone on the line comes off hook and line current flows, a voltage drop appears across resistor R1305 and the operating potential for transistor 1320 is thereby reduced to the point where the output pulse amplitude is insufficient to cause firing of the cold cathode tubes 1300 and 1310. In this manner, the ringing power is cut off instantaneously within the line circuit in response to answering supervision. The potential drop across resistor R1305 is also reflected to conductor M11 so that the multiplexer 24 operates to inform the connector circuit that the called line has answered. The connector then functions to terminate the ringing control pulses appearing in the time position of line circuit 11 on conductor RC. It is to be noted that resistors R1310 and R1311 serve to isolate the ringing control oscillator 1320 and the M11 conductor from each other and that capacitors C1304 and C1305 serve to decouple all high frequency signals from conductor M11.

*Diode switch 11A*

Figure 14:
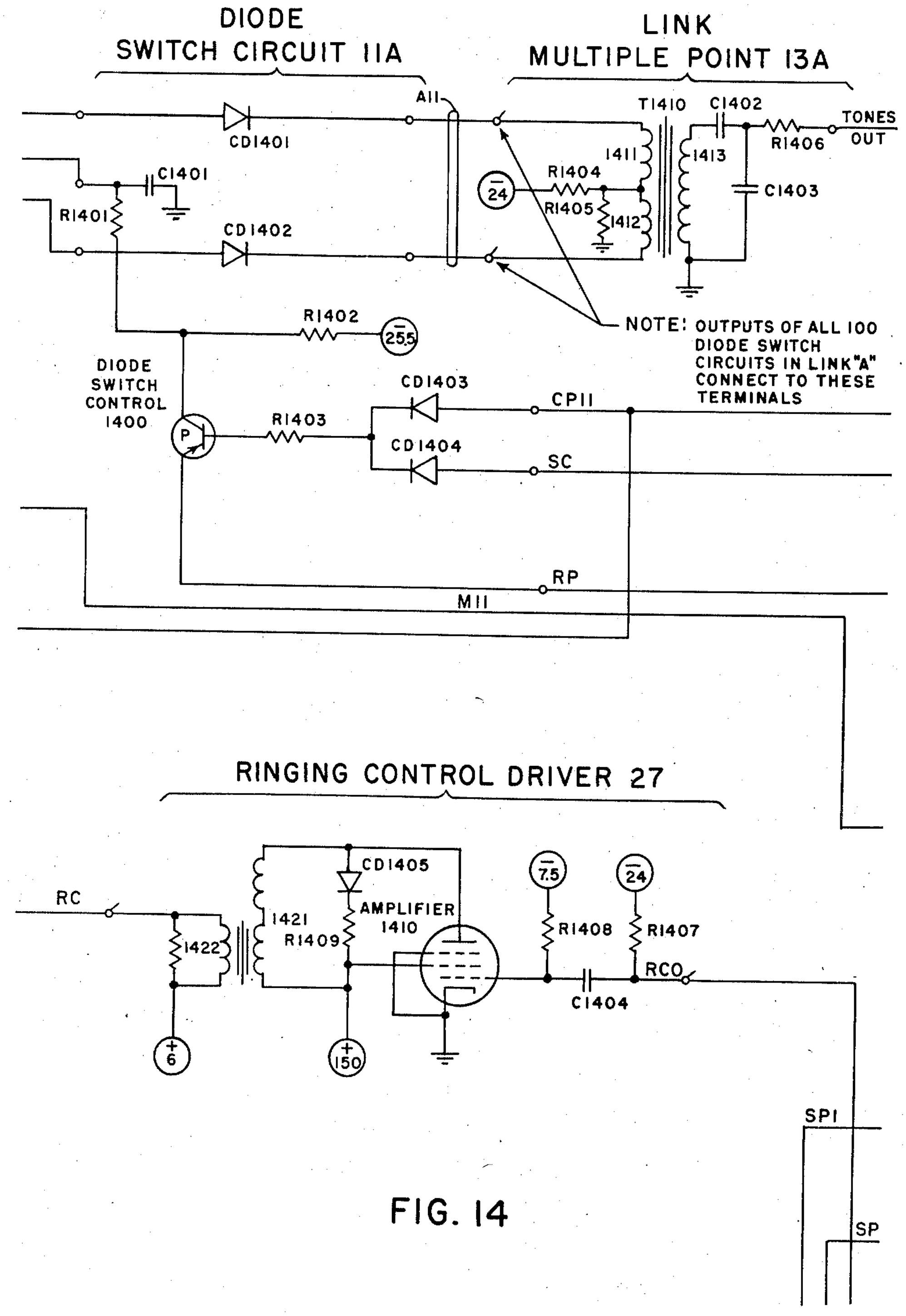

Figure 14 shows the details of diode switch circuit 11A, which is the diode switch associated with line circuit 11 and with link A. It will be remembered that each line circuit has a diode switch associated with each link and that each link therefore has 100 diode switches, one for each line of the 100 line system, associated with it. The diode switch circuits for the other lines of the system are identical, circuitwise, to circuit 11A.

The diode switch comprises line connecting means which is arranged to normally block current flow between the associated line and the multiple point. The line connecting means is controlled to permit speech current flow between the associated line and the link multiple point when its associated line is selected by the line finder or connector.

In the disclosed arrangement, the line connecting means comprises a pair of silicon junction diodes CD1401 and CD1402, which may be type 1N137A, and which are connected in a balanced configuration. The diodes are rendered either conductive or non-conductive by a control means. As disclosed, the control means is the point contact bi-stable diode switch control transistor 1400 which applies biasing potential to the diodes over conductor **11*a*3 and the center tap of secondary winding 1343 on transformer T1340 in line circuit 11. When transistor 1400 is non-conducting, a negative signal of approximately 15 volts is applied to the diodes in the non-conducting direction. The cathode terminals of diodes CD1401 and CD1402 are held at approximately −6 volts as determined by the simple bleeder circuit comprising resistors R1404 and R1405 in link multiple point 13A. The anode terminals of diodes CD1401 and CD1402 are held at approximately −21 volts as determined by the voltage drop in resistor R1402 from −25.5 volts caused by the small current flow from collector to base of transistor 1400** in the non-conducting condition.

When transistor 1400 is conductive, its collector potential rises to approximately ground potential and a D. C. current flow of approximately 2.5 milliamperes per diode is achieved. The D.-C. bias is sufficient to allow the A.-C. talking signals to pass without distortion. In other words, the A.-C. signals do not exceed an amplitude of 2.5 ma. It should be obvious that talking signals appearing in secondary winding 1343 of transformer T1340 are blocked when the diodes are in their non-conducting state, and are allowed to pass through with virtually no attenuation when the diodes are rendered conductive.

Transistor 1400, which may be type G11A, is bi-stable in operation and hence can be turned on or off with the application of short pulses. The emitter is returned to the release pulse conductor RP which is multipled to all of the other diode switch circuits associated with link A. When link A is engaged in a call, conductor RP stands at ground potential. When the link is idle, a series of short negative pulses are impressed on conductor RP by the release pulse generator 15A. These pulses serve to render any and all conducting transistors associated with link A non-conducting for reasons that will become apparent as the description proceeds.

It will be remembered that when link A seizes a calling line, the release pulses are terminated and the line finder transmits a pulse in the time position of the calling line to switch control circuit 16A. Circuit 16A then amplifies the pulse and releases it over conductor SC to all of the diode switches associated with link A. The pulse on conductor SC is impressed upon one input of an "and" gate, which comprises diodes CD1403 and CR1404. The output of the gate is connected to the base of the control transistor 1400. Channel gate pulses from the channel pulse matrix 26 are continuously applied to the other input of the "and" gate. For line 11, channel gate pulses, in time position 11, are applied to the "and" gate terminals of all the diode switches associated with that line whereas switch control pulses on conductor SC are applied to the "and" gate terminals of all the diode switches associated with link A. When a switch control pulse appears in time position 11, the combination of this pulse and the channel pulse in the same position gives rise to an output which acts to trigger the bi-stable transistor to its "on" condition.

Conductor SC stands at +6 volts except when a negative switch control pulse is applied thereto. Conductor CP11 is also maintained at +6 volts except during the negative pulse in time position 11. Thus, diodes CD1403 and CD1404, which may be of type CK705, are normally conductive from +6 volts through the base and collector of transistor 1400 to battery. As previously mentioned, base current flows in point contact transistor 1400 even though the transistor is in the non-conductive condition with the emitter cut off. A negative pulse appearing on conductor SC in any time position other than during the time of channel pulse 11, merely serves to cut off diode CD1404 since its cathode remains at +6 volts because of the conduction through diode CD1403. However, when the time position of the negative pulse on conductor SC coincides with the negative channel pulse, diodes CD1403 and CD1404 are rendered non-conductive and transistor 1400 shifts to its conductive condition. The operation of transistor 1400 is graphically illustrated in Figure 45 of the drawings. Fig. 45(*b*) shows the base bi-stable characteristic and Fig. 45(*a*) shows the circuit used to obtain the characteristic.

It can be seen that the load line R*g* has three intersections with the base characteristic curve. As is well known, the intersection with the characteristic in region II is unstable, whereas those in regions I and III are stable. If it be assumed that the transistor is in the non-conducting condition, the circuit is at operating point (*a*). It can be seen that there is substantial base current flow in the non-conducting condition. When the base supply voltage approaches zero, the load line moves downward and the assumed operating point (*a*) moves downward along the region I position of the characteristic. At the turning point of the characteristic, the operating point suddenly flips to the high current region, returning to point (*b*) as the base voltage is returned to its original value. It can be seen that a positive impulse would be required to shift the operating point from (*b*) to (*a*). Since conductor SC carries only negative going pulses, the base circuit of transistor 1400 loses control and transistor 1400 remains conductive until turned off at the termination of the call by application of negative release pulses to the emitter over conductor RP. The application of a negative pulse to the emitter is, of course, the equivalent of the application of a positive pulse to the base.

The operation when line circuit 11 is the selected called line is exactly as described above. The connector 18A controls switch control circuit 16A which releases pulses in the time position of line 11 over conductor SC to trigger diode switch control transistor 1400 to its conductive condition.

*Link multiple point 13A*

Link multiple point 13A is illustrated in Fig. 14 of the drawings. The output leads of all of the 100 diode switches associated with link A are multipled at the terminals of the primary windings 1411 and 1412 of transformer T1410. The center tap of the transformer is returned to a potential of approximately −6 volts as determiner by a simple bleeder circuit comprising resistors R1404 and R1405 which connect to −24 volts and ground potential, respectively. The secondary 1413 of the transformer is used merely as an insertion point for dial tone and busy tone as received over conductor tones-out from the connector circuit 18A. A low pass filter, comprising resistor R1406 and capacitors C1402 and C1403, is employed in the secondary circuit to remove some of the higher harmonics present in these tones.

COMMON EQUIPMENT

*Master oscillator 28*

Figure 21:
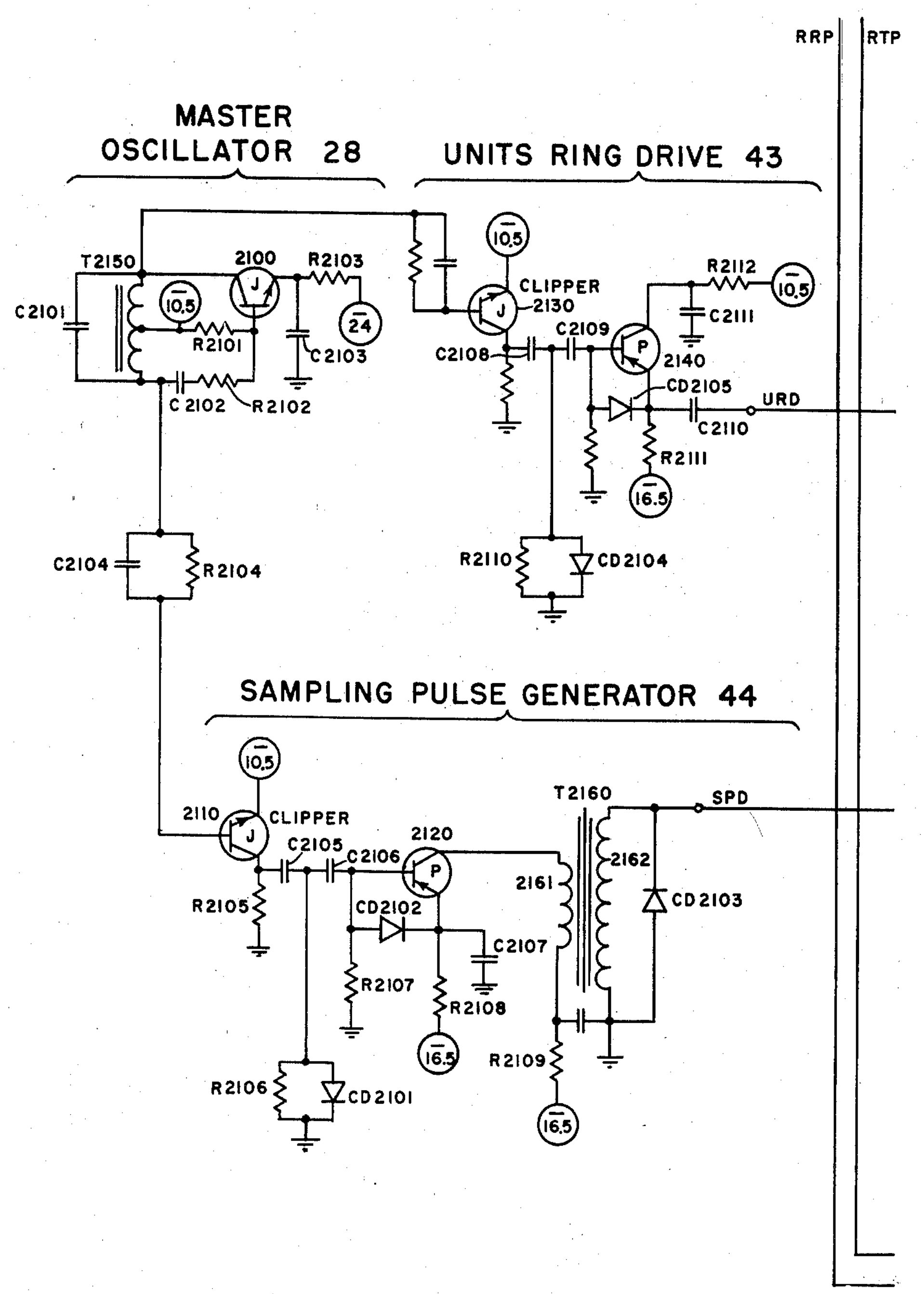

Master oscillator 28, which is shown in the upper left portion of Fig. 21, is designed to provide a sinusoidal output signal at a frequency of approximately 100 kc. The exact frequency of the oscillator is not critical since all of the circuits in the entire switchboard are keyed or synchronized by the master oscillator.

The master oscillator is of the Hartley type. More particularly, a tuned circuit, which comprises capacitor C2101 and transformer T2150 connected in parallel, is coupled between the collector and base terminals of transistor 2100, which may be type T1201. Collector supply voltage is derived from the −10.5 volt connection to the center tap of transformer T2150 while base bias is derived from −10.5 volts through resistor R2101. Capacitor C2102 and resistor R2102 couple the tuned circuit to the base terminal of transistor 2100. The emitter is connected through resistor R2103 to −24 volts. Resistor R2103 in conjunction with capacitor C2103 forms a current limiting and decoupling network.

Two output signals, 180° out of phase, are taken from the master oscillator and utilized to drive the sampling pulse generator circuit 44 and the units ring drive circuit 43, respectively. It can be seen from the drawing that the output conductor which connects to sampling pulse generator 44 is connected to the base end of the tuned circuit while the output conductor which connects to units ring drive circuit 43 is connected to the collector end of the tuned circuit. Thus, the signal voltage connected to either one of the output conductors is 180° out of phase with the signal voltage connected to the other output conductor. The signal produced by the oscillator will swing the output conductors from approximately ground potential to approximately −20 volts.

*Sampling pulse generator 44*

The circuit, which is shown in Fig. 21, comprises an overdriven NPN transistor amplifier 2110 followed by a peaking circuit which is designed to produce a short negative output pulse once during each cycle of the master oscillator. The output of the peaker circuit is used to drive a monostable point contact transistor oscillator 2120. Transistor 2120 responds by generating a short positive pulse of considerable power in its collector circuit.

The emitter terminal of clipper transistor 2110 is biased at −10.5 volts. Transistor 2110 will conduct only when the base becomes positive relative to the emitter and is in a cutoff condition when the base becomes negative relative to the emitter. During the positive half cycle of the master oscillator output voltage, the output conductor potential is in the range from approximately −10.5 volts to ground. During the negative half cycle the potential is in the range from approximately −10.5 volts to −20 volts. This potential is coupled through resistor R2104 and peaking capacitor C2104 to the base of clipper amplifier 2110, and serves to saturate clipper 2110 during the negative half cycle. An output signal is taken from across collector load resistor R2105 and coupled to the peaking circuit which comprises capacitor C2105 and resistor R2106. Since the potential of the collector cannot drop below the −10.5 volt potential of the emitter, the output taken from the collector terminal is essentially a negative going squarewave.

Capacitor C2105 and resistor R2106 serve to differentiate the squarewave output into a sharp negative pulse corresponding to the leading edge of the squarewave and a sharp positive pulse corresponding to the trailing edge of the squarewave. The negative pulse is connected through coupling capacitor C2106 to the base terminal of the single shot oscillator comprising transistor 2120. Crystal diode CD2101, which may be type CK705, serves to clip off the positive going impulses since it is poled to conduct when the pulse is positive with respect to ground.

It is believed that a better understanding of the operation of the single shot oscillator circuit may be had by referring to Fig. 46. Fig. 46(*b*) shows the emitter monostable characteristic and Fig. 46(*a*) shows the circuit utilized to obtain the characteristic. Resistors $R_c$, $R_b$, and $R_e$ represent the collector, base, and emitter resistors, respectively. $V_{CC}$ is the collector supply voltage while $V_{ee}$ is the emitter bias voltage supply. A capacitor C is shown connected between the emitter and base terminals. The emitter input characteristic of the point contact transistor is of the familiar N type. The characteristic shows two positive impedance regions, namely, region I and region III. The transistor is, of course, non-conducting in region I while region III is the current saturation region. Region II is the negative resistance or unstable area of the transistor characteristic. It might be pointed out at this time that the particular characteristic shown corresponds to a particular transistor utilizing particular circuit parameters. The N curves for different transistors, or for the particular transistor with different circuit parameters, may be displaced in one or more directions and may have slightly different shapes than the example shown.

In the quiescent state, emitter bias voltage $V_{ee}$ holds the transistor at non-conducting operation point (*a*). When a trigger pulse raises the potential of the emitter to peak point (*b*), the emitter current quickly shifts to point (*c*) in the saturation region III of the curve. The horizontal shift from point (*b*) to point (*c*) is brought about because of the negligible impedance of capacitor C. The charging current of capacitor C quickly diminishes until point (*d*) on the curve is reached. At point (*d*) the operating point quickly shifts to point (*e*) in the high resistance region I. The capacitor C then slowly discharges through the high back resistance of the emitter until quiescent operating point (*a*) is again reached.

Referring to transistor 2120, the emitter terminal is normally biased at approximately −3 volts. The bias circuit is from ground through resistor R2107, crystal diode CD2102, and through resistor R2108 to −16.5 volts. When the negative impulse is received through coupling capacitor C2106, the base terminal of 2120 is driven in a negative direction with respect to the potential of the emitter terminal. Making the base negative is equivalent to connecting a positive pulse to the emitter as was used to describe the operation in conjunction with Fig. 46(*b*). A heavy current then flows from −16.5 volts through resistor R2109, winding 2161 of transformer T2160, the collector, base, and emitter of transistor 2120 to charge capacitor C2107. As previously described in the preceding paragraph, the charge current of capacitor C2107 quickly diminishes until the valley point of the N curve is reached. The operating point then shifts to region I of the N curve. Diode CD2102 is poled so as to shortcircuit the high back resistance of the emitter and thus quickly discharge capacitor C2107 so that the operating point is shifted to the quiescent point (*a*) in readiness for the next triggering impulse in the shortest possible time.

The heavy positive impulse of current is coupled through output transformer T2160 to the sampling pulse drive conductor SPD. Transformer T2160 has a step-up ratio of approximately two to one and is designed to handle relatively short pulses. Diode CD2103, which is connected across secondary winding 2162, serves a tail clipping function. Transistor 2110 may be type TI201 while transistor 2120 may be type G11A.

*Units ring drive circuit 43*

The operation of the units ring drive circuit, which is also shown in Fig. 21, is substantially the same as the operation of the sampling pulse generator which was just described. The clipper stage transistor 2130 converts the positive half cycles of the oscillator signal voltage into negative squarewave pulses which are differentiated by capacitor C2108 and resistor R2110 into sharp negative and positive pulses. The negative pulses are coupled through capacitor C2109 to the base circuit of the single shot oscillator 2140 and the positive pulses are clipped by diode CD2104. The output signal for driving the units ring circuit is derived from across the emitter load resistor R2111 in the emitter circuit of transistor 2140 and is therefore comprised of negative pulses. As previously described, the negative impulse connected to the base of transistor 2140 produces a large current pulse which is terminated when capacitor C2110 is charged. Diode CD2105 shortcircuits the high back resistance of the emitter when the transistor drops back into the non-conducting region so that capacitor C2110 is quickly discharged. Resistor R2112 and capacitor C2111 serve as a current limiting and decoupling network in the collector circuit of transistor 2140.

*Sampling pulse output amplifier 29*

Figure 22:
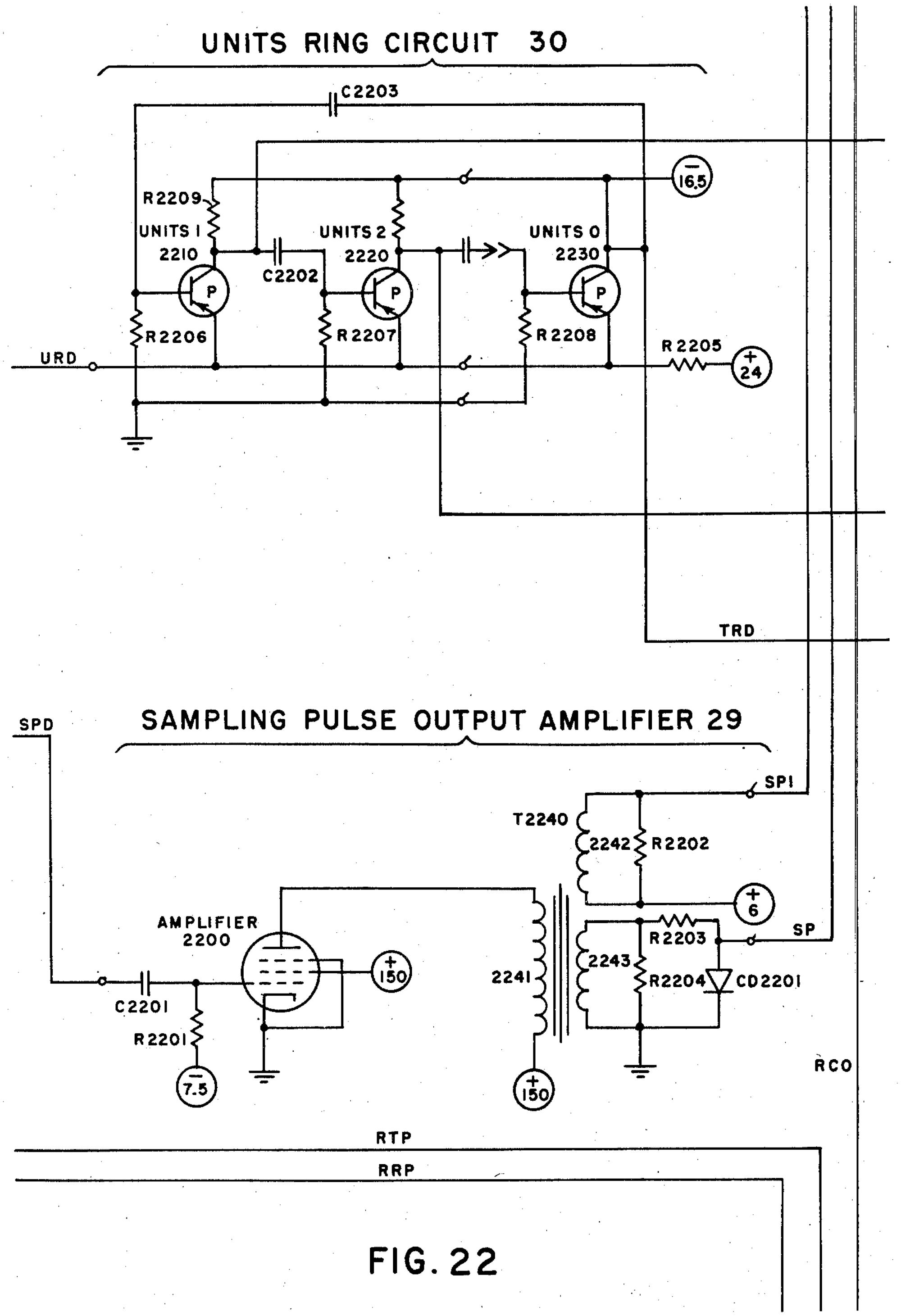

This circuit, which is shown in Fig. 22, serves to convert positive input pulses received over conductor SPD from the sampling pulse generator to negative amplified output impulses which are connected to the multiplexer, switch control, and connector circuits of the system. Amplifier tube 2200 is of the pentode type and may be a 6AG7, or similar. The tube is normally biased below cutoff by −7.5 volts through resistor R2201 connected to its grid terminal. This circuit is of the conventional grounded cathode type in which a positive impulse connected to the grid conductor causes a negative impulse to be produced in the primary winding 2241 of the plate transformer T2240. The negative impulse produced in the secondary winding 2242, which is returned to +6 volts, is connected to the output conductor SP1 which connects to the switch control circuits of the system. The negative impulse produced in the secondary winding 2243, which is returned to ground, is connected to the output conductor SP which connects to the multiplexer and connector circuits. Resistors R2202, R2203, and R2204 are utilized to load the secondary windings of the transformer, and diode CD2201 performs a tail clipping function. The negative output pulses derived from the sampling pulse output amplifier are approximately 2 microseconds in duration, have an amplitude of about 10 volts, and have an internal generator impedance of about 8 ohms.

*Units ring circuit 30*

This is a ten stage ring circuit which commutates the units ring drive impulses received over conductor URD to the units ring amplifiers 1–10. Fig. 22 shows only stages 1, 2 and 10 of the ring circuit. Stages 3–9 are, of course, identical and have not been shown for purposes of simplification. One transistor in the ring is normally conductive and connects a positive pulse of finite and greater width than the units ring drive pulses to its associated output conductor. Each negative impulse received from the units ring drive circuit serves to cut off the conducting transistor and trigger the next transistor in the ring circuit. The output of the ring circuit is derived from each of the ten component stages and consists of ten sequential positive pulses of about 10 volts in amplitude. Since the driving rate for the ring circuit is 100 kc., each output pulse will be 10 microseconds in duration, and the ring will go through one complete cycle in 100 microseconds, corresponding to a frequency of 10 kc.

The ring circuit utilizes a common emitter connection through resistor R2205 to +24 volts. Base bias is applied to the transistors 2210, 2220, and 2230, which may be type G11A, from ground through resistors R2206, R2207, and R2208, respectively. If it be assumed that units 1 transistor 2210 is conducting, the emitter voltage on the other transistors is held well below the peak point of their respective "N" curves. The collector terminal of conducting transistor 2210 is at a positive potential relative to the collector voltage of the non-conducting transistors. In other words, a positive pulse is taken from across the collector load resistor, such as R2209, of the conducting transistor and connected to its associated units ring amplifier. A trigger pulse incoming from the units ring drive circuit serves to further lower the emitter voltage so that transistor 2210 is rendered non-conductive. The resulting cessation of collector current flow causes the potential of the collector terminal of transistor 2210 to drop to a more negative potential. This negative pulse is coupled through capacitor C2202 to the base terminal of the units 2 ring transistor 2220. The charge is maintained on capacitor C2202 for a sufficient time to allow the negative impulse appearing on conductor URD to terminate. At the termination of the trigger pulse, the common emitter circuit voltage rises toward +24 volts and since transistor 2220 has a negative potential on its base terminal, it is the most likely transistor in the ring circuit to operate. It can be seen from the above that each negative trigger pulse serves to step the units ring. The ring steps from one to zero and then recycles since the collector terminal of units 0 transistor 2230 is coupled through capacitor C2203 to the base circuit of units 1 transistor 2210.

The output of the units 0 transistor 2230 is also coupled to the tens ring circuit, over tens ring drive conductor TRD, as shown in the drawing. Thus, each tenth pulse will trigger the tens ring circuit.

A more complete understanding of the operation of the ring circuit may be had by reference to Figure 47 of the drawings. Figure 47(*a*) shows a series of N curves representative of particular transistors used in the ring circuit. It can be seen that the common emitter resistor R2205, which corresponds to load line $R_e$, and the emitter voltage $V_e$ are chosen so that the load line intersects the various N curves in the saturation region III above the valley point of the transistor having the highest valley point. The intersection of the load line $R_e$ with the N characteristic of the conducting transistor establishes the value of the voltage applied to the common emitter connection. The load line $R_e'$ represents the load line seen by the non-conducting transistors with one transistor conducting. Load line $R_e'$ must fall below the valley point of the lowest N curve for stable operation. Fig. 47(*a*) illustrates the worst condition. The transistor having the highest N curve is shown conducting so that the common emitter voltage stands at point (*a*). It can be seen that the valley points of the transistors used in the ring circuit must fall within the shaded area for stable operation.

In operation, a negative pulse applied to the common emitter connection renders the conducting transistor nonconductive and at the termination of the pulse, the common emitter voltage returns toward +24 volts. Theoretically, any one of the transistors of the ring could now operate. However, the base electrode of the selected transistor, which is the next transistor in the ring, is made negative with respect to potential of the base electrodes of the other transistors so that the selected transistor is the one which conducts.

Figure 47(*b*) illustrates the fact that two transistors cannot conduct simultaneously when power is first applied to the circuit. The N curve for a single transistor is represented by the solid line curve, while the N curve for two transistors in parallel is represented by the dashed line curve. It can be seen that the load line $R_e$ intersects the dashed line N curve in the unstable region II. Thus the transistors will quickly jump to either points (*a*) or (*b*), at which time one will be conductive and the other non-conductive.

*Units ring amplifier circuit 31*

Figure 23:
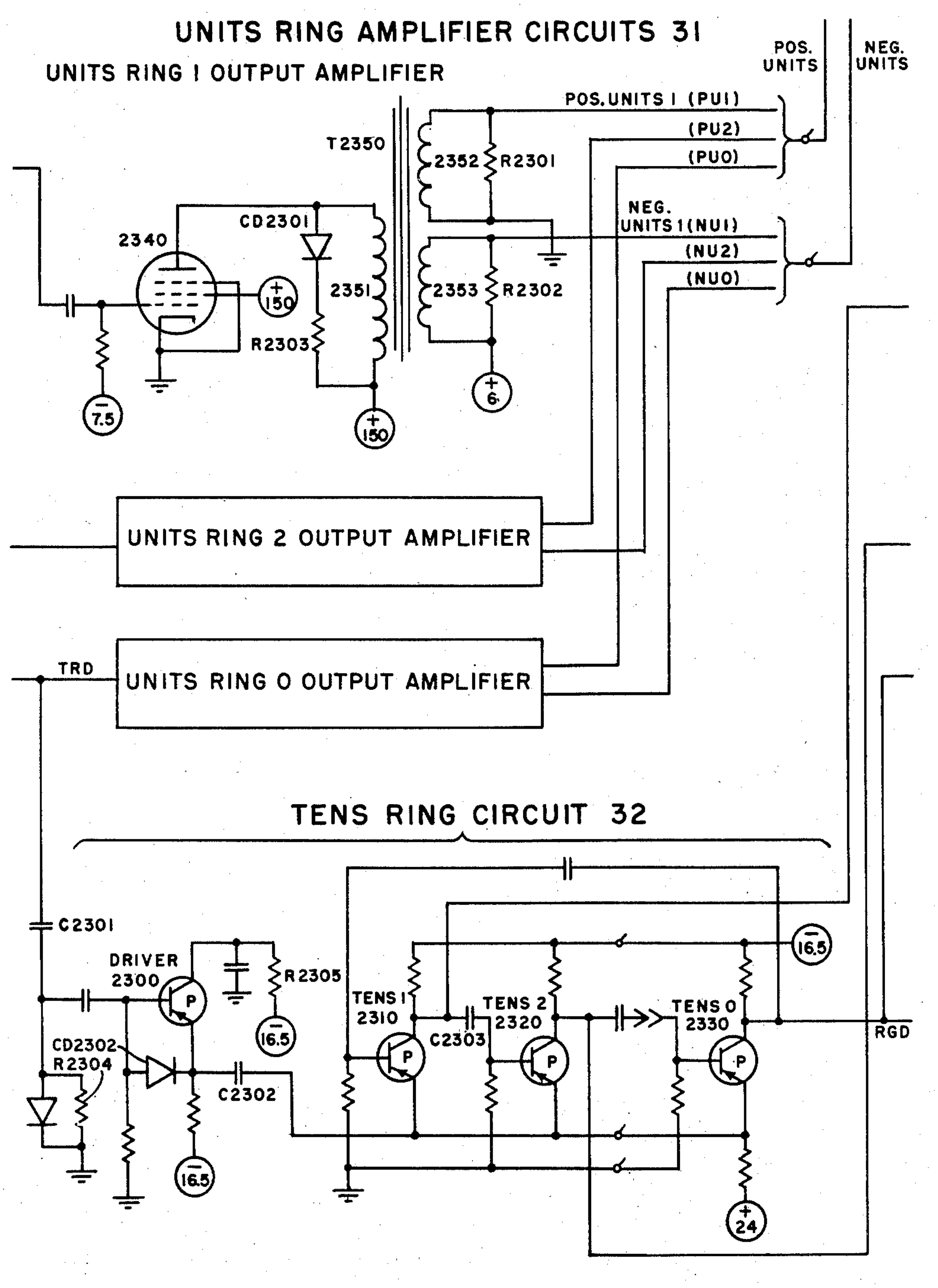

This circuit serves to amplify signals received over its input conductor, which is connected to the collector terminal of the corresponding transistor in the units ring circuit. Fig. 23 shows the details of the units ring 1 output amplifier while amplifiers 2 and 0 are shown in block form. This circuit is substantially the same as the previously described Sampling Pulse Output Amplifier. The tube 2340 is of the pentode type and may be a 6AG7, or similar. The tube is normally biased below cutoff and conducts only when positive going impulses are received over the input conductor. The plate transformer T2350 couples the produced impulses to the positive units pulse and negative units pulse conductors. The polarity of the produced impulses is, of course, controlled by the direction of connection of the secondary windings 2352 and 2353 of transformer T2350. The resistors R2301 and R2302 serve to load the plate transformer. Crystal diode CD2301 and resistor R2303 comprise a tail clipping network.

The positive units pulses PU1–PU0 and the negative units pulses NU1–NU0 are graphically illustrated in Figs. 42 and 43 of the drawings.

*Tens ring circuit 32*

As described under the description of the Units Ring Circuit, the output pulse from the tenth stage in the units ring is coupled to this circuit over the tens ring drive conductor TRD. The circuit, which is shown in Fig. 23, is a ring circuit which comprises ten transistor stages. The circuit commutates the 10 kc. impulses received from the units ring circuit to ten output amplifiers. Thus, a pulse appears on the output of any particular stage of the tens ring at a frequency of 1 kc. Each output pulse will be 100 microseconds in duration and the ring will go through one complete cycle in 1000 microseconds.

Driver transistor 2300, in connection with its associated circuit components, comprises a single shot or monostable oscillator which converts the positive impulse from the units ring circuit into a negative pulse suitable for driving the tens ring circuit. This single shot oscillator is identical to the single shot oscillator described in the Units Ring Drive Circuit. Briefly, the emitter is biased at a slightly negative potential to prevent operation on transient or stray signals. The differentiating circuit comprising capacitor C2301 and resistor R2304 in the base circuit converts the positive pulse from the units ring circuit to a sharp positive pulse at the beginning of said input pulse and a sharp negative pulse corresponding to the trailing edge of the positive input pulse. When the base terminal becomes negative with respect to the emitter in response to the trailing edge negative impulse, transistor 2300 conducts and capacitor C2302 is charged from −16.5 volts through resistor R2305 and through the collector, base, and emitter of transistor 2300. As previously described, the charge current of capacitor C2302 decreases exponentially until the valley point of the N curve is reached at which time the transistor is rendered non-conductive. Crystal diode CD2302 shortcircuits the high back resistance of the emitter circuit to quickly discharge capacitor C2302 in readiness for the next incoming pulse.

The tens ring circuit comprises ten transistor stages. Only three stages, namely, tens 1, tens 2, and tens 0, have been shown in the drawing but it is to be understood that stages 3–9, inclusive, are identical. The circuit functions exactly the same as the previously described units ring circuit.

One transistor is normally conducting so that the potential of the common emitter circuit is held well below the peak point of the other transistors. Negative impulses coupled to the common emitter circuit through capacitor C2302 drive the common emitter circuit sufficiently negative to render the conducting transistor non-conductive. The potential of the collector terminal of this transistor is immediately lowered to a negative potential. If it be assumed that tens 1 transistor 2310 was conducting, the sudden negative potential of its collector terminal is coupled through capacitor C2303 to the base terminal of tens 2 transistor 2320. When the negative pulse disappears from the common emitter circuit, the emitter voltage rises toward +24 volts. Since transistor 2320 is the only stage with negative base voltage, it will be the most likely transistor to conduct. Thus it can be seen that each impulse from the tenth units ring transistor serves to cut off the conducting transistor and trigger the next transistor in the tens ring circuit. The conducting transistor is identified by the positive potential on its collector terminal.

The collector terminal of the tenth stage transistor 2330 in addition to being connected to the associated tens ring amplifier, is also connected to the register drive pulse generator 34. The outputs of the individual stages of the tens rings are illustrated in Fig. 44 of the drawings.

All transistors used in this circuit may be type G11A.

*Tens ring amplifier circuit 33*

Figure 24:
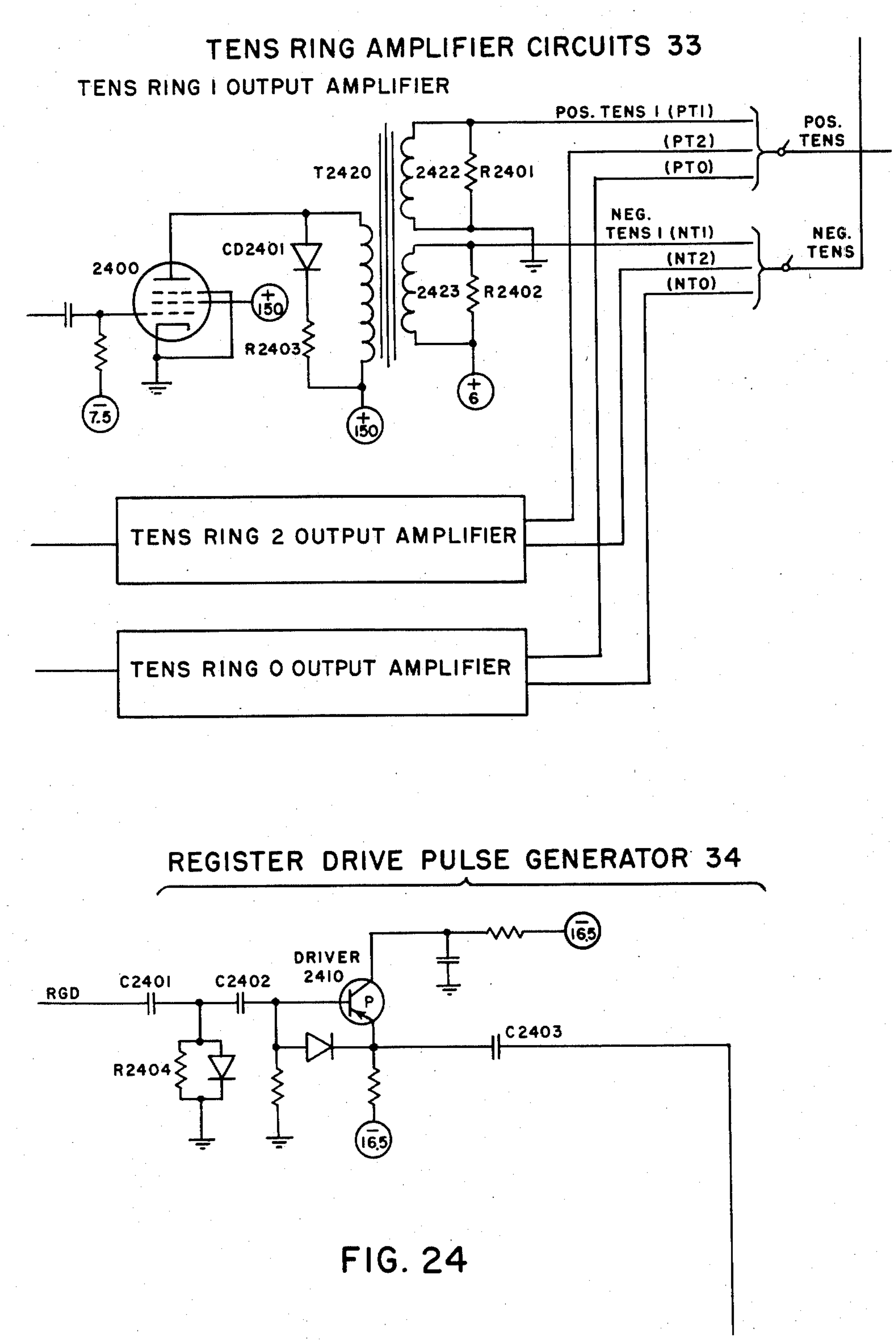

This circuit, which is shown in Fig. 24, serves to amplify signals received over its input conductor, which is connected to the collector terminal of the corresponding transistor in the tens ring circuit. This circuit is substantially the same as the previously described Sampling Pulse and Units Ring Output Amplifiers. The tube 2400 is of the pentode type and may be a 6AG7, or similar. The tube is normally biased below cutoff and conducts only when positive impulses are received over the input conductor. The plate transformer T2420 couples the produced impulses to the positive tens pulse and negative tens pulse conductors. The polarity of the output pulses is, of course, controlled by the connection of the secondary windows 2422 and 2423 of transformer T2420. Resistors R2401 and R2402 serve to load the plate transformer. Crystal diode CD2401 and resistor R2403 comprise a tail clipping circuit.

The positive tens pulses PT1–PT0 and the negative tens pulses NT1–NT0 are graphically illustrated in Figs. 42 and 43 of the drawings.

*Register drive pulse generator 34*

Figure 30:
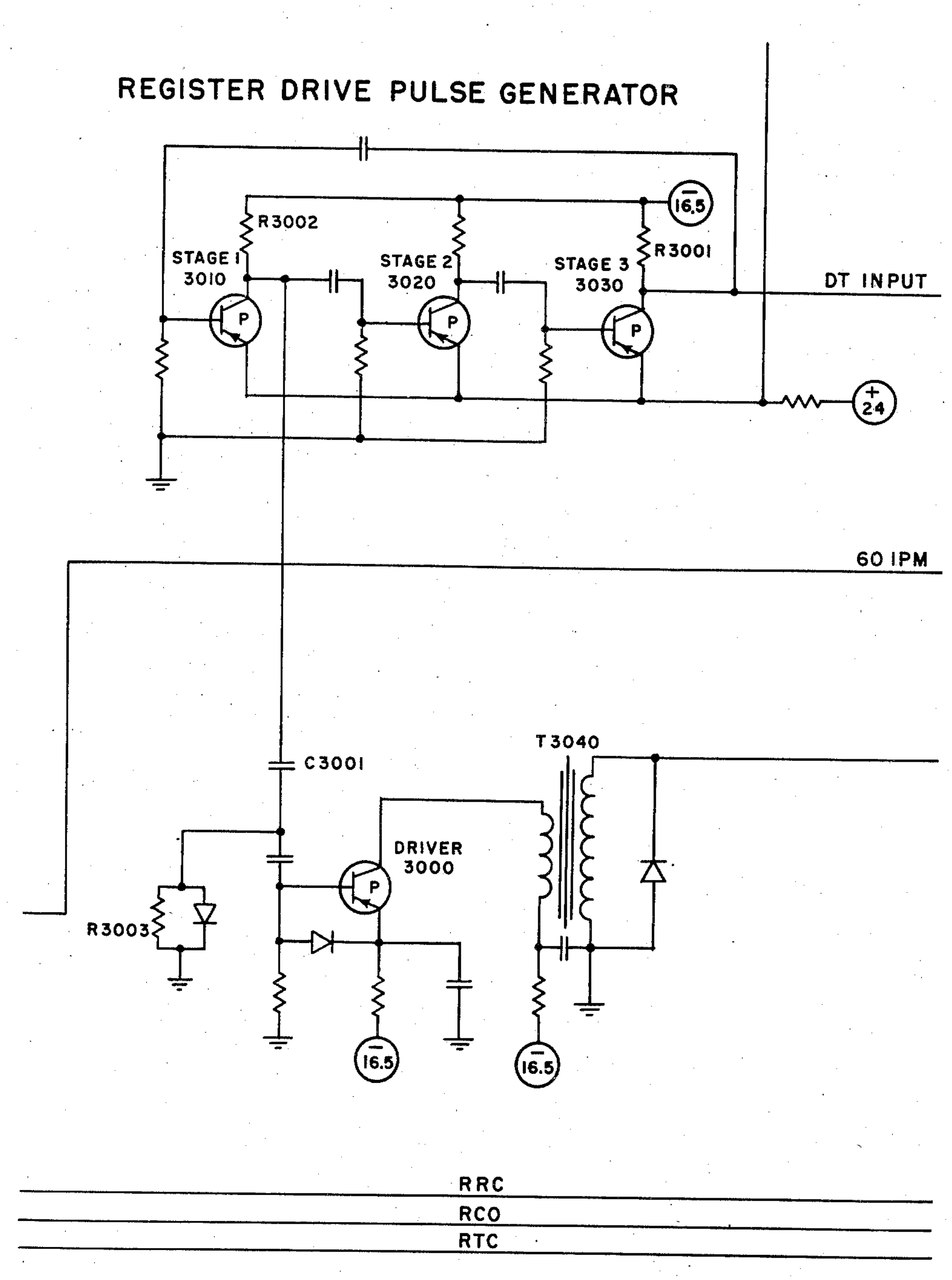

This circuit, which is shown in Figs. 24 and 30, serves to convert the 1 kc. signals received over conductor RGD from the collector terminal of the tens 0 transistor 2330 into 333 cycle signals suitable for dial tone, busy tone, and as switching impulses used throughout the linkage. The configuration of this circuit is identical to the tens ring circuit except that only three ring stages are provided. Driver transistor 2410 is a single short oscillator identical to the previously described single shot oscillators. The differentiating network, comprising capacitor C2401 and resistor R2404, converts the trailing edge of the positive impulse appearing on conductor RGD into a negative impulse which is coupled to the base of transistor 2410 through capacitor C2402. The single shot oscillator 2410 amplifies the negative impulse and couples it through capacitor C2403 to the common emitter circuit of the ring circuit comprising transistors 3010, 3020, and 3030.

Each negative impulse appearing on the common emitter circuit serves to step the ring circuit from one stage to the next succeeding stage as previously described. An output signal for driving the dial tone and busy tone generators is taken from across the load resistor R3001 in the collector circuit of transistor 3030 and coupled to the dial tone and busy tone generators by conductor DT input. This output signal is, of course, a rectangular wave with a positive excursion time of 1000 microseconds and a negative excursion time of 2000 microseconds as illustrated in Fig. 44 of the drawings. The signal has a fundamental frequency of 333 C. P. S. and contains a large number of both odd and even harmonics.

A second output is taken from across load resistor R3002 in the collector circuit of stage 1 transistor 3010 and coupled through the peaking circuit, comprising capacitor C3001 and resistor R3003, to the base circuit of the single shot oscillator comprising driver transistor 3000. The trailing edge of the positive input pulse from the collector circuit of stage 1 transistor 3010 is utilized to trigger transistor 3000, all as previously described. The positive pulse appearing in the collector circuit of transistor 3000 is coupled to the register drive pulse amplifier through transformer T3040. This pulse is approximately 2 microseconds in duration and occurs at the beginning of every third frame, or every 3000 microseconds.

All transistors used in this circuit may be type G11A.

*Register drive pulse output amplifier 35*

Figure 31:
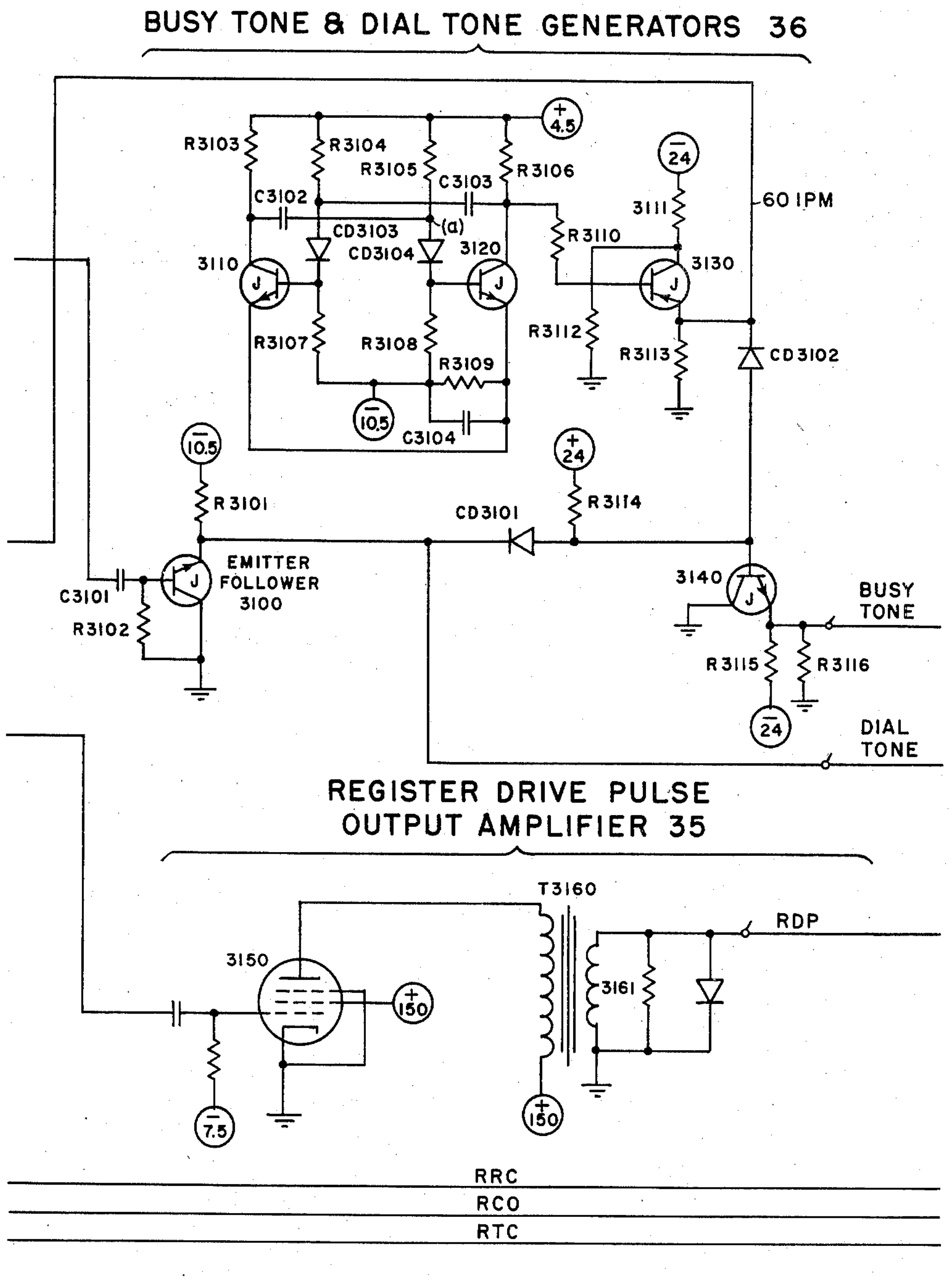
Figure 32:
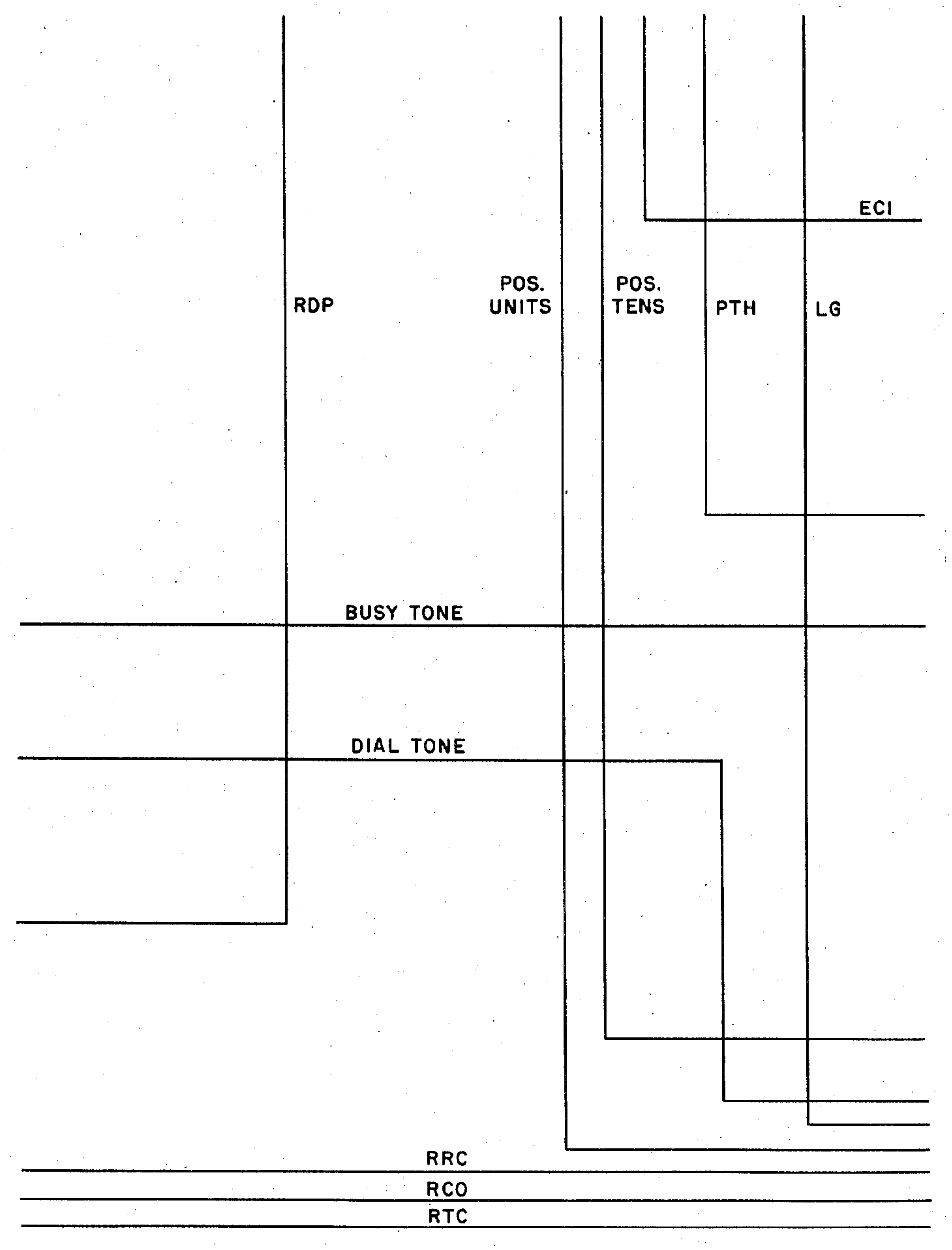

This amplifier, which is shown in Fig. 31, is identical to the previously described output amplifiers. The tube 3150 is normally biased below cutoff and conducts only when positive impulses are received over its input conductor from the output of the register drive pulse generator. The plate transformer T3160 couples the amplified pulses to the register drive pulse conductor RDP. The secondary winding 3161 of transformer T3160 is poled to provide a negative output. The 333 C. P. S. negative impulses on conductor RDP, illustrated in Fig. 44, are utilized in the line finders, the connectors, and in the allotter.

*Busy tone and dial tone generator 36*

This circuit, which is shown in Fig. 31, serves to repeat the dial tone signal received from the register drive pulse generator to the connectors of the system, to produce a busy tone for connection to the system connectors, and to produce a squarewave 1-cycle signal voltage for connection to the ringing interrupter. The rectangular wave input received over conductor DT input from the collector circuit of stage 3 transistor 3030 in the register drive pulse generator 34 is coupled through capacitor C3101 to the base circuit of emitter follower transistor 3100. Base bias for transistor 3100 is derived through resistor R3102. An output signal is taken from across load resistor R3101 in the emitter circuit of transistor 3100 and applied directly to the dial tone conductor. The output signal is also applied to the cathode terminal of diode CD3101. Diode CD3101 serves as one input of a two input "and" gate which comprises diodes CD3101 and CD3102.

Transistors 3110 and 3120 are connected in a stabilized multivibrator circuit which is designed to generate a squarewave with a frequency of 1-cycle per second. The output of this multivibrator is clipped and amplified by transistor 3130. The output of transistor 3130 is coupled to the other input of the "and" gate, as well as to the ringing interrupter circuit. The output of the "and" gate is the dial tone signal keyed by the squarewave to form a busy tone signal. This signal is repeated by emitter follower 3140 and impressed on the busy tone output conductor.

NPN junction transistors 3100, 3110, 3120, and 3140 may be type T1201 while PNP junction transistor 3130 may be type CK722.

The multivibrator, which comprises transistors 3110 and 3120 and their associated circuit components, differs from conventional multivibrators in that it is compensated for impedance variations between different transistors and for changes in operating potentials through the action of two cutoff diodes. It is believed, therefore, that a better understanding of the circuit will be achieved if it is described in detail. Assume that transistor 3120 is conducting and that transistor 3110 has just started to conduct. The potential at the collector terminal of transistor 3110 begins to drop from +4.5 volts to approximately −8 volts as determined by the emitter bias voltage. Point (*a*) at crystal diode CD3104 had been standing at approximately −8 volts. The voltage swing of approximately 12.5 volts on the collector of transistor 3110 is coupled through capacitor C3102 to point (*a*) and thus drives this point to approximately −20 volts. Crystal diode CD3104 is now biased in the reverse direction so that practically no current flows therethrough. The potential on the base of transistor 3120 drops to approximately −10.5 volts when diode CD3104 is cut off and thus transistor 3120 is rendered non-conductive. Capacitor C3102 now charges through resistor R3105 toward +4.5 volts. Crystal diode CD3104 is included in the circuit to isolate the charging circuit for capacitor C3102 from the base circuit of transistor 3120 because of the substantial base current flow through a non-conducting transistor. By cutting off the base circuit during the charge time of the capacitor, the frequency of the circuit is made independent of the variance of base circuit impedance between various transistors. Resistor R3108 serves to maintain the base terminal of transistor 3120 at a negative potential when cut off from capacitor C3102 by crystal diode CD3104. In response to the cessation of collector current flow in transistor 3120, the voltage at the collector terminal of transistor 3120 rises from −8 volts to +4.5 volts. This voltage change is coupled through capacitor C3103 and diode CD3103 to the base of transistor 3110 to assist in the build up of conduction therein.

When capacitor C3102 becomes charged sufficiently to bias crystal diode CD3104 in a conducting direction, capacitor C3102 continues to charge toward approximately −5 volts as determined by the voltage division across resistors R3105 and R3108. Before the charge on capacitor C3102 reaches this point, however, the base terminal of transistor 3120 is made slightly positive with respect to its emitter potential. Transistor 3120 thus begins to conduct and its collector potential swings from +4.5 volts toward −8 volts. This swing is reflected through capacitor C3103 and serves to bias crystal diode CD3103 in the non-conducting direction. Transistor 3110 is, of course, rendered non-conductive from −10.5 volts through resistor R3107 when its base circuit is cut off from capacitor C3103 by diode CD3103. The resulting rise of potential at the collector of transistor 3110, in response to the cessation of collector current flow, is reflected through capacitor C3102 to the base terminal of transistor 3120 to assist in its build up. Capacitor C3103 then charges through resistor R3104 until it is charged sufficiently to bias diode CD3103 in the conducting direction and then continues to charge through resistors R3104 and R3107 until transistor 3110 is rendered conductive.

The two transistors are alternately operated at a frequency determined by the impedance of capacitor C3102 in conjunction with resistor R3105 and capacitor C3103 in conjunction with resistor R3104. Resistor R3109 is utilized to provide emitter bias for both transistors. The current through this resistor is substantially constant.

Bypass capacitor C3104 serves to maintain the emitter bias potential during the transfer of operation from one transistor to the other.

The output signal is taken from across resistor R3106 in the collector circuit of transistor 3120 and is coupled through resistor R3110 to the base of the clipper and amplifier transistor 3130. The output signal is essentially a squarewave which swings between 4.5 volts and approximately −8 volts.

Transistor 3130 is of the PNP type and thus conducts only when the base terminal is at a negative potential with respect to the emitter potential. Thus the positive portion of the multivibrator output voltage is clipped and transistor 3130 conducts on the portion of the signal between ground potential and approximately −8 volts. Resistors R3111 and R3112 serve as a voltage divider which maintains a bias of approximately −12 volts on the collector terminal of transistor 3130.

The output of clipper amplifier 3130 is taken from across the emitter load resistor R3113. The output signal of approximately 12 volts is directly connected to the 60 I. P. M. conductor which connects to the ringing interrupter circuit and is also connected to the other input terminal of the "and" gate.

The "and" gate, comprising resistor R3114 in conjunction with crystal diodes CD3101 and CD3102, serves to key the dial tone signal with the squarewave output of the multivibrator so as to produce the busy tone. With transistor 3130 conducting, +24 volts through resistor R3114 is connected through crystal diode CD3102 to approximately −12 volts, which appears across the load resistor R3113 in the emitter circuit of transistor 3130. Since the forward impedance of crystal diode CD3102 is negligible in comparison to the impedance of resistor R3114, the negative voltage appears at the base terminal of transistor 3140 to render 3140 non-conducting and to block diode CD3101. Thus, the dial tone signal produced by transistor 3100 is blocked from having any effect upon transistor 3140 since the cathode terminal of diode CD3101 swings between ground and −10.5 volts and the anode terminal of diode CD3101 is held at approximately −12 volts.

When transistor 3130 is non-conducting, ground through resistor R3113 is reflected through crystal diode CD3102. Thus, the base of transistor 3140 is made positive with respect to the emitter and the dial tone signal is keyed to become effective to control the base circuit of transistor 3140. The busy tone output is taken from across the emitter load resistors R3115 and R3116 of transistor 3140. These resistors also function as a voltage divider which provides an emitter bias of approximately −12 volts for transistor 3140.

To summarize briefly, the dial tone signal of 333 C. P. S. is keyed by the multivibrator output so that it is on for one-half second and off for one-half second to produce the standard busy tone signal.

*Ringing interrupter 37*

Figure 29:
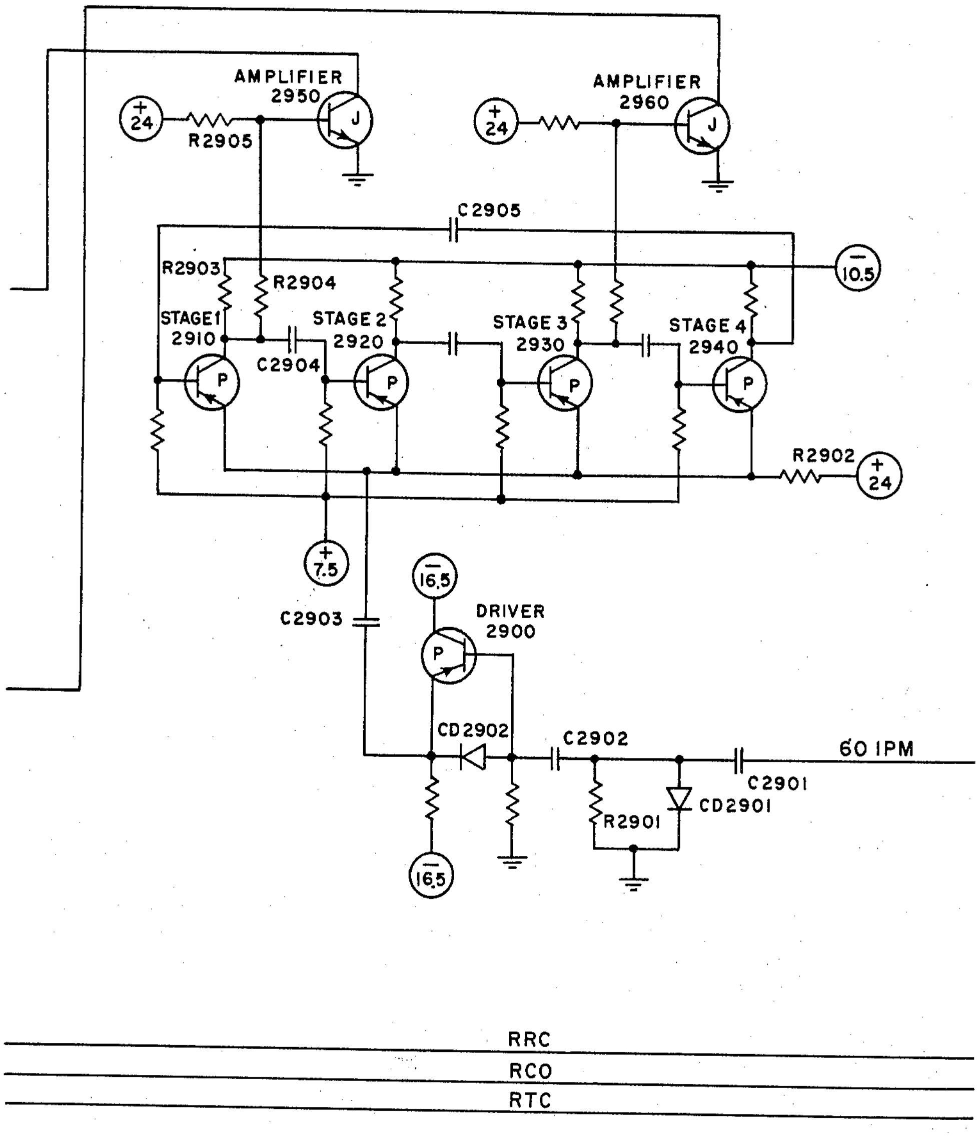

This circuit, which is shown in Fig. 29, is designed to provide a pair of keying output signals suitable for controlling the ringing in the system. The 1-cycle squarewave signal from the busy tone and dial tone generator 36, appearing on conductor 60 I. P. M., is coupled through a peaking circuit to a monostable point contact oscillator which responds by generating a short negative output pulse once each second. The output of this oscillator is used to drive a four stage ring circuit of a design similar to ring circuits previously considered. In this case, the driving rate is very low and four seconds are required for the ring to go through one complete cycle. The output of each stage consists of a positive going squarewave signal of one second duration separated by a three second negative portion.

Outputs are taken from the first stage and the third stage of the ring. These two outputs are amplified and inverted by two amplifiers and are coupled over two conductors to the superimposing ringing supply circuit 38.

The circuit of driver transistor 2900 is identical to the monostable oscillators previously described. Briefly, the 1 C. P. S. squarewave signal on conductor 60 I. P. M. is differentiated by the peaking circuit which comprises capacitor C2901 and resistor R2901. Diode CD2901 conducts the positive signals to ground while the negative signals, which correspond to the trailing edge of the 60 I. P. M. signal, are coupled through capacitor C2902 to the base of transistor 2900. The oscillator responds by generating a short negative pulse which is coupled through capacitor C2903 to the common emitter circuit of the ring. As previously explained, diode CD2902 functions in the circuit to shortcircuit the high back resistance of the emitter when the oscillator is cut off and thus provide a low resistance discharge path for capacitor C2903.

The four stage ring circuit, which comprises transistors 2910, 2920, 2930, and 2940, is similar to the previously described ring circuits. One transistor is normally conducting so that the potential of the common emitter circuit is held well below the peak point of the other transistors. Negative impulses coupled to the common emitter circuit through capacitor C2903 drive the common emitter circuit sufficiently negative to render the conducting transistor non-conductive. The potential of the collector terminal of this transistor is immediately lowered to a negative potential. If it be assumed that stage 1 transistor 2910 is conducting, the sudden negative potential of its collector terminal is coupled through capacitor C2904 to the base terminal of stage 2 transistor 2920. When the short negative pulse disappears from the common emitter circuit, the emitter voltage rises toward +24 volts. Since transistor 2920 is the only stage with negative base voltage, it will be the most likely transistor to conduct. Thus it can be seen that each impulse from driver 2900 serves to cut off the conducting transistor and trigger the next transistor in the ring circuit. The conducting transistor is identified by the positive potential on its collector terminal. The ring steps from stage 1 to stage 4 and then recycles since the collector of stage 4 transistor 2940 is coupled to the base of stage 1 transistor 2910 through capacitor C2905.

Output signals are taken from the collector circuits of stage 1 transistor 2910 and from stage 3 transistor 2930 and coupled to the base circuits of amplifier transistors 2950 and 2960, respectively. Since the two amplifiers are identical, it is believed sufficient to describe in detail the operation of amplifier 2950 only. When stage 1 transistor 2910 is not conducting, amplifier transistor 2950 is biased for non-conduction by the action of a voltage divider comprising resistor R2905 and the series combination of resistors R2903 and R2904. The resulting negative potential on the base of transistor 2950 maintains said transistor cutoff.

When stage 1 transistor 2910 is conducting, its collector potential, and thus the potential of the base of transistor 2950, rises to a positive potential. Amplifier transistor 2950 is thus rendered conductive for a one second interval each four seconds. The collector terminals of transistors 2950 and 2960 are connected through the windings of individually associated relays in the superimposing ringing supply circuit 38 to +24 volts.

Driver transistor 2900 and the transistors comprising the ring circuit may be type G11A while the amplifier transistors 2950 and 2960 may be type TI201.

*Superimposing ringing supply circuit 38*

Figure 28:
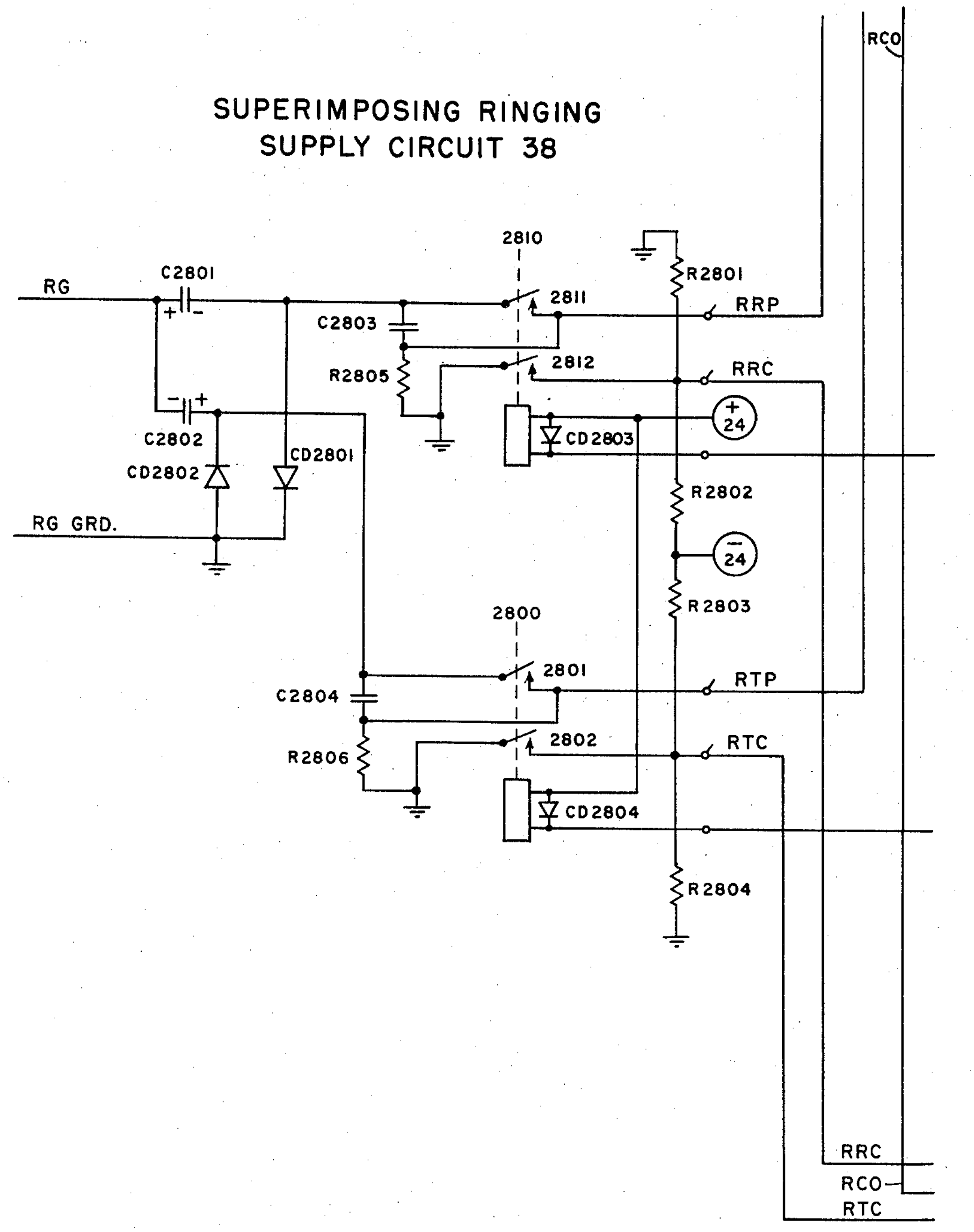

This circuit, which is shown in Fig. 28, comprises relays 2800 and 2810 which are connected in the collector circuits of amplifiers 2960 and 2950, respectively, which are located in the ringing interrupter circuit 37. As previously described in the preceding section, amplifiers 2950 and 2960 conduct alternately for one second intervals spaced by one second intervals. Thus relay 2810 is operated for one second and is then released for one second. Relay 2800 is then operated for one second and then released for one second to give a complete four second ringing cycle.

During the interval when relay 2810 is operated, 20-cycle ringing power, which varies between ground potential and −230 volts, is applied to the ring-ring power conductor RRP through operated make contacts 2811 on relay 2810. The derivation of the ringing power will be discussed in a subsequent paragraph. The ringing power on conductor RRP is utilized in the line circuits of the system to ring phones on the ring side of the line as previously described. During the period that power is applied to conductor RRP, ground potential, through operated contacts 2812 on relay 2810, is applied to conductor RRC for the purpose of informing the connectors of the system that they may release ring control pulses in the time position of selected called lines which are to be rung on the ring side of the line. Conductor RRC normally stands at approximately −10.5 volts as determined by a simple bleeder circuit comprising resistors R2801 and R2802 which are connected between conductor RRC and ground and −24 volts, respectively.

During the interval when relay 2800 is operated, 20-cycle ringing power, which varies between ground potential and +230 volts, is applied to the ring tip power conductor RTP through operated make contacts 2801 on relay 2800. The ringing power on conductor RTP is utilized in the line circuits to ring phones on the tip side of the line and bridged phones as previously described. During the period that power is applied to conductor RTP, ground potential through operated make contacts 2802 on relay 2800 is applied to conductor RTC for the purpose of informing the connectors of the system that ring control pulses may be released in the time position of selected called lines which are to be rung on the tip side of the line. Conductor RTC normally stands at −10.5 volts as determined by the bleeder circuit comprising resistors R2803 and R2804. Diodes CD2803 and CD2804 are connected across the windings of relays 2810 and 2800, respectively, to absorb the inductive kick from said relays which results when their associated transistor amplifiers are rendered non-conductive.

The ringing generator output signal which is introduced to this circuit over conductors RG and RG.GRD comprises a 20-cycle 230 volt peak-to-peak squarewave. This signal is coupled to two clamping circuits. The clamping circuit, which comprises electrolytic capacitor C2801 and diode CD2801, which may be type 1N93, operates to clamp the positive peak of the ringing signal to ground. The resulting signal is then connected through operated contacts 2811 of relay 2810 to conductor RRP. The clamping circuit comprising electrolytic capacitor C2802 and diode CD2802 functions to clamp the negative peak of the ringing generator signal to ground. The resulting signal is then connected through operated contacts 2801 on relay 2800 to conductor RTP.

Consider the clamping circuit which comprises capacitor C2801 and diode CD2801 and assume that conductor RG stands at +115 volts. Diode CD2801 is poled so as to conduct so that capacitor C2801 charges to a potential of +115 volts and conductor RRP is maintained at ground potential because of the low forward impedance of diode CD2801. When the ringing voltage suddenly changes to −115 volts, the difference between the −115 volts applied and the +115 volts across the capacitor appears across the load as an output voltage of −230 volts.

The clamping circuit which comprises capacitor C2802 and diode CD2802 is, of course, operated in the reverse manner. When conductor RG stands at −115 volts, diode CD2802 is poled so as to conduct, capacitor C2802 charges to −115 volts and conductor RTP is maintained at ground potential. When the potential of conductor RG suddenly changes to +115 volts, the difference between the applied voltage and the voltage across capacitor C2802 appears across the load as an output voltage of +230 volts.

Capacitors C2803 and C2804 bridge contacts 2811 and 2801, respectively, for the purpose of preventing arcing when these contacts are being opened or closed. Resistors R2805 and R2806 tie the conductors.

*Ringing generator 39*

Figure 27:
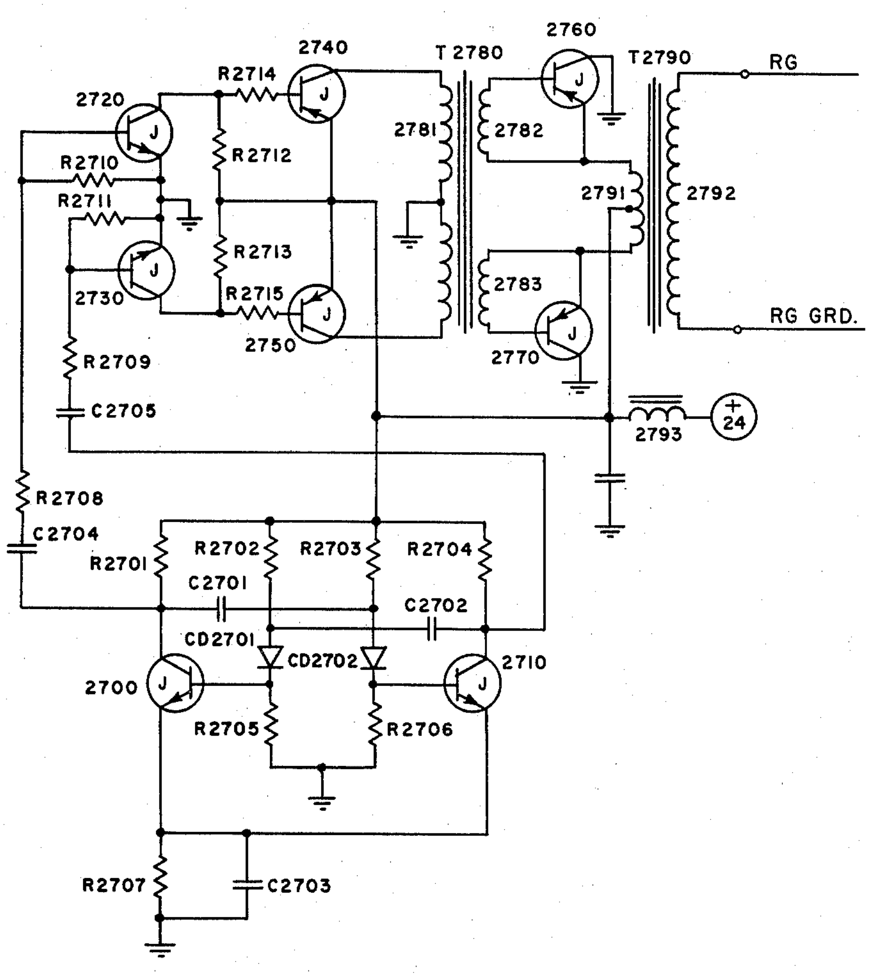

This circuit, which is shown in Fig. 27, serves to provide the 20-cycle ringing power for the system. Transistors 2700 and 2710, which may be type TI201, are connected as a 20-cycle squarewave multivibrator. The output of this multivibrator is amplified in a push-pull grounded emitter stage comprising transistors 2720 and 2730 which also may be type TI201. The output of the first amplifier stage is used to drive a second stage comprising power transistors 2740 and 2750, which may be type 2N57. The second stage is connected as a push-pull grounded emitter amplifier and is transformer coupled to a second pair of power transistors 2760 and 2770, which also may be type 2N57. The second or output pair of power transistors is connected in a common emitter configuration with both collectors at D.-C. ground potential. All transistors in the generator are driven from saturation to cutoff so that the efficiency of the circuit is very high. A squarewave output voltage of 115 volts peak amplitude is obtained.

The 20-cycle multivibrator, which comprises transistors 2700 and 2710 and their associated circuit components, is identical to the previously described multivibrator in the busy tone and dial tone generator 36 except for the value of the frequency determining components capacitor C2701 in conjunction with resistor R2703 and capacitor C2702 in conjunction with resistor R2702. It will be remembered that diodes CD2701 and CD2702 are included in the circuit to isolate the charging currents for capacitors C2702 and C2701 from the base circuits of transistors 2700 and 2710, respectively. By cutting off the base circuit during the charge time of the capacitor, the frequency of the circuit is made independent of the variance of base circuit impedance between various transistors. Resistors R2705 and R2706 serve to maintain transistors 2700 and 2710, respectively, cut off after the associated diode in their respective base circuit has been cut off, as previously explained. Resistor R2707 is utilized to provide emitter bias for both transistors. The current through the resistor is substantially constant. Bypass capacitor C2703 serves to maintain emitter bias during the transfer of operation from one transistor to the other.

A first output is taken from across load resistor R2701 in the collector circuit of transistor 2700 and coupled through capacitor C2704 and resistor R2708 to the base circuit of transistor 2720. A second output is taken from across load resistor R2704 in the collector circuit of transistor 2710 and coupled through capacitor C2705 and resistor R2709 to the base circuit of transistor 2730. The base circuits of transistors 2720 and 2730 are biased from ground through resistors R2710 and R2711, respectively. Since these transistors are type NPN, they conduct only when their base is positive with respect to the emitter. The output signal from the multivibrator swings from approximately ground potential to +24 volts corresponding to the conducting and non-conducting condition, respectively, of the associated transistor. Thus, each time that transistor 2700 is rendered non-conducting, transistor 2720 is rendered conducting, and each time that transistor 2710 is rendered non-conducting, transistor 2730 is rendered conducting. Thus, a push-pull output is obtained from transistors 2720 and 2730.

Transistors 2740 and 2750 obtain emitter bias from

+24 volts through filter choke 2793 and base bias from the same voltage source through resistors R2712 and R2713, respectively. Since transistors 2740 and 2750 are of the PNP type, they conduct only when their base is negative with respect to their emitter potential. Thus it can be seen that transistor 2740 conducts only when transistor 2720 is conducting, and transistor 2750 conducts only when transistor 2730 is conducting. The output voltage signal of transistors 2720 and 2730, which is approximately ground potential, is connected through resistors R2714 and R2715 to the base of transistors 2740 and 2750, respectively.

The output signal from the second stage amplifiers appears across the primary winding 2781 of transformer T2780 and is coupled by the secondary windings 2782 and 2783 across the base to emitter inputs of transistors 2760 and 2770, respectively. The output signal of the third stage is, of course, coupled from the primary winding 2791 of transformer T2790 to the secondary winding 2792 and thus to the output conductors RG and RG.GRD.

*Channel pulse matrix 26*

Figure 15:
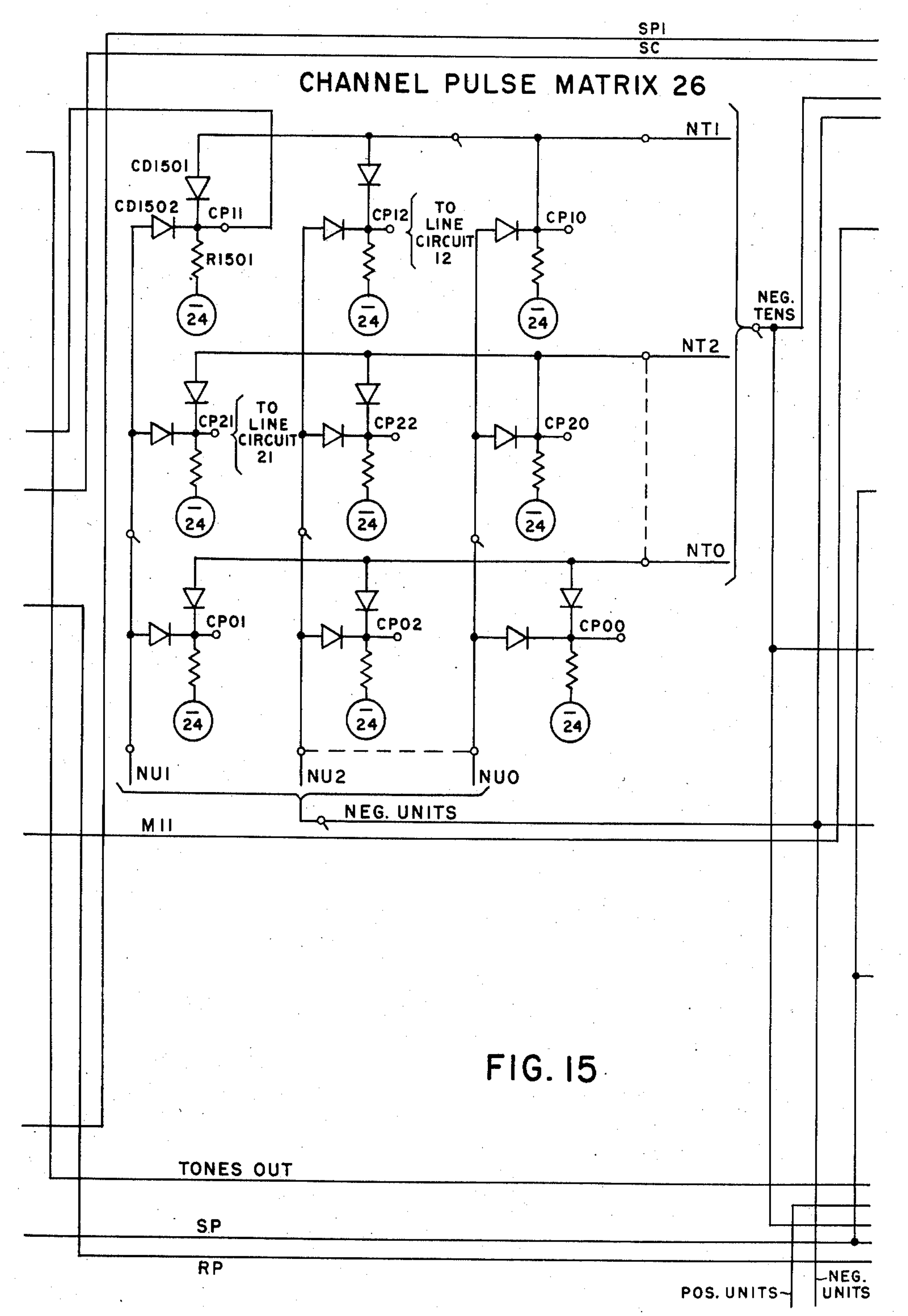

Figure 15 shows the circuit details of the channel pulse matrix. This circuit consists of a bank of 200 gold bonded germanium diodes which may be type CK739. The purpose of the circuit is to commutate to 100 output conductors the individual time positions assigned to each of the 100 lines of the system in response to pulses on the 20 input conductors, negative units NU1–NU0 and negative tens NT1–NT0, which carry negative units and tens pulses originating in the units and tens ring circuits, respectively.

The matrix is made up of 100 identical "and" gates composed of two diodes each. When a tens pulse and units pulse occur at the same instant of time, an output is realized from one of the "and" gates. For any one gate, this simultaneous occurrence occurs during one of the ten microsecond channel intervals and repeats once each frame. The "and" gate corresponding to line 11, which is identical to the other 99 gates, is comprised of diodes CD1501 and CD1502 with their associated resistor R1501. It can be seen that the NEG tens 1 conductor NT1 and the NEG units 1 conductor NU1 connect to the anode terminals of diodes CD1501 and CD1502, respectively. These conductors stand at +6 volts as derived from the transformer windings 2423 and 2353 in the tens ring amplifier circuit 33 of Fig. 24 and the units ring amplifier circuits 31 of Fig. 23, respectively, except when a negative pulse is connected thereto. With +6 volts connected to these conductors, the diodes conduct through resistor R1501 to −24 volts and because of the low forward impedance of the diodes, their common cathode connection is at approximately +6 volts. A negative pulse appearing on conductor NU1 at any time other than during the appearance of a negative pulse on conductor NT1 merely serves to cut off diode CD1502 since its cathode terminal remains at +6 volts because of the conduction through CD1501. However, when a negative pulse appears on conductor NU1 simultaneously with the appearance of a negative pulse on conductor NT1, a negative output is realized from the gate.

The output of the channel pulse matrix is coupled to the diode switches and to the line circuits of the system. It can be seen that channel pulse conductor CP11 connects to diode switch circuit 11A and to line circuit 11. It can also be seen from the block diagram that conductor CP11 connects to each one of the diode switch circuits such as 11B and 11C, which are associated with line 11 and with the various links. The diode switches are thus advised as to the time position identity of the line to which they are connected so that they will respond to switch control pulses in accordance with the relative timing of these pulses. In a similar manner, the ringing control facilities in each line circuit are advised of the time position of the line so that ringing control pulses will act to operate the proper line circuit in accordance with the relative timing of the pulses.

LINK COMMON EQUIPMENT

*Multiplexer 24*

Figure 16:
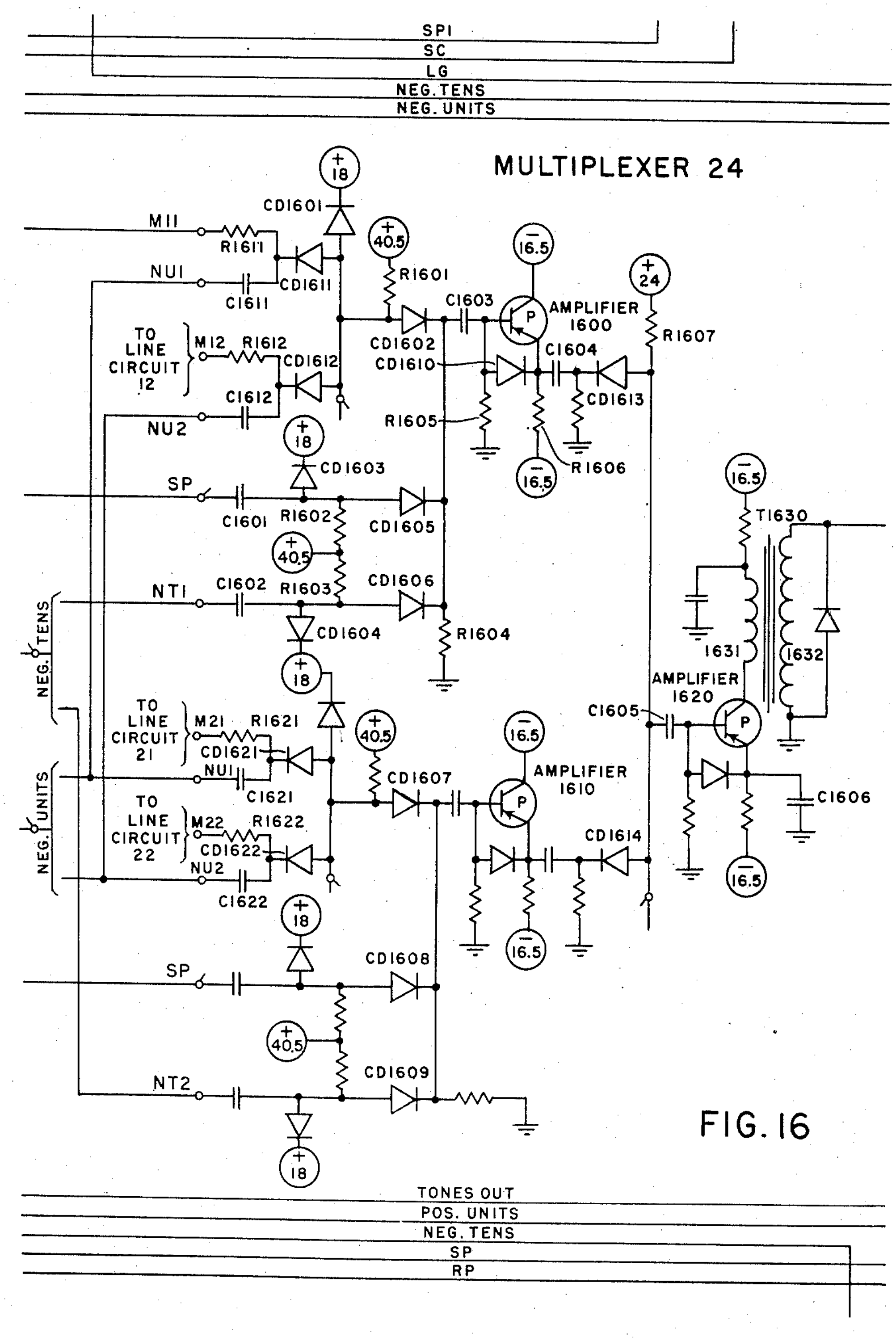

It will be recalled that the purpose of the multiplexer circuit, shown in Figure 16, is to sample each line of the system during its individual time position to determine if the line is on hook or off hook. If line current is flowing, a full amplitude output signal, in the form of a two microsecond pulse occurring approximately at the center of the channel pulse interval, is derived. The samples from all lines are combined in the multiplexer and appear on a single output conductor which connects to the multiplexer output amplifier 25.

The multiplexer is split up into ten identical subcircuits, the outputs of which are combined in a common output stage. Each subcircuit corresponds to one tens group which is identified with one of the negative tens pulses generated by the tens ring circuit. During each tens pulse interval, samples of ten consecutive lines are taken. Since each subcircuit handles lines in successive tens pulse intervals, the mixed output of all ten subcircuits will contain the complete sampling of all 100 consecutive lines. The drawing Figure 16 shows two typical subcircuits of the multiplexer together with the output stage.

Each subcircuit comprises a group of ten individual line gates, a sampling pulse gate, and the tens selection gate, and a point contact transistor amplifier. The line gates are connected as a ten input "or" gate in such a way that samples will be transmitted to the output from any one or more of the lines. Each gate comprises a diode which operates to release one of the units pulses originating in the units ring circuit in response to supervisory potentials received over the multiplexer control lead.

The line gate for line circuit 11 comprises diode CD1611. Diode CD1601 is common to the ten line gates which comprise diodes CD1611, CD1612, and eight other identical diodes which correspond to line circuits 13–10, inclusive. Diode CD1601 is normally conductive from +40.5 volts through resistor R1601 connected to its anode terminal and +18 volts which is connected to its cathode terminal. Because of the low forward resistance of diode CD1601, its anode potential stands at approximately +18 volts and thus the anodes of diodes CD1611, CD1612, and the other diodes of the "or" gate stand at +18 volts.

It will be remembered from the description of line circuit 11 that the multiplexer control conductor M11 stands at +24 volts when the line is on hook and at +18 volts or less when the line is off hook. It can be seen that the negative units 1 pulses occurring on conductor NU1 will not be effective if conductor M11 stands at +24 volts since diode CD1611 is poled for non-conduction. However, if conductor M11 stands at +18 volts or less, the negative pulses coupled through capacitor C1611 from conductor NU1 are conducted through diode CD1611 to the output of the line "or" gate. It should be readily apparent that the negative pulses on conductor NU2 will also be conducted through the line "or" gate if line 12 is off hook. In the output of the line gate group there appears a negative units pulse for every line of the group 11–10 which is off hook. The output of the line "or" gate is connected to the anode terminal of diode CD1602 which serves as one input of a three input "and" gate comprising diodes CD1602, CD1605, and CD1606.

The negative units pulses derived from the line gates are too wide to be used as satisfactory samples so the two microsecond sampling pulse, which appears at the center of each units pulse interval, on conductor SP is coupled through capacitor C1601 to the anode terminal of diode CD1605 which serves as a second input of the "and" gate. Furthermore, the units pulses appear ten times per frame so a tens gating operation must be made so that the samples are derived in the output only during the tens pulse interval assigned to the particular subcircuit and its group of ten lines. To this end, the negative tens 1 conductor NT1 is coupled through capacitor C1602 to the anode terminal of diode CD1606 which serves as the third input of the "and" gate.

In the absence of negative pulses, diodes CD1602, CD1605, and CD1606 are poled for conduction. Diode CD1602 conducts from +40.5 volts through resistor R1601 to ground through resistor R1604, diode CD1605 conducts from +40.5 volts through resistor R1602 to ground through resistor R1604, and diode CD1606 conducts from +40.5 volts through resistor R1603 to ground through resistor R1604. Furthermore, diodes CD1603 and CD1604 are poled for conduction from +40.5 volts through resistors R1602 and R1603, respectively, to +18 volts on their cathode terminals. Because of the low forward resistance of the diodes, both the anodes and the cathodes of the "and" gate diodes stand at approximately +18 volts.

A negative pulse occurring on any one of the conductors SP, NT1, or the output of the line gate, will render its associated diode non-conductive if either one or both of the other diodes is conducting, and the output of the "and" gate remains at +18 volts. However, when an output is obtained from the line gate, a negative sampling pulse is received over conductor SP, and the negative tens 1 pulse is present on conductor NT1 simultaneously, a negative going signal appears at the common cathode connection of diodes CD1602, CD1605, and CD1606.

The negative going output pulse is coupled through capacitor C1603 to the base circuit of amplifier 1600. This amplifier is actually a single shot oscillator which is triggered once for each input pulse and serves not only to amplify and buffer the input signals but acts to standardize both the pulse height and pulse width of the various incoming signals as well. The operation of amplifier 1600 is identical to that of the single shot oscillators previously described. Briefly, the emitter of transistor 1600 is biased to approximately —3 volts from ground through resistor R1605, diode CD1610, and through resistor R1606 to —16.5 volts. As previously described, the negative impulse connected to the base of transistor 1600 produces a large current pulse in transitor 1600 which is terminated when capacitor C1604 becomes charged. Diode CD1610 shortcircuits the high back resistance of the emitter when the transistor drops back into the non-conducting region so that capacitor C1604 is quickly discharged in readiness for the next pulse.

The negative pulse appearing in the emitter circuit of amplifier 1600 is conducted through diode CD1613 and coupled by capacitor C1605 to the base circuit of amplifier 1620. Diode CD1613 comprises one input of a ten input "or" gate for negatvie pulses. Diode CD1614, which is associated with the second subgroup of ten lines or lines 21–20, serves as a second input to the "or" gate. There are, of course, eight other identical subgroups and associated diodes which sequentially couple impulses in the time position of their off hook lines through the "or" gate.

Amplifier 1620 is identical to the single shot oscillator 2120 which was described in detail in the section entitled "Sampling Pulse Generator 44." A negative impulse coupled from the output of the "or" gate through capacitor C1605 causes transistor 1620 to produce a large current positive impulse in winding 1631 of transformer 1630 which winding is connected in the collector circuit of transistor 1620. The produced impulse, which is terminated when capacitor C1606 becomes charged, is coupled through transformer T1630 to secondary winding 1632 and thence to the multiplexer output amplifier 25.

The subcircuit associated with lines 21–20 and the other eight subcircuits are identical to the just described subcircuit associated with lines 11–10. For example, the negative units 1 pulse on conductor NU1 is gated with the potential of multiplexer control conductor M21 and coupled through diode CD1621 if line 21 is off hook. Similarly, the negative units 2 pulse on conductor NU2 is gated with conductor M22 and coupled through diode CD1622 if line 22 is off hook. The output of the line "or" gate is then connected to one input of an "and" gate which comprises diodes CD1607, CD1608, and CD1609. The other two inputs of the "and" gate are connected to the sampling pulse conductor SP and the negative tens 2 conductor NT2. The output of the "and" gate is then coupled through amplifier 1610 to the "or" gate which controls amplifier 1620.

Transistors 1600, 1610, and 1620 may all be type G11A.

*Multiplexer output amplifier 25*

Figure 17:
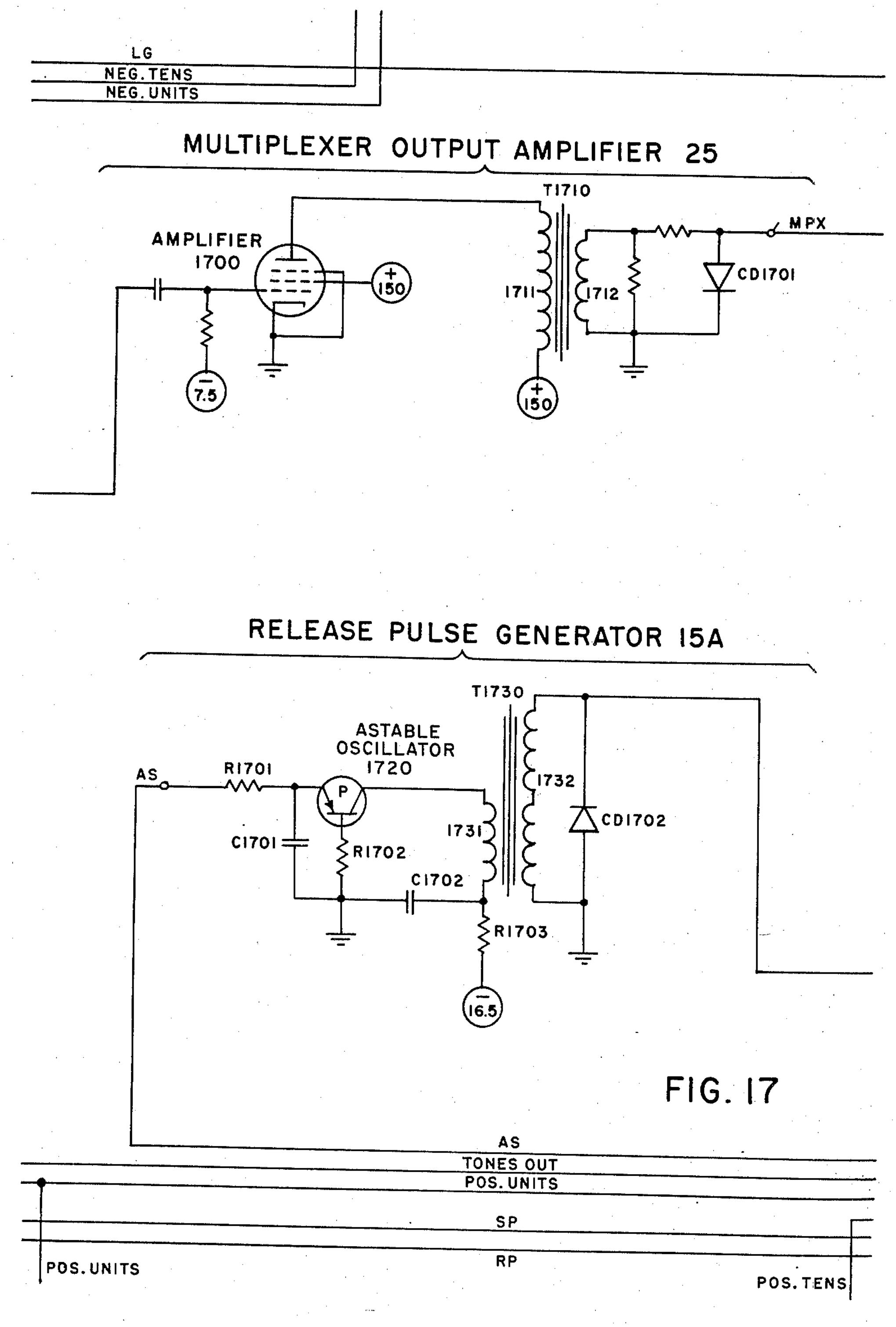

This amplifier, which is shown in Fig. 17, comprises an amplifier tube 1700, which may be type 6AG7, and an output pulse transformer T1710. The purpose of the amplifier is to increase the power of the multiplexer pulses to the point where they may be delivered at a suitable low resistance level to the many link circuits of the system without appreciable loading. Operation of this amplifier is identical to the operation of the sampling pulse output amplifier 29 which was previously described. The output of the amplifier is taken from secondary winding 1712 of transformer T1710. Winding 1712 is poled to provide negative output pulses. A tail clipping diode CD1701 is provided to prevent unwanted positive signals at the end of each multiplexer pulse. The multiplexer output conductor MPX is multipled to all of the line finders and connectors of the 100 line system and is multipled as well to the allotter circuit.

*Ringing control driver 27*

This circuit, which is shown in Fig. 14, serves to amplify all of the ringing control signals derived from the connectors of the link group and to deliver them to all of the 100 line circuits served by the link group. Not shown in Fig. 14 is the plural input "or" gate which mixes the ringing control signal outputs from the connectors. Two inputs of the gate are physically located within each of the connector circuits so that a single multiple conductor RCO may be used to conduct the ringing control signals derived from the connectors to the ringing control driver circuit 27. For example, in connector 18A, diode CD4101 in the collector circuit of ring-ring follower transistor 4140, and diode CD4102 in the collector circuit of ring tip follower transistor 4130 connect to conductor RCO.

The operation of amplifier 1410, which may be type 6AG7, is similar to the operation of the previously described output amplifiers. Briefly, amplifier 1410 is normally biased for non-conduction from —7.5 volts through resistor R1408. Positive impulses coupled through capacitor C1404 from conductor RCO to the grid circuit cause negative impulses to be produced in the primary winding 1421 of transformer T1420. The pulses are induced in the secondary winding 1422, which is poled to produce negative impulses on ringing control conductor RC, which is multipled to all 100 line circuits of the group. Diode CD1405, in conjunction with resistor R1409, serves a tail clipping function.

*Busy lead converter and emergency service number circuit 21*

Figure 10:
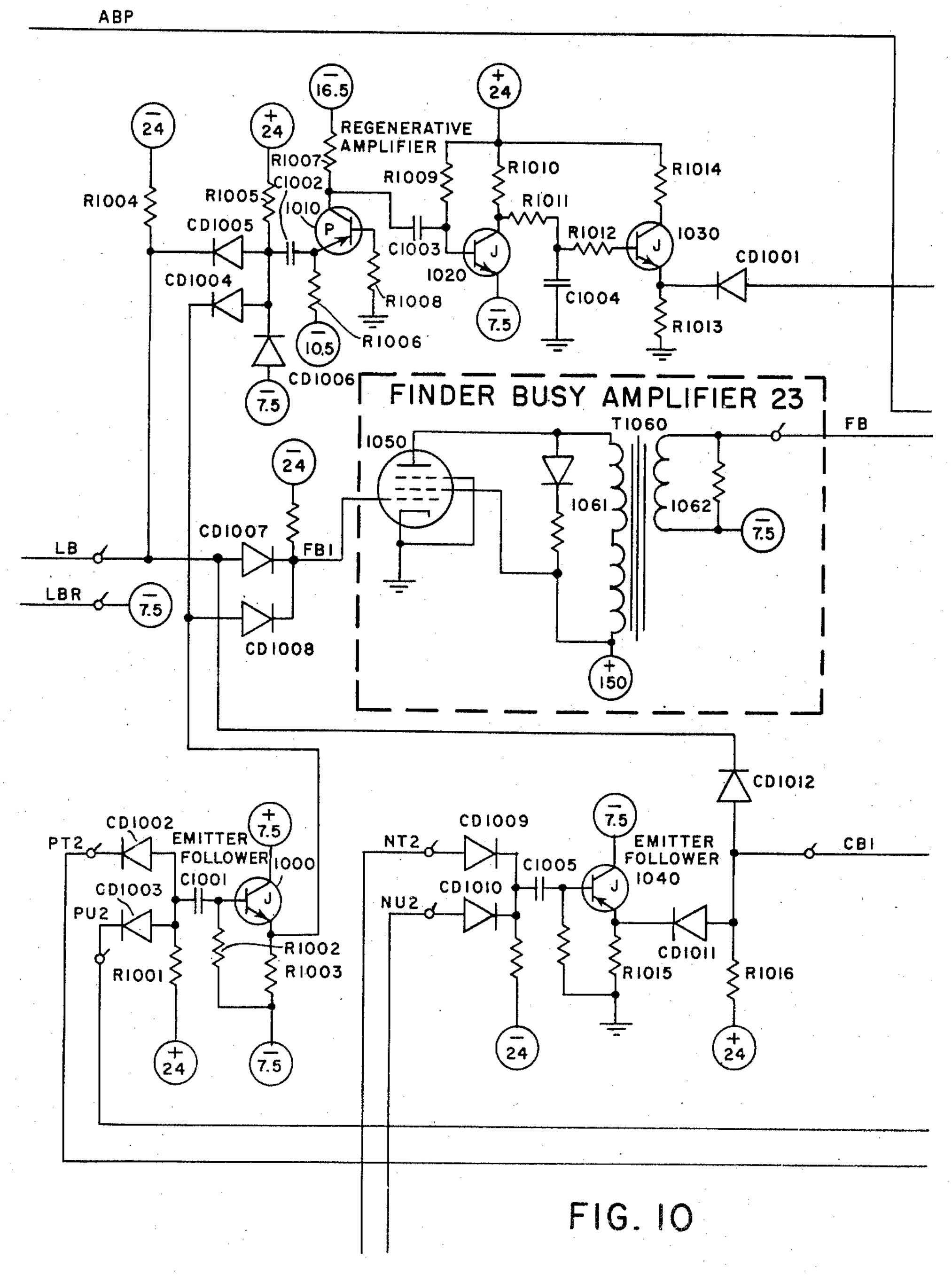
Figure 11:
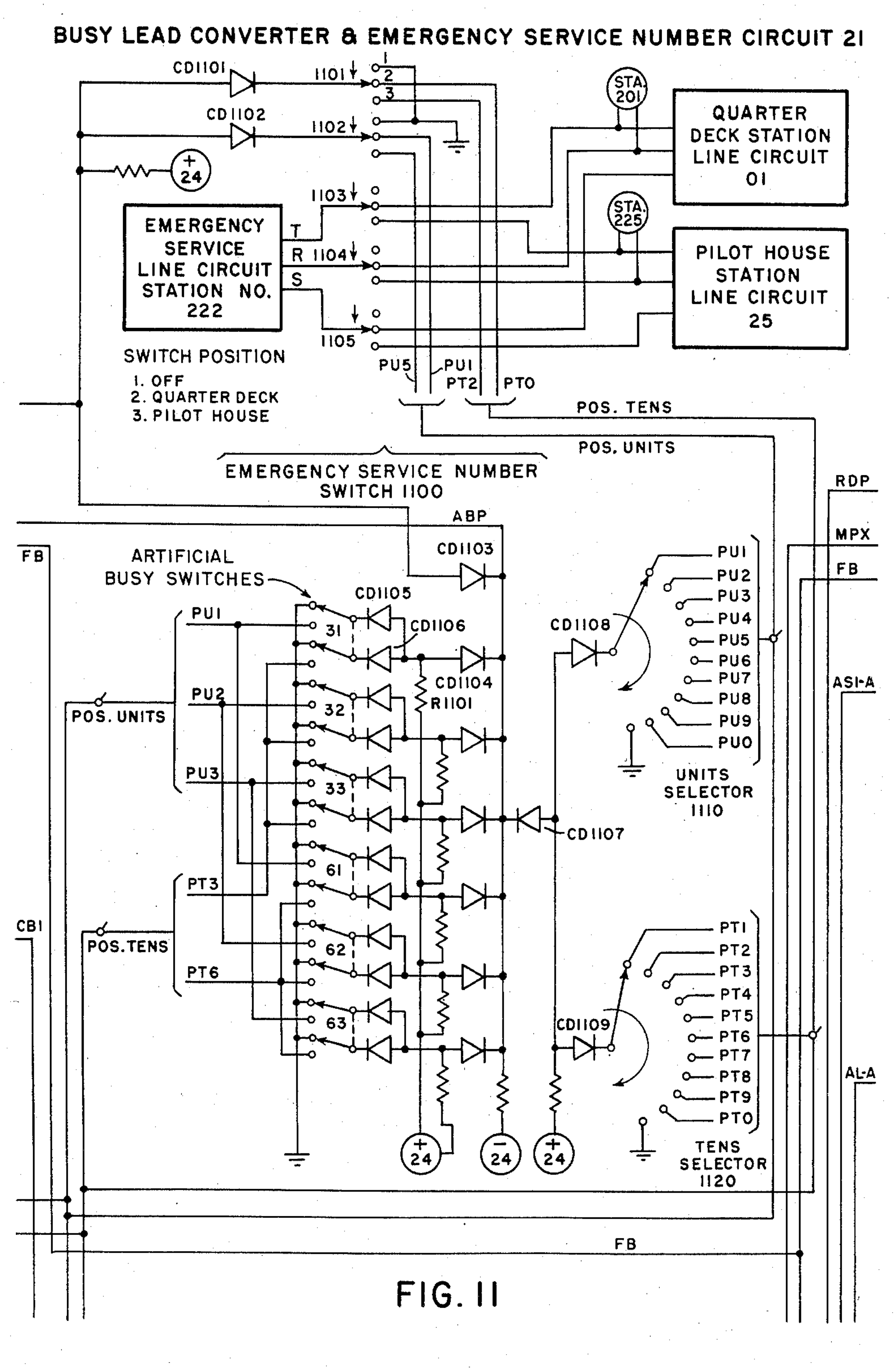

The purpose of this circuit, which is shown in Figs. 10 and 11, is to amplify busy pulses received from the finders and connectors, to generate artificial busy pulses in accordance with the emergency service requirement, and to redistribute the busy signals to the finders and connectors of the system. Busy pulses in the time position of the calling and called lines are generated by the finder and connector, respectively, and coupled over the link gate conductor LG to the switch control circuit individually associated with that particular link. These pulses are then combined through an "or" gate, a part of the gate being within each switch control circuit, and connected by the link busy conductor LB to circuit 21. Thus it can be seen that conductor LB, which serves as an input to this circuit, carries pulses in the time position of all lines of the group which are busy.

The busy pulses are then amplified and sent back to the finders and connectors so that they are all advised as to the busy condition of any one or more of the lines of the system. Except for the special conditions imposed by the inclusion of the emergency service number feature, a single output conductor could be provided for both finders and connectors. In the present system, however, two separate leads are provided; one for finders and the other for connectors. The busy pulses on the two leads are the same except where modified by the emergency service number circuit.

It will be remembered that an emergency service line circuit is assigned for the purpose of providing the emergency service feature. Emergency service line circuit 22, which has directory number 222, is shown in Fig. 11. Line circuit 22 could have a substation associated with it, which substation would be used only for emergency service calls. In the disclosed arrangement, line circuit 22 does not have a substation individually associated with it but instead, the line conductors T, R, and S are multipled to the line conductors of either line circuit 01 or 25 as determined by the positioning of the emergency service number switch 1100. Although the conductors on the equipment side of these line circuits have not been shown, it is to be understood that line circuits 22, 25, and 01 are identical to line circuit 11, which is shown in Fig. 13. It can be seen that when switch 1100 is in its second position, the T, R, and S conductors of line circuit 22 are connected to the T, R, and S conductors of line circuit 01 by wipers 1103, 1104, and 1105, respectively. Calls made to directory number 222 or to directory number 201 will serve to ring station 201 under control of either line circuit 22 or 01, respectively. Since the busy lead converter circuit is arranged to mark line 22 as busy to the finders at all times, calls originated by station 201 will be handled through line circuit 01. Similarly, when switch 1100 is in its third position, wipers 1103, 1104, and 1105 connect the T, R, and S conductors of line circuit 22 in multiple with the line conductors of line circuit 25. With the switch in this position, calls made to directory number 222, or to directory number 225, will serve to ring station 225 either under control of line circuit 22 or line circuit 25, respectively. Calls originating at station 225 are routed through line circuit 25.

Wipers 1101 and 1102 on switch 1100 connect the positive tens and positive units conductors, which correspond to the multipled line circuit, to the cathode terminals of diodes CD1101 and CD1102, respectively. When switch 1100 is in position 2, wiper 1101 connects conductor PT0 to the cathode of CD1101 and wiper 1102 connects conductor PU1 to the cathode of CD1102. Similarly, when switch 1100 is in position 3, wiper 1101 connects conductor PT2 to CD1101 and wiper 1102 connects conductor PU5 to CD1102. When switch 1100 is in the off position 1, ground potential is connected through the wipers to the diodes. Diodes CD1101, CD1102, and CD1001 comprise a three input "and" gate. The purpose of this gate is to allow pulses in the time position of the line which is connected in multiple with line circuit 22 to be conducted to the auxiliary pulse amplifier whenever the emergency service line circuit 22 is seized by a connector.

If it be assumed that line circuit 25 is connected in multiple with line circuit 22 and that someone has dialed the emergency service number 222, station 225 will be rung under control of line circuit 22. The seizing connector, of course, generates a pulse only in the time position of line circuit 22. It is therefore necessary for this circuit to generate an artificial busy pulse in the time position of line circuit 25 so that a line finder will not be seized by line circuit 25 when station 225 goes off hook in response to the ringing signal.

The signal applied to diode CD1001 serves the purpose of gating the pulse in the time position of line 25, as derived from PT2 and PU5 through diodes CD1101 and CD1102, through to the auxiliary pulse amplifier only when line circuit 22 is seized by a connector. To understand the derivation of this signal it is necessary to consider the operation transistors 1000, 1010, 1020, and 1030 and their associated circuit components.

The input to the base circuit of transistor 1000 consists of a positive pulse in the time position of the emergency service line circuit 22. It will be remembered that conductors PT2 and PU2 stand at ground potential except when a positive impulse is impressed thereon. Diodes CD1002 and CD1003 normally conduct from +24 volts through resistor R1001 connected to their anode terminals and ground potential connected to their respective cathode terminals. A positive impulse appearing on conductor PU2 at any time other than when a positive impulse is connected to conductor PT2 merely serves to cut off diode CD1003 since its anode terminal remains at ground potential because of the conduction through CD1002. However, when a positive pulse appears on conductor PT2 simultaneously with the appearance of a positive pulse on conductor PU2, the positive pulse is conducted through the "and" gate and through capacitor C1001 to the base of transistor 1000.

Emitter follower transistor 1000, which is normally cut off by virtue of base bias connected through resistor R1002 from −7.5 volts, conducts when the positive pulse is connected to its base. The output signal taken from across the load resistor R1003 in the emitter circuit of transistor 1000 is a positive pulse in time position 22. The output conductor is connected to the cathode terminal of diode CD1004 which comprises one input of an "and" gate. Diode CD1005, which has its cathode terminal connected to conductor LB, comprises the other input of the "and" gate. Since conductor LB and the output conductor from transistor 1000 normally stand at −7.5 volts, CD1004 and CD1005 conduct with +24 volts through resistor R1005 connected to their anodes. Because of the low forward resistance of the diodes, the common anode connection stands at approximately −7.5 volts. Diode CD1006 clamps the negative voltage to −7.5 volts since it is poled to conduct on signals exceeding −7.5 volts in the negative direction.

A positive pulse appearing on either input conductor will render the associated diode non-conducting and the common anode potential remains at −7.5 volts by virtue of the conduction through the other diode. However, when a busy pulse in time position 22 is received over conductor LB, the positive pulse is gated through since it corresponds in time position to the pulse generated by transistor 1000. The busy pulse on conductor LB in time position 22 can come only from a connector and thus will indicate when a connector has seized the emergency service line circuit.

The positive output pulse from the "and" gate is coupled through capacitor C1002 to the emitter circuit of regenerative amplifier 1010. Transistor 1010 is connected for operation as a single shot or monostable oscillator circuit. It is similar to the previously described monostable oscillator circuits except that emitter input is used. Transistor 1010 is normally biased for non-conduction by −10.5 volts connected through resistor R1006 to its emitter terminal. A positive pulse coupled through capacitor C1002 triggers the oscillator into the saturation region. A positive going pulse is taken from across collector load resistor R1007 When capacitor C1003 becomes charged, transistor 1010 drops back into the non-conducting condition, as previously described.

The positive going output pulse from transistor 1010 is coupled to the base circuit of transistor 1020. Transistor 1020 is normally operated in a saturated condition through the action of the base biasing circuit comprising +24 volts through resistor R1009. When a positive impulse is received, a heavy base to emitter current flows which charges capacitor C1003 to the peak voltage of the input pulse. At the end of the pulse, the stored charge on capacitor C1003 forces transistor 1020 below cutoff where it remains for an entire frame of 1000 microseconds because of the relatively high value of resistor R1009 and the resulting long time constant for the RC network. Upon application of succeeding input pulses, transistor 1020 is driven to saturation for the duration of each pulse, and is held below cutoff for the entire period separating succeeding pulses. Thus the output voltage of transistor 1020, which appears across collector load resistor R1010, stands at approximately −7.5 volts when no connector has seized line 22. During periods when pulses are being generated in the time position of line 22, the output voltage rises to +24 volts except for very short intervals once per frame when the voltage drops once more to −7.5 volts. This short negative pulse is filtered in a simple T section low-pass filter, which comprises resistors R1011 and R1012 and capacitor C1004, and the output of transistor 1020 is then coupled to the base of transistor 1030.

Transistor 1030 is held below cutoff when transistor 1020 is conducting and thus the output taken from across emitter load resistor R1013 stands at ground potential. During the period that line 22 is seized and transistor 1020 is cut off, transistor 1030 is driven to saturation and the output voltage across R1013 is approximately +10.5 volts as determined by the comparative values of resistors R1014 and R1013. No short pulses are evident in the output of transistor 1030 due to the action of the filter and the limiting action of transistor 1030 when driven into saturation. Thus the signal appearing on the cathode terminal of diode CD1001 is a D.-C. switching signal of approximately +10.5 volts which gates the pulse in time position 25 from diodes CD1101 and CD1102 through to the anode terminal of diode CD1103. Diode CD1103 comprises one input of a large "or" gate for positive pulses. The output of the "or" gate is connected to the auxiliary pulse amplifier circuit 20 by the auxiliary busy pole conductor ABP.

To summarize briefly, an output pulse in the assigned time position of the pilot house line circuit, or quarter-deck line circuit, is released during periods when one or more connectors have dialed the emergency service number. When the connector, or connectors, have abandoned the call, the auxiliary 25 or 01 pulse is, of course, terminated.

In the present embodiment of the busy lead converter, a set of test switches has been included for the purpose of making certain ones of the lines of the system busy, at will, for test purposes. Six toggle switches are shown which enable the operator to make lines 31, 32, 33, 61, 62, or 63 artificially busy. The six lines represent the member lines of the two trunk groups which have been arbitrarily chosen for the system, and are used when testing the trunk hunting facilities of the connector. In addition, units selector switch 1110 and tens selector switch 1120 have been provided to permit the operator to busy any single desired line in the system.

Since the six toggle switch circuits are identical, it is believed sufficient to describe the one which is connected for artificially busying line 31. It can be seen that when the switch is in its upper or off position, ground potential is connected through diodes CD1105 and CD1106 and thus through diode CD1104, which comprises a second input of the "or" gate, to conductor ABP. When the switch is in its lower or operated position, the PU1 pulse is gated with the PT3 pulse so that a positive pulse is obtained from the "and" gate comprising CD1105 and CD1106 in the time position of line 31. This positive output pulse is conducted through diode CD1104 to conductor ABP and thus to the auxiliary pulse amplifier circuit.

Similarly, when the units selector switch 1110 and the tens selector switch 1120 are in their eleventh, or off position, ground potential is connected through diodes CD1108 and CD1109 and thus through diode CD1107 to conductor ABP. When, as shown, switches 1110 and 1120 are positioned on step 1, the PU1 pulse is gated with the PT1 pulse so that a positive pulse is obtained from the "and" gate, comprising diodes CD1108 and CD1109, in the time position of line 11. This positive pulse is conducted through "or" gate diode CD1107 to conductor ABP and thus to the auxiliary pulse amplifier circuit.

Returning to the consideration of input conductor LB, which carries impulses in the time position of all busy lines including those made artificially busy by the circuits just described, it can be seen that this conductor connects to the anode terminal of diode CD1007. The output of previously described transistor 1000, which generates pulses in time position 22, is connected to the anode of diode CD1008. CD1007 and CD1008 serve as an "or" gate for positive pulses. The output of the "or" gate connects to finder busy input conductor FBI which connects to the finder busy amplifier. The "or" gate serves to mix all of the incoming pulses on the LB lead with a fixed 22 pulse. The output of this gate is coupled through finder busy pulse amplifier circuit 23 to the finder busy conductor FB. Since busy pulses in time position 22 are always present on this lead, no finder will respond to line 22 at any time. It will be remembered that when a connector seizes line 22, the auxiliary busy section of the busy lead converter responds by generating a busy pulse in time position 25 or 01. This pulse is routed back over conductor LB, through diode CD1007, and then through the finder busy pulse amplifier to all of the finders of the system. When line 25 or 01 answers, all finders will have been given the busy information so that none will be unnecessarily seized.

It is also a purpose of this circuit to mark the emergency service line as idle to the connectors at all times. For this reason, it is necessary to remove the busy pulse in time position 22 received over conductor LB so that it is not amplified and repeated by the connector busy amplifier. To this end, negative pulses on conductors NT2 and NU2 are gated by an "and" gate, comprising diodes CD1009 and CD1010, to produce a negative pulse in time position 22 which is coupled through capacitor C1005 to the base of transistor 1040. Emitter follower transistor 1040 which is normally cut off, conducts when the negative impulse is connected to its base circuit. An output signal is taken from across emitter resistor R1015. The output signal is at ground potential except when transistor 1040 conducts during the time position of line 22. During the conducting period the output signal drops to approximately −7.5 volts. The output of this stage is connected to the cathode terminal of diode CD1011 which diode comprises one input of an "inhibitor" gate. Diode CD1012 comprises the other input for the gate.

In the absence of pulses thereon, conductor LB stands at approximately −7.5 volts and diode CD1012 conducts from +24 volts through resistor R1016 connected to its anode terminal. Because of the low forward impedance of the diode, the anode terminal of CD1012 and output conductor CBI, which connects to the connector busy amplifier, stand at −7.5 volts and diode CD1011 is cut off. Positive pulses conducted through CD1012 appear on conductor CBI when transistor 1040 is not conducting but diode CD1011 serves to clamp these pulses to approximately ground potential. However, when transistor 1040 is conducting, during the time position of emergency service line 22, the −7.5 volts potential reflected through CD1011 holds the anode potential of CD1012 at −7.5 volts so that CD1012 is cut off if a positive pulse appears on conductor LB in time position 22. Thus, the inhibiting action of the gate prevents the transmission of pulses in time position 22 to output conductor CBI at all times. The connectors therefore will never recognize line 22 as being busy and will always be free to cut through in that time position.

As used in this circuit, transistors 1000 and 1020 may be type TI201, 1010 may be type G11A, 1030 may be type TI202, and 1040 may be type CK722.

*Auxiliary pulse amplifier 20*

Figure 9:
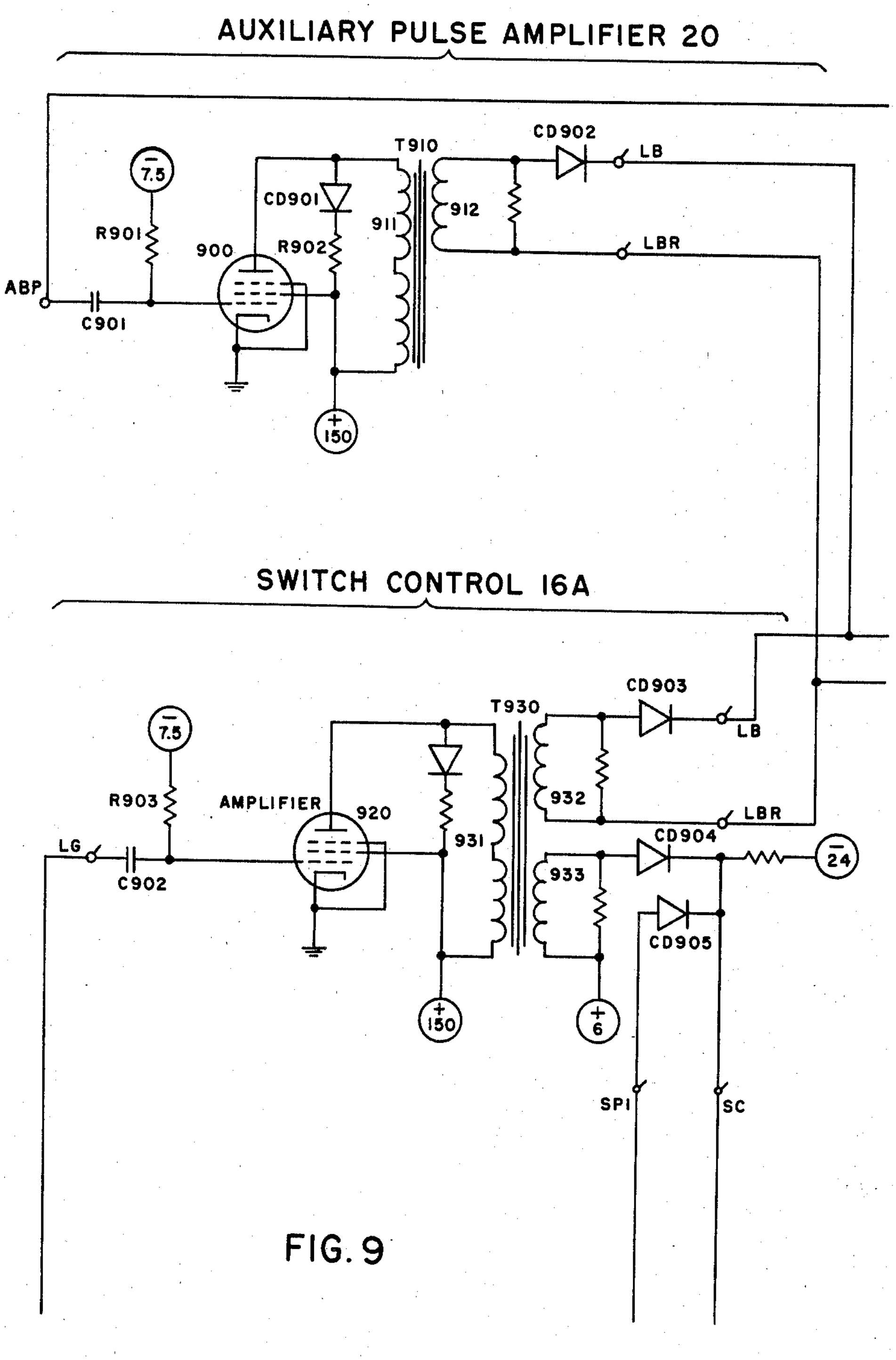

The purpose of this circuit, which is shown in Fig. 9, is to amplify the various artificial or auxiliary busy pulses generated in the busy lead converter and to deliver them through an "or" gate, shared by all of the switch control circuits of the link group, to conductor LB. Conductor LB is coupled back to the input of the busy lead converter circuit.

The operation of this circuit is similar to the many output amplifiers previously described. Artificial busy pulses on conductor ABP are coupled through capacitor C901 to the grid circuit of tube 900, which may be a 6AG7. The resulting negative pulse in primary winding 911 of transformer T910 is coupled to secondary winding 912 which is poled to produce positive impulses. Diode CD901 and resistor R902, which are connected across the primary winding 911, serve a tail clipping function. Diode CD902, which couples secondary winding 912 to conductor LB, serves as one input of an "or" gate which has a corresponding input in each of the switch control circuits of the link group. The secondary winding 912 is returned to −7.5 volts as derived over conductor LBR.

*Finder busy amplifier 23*

The purpose of this circuit, which is shown in Fig. 10, is to amplify the output of the finder busy pulse "or" gate provided in the busy lead converter and to deliver it to a finder busy conductor FB which is multipled to all of the finders of the system. Grid bias for tube 1050, which may be a 6AG7, is derived from the common cathode connection of the "or" gate diodes CD1007 and CD1008. As previously described, this common point stands at −7.5 volts except when positive pulses are connected thereto. Tube 1050, of course, conducts when the positive impulse is connected to conductor FBI. The secondary winding 1062 of transformer TI060 is poled so as to produce positive going impulses on conductor FB. The secondary winding 1062 is returned to −7.5 volts.

*Connector busy amplifier 22*

Figure 18:
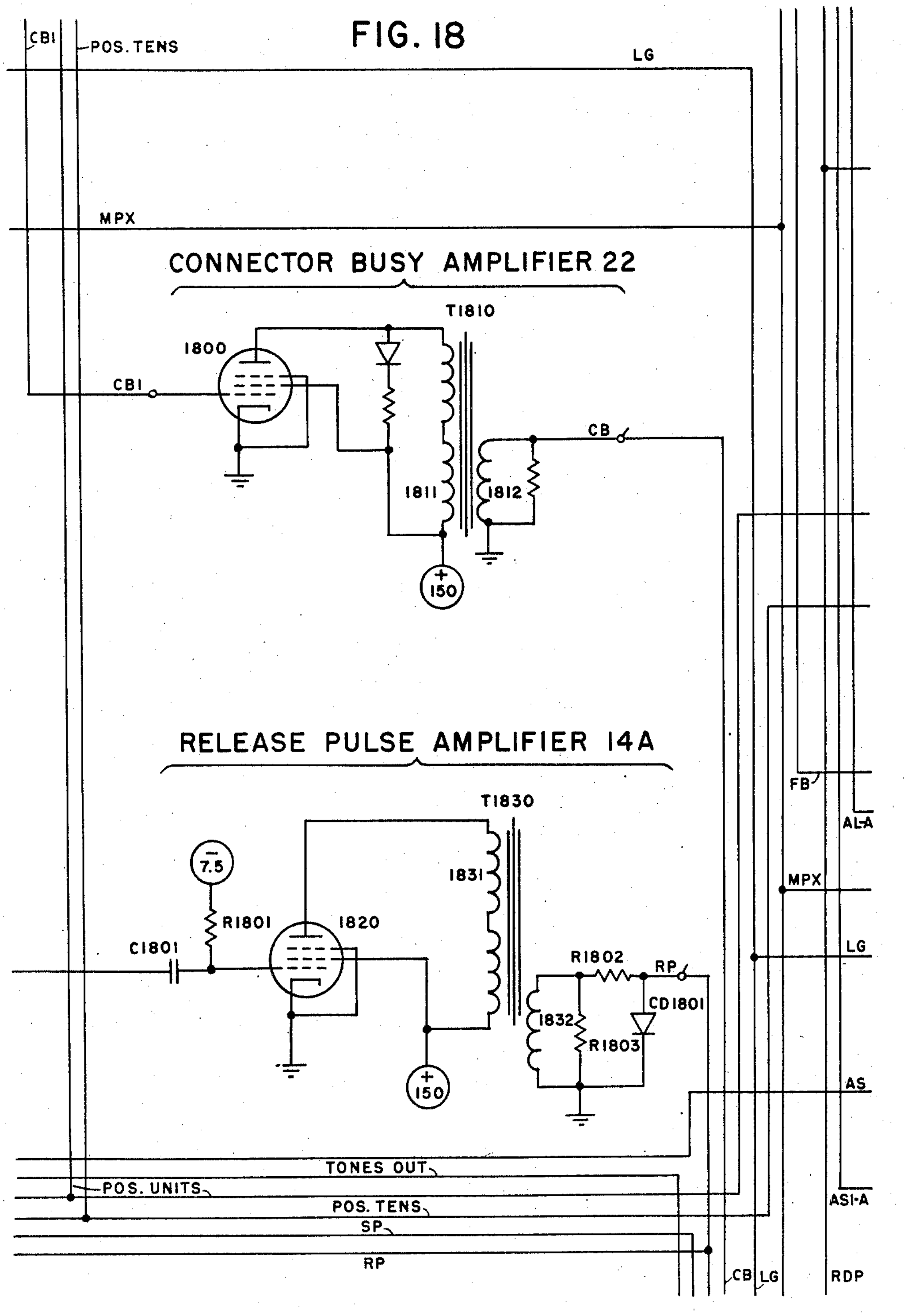

The purpose of this circuit, which is shown in Fig. 18, is to amplify the output of the connector busy inhibitor gate provided in the busy lead converter and to deliver it to all of the connectors of the link group over a connector busy conductor CB. Grid bias for tube 1800, which may be type 6AG7, is supplied over conductor CBI from the common anode connection of the "inhibitor" gate diodes CD1011 and CD1012 in the busy lead converter circuit. As previously described, this common point normally stands at −7.5 volts and rises to approximately ground potential when pulses on conductor LB are connected thereto. Tube 1800, of course, conducts on the positive impulses and the resulting negative impulses produced in secondary winding 1812 of transformer T1810 are connected over conductor CB to the connectors.

*Trunk hunting and executive-cut-in marker circuit 40*

Figure 25:
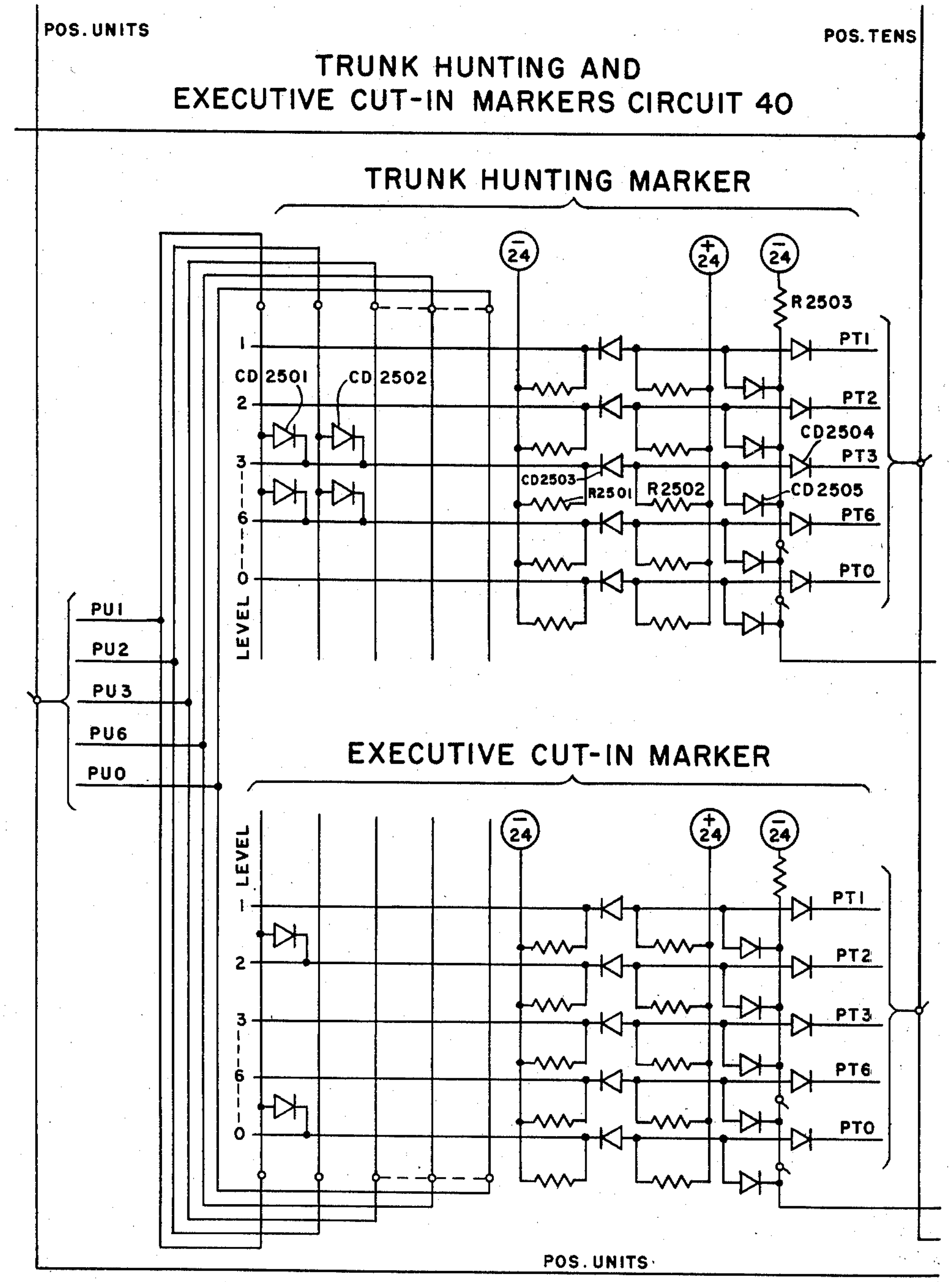

The purpose of this circuit, which is shown in Fig. 25, is to identify those particular lines of the system which are to be distinguished from other lines in regard to the special services of trunk hunting and executive-cut-in. These lines are identified by generating fixed pulses in the time positions corresponding to these lines. In particular, the trunk hunting marking generator comprises a matrix which can be wired in any desired manner to provide one or more pulses within the time position frame so that lines in trunk groups may be identified. In the present arrangement, all lines except the last line of any one trunk group are marked with pulses by the trunk hunting marker. The drawing shows the method of wiring the matrix so that pulses 31, 32, 61, and 62 are generated, indicating that lines 31, 32, 33, and 61, 62, 63 comprise two individual trunk groups of three lines each. The output of this matrix is coupled to the trunk hunting output amplifier circuit 42.

Considering level 3 of the matrix, it can be seen that diodes CD2501 and CD2502 comprise two inputs of an "or" gate for positive units pulses. CD2501 conducts positive pulses from conductor PU1 through to the cathode of diode CD2503 and CD2502 conducts positive impulses appearing on conductor PU2 through to the cathode of CD2503. Resistor R2501 serves as a load resistor for the "or" gate. Diodes CD2503 and CD2504 comprise two inputs of an "and" gate which serves to gate the positive units pulse with the positive tens pulse on conductor PT3. The operation of the "and" gate, which utilizes resistor R2502 as a load resistor, is identical to the many "and" gates previously described. A positive output pulse is realized from the "and" gate in time positions 31 and 32 and coupled through diode CD2505 to the output conductor which connects to the trunk hunting output amplifier. Diode CD2505 serves as one input of a ten input "or" gate which has an input corresponding to each one of the ten levels of the 100 line system. Resistor R2502 serves as a load resistor for the last mentioned "or" gate. In an identical fashion, positive pulses in the time positions of lines 61 and 62 are connected to the trunk hunting output amplifier.

Also shown on the drawing is the matrix used to generate the marking pulses for the executive-cut-in feature. The operation of the circuit is identical to the operation of the trunk hunting matrix. The matrix is shown as wired to provide executive-cut-in service for lines 21 and 01. Output pulses appearing in the time position of lines 21 and 01 are connected to the executive-cut-in output amplifier 41.

*Trunk hunting output amplifier 42*

Figure 26:
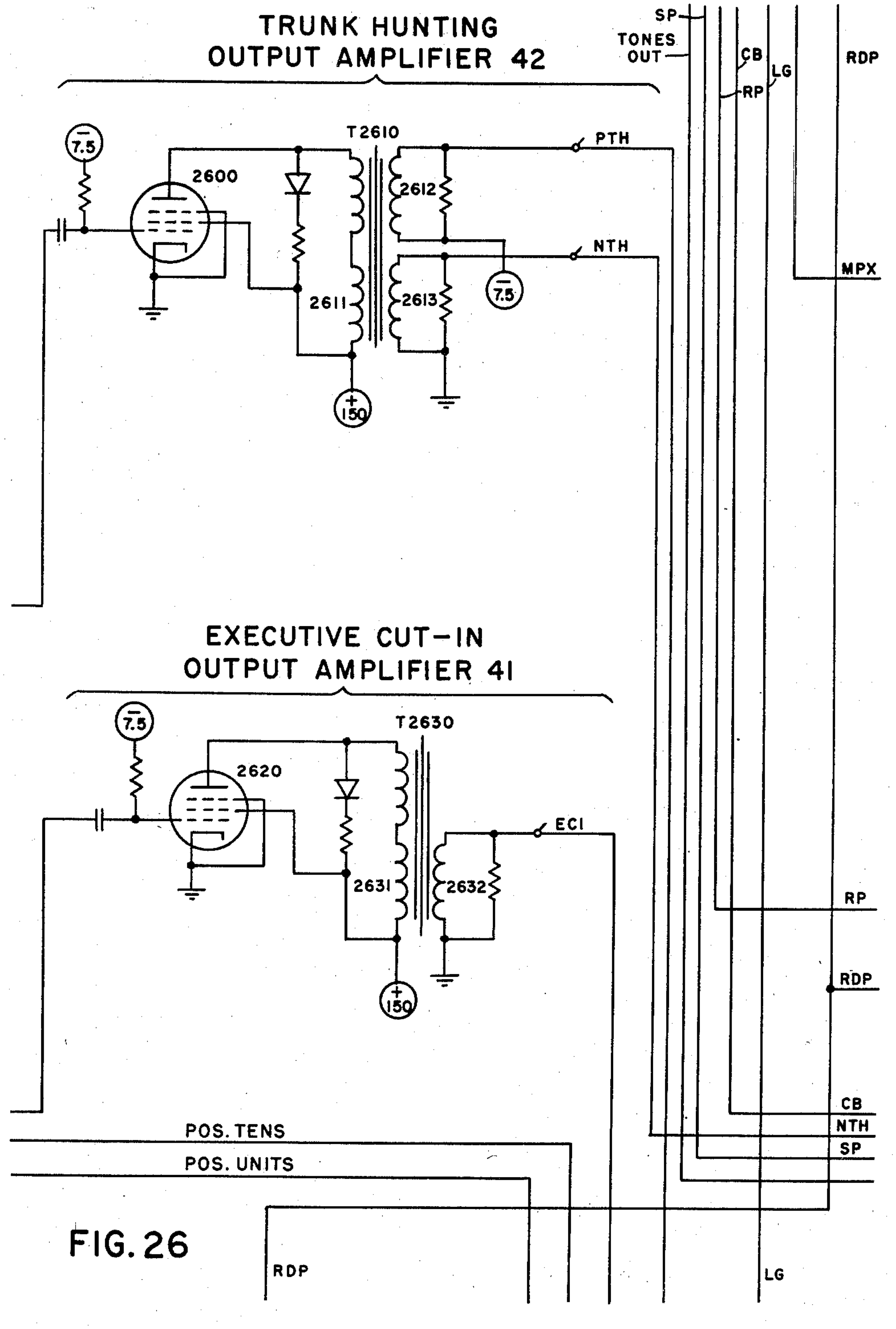

The purpose of this circuit, which is shown in Fig. 26, is to amplify the pulse output of the trunk hunting marker and to deliver these pulses over two conductors to all of the connectors of the link group. Secondary winding 2612 of transformer T2610 is poled so as to produce positive pulses which are coupled over the positive trunk hunting conductor PTH to the connectors of the link group. Winding 2612 is returned to −7.5 volts. Secondary winding 2613 is poled so as to produce negative impulses which are coupled over the negative trunk hunting conductor NTH to the connectors. Winding 2613 is returned to ground potential. Amplifier tube 2600 may be type 6AG7.

*Executive-cut-in amplifier 41*

The purpose of this circuit, which is shown in Fig. 26, is to amplify the pulse output of the executive-cut-in marker and to deliver these pulses over conductor ECI to all of the connectors of the link group. Secondary winding 2632 of transformer T2630, which is returned to ground, is poled to provide negative output pulses. Amplifier tube 2620 may be type 6AG7.

*Link allotter circuit 19*

Figure 12:
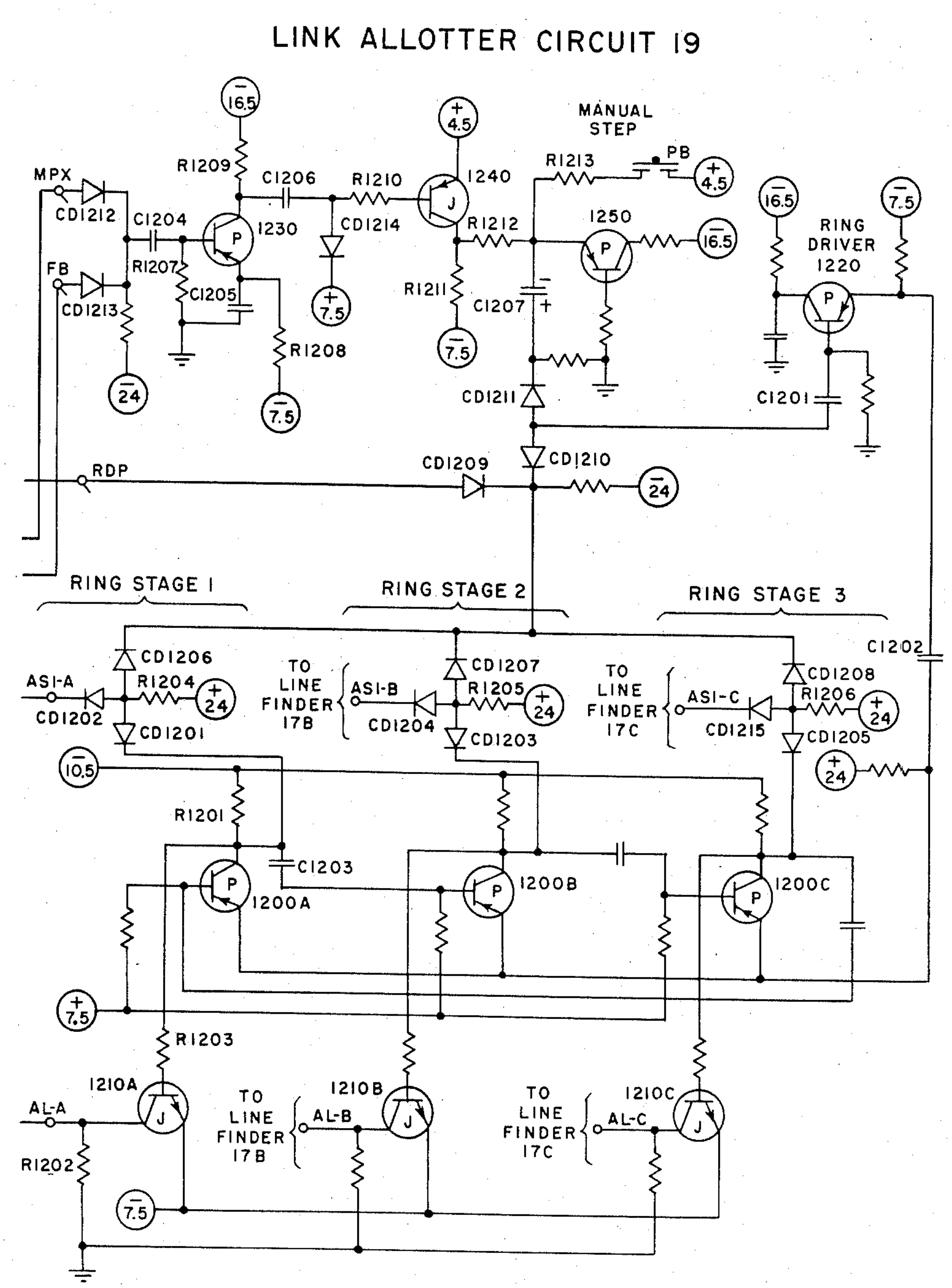

This circuit, which is shown in Fig. 12, is employed to allocate line finder-connector links in sequence to handle calls. The allotter is arranged to preselect the next idle link, in its associated group, at the termination of each line finding operation.

The allotter comprises a two transistor circuit for each link of the system. Ring stage 1 transistors 1200A and 1210A are associated with link A, ring stage 2 transistors 1200B and 1210B are associated with link B, and ring stage 3 transistors 1200C and 1210C are associated with link C. It is to be understood that in practice the number of ring stages employed would correspond to the maximum number of links which might be needed to serve the particular 100 line group.

The transistors 1200A, 1200B, and 1200C are connected in a ring circuit, which is identical in operation to the previously described units ring circuit 30, while transistors 1210A, 1210B, and 1210C are inverters which are utilized to enable their associated line finder when it has been preselected. In operation, one ring circuit transistor and its associated inverter transistor are normally conductive. These units correspond to the particular link allotted.

Referring to the circuit of transistor 1200A, it can be seen that the output signal, taken from across collector load resistor R1201, stands at −10.5 volts when the transistor is non-conductive. This −10.5 volt potential, which is coupled to the base of transistor 1210A through resistor R1203, maintains transistor 1210A cut off. With transistor 1210A cut off, the output signal on conductor AL–A, which is taken from across collector load resistor R1202, stands at ground potential. When transistor 1200A is conductive, the output signal across resistor R1201 rises to a positive potential which serves to drive transistor 1210A to saturation. The output signal on conductor AL–A drops to approximately −7.5 volts. Thus it can be seen that the AL lead which connects to the allotted finder stands at −7.5 volts while the AL conductors which connect to all of the other finders stand at ground potential.

It will be remembered from the general description that the conductor AL is connected to one input of the finder in gate, and only the finder which has a negative potential on its corresponding AL conductor is enabled to find a calling line. It will also be remembered that the finders return ground potential over their associated AS conductor when idle, and negative potential when they have seized a line. The AS conductor remains at a negative potential so long as the finder is busy. The connection of a negative potential to the AS conductor by the allocated finder serves to inform the allotter that the line has been found and enables it to preselect the next idle finder.

To the collector of each ring stage transistor is connected the cathode terminal of one diode of a two-input "and" gate. The cathode terminal of the other diode of this gate is connected to the appropriate allotter start conductor AS. The "and" gate for stage 1 of the ring comprises diodes CD1201 and CD1202 and their respective cathode terminals are connected to the collector of transistor 1200A and to conductor AS1–A. If it be assumed that link A has been allotted but has not as yet connected to a calling line, the collector of transistor 1200A stands at a positive potential and conductor AS1–A stands at ground potential. Thus, the output of the "and" gate associated with ring stage 1 stands at ground potential since diode CD1202 conducts from +24 volts through resistor R1204 and diode CD1201 is thereby cut off. Examining the case of the two ring stages which are off, their collectors are negative, resulting in a negative output from their "and" gates. Incidentally, it is of no importance whether the finder associated with the off stage is busy or not insofar as the output of the "and" gate is concerned.

Assume that the line finder associated with ring stage 2 is idle and the finder associated with ring stage 3 is busy so that conductors AS1–B and AS1–C stand at ground potential and a negative potential, respectively. The output of the "and" gate, comprising diodes CD1203 and CD1204, will be negative because of conduction from +24 volts through resistor R1205 and through CD1203 to negative potential. The resulting negative potential functions to cut off CD1204. The output of the "and" gate comprising diodes CD1205 and CD1215 is also negative since both diodes conduct from +24 volts through resistor R1206 on their anode terminals to negative potential on their respective cathode terminals.

The outputs of the "and" gates just described are combined in an "or" gate, which has one input per each "and" gate, in such a way that if a positive signal is derived from any one of the "and" gates, this positive signal will be transmitted to the output of the "or" gate. In the assumed case, ground potential is conducted through diode CD1206 and diodes CD1207 and CD1208 are thereby cut off.

Register drive pulses on conductor RDP are introduced to the circuit by means of the connection to the anode of diode CD1209 which comprises one input of an "inhibitor" gate. The "or" gate just described serves the double function of also serving as the other half of this "inhibitor" gate. A positive output obtained from the "or" gate acts to inhibit the register drive pulses and no output is obtained from the "inhibitor" gate. Hence no pulses are transmitted to the ring driver transistor 1220, which will be described in a subsequent paragraph, and the ring remains in a dormant condition. In particular, ground potential conducted through diode CD1206 holds the common cathode connection of the "inhibitor" gate at ground potential and negative pulses on conductor RDP serve merely to cut off diode CD1209.

Assume that a line comes off hook and causes multiplexer pulses to be generated. These pulses enter all of the line finders of the link group but only line finder 17A, which was assumed to be allotted for use, will respond by seizure of the pulse. Coincident with seizure of the line, conductor AS1–A suddenly drops to a negative potential. The "and" gate associated with the first stage of the allotter ring responds by transmitting a negative output signal to the "or" gate. All of the other "and" gates are transmitting negative signals at this instant so that the output of the "or" gate goes negative, unblocking the "inhibitor" gate, and allowing a negative pulse on conductor RDP to pass through diode CD1210 to the base circuit of ring driver transistor 1220. Diode CR1210 comprises one input of an "or" gate which is utilized to conduct pulses to transistor 1220.

Transistor 1220 is connected as a monostable oscillator which is identical to the previously described monostable oscillators. The negative impulse coupled to its base through capacitor C1201 causes a heavy current pulse to be produced. The pulse is terminated when capacitor C1202 becomes charged.

The negative pulse conducted through capacitor C1202 serves to drive the common emitter circuit of the ring circuit sufficiently negative so as to render transistor 1200A non-conducting. The resulting drop to a negative potential of the collector of transistor 1200A is coupled to the base of transistor 1200B through capacitor C1203. When the negative pulse from the output of transistor 1220 terminates, the common emitter circuit rises toward a potential of +24 volts and since the base of transistor 1200B is negative, said transistor conducts. Transistor 1210B then conducts and the potential of conductor AL–B is lowered to +7.5 volts.

The allotter control signal on conductor AL–A is removed when transistors 1200A and 1201A are made nonconductive, and instead, the AL–B lead is energized, thus allotting line finder 17B. At this same instant, the "and" gate associated with ring stage 2 responds by transmitting a ground potential output signal to the "or" gate, since the allotter start lead from finder 17B is at ground potential. The "or" gate responds by sending a ground potential signal to the "inhibitor" gate, which blocks further register drive pulses from being transmitted to the ring pulsing stage. Hence the allotter accepts a single register drive pulse, advances one step, and stops. The line finder 17B, of link B, is now allotted to handle the next call placed in the system.

After the system has been in operation for a time, a number of line finders may be simultaneously handling calls. The case may easily occur wherein a line finder seizes a line coming off hook, the allotter responds by stepping one stage, only to find that the next succeeding finder is already occupied with a call. In this case, the "and" gate associated with this particular link allotter stage responds by sending a negative signal through the "or" gate to the "inhibitor" gate. This allows the continuing transmission of register drive pulses to the ring pulser circuit, and the allotter continues its stepping process until it finds an idle finder.

If desired, a line finder may be taken out of service for repairs by placing a negative potential on its allotter start lead AS. The allotter will then skip over this particular link, thinking it is busy, and will allot a succeeding idle link.

Turning our attention now to the emergency pulse generator circuit of the allotter, it will be remembered that the allotter normally operates to allot a new link in response to the allotter start signal received from the allotted line finder. In the event of failure of the line finder to seize the calling line, no allotter start signal would be received, and the allotter would remain permanently locked to the faulty link. To prevent this, a monitor circuit is incorporated within the allotter which examines the multiplexer pulses on conductor MPX, and compares them with the finder busy pulses on conductor FB. In normal operation of the system, every multiplexer pulse will have a companion busy pulse, originating either in a line finder or a connector. The monitor circuit comprises an "inhibitor" gate which is arranged so that all unguarded multiplexer pulses are transmitted. If more than a reasonable number of unguarded multiplexer pulses are passed, allowing ample finding time for the allotted line finder, then the emergency pulse generator is brought into play to generate a single emergency pulse. This pulse is passed through the second "or" gate described previously and serves to operate the ring driver transistor 1220, which in turn, steps the allotter to the next link.

Diodes CD1212 and CD1213 comprise the "inhibitor" gate. Conductor MPX and conductor FB connect to the anode terminals of CD1212 and CD1213, respectively. It will be remembered that conductor MPX stands at ground potential except when a negative pulse is connected thereto and conductor FB stands at +7.5 volts except when a positive pulse is connected thereto. Thus, in the absence of pulses, diode CD1212 conducts so that the gate output is at ground potential and diode CD1213 is cut off. If an unguarded multiplexer pulse is received, that is, conductor MPX goes negative and conductor FB remains negative, a negative output is realized from the gate. If the multiplexer pulse has a companion pulse, that is, conductor MPX goes negative and conductor FB rises to approximately ground potential, diode CD1213 conducts and diode CD1212 is cut off so that the output of the gate remains at ground potential.

Thus, negative pulses, which correspond to unguarded multiplexer pulses, are coupled through capacitor C1204 to the base circuit of transistor 1230. Transistor 1230 is connected as a monostable oscillator and its operation is similar to previously described monostable oscillators. Briefly, transistor 1230 is biased for non-conduction by virtue of base bias from ground through resistor R1207 and emitter bias from −7.5 volts through resistor R1208. The negative impulse connected to the base circuit serves to trigger the oscillator into the saturation region. The pulse is terminated when capacitor C1205, which is connected between the emitter and base, becomes charged from −16.5 volts through resistor R1209, the collector, base, and emitter of transistor 1230. When transistor 1230 is rendered non-conductive, capacitor C1205 discharges through the back emitter resistance. A positive going output pulse is taken from across collector load resistor R1209 and coupled through capacitor C1206 to the base circuit of transistor 1240. The positive peak of the pulse, which has a swing of approximately 9 volts, is clamped to +7.5 volts by diode CD1214 which, of course, conducts when its anode potential exceeds +7.5 volts. The negative swing which occurs at termination of the pulse serves to cut off diode CD1214 and to render transistor 1240 conductive. The time constant of the RC network, comprising capacitor C1206 and resistor R1210, is sufficiently long so that transistor 1240 conducts for an entire frame of 1000 microseconds. Upon application of succeeding pulses, transistor 1240 is cut off for the duration of each pulse and then conducts for the entire period separating succeeding pulses.

The output voltage of transistor 1240, which appears across collector load resistor R1211, stands at −7.5 volts when no unguarded multiplexer pulses are received. During periods when unguarded multiplexer pulses are being received, the output voltage rises to approximately +4.5 volts except for very short intervals once per frame when the voltage once more drops to −7.5 volts.

The output signal is applied to an integrator circuit comprising resistor R1212 and capacitor C1207. The output of this integrator circuit is connected to the emitter of monostable oscillator transistor 1250. The time constant of the integrator is so chosen that approximately one second is required for the output to build up to a potential high enough to trigger the oscillator. In this way, momentary unguarded multiplexer pulses will not operate the emergency pulse circuit, but the prolonged existence of unguarded multiplexer pulses will result in the operation of the circuit. The resulting negative output pulse from transistor 1250 is coupled through diode CD1211 to the base circuit of ring driver transistor 1220 which functions to step the ring, as previously described.

A manual push button PB is incorporated in the emergency pulse generator circuit to serve as a means for advancing the allotter one step at a time for test purposes. If the button is held down, the allotter will step continuously at a slow rate. Resistor R1213 and capacitor C1207 comprise the integrator circuit in this condition.

The emergency pulse generator circuit will also respond as a result of allotter ring failure. If the ring fails to step, the allotter will not allot a new finder. If a line goes off hook, no finders are capable of seizing that line, and the multiplexer pulses remain unguarded, thus causing the operation of the emergency pulse generator. The emergency pulse generator will also be energized in the event that all finders are busy. The allotter will step continuously, trying to find an idle finder, under control of the "and" gates associated with the ring stages. Since the multiplexer pulses remain unguarded, the emergency service circuit will also be operated.

As used in this circuit, transistors 1200A, 1200B, 1200C, 1230, 1250, and 1220 may be type G11A, transistors 1210A, 1210B, and 1210C may be type TI201, and transistor 1240 may be type CK722.

While the allotter has been disclosed as controlling finders in a bi-path system, its application is not limited thereto. Allotter 19 could be used in an all multiplex system such as that shown in Morris and Trousdale application Ser. No. 134,974, which application is assigned to the same assignee as the present invention.

LINK EQUIPMENT

*Line finder 17A*

Figure 19:
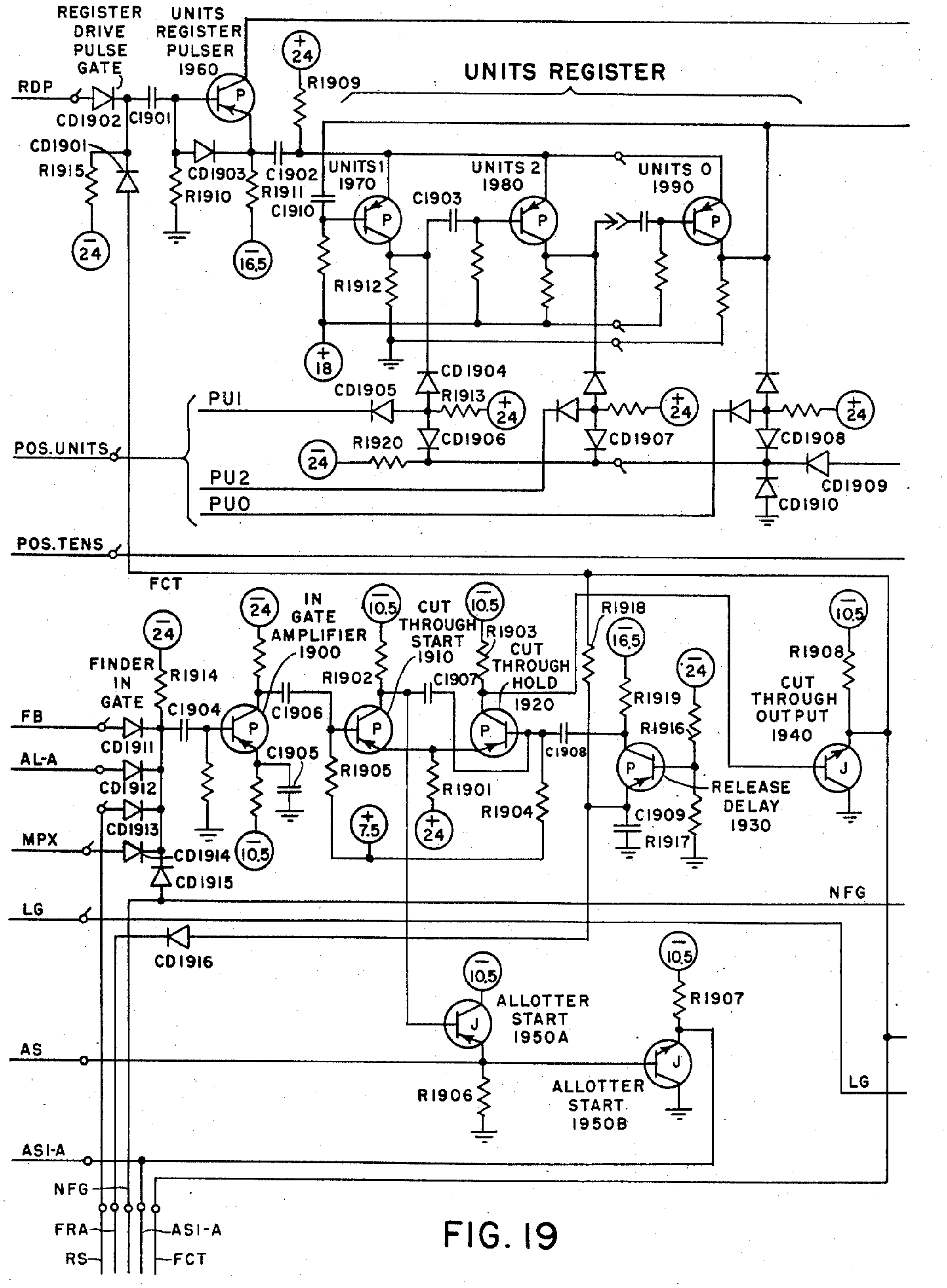
Figure 20:
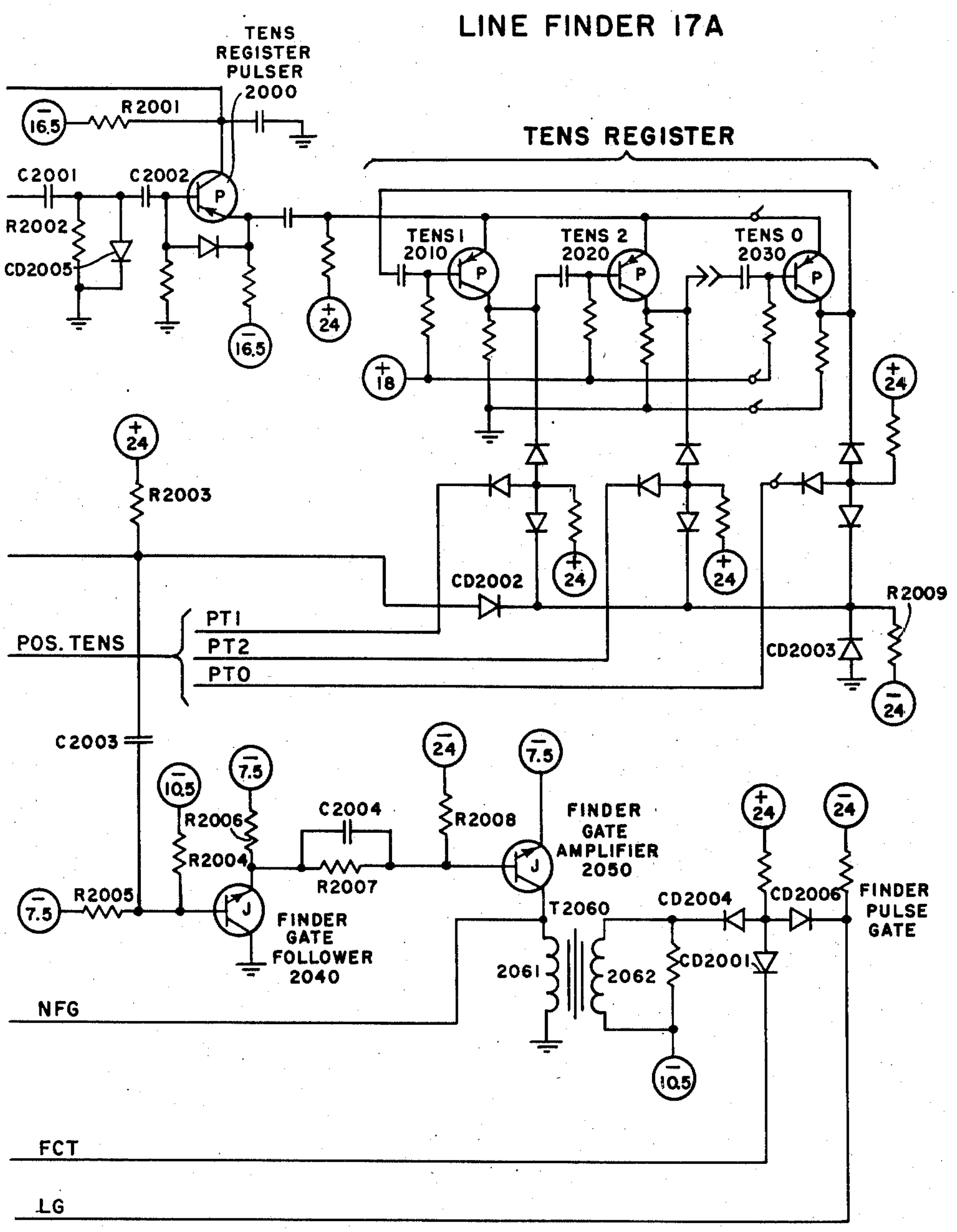

This circuit is shown in Figures 19 and 20 of the drawings. The circuit comprises a control section and a register section. The control section comprises in gate amplifier transistor 1900, cut-through start transistor 1910, cut-through hold transistor 1920, release delay transistor 1930, cut-through output transistor 1940, allotter start transistor 1950A and allotter start 1 transistor 1950B. The pulse generating or register section, which functions to generate a pulse in the time position of the calling line, comprises the units register pulser transistor 1960, the units register circuit, tens register pulser transistor 2000, the tens register circuit, and a two stage amplifier comprising transistors 2040 and 2050. As will be explained more fully hereinafter, the register circuits of the finder are continuously operated while the finder is idle and are stopped under control of the control section when the pulse generated by the register section corresponds in time position with the time position of the calling line. The control section is effective to terminate the operation of the register ring circuits only when line finder 17A is the enabled line finder as controlled by the previously described link allotter 19.

When the finder is idle, cut-through start transistor 1910 is conductive. Through the common emitter connection the cut-through hold transistor 1920 is held off. Transistors 1910 and 1920 are connected as a bistable Eccles-Jordan type circuit. The two transistors are supplied base bias from +7.5 volts through resistors R1905 and 1904, respectively. With transistor 1910 conducting, 1920 is held cut off since its emitter terminal is held at a negative potential with respect to its base potential by virtue of conduction through transistor 1910 and the resulting voltage drop in common emitter resistor R1901. The positive potential output signal taken from across the collector load resistor R1902 of transistor 1910 holds the allotter start transistor 1950A below cutoff. With transistor 1950A cut off, the output signal taken from across emitter load resistor R1906 stands at ground potential and allotter start 1 transistor 1950B is driven to saturation.

With transistor 1950A cut off and transistor 1950B conducting at saturation, the output signals which are taken from across load resistor R1906 and load resistor R1907 and connected to conductors AS and AS1–A, respectively, stand at ground potential. Conductor AS connects to the release pulse generator circuit 15A while conductor AS1–A is connected to the connector circuit 18A and to the link allotter circuit 19. Ground potential on conductors AS and AS1–A serves to mark the finder as idle so that the release pulse generator is enabled to generate release pulses and so that the allotter may assign finder 17A to find a calling line.

Returning to the consideration of transistor 1920, which is cut off, −10.5 volts potential reflected through collector load resistor R1903 to the collector of transistor 1920 serves to prevent conduction of cut-through output transistor 1940. Since transistor 1940 is below cut off, the finder cut-through conductor FCT, which is connected to the emitter of transistor 1940, is at a potential of −10.5 volts as reflected through load resistor R1908. This potential is also applied to the finder pulse gate diode CD2001 so that pulses, generated by the register circuits, are not released to the link gate conductor LG at this time.

The normally negative cut-through potential from cut-through output transistor 1940 is also applied to the anode terminal of diode CD1901, which serves as one input of an "and" gate, in such a way that register drive pulses on conductor RDP are allowed to pass through diode CD1902 to the input of the units register pulser transistor 1960. The register drive pulses are of negative polarity and occur at a rate equal to one-third of the frame rate of the multiplex system. Transistor 1960 is connected as a monostable oscillator which responds to each negative drive pulse by generating a single negative output pulse across resistor R1909. The operation of transistor 1960 is identical to the operation of previously described transistor 2140 in the units ring drive circuit 43. Briefly, the emitter of transistor 1960 is biased at approximately −3 volts by conduction from ground through resistor R1910, diode CD1903 and through resistor R1911 to −16.5 volts. When a negative pulse is coupled through capacitor C1901 to the base circuit of transistor 1960, the transistor circuit is triggered to the saturation region where it remains for the charge time of capacitor C1902. The charge circuit for capacitor C1902 is from −16.5 volts through resistor R2001, the collector, base, and emitter of transistor 1960. When capacitor C1902 becomes charged, the transistor triggers back to the non-conducting region and diode CD1903 shortcircuits the high back resistance of the emitter so that capacitor C1902 is quickly discharged.

Resistor R1909 is the common emitter resistor for the units register chain, which comprises ten point contact transistor stages units 1-units 0, inclusive, of which three stages have been shown. The units register chain is connected as an endless ring and responds to the register drive pulses by advancing one step for each pulse input. The operation of the units register ring is identical to the operation of previously described ring circuits. One transistor is normally conducting so that the potential of the common emitter circuit is held well below the peak point of the other transistors. Negative impulses coupled to the common emitter circuit through capacitor C1902 drive the common emitter sufficiently negative to render the conducting transistor non-conducting. The potential of the collector terminal of this transistor is immediately lowered to a negative potential. If it be assumed that units 1 transistor 1970 was conducting, the sudden negative potential of its collector is coupled through capacitor C1903 to the base of units 2 transistor 1980. When the negative pulse disappears from the common emitter circuit, the emitter voltage rises toward +24 volts. Since transistor 1980 is the only stage with negative base potential, it conducts. Thus it can be seen that each impulse from units register pulser 1960 serves to cut off the conducting transistor and trigger the next transistor in the units register circuit. The ring steps from units 1 to units 0 and then recycles since the collector of units 0 transistor 1990 is coupled to the base of units 1 transistor 1970 by capacitor C1910. The conducting transistor is identified by the positive potential appearing on its collector.

A connection from the collector of the tenth units register stage units 0 transistor 1990 is made to the input of the tens register pulser transistor 2000. The positive impulse appearing on the collector of transistor 1990 is coupled through a peaker circuit comprising capacitor C2001 and resistor R2002, where it is differentiated into a positive pulse and a negative pulse corresponding to the turning on and the turning off, respectively, of transistor 1990. The produced postive pulse is conducted to ground by diode CD2005 while the produced negative pulse is coupled through capacitor C2002 to the base circuit of transistor 2000. The operation of the tens register pulser 2000 and the tens register is identical to the just described operation of units ring pulser transistor 1960 and the units register, respectively. The output of transistor 2000 is used to advance the tens register chain, comprising stages tens 1-tens 0, one step at a time in response to pulses from transistor 2000. It is evident that the tens register chain is stepped at a rate one-tenth that of the units register, which in turn, is stepped at a rate of one-third of the system multiplexing frame repetition frequency. If the frame rate of the system is 1000 C. P. S, then it follows that the register chains in the line finder make one complete cycle in a third of a second. Therefore, the line finding time of the line finder will be a maximum of one-third of a second and, due to the probability factors involved, may be considerably less than this.

Diode gating circuits are provided for each units and tens register stage of the line finder. Each stage is coupled to one input of a two diode "and" gate. For example, the collector of units 1 transistor 1970 is shown connected to the cathode terminal of diode CD1904. The corresponding tens or units pulse is coupled to the other input of this "and" gate. It can be seen that for the units 1 register stage, conductor PU1 is connected to the cathode terminal of diode CD1905. The outputs of all of the "and" gates of each register are coupled through a ten input "or" gate to a common output pulse bus. Three inputs comprising diodes CD1906, CD1907, and CD1908, which correspond to stages units 1, units 2, and units 0, respectively, are shown. The "and" gates are so arranged that when the register stage is off, ground potential from the collector blocks the gate so as to prevent the transmission of the positive tens or units pulse to the common output conductor. When a register stage is on, the positive collector potential unblocks the gate and thus permits passage of the tens or units pulse. Examining the case of the gate associated with the units 1 stage it can be seen that when transistor 1970 is nonconductive, diode CD1904 conducts from +24 volts through resistor R1913 connected to its anode terminal and ground through resistor R1912 connected to its cathode terminal. Diode CD1905 conducts since it also has ground connected to its cathode terminal. Positive impulses appearing on conductor PU1 serve merely to cut off diode CD1905 and the output of the "and" gate remains at ground potential because of the conduction through diode CD1904. When transistor 1970 is conducting, its collector potential rises to a positive value. Positive pulses appearing on conductor PU1 thus appear in the output of the "and" gate and are conducted through diode CD1906 to the common output conductor for the units register. As the stages are stepped along under control of the register drive pulses, it is seen that the common output conductors will carry one of the ten units or ten tens pulses at a time; the particular pulse depending upon the setting of the register chain at that instant. The common output conductors are clamped at ground potential through action of diodes CD1910 and CD2003 which connect to the units register and tens register output conductors, respectively. Positive pulses conducted through the "or" gate serve to cut off CD1910 or CD2003 as the case may be. Since the chains are stepped at one-third of the frame rate, each units pulse will appear thirty consecutive times and each tens pulse will appear three consecutive times on its respective common output conductor.

The selected units pulse and the selected tens pulse, appearing on the two "or" gate output pulse conductors, are applied to an "and" gate which comprises diodes CD1909 and CD2002. The common output conductor for the tens register connects to the cathode terminal of diode CD2002 and the common output conductor for the units register connects to the cathode terminal of diode CD1909. In the absence of pulses, the output of this gate stands at ground potential because of the conducton from +24 volts through resistor R2003, through diode CD2002 to ground on the output conductor of the tens ring, as determined by the voltage division across diode CD2003 and resistor R2009, and from +24 volts through resistor R2003, diode CD1909 to ground on the output conductors of the units ring, as determined by the voltage division across diode CD1910 and resistor R1920. A positive pulse appearing on either conductor while the other output conductor remains at ground potential, serves merely to cut off its associated diode and the output of the "and" gate remains at ground potential. When a coincidence of tens and units pulses does exist, the output of this gate is a single positive pulse having a duration of one time channel and having a repetition rate of one pulse frame. Due to the method of connecting the register chain, this selected finder gate pulse will step through the frame one time channel at a time in a continuous fashion so long as the finder is idle.

If it be assumed that units 1 transistor 1970 and tens 1 transistor 2010 are conducting, it can be seen that a pulse appearing in time position 11 will appear in the output of the "and" gate three times in succession since the units register is driven at one-third of the frame rate. The units 2 transistor 1980 will then be rendered conductive responsive to a register drive pulse and a pulse in time position 12 will then appear three times in succession, etc.

The positive pulses appearing in the output of the last-mentioned "and" gate are coupled through capacitor C2003 to the base circuit of the finder gate follower transistor 2040. The purpose of transistors 2040 and 2050 in the circuit is to provide an amplifier having a high input impedance, and at the same time to provide means for carrying out wave shaping operations on the finder gate pulse to clip the base line and to standardize the pulse amplitude. Transistor 2040 is normally nonconductive since the potential of its base is negative relative to the potential of its emitter. Its base is held at approximately −9 volts as determined by the voltage division of −10.5 volts through resistor R2004 and −7.5 volts through resistor R2005. The positive pulses coupled through capacitor C2003 serve to drive transistor 2040 to saturation. The output signal, which is taken from across emitter load resistor R2006, thus swings from −7.5 volts to ground potential. The output signal is coupled through the peaking circuit comprising capacitor C2004 and resistor R2007, to the base of finder gate amplifier 2050. Transistor 2050 is normally cut off by virtue of base bias from −24 volts through resistor R2008 and −7.5 volts through resistors R2006 and R2007. Positive pulses coupled through capacitor C2004 drive transistor 2050 to saturation and appear as negative pulses in the collector winding 2061 of transformer T2060.

Negative finder gate conductor NFG, which connects to the finder in gate and to connector circuit 18A, is connected to the collector of transistor 2050 and thus carries negative pulses in the time position of the line selected by the units and tens register circuits. The secondary winding 2062 of transformer T2060 is poled so as to produce positive impulses which are connected to the cathode terminal of diode CD2004 of the finder pulse gate. It will be remembered that in the finder idle condition, cut-through output transistor 1940 is non-conductive so that its output, which is connected to the cathode of diode CD2001, is negative. Thus, the positive pulses produced in winding 2062 serve merely to cut off diode CD2004 and the output of the finder pulse gate remains at a negative potential because of the conduction through diode CD2001.

The purpose of the cut-through and release delay circuits is to provide a means for stopping the advance of the register chains when they have reached a setting corresponding with the time position identity of a calling line. This stopping action must persist even though the calling line may transmit dial impulses, which momentarily interrupt the continuous flow of the multiplexer pulses in the time position of the calling line. After the line has hung up, the release delay circuit functions to return the line finder to its idle condition and thus allow the register chains to resume their searching operations.

An "and" gate is provided in the finder which has five inputs. This gate is called the finder in gate and the inputs comprise the finder busy pulse on conductor FB which connects to the anode of diode CD1911, the allotter control on conductor AL–A which connects to the anode of diode CD1912, the multiplexer conductor MPX which connects to the anode of diode CD1914, the negative finder gate conductor NFG which connects to the anode of diode CD1915, and the reset conductor RS which originates in the connector circuit and connects to the anode terminal of diode CD1913. The RS conductor, which has not been previously discussed, carries information back to the finder that the connector is in the normal reset condition and is ready to handle a new incoming call. If, for any reason, the connector does not reset, the line finder will not be able to find the calling line and the emergency pulse generating section of allotter 19 is effective to advance the allotter to the next idle finder, as previously described. An output is obtained from the finder in gate when all of the input signals are negative. The FB input is negative except during pulses in the time position of lines which have been made busy by one of the finders or connectors of the system. The AL–A input is negative when the allotter allots the subject line finder to handle the next incoming call. The RS input is negative when the associated connector circuit is in its reset condition. The MPX input contains negative going multiplexer pulses in the time position of all lines of the 100 line group which are off hook. The NFG input, which originates at the collector terminal of finder gate amplifier 2050, carries a negative finder gate pulse which steps through the frame under control of the units and tens registers, as previously described. It is evident, therefore, that an output will be obtained from the "and" gate when the finder is allotted by the allotter, when the connector is reset, when a multiplexer pulse exists in a time position not covered by a busy pulse, and when the register chains of the finder are driven to a setting agreeing in time position with this unguarded multiplexer pulse. When these five conditions do not occur simultaneously, ground potential on any one of the input conductors causes its associated diode to conduct through gate loader resistor R1914 to −24 volts and thus cut off the other diodes of the gate and hold the output of the gate at ground potential.

The output of the finder in gate, carrying unseized multiplexer pulses, is coupled through capacitor C1904 to the base circuit of in gate amplifier transistor 1900. This stage is a monostable point contact oscillator which generates one positive output pulse in its collector circuit for each negtive impulse connected to its base circuit. The operation of transistor 1900 is identical to the operation of previously described monostable oscillators. A negative impulse coupled to its base circuit through capacitor C1904 serves to trigger the transistor into the saturation region. The pulse persists until capacitor C1905 becomes charged. The resulting positive going signal on the collector of transistor 1900 is coupled through capacitor C1906 to the base circuit of cut-through start transistor 1910. It will be remembered that transistors 1910 and 1920 comprise a bistable Eccles-Jordan type circuit with transistor 1910 normally conducting. The positive input to transistor 1910 serves to turn off transistor 1910 and to turn on the cut-through hold transistor 1920. The negative swing of the collector of transistor 1910, which occurs in response to the turning off of this transistor, is coupled through capacitor C1907 to the base of transistor 1920. Also in response to the cessation of current flow in transistor 1910, the emitter potential rises toward +24 volts. With a negative potential on its base and +24 volts connected to its emitter circuit, transistor 1920 is rendered conductive. When the collector of transistor 1910 goes negative, in response to the cessation of conduction by transistor 1910, the allotter start transistors 1950A and 1950B are driven to conduction and cutoff, respectively, conductor AS, which connects to the release pulse generator, and conductor AS1–A, which connects to the connector and the allotter, go negative. The negative potential on conductor AS1–A serves to advise the allotter that the subject line finder has found a line and is now busy. When the collector of cut-through hold transistor 1920 goes positive, the cut-through output transistor 1940 is driven to saturation.

When transistor 1940 is rendered conductive, its emitter rises to ground potential, thus causing the finder cut-through lead FCT to rise from −10.5 volts to ground potential. The immediate result of this action is to block the register drive pulse "and" gate so that the register chains are prevented from stepping beyond the setting they had reached at the moment. This action stops the searching of the finder gate pulse which remains in the time position of the calling line throughout the remainder of the call. Ground potential on conductor FCT causes diode CD1901 to conduct through resistor R1915 to −24 volts. Thus, negative pulses on conductor RDP serve merely to cut off diode CD1902 and the output of the "and" gate remains at ground potential.

The ground potential on conductor FCT is additionally applied to the cathode of diode CD2001 in the finder pulse gate. As previously described, this operation acts to release the selected finder pulses appearing on the secondary 2062 of transformer T2060 to the link gate conductor LG through diode CD2006. Diode CD2006 serves as one input of a two input "or" gate, the other input being located in the associated connector 18A. Conductor LG carries the selected finder pulse to the circuits which distribute it to the busy leads of the system and to the diode switches associated with link A.

Once the finder has seized the calling line in the manner described above, the allotter will step to the next idle finder, simultaneously increasing the potential of the ALA conductor of finder 17A to ground. In addition, the busy lead converter circuit responds to the transmission of finder gate pulses transmitted thereto over conductor LG by sending positive finder busy pulses back to the finder over conductor FB. Thus, even though the multiplexer pulses and finder gate pulses persist, no further output is obtained from the finder in gate.

Since transistors 1910 and 1920 comprise a bistable circuit, no further pulses are required to maintain cut-through hold transistor 1920 operated. However, a pulse must be provided to return the circuit back to the idle condition in response to call abandonment by the calling line. The release delay circuit comprising transistor 1930 is provided for this purpose.

To understand the operation of release delay transistor 1930, it is necessary to discuss the condition of the forward reconstructor amplifier conductor FRA which originates in the connector circuit. When the link is idle, conductor FRA stands at ground potential. When the calling line is found and the connector associated with the seizing line finder is seized, conductor FRA drops to a potential of −10.5 volts where it remains except during the break periods of the dial interruptions when it once again returns to ground potential. It can be seen that conductor FRA is coupled to the emitter of transistor 1930 through diode CD1916 and that resistor R1918 couples the emitter of transistor 1930 to the emitter of transistor 1940.

Release delay transistor 1930 is normally non-conductive since, during idle periods, the emitter of transistor 1940 and thus conductor FCT and the emitter of transistor 1930 are held at a potential of −10.5 volts, and the base of transistor 1930 is held at approximately −7.5 volts by virtue of its connection to a voltage divider which comprises resistors R1916 and R1917. The ground potential existing on conductor FRA is not coupled to transistor 1930 since diode CD1916 is poled to block at this time. The large timing capacitor C1909, which is also connected to the emitter of transistor 1930, is normally discharged to −10.5 volts. When the line finder seizes the calling line, the finder cut-through potential suddenly rises to ground and the potential on conductor FRA drops to −10.5 volts. Diode CD1916 is now poled in its forward direction and since its forward impedance is low compared to the resistance of R1918, the emitter of transistor 1930 remains at approximately −10.5 volts. The timing capacitor C1909 is of sufficient capacity to cover the short time interval, existing between the leading edge of the cut-through potential change and the leading edge of the FRA potential change, which is caused by seizure delay in the connector circuit.

During the break period of dial impulses, conductor FRA returns momentarily to ground potential. This causes diode CD1916 to block and timing capacitor C1909 starts to charge toward ground potential. The time constant is so chosen that a period of approximately 250 milliseconds is required for the emitter of transistor 1930 to rise to a potential where conduction will begin. So long as dial interruptions are shorter than this critical value, transistor 1930 will not fire and no pulse will be generated to trigger the cut-through hold transistor 1920. When the calling line hangs up for periods greater than 250 milliseconds, transistor 1930 will fire and generate a single positive output pulse. The operation of transistor 1930 is identical to the operation of the previously described monostable point contact oscillators. When the emitter becomes positive relative to the base, transistor 1930 is triggered into the saturation region where it remains for the discharge time of capacitor C1909. The resulting positive going signal on the collector of transistor 1930 is coupled through capacitor C1908 to the base of cut-through hold transistor 1920. This positive pulse serves to cut off transistor 1920 and due to the cross coupling with the cut-through start transistor 1910, the latter stage becomes conductive and remains so until a new call is initiated. In this manner, the finder is made to lock to a calling line even during dial interruptions and releases only after a suitable release delay timing interval. When the finder releases, conductor FCT returns to −10.5 volts since cut-through output transistor 1940 is rendered non-conductive when the cut-through hold stage 1920 is extinguished. The negative potential on conductor FCT prevents release delay transistor 1930 from firing again and the AS and AS1–A conductors return to ground potential indicating the idle condition of the link. Also, the negative potential on conductor FCT unblocks the register drive pulse gate so that the units and tens register circuits resume their seaching operation, and the finder pulse gate is blocked since diode CD2001 is rendered conducting.

As used in this circuit, transistors 1900, 1910, 1920, 1930, 1960, 1970, 1980, 1990, 2000, 2010, 2020, and 2030 may be type G11A, transistors 1940, 1950B, 2050 may be type TI201, transistor 1950A may be type CK722, and transistor 2040 may be type TI202.

While this line finder has been disclosed with a bi-path system, its application is not limited thereto. Line finder 17A could be used in an all multiplex system such as that shown in Morris and Trousdale application Ser. No. 134,974, which is assigned to the same assignee as the present invention.

*Release pulse generator circuit 15A*

Figure 17 shows the circuit details of the release pulse generator circuit, which is operated in response to signals appearing on the allotter start conductor AS, which originates in line finder 17A. The purpose of this circuit is to generate a series of short release pulses used for resetting the diode switches associated with link A and for resetting certain circuits within connector 18A at the end of a call so that the link is made ready to handle a new incoming call. One release pulse generator circuit is required for each link of the system.

The circuit comprises a single point contact astable oscillator circuit designed to free-run at roughly four times the frame rate of the system, or 4000 C. P. S. The exact frequency is not critical so long as it is several times higher than the frame rate. The oscillator will free-run continuously so long as ground potential appears on conductor AS. It will be recalled that this potential is derived from the emitter of the allotter start transistor 1950A in the line finder 17A and is at ground potential during periods when the line finder is idle.

As mentioned above, the circuit comprises an astable oscillator transistor 1720 which may be type G11A. The value of the emitter load resistor R1701 is so chosen that the load line intersects the negative resistance region II of the emitter characteristic when the emitter is biased at ground potential. An emitter characteristic curve may be seen in Fig. 46B of the drawings. After each operation, capacitor C1701 discharges through the parallel combination of resistor R1701 and the back emitter resistance to ground until the emitter voltage rises to the peak point of the emitter characteristic whereupon the emitter current quickly shifts to the saturation region III of the emitter characteristic curve. Capacitor C1701 then charges from −16.5 volts through resistor R1703, winding 1731 of transformer T1730, the collector, base, and emitter of conducting transistor 1720. The charging current of capacitor C1701 gradually diminishes until the valley point of the emitted characteristic curve is reached whereupon the operating point quickly shifts to the high resistance non-conducting region I. Capacitor C1701 then discharges through the parallel combination of resistor R1701 and the back emitter resistance to ground until the emitter voltage rises to the peak point of the emitter characteristic and the operation is repeated. Resistor R1703 and capacitor C1702 comprise a current limiting and decoupling network.

The output of transistor 1720 is coupled through pulse transformer T1730, which serves to step up the positive output voltage pulse to an amplitude suitable to drive the release pulse amplifier circuit 14A. Diode CD1702, which is connected across secondary winding 1732, serves to clip negative tails from the produced positive pulses.

When the line finder is made busy, incident to seizure of a calling line, conductor AS drops to a potential of −10.5 volts as previously described. Application of this negative signal to the emitter of transistor 1720 terminates further oscillations and no further output pulses are derived from the generator since the load line no longer intersects the emitter characteristic curve in the negative resistance region but rather intersects same in the non-conducting region I. When the finder is released at the end of the call, conductor AS is returned to ground potential, oscillations are resumed, release pulses are generated, and the diode switches and the connector are reset to their normal condition.

*Release pulse amplifier 14A*

This circuit which is shown in Figure 18, serves to amplify the output of the release pulse generator circuit 15A and to deliver the release pulses at low impedance to the connector circuit and to the diode switch circuits associated with link A.

Operation of the release pulse amplifier circuit is similar to that of the output amplifiers previously described. Pentode tube 1820 which may be type 6AG7, is normally biased for non-conduction by −7.5 volts connected through resistor R1801 to its grid. Positive impulses coupled through capacitor C1801 from release pulse generator 15A serve to render the tube conductive and thus produce negative impulses in plate winding 1831 of output transformer T1830. The negatively poled secondary winding 1832 of output transformer T1830 is employed to apply the output pulses to the release pulse conductor RP which is multipled to the diode switch circuits associated with link A and to the connector circuit 18A. Resistors R1802 and R1803 serve to load the transformer T1830 and diode CD1801 serves to clip any positive tails from the negative output pulses.

*Connector circuit 18A*

The connector circuit, which is shown in Figs. 33–41 inclusive, comprises two sections. The first section of the drawings shows the circuit details of the register section of the connector, which is primarily concerned with the counting and storage of dialed digits trasmitted thereto from the calling line. The second section of the drawings shows the circuit details of the control section of the connector, which is concerned principally with the handling of the many pieces of information involved with the setting up of a call, and determines how the connector will respond during the call.

The lower half of Figs. 36–38 and Figs. 39–41 show the circuit arrangement of the register section of the connector. The purpose of this section is to count and store the digits dialed into the link by the calling line, to generate a connector gate pulse in the time position of the called line, to control the transmission of dial tone, to generate a signal indicative of the desired party to be rung, to generate a ringing control pulse in the time position of the called line, released under the joint control of the register section and control section of the connector, to generate a start signal which initiates operation of the control section of the connector, and to generate a finder start signal which advises the line finder when the connector is reset and in a condition suitable for the receipt of signals from a calling line.

Figure 41:
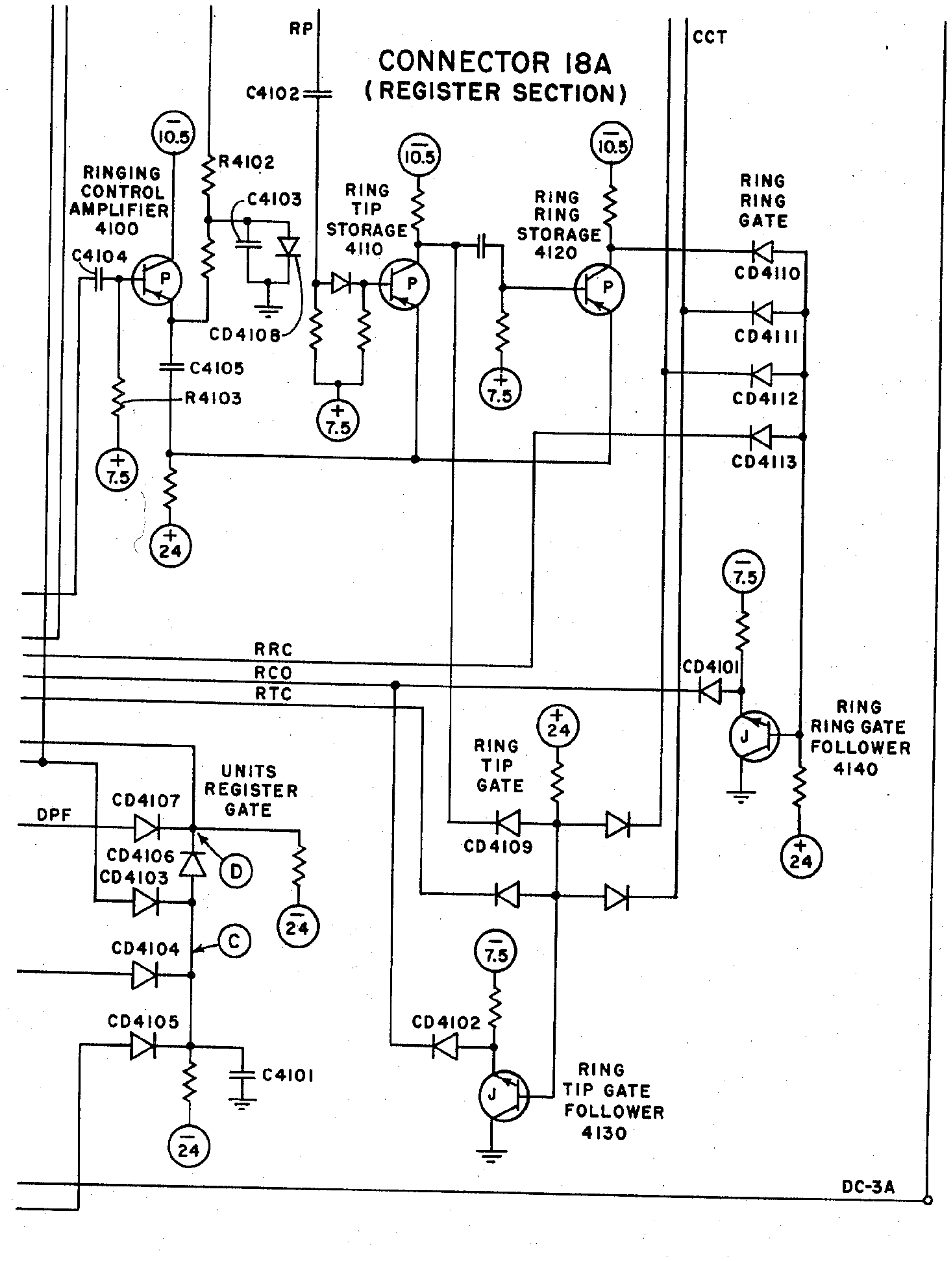

The register section comprises in part, two ten-stage register chains, a connector gate circuit, a connector busy pulse gating circuit, a dial tone gate, a ringing control storage circuit, a ringing control gating circuit, a sequence timing circuit, and a digit counter. In operation, the first dialed digit acts to drive the tens register chain, which is shown in lower half of Fig. 37, to a setting corresponding to the magnitude of the digit. The first digit is the party selection digit which, in the disclosed embodiment, will select the tip party if the digit was 1, 2, 3, 4, 5, 6, 7, 8 or 0, and will select the ring party if the digit was 9. This assignment of digits is purely arbitrary and it should be obvious that any desired group of digits could be used for tip or ring selection. As disclosed, the register section of the connector is so arranged that if a "9" is dialed as a first digit, the ringing control storage circuit, which is shown in Fig. 41, is operated, thus sending a signal to the ringing control gating circuit which will cause it to initiate ringing on the ring side of the line incident to switch-through. If a digit other than 9 is dialed, the ringing control storage circuit is not operated, and the ringing control gating circuit will ring the tip side of the line incident to switch-through.

Figure 40:
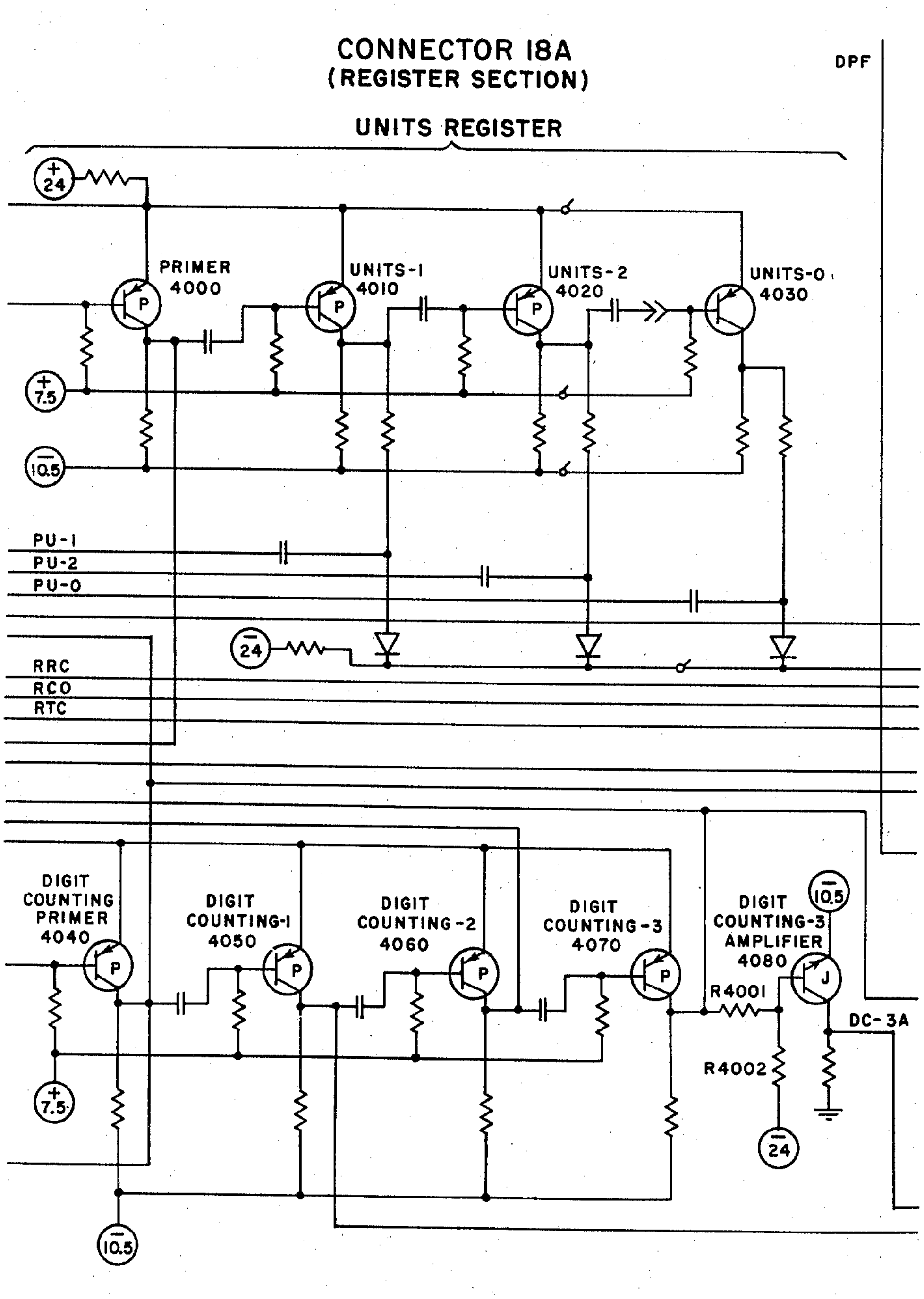

At the end of the first digit, the tens register chain is reset, leaving the party selection information in the storage circuit, and the chain is re-used to register the second, or tens, digit. At the end of the second digit, the tens register chain is not reset, but remains at the driven setting. The third dialed digit drives the units register chain, which is shown in Fig. 40, to a setting corresponding to the units digit, and at the end of the digit, the units register remains at the driven setting.

Figure 38:
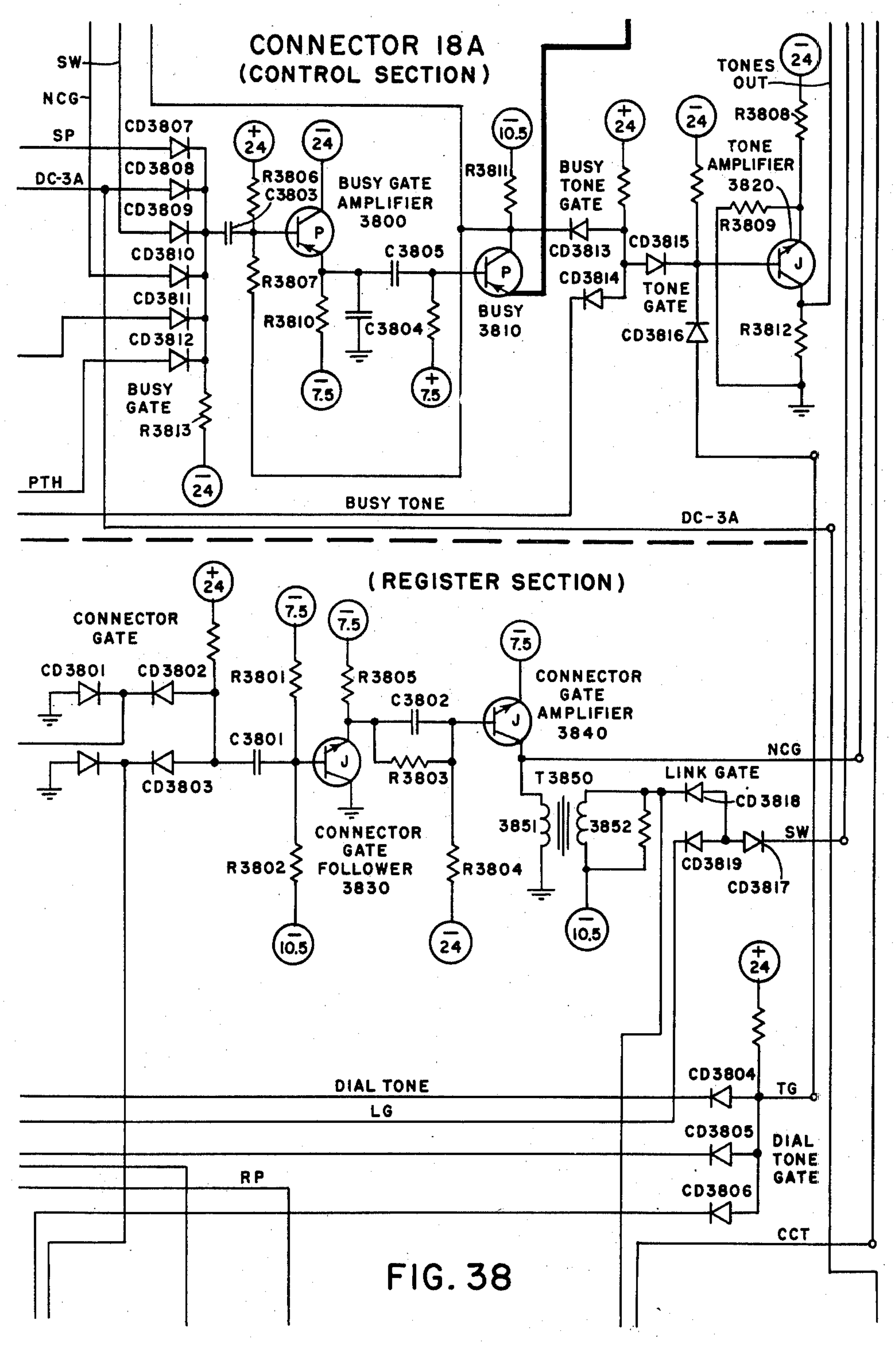

Gating circuits associated with the two register chains, together with the connector gate circuit, which is shown in Fig. 38, serve to generate a pulse in the time position of the called line, termed a connector gate pulse. This pulse is routed to the control section, and after switch-through, is released to the switch control pulse amplifier associated with the link.

A dial tone circuit, which is shown in Fig. 38, is utilized to gate dial tone when the link is seized, and to terminate the tone at the start of the first dialed digit. This tone is routed through the control section to the link multiple point, where it is transmitted to the calling line.

Figure 39:
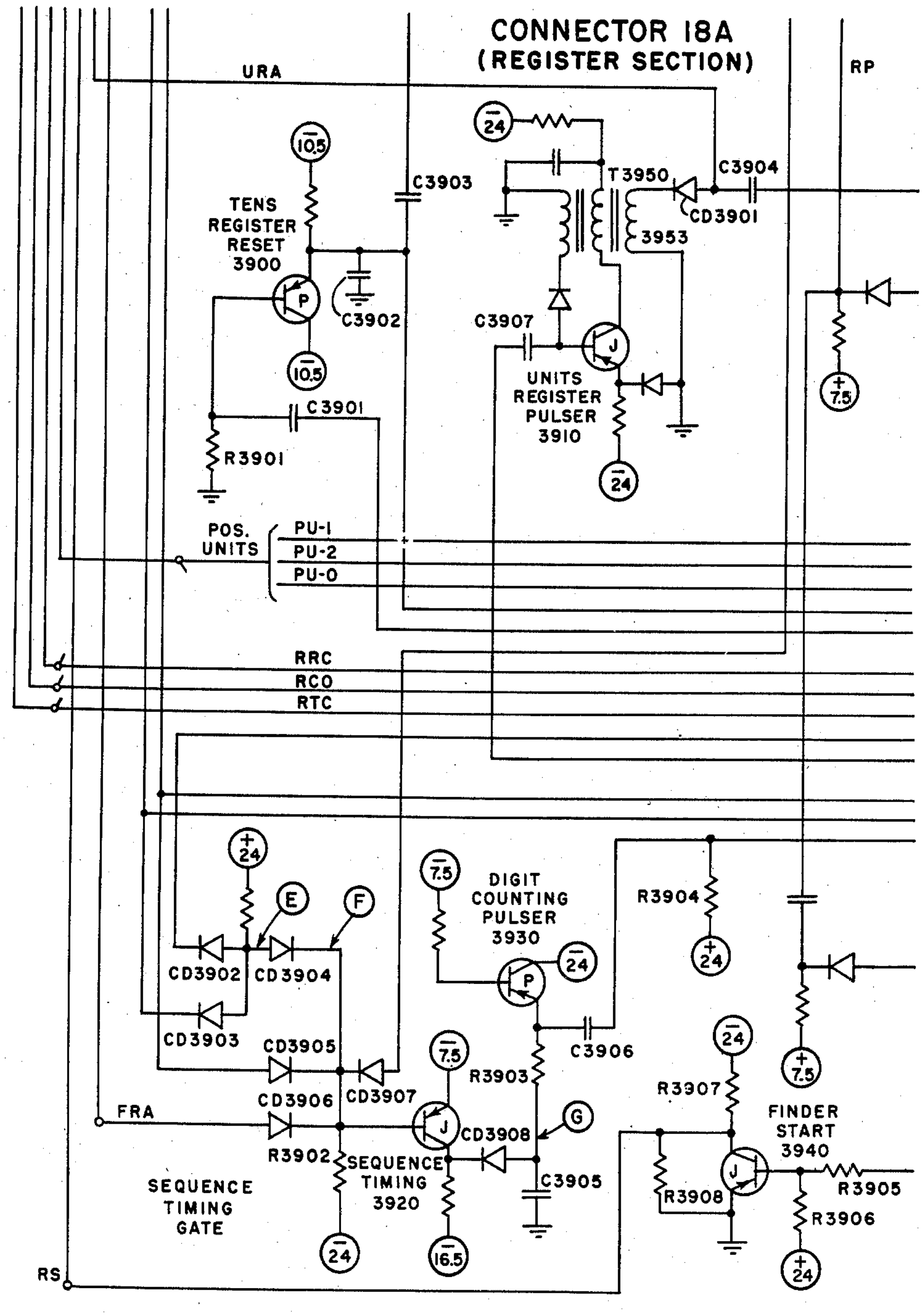

A sequence timing circuit, shown in Fig. 39, is incorporated in the register section of the connector and serves to determine the end of each successive dialed digit, and to advance the digit counter at each such time until three digits have been counted. After the third digit, the circuit will not respond to further digits.

A digit counting chain, which is shown in Fig. 40, is utilized to set up certain gate circuits in the register section in order that the register chains are properly controlled according to the sequence of the incoming digits. When the last stage of the counter is operated, a start signal is sent to the control section which causes it to initiate a trunk hunting, busy testing, switch-through and the like.

Figure 33:
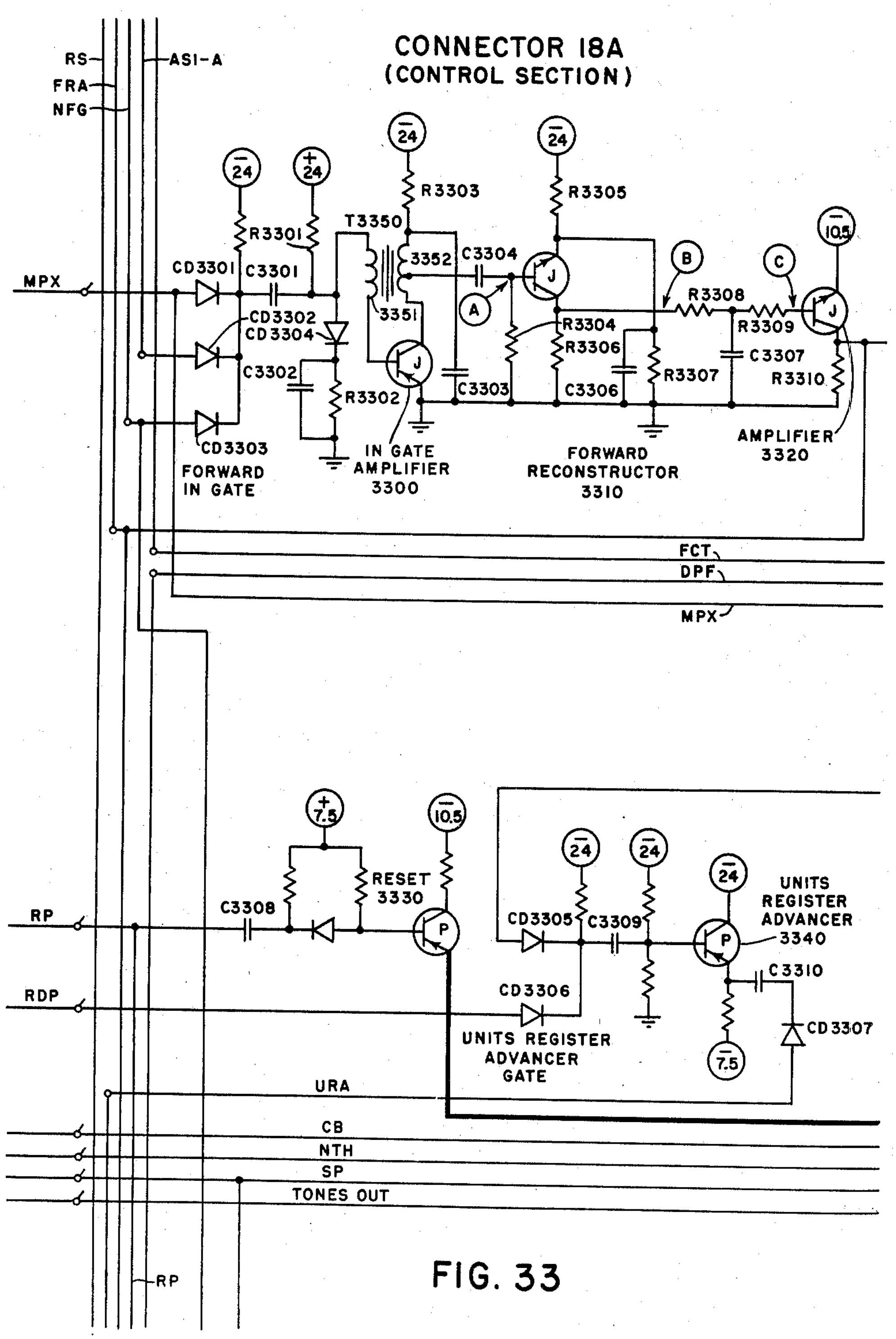
Figure 34:
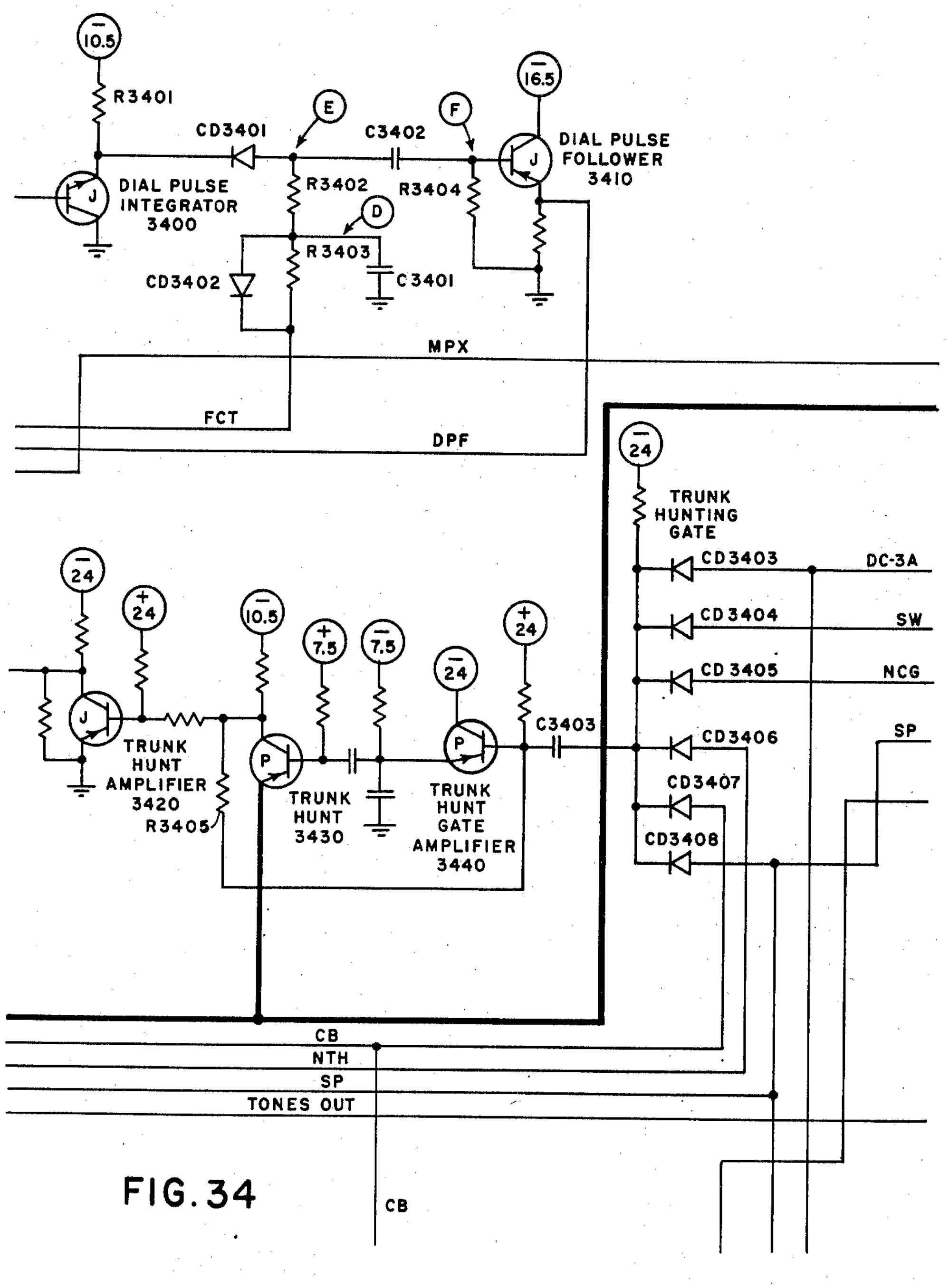
Figure 35:
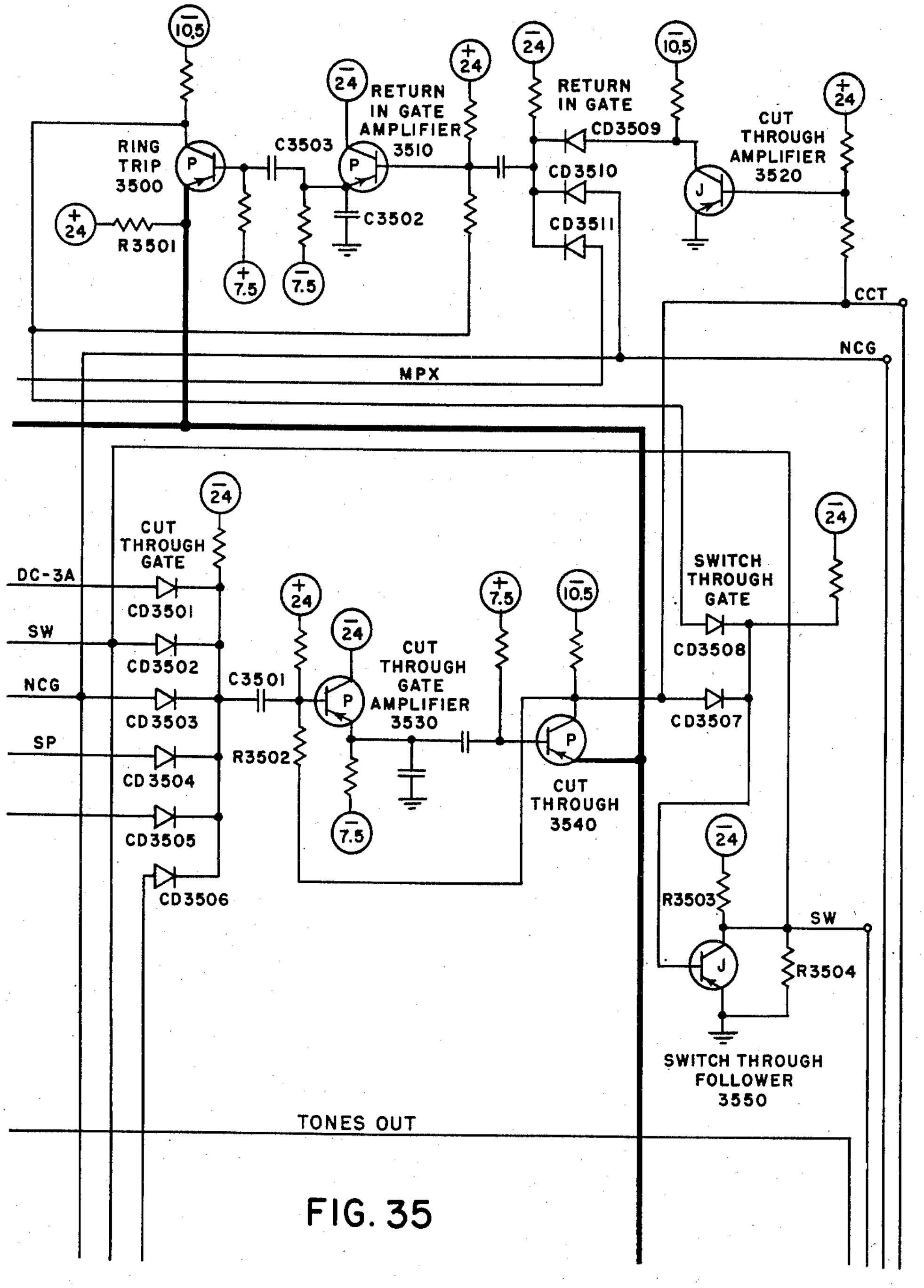
Figure 36:
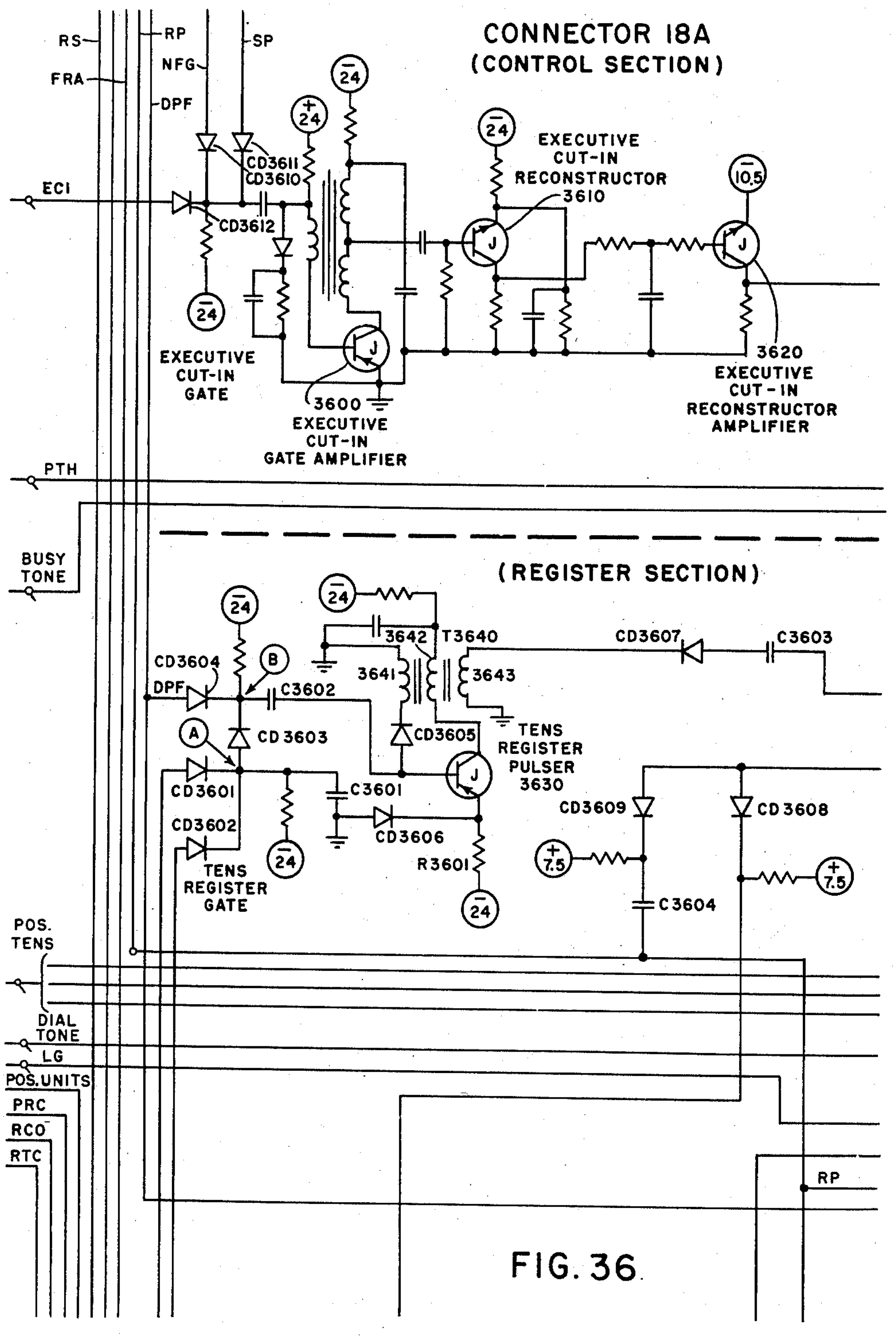
Figure 37:
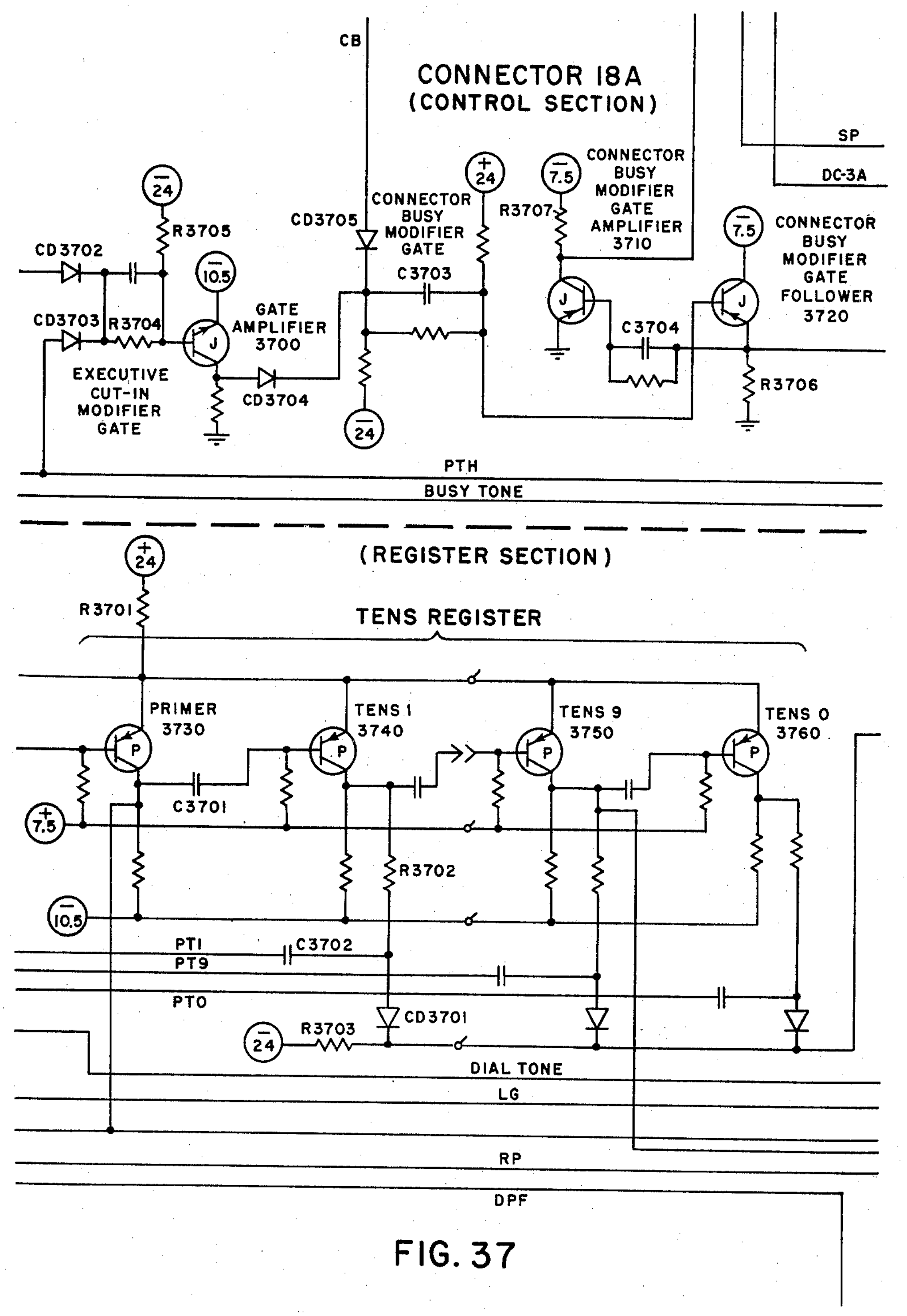

Figs. 33–35 and the upper half of Figs. 36–38 show the circuit arrangement of the control section of the connector. The purpose of the control section is to extract calling multiplexer pulses from the multiplexer lead which agree with those of the calling line which has been seized by the associated line finder, to detect, reconstruct, integrate, and clip these pulses to form suitable dial impulses for operation of the register section, and to respond to the initiating signal and connector pulse received from the register section and the various control pulses received from the common equipment in the following manner:

If the connector pulse does not coincide with a busy pulse on the connector busy conductor CB, switch-through occurs, which in turn, releases the connector pulse to the switch control circuit, where it is transmitted to the diode switches and to the busy lead converter circuit. At the same time, ringing control signals are released from the register section of the connector which are routed to the called line circuit to initiate ringing of either the tip party or the ring party, depending upon information received from the ringing storage circuit. At the same time, a ringing trip circuit, which is shown in Fig. 35, is enabled so that the connector will respond to answering supervision originating on the called line.

After switch-through, if the called line answers, a multiplexer pulse is received in the time position of the called line which serves to operate the ringing trip circuit. This serves to terminate transmission of the ringing control signals to the called line circuit.

If the connector pulse does coincide with a busy pulse on conductor CB and the finder pulse, which appears in the time position of the calling line, does not coincide with an executive-cut-in marking pulse, switch-through does not occur, but instead, the busy circuit, which is shown in Fig. 38, operates. The connector is locked in this busy condition until the call is abandoned by the calling line. Busy tone is released by the connector and is routed to the calling line to inform it of the busy condition of the connector.

If the connector pulse does coincide with a busy pulse and the finder pulse does coincide with an executive-cut-in marking pulse, an executive-cut-in circuit, which is shown in Fig. 36, operates to allow the switch-through circuit to operate, provided that the connector pulse does not coincide with a pulse on the trunk hunting marking lead.

If the connector pulse coincides with a busy pulse as well as a trunk hunting marking pulse, a trunk hunting circuit, which is shown in Fig. 34, operates, regardless of whether or not the finder pulse coincides with an executive-cut-in marking pulse. This circuit acts to advance the units register chain in the register section of the connector one step, so that a new connector pulse is generated.

The above operations are accomplished in a group of "logic" gates, operating in conjunction with a "pentastable," or five-condition multi-stable circuit. The five conditions are called "reset," "trunk hunt," "busy," "cut-through," and "ringing trip." This pentastable circuit is capable of tripping from any one condition to any other condition, unlike a counting chain, which can trip from one stage to the next only in a predetermined order. The pentastable circuit is identified in the drawings by a heavy line common emitter connection. The pentastable circuit has been shown as comprising point contact transistors. Double base diodes or transistors connected in an Eccles-Jordan configuration could be used in each stage.

At the termination of the call, negative release pulses from the release pulse generator serve to reset the two register chains, erase the information stored in the ringing control storage stage, reset the digit counter, and switch the pentastable circuit to its reset condition. This returns the connector to its normal state so that it may handle a new incoming call. Coincidentally, a signal is routed to the line finder, informing it of the reset condition of the connector, which in turn, permits the line finder to engage itself with a new calling line.

In considering the circuit details of the connector, it will be recalled that when the line finder 17A seizes a calling line, the potential on conductor AS1–A is lowered to −10.5 volts, and that a negative pulse in the time position of the calling line appears on the negative finder gate conductor NFG. The forward in gate, which is shown in Fig. 33, comprises three inputs. Conductor MPX, which carries pulses corresponding to all lines which are off hook, is connected to the anode of diode CD3301, conductor AS1–A connects to the anode of diode CD3302, and conductor NFG connects to the anode of diode CD3303. An output is realized from this "and" gate only when all three conductors are negative simultaneously. Thus the output of the gate comprises the multiplexer pulses corresponding to the line which is seized by line finder 17A.

The negative output pulse of the forward in gate is transmitted through a coupling circuit, which comprises capacitor C3301 and resistor R3301, and through winding 3351 of transformer T3350 to the base of the in gate amplifier transistor 3300. Transistor 3300, which may be type CK721, is connected as a regenerative amplifier or blocking oscillator. It is normaly biased below cutoff by a resistance bleeder circuit in the base circuit. Bias is derived from +24 volts through resistor R3301, diode CD3304, and through resistor R3302 to ground. Diode CD3304 is provided in the base circuit to present a low impedance to the base of the transistor 330 during the time that transistor 3300 fires, and to allow the negative triggering signal to be transmitted in full to the base of the transistor.

When the oscillator responds by firing the voltage rise in the collector winding 3352 of transformer T3350 is reflected into winding 3351 in such direction as to make the base of transistor 3300 more negative and thus assist in the build up to saturation.

A heavy base current flows from ground through capacitor C3302, diode CD3304, winding 3351 of transformer T3350, and through the base and emitter of transistor 3300 back to ground. This current decreases exponentialy as capacitor C3302 is charged so that transistor 3300 is held saturated for a time period determined by the magnitude of capacitor C3302. The inductance of transformer T3350 is sufficiently large that the pulse duration is controlled solely by capacitor C3302 and not by saturation effects in transformer T3350. During this period, the collector voltage, normally +24 volts, stands at approximately ground potential. When the base current decreases sufficiently to bring transistor 3300 out of saturation, the collector voltage rises once more and transformer winding 3352 reflects this change into base winding 3351 in such a direction as to make the base terminal more positive and thus further cut off transistor 3300.

The output pulse, which is derived from a tap on winding 3352, is a relative short, high energy pulse. Resistor R3303 and capacitor C3303 form a current limiting and decoupling network. The positive output pulse from transistor 3300 is coupled through capacitor C3304 to the base of forward reconstructor transistor 3310. Transistor 3310, which may be type TI201, is normally operated in a saturated condition through the action of the base biasing circuit which is from ground through resistor R3304. When a positive input pulse is received, a heavy base to emitter current flows which charges the coupling capacitor C3304 to the peak voltage of the input pulse. At the end of the pulse, the stored charge on capacitor C3304 forces transistor 3310 below cutoff, where it remains for an entire frame of 1000 microseconds, because of the relatively high value of resistor R3304 and the resulting long time constant for the RC network. Upon application of succeeding input pulses, transistor 3310 is driven to saturation for the duration of each pulse and is held below cutoff for the entire period separating succeeding pulses. The output voltage, which is taken from across collector load resistor R3306 of transistor 3310, stands at approximately −16 volts during periods when the link is idle. The value of this output signal is determined by the emitter bleeder circuit comprising resistors R3305 and R3307. During periods when multiplexer pulses are applied, the output signal rises to ground potential except for very short intervals once per frame when the voltage drops once more to −16 volts. This short negative pulse is filtered in a simple T section low-pass filter, which comprises resistors R3308 and R3309 and capacitor C3307, and the output is then coupled to the base of amplifier 3320. The bias on transistor 3320, which may be type TI201, is set so that during idle periods of the link the stage is held below cutoff. Since the collector of transistor 3310 stands at −16 volts when the link is idle, the base of transistor 3320 is negative with respect to its emitter which is biased at −10.5 volts. When multiplexer pulses are applied to transistor 3310 and it is thereby rendered non-conductive, transistor 3320 is driven to saturation. No short pulses are evident on the output of transistor 3320 due to the action of the filter and the limiting action of transistor 3320 when driven into saturation. The output of transistor 3320, which is taken from across collector load resistor R3310, is at ground potential when the link is idle and at a potential of −10.5 volts when the finder has seized a line. Figure 48(*a*) shows the voltages existing at various points throughout the forward reconstructor circuit.

The time constant of the integrator circuit, comprising capacitor C3304 and resistor R3304, is chosen so that if the multiplexer pulses are interrupted due to dialing, and the like, the capacitor will discharge fully during each such interruption and cause the output of transistors 3310 and 3320 to resume their link idle voltages. The output of transistor 3320 therefore is a D. C. signal which is a very close approximation to the line current waveform in the calling line. For this reason, we say that this circuit reconstructs the original supervisory signal. The output voltage of transistor 3320 during a call, is negative when the calling line is off hook and rises to ground during dial breaks and when the calling line hangs up.

The output of transistor 3320 is coupled to the line finder over conductor FRA, to the connector dial pulse integrator transistor 3400, and to the connector sequence timing gate in the register section. Transistor 3400, which may be type TI201, is normally saturated since conductor FRA, which connects to its base, is at ground potential and is thus positive with respect to the emitter of transistor 3400 which is returned to −10.5 volts. When the link is idle, the output voltage, which is taken from across emitter load resistor R3401, stands at ground potential. The finder cut-through potential from line finder 17A is applied over conductor FCT to the integrator circuit, which comprises capacitor C3401 and resistor R3402, in the output circuit of transistor 3400. When the link is idle, this potential stands at −10.5 volts. Under these conditions, points D and E of the integrator circuit stand at −10.5 volts, since diode CD3401 is cut off and the diode CD3402 is conductive. Capacitor C3401, which is connected to point D, is therefore charged to −10.5 volts. When the link is seized by a calling line, conductor FCT suddenly rises to ground potential. This is followed shortly thereafter by a drop in the potential from transistor 3400 to −10.5 volts. The delay is caused primarily by the integrator circuit contained in the forward reconstructor circuit. During the short delay interval, capacitor C3401 starts to discharge toward the ground potential on conductor FCT through discharging resistor R3403 in parallel with the diode CD3402 which is now cut off. Point E follows this potential rise, which is small since the length of the delay interval is small in comparison with the time constant of the cut-through delay network just described. At the end of the delay interval, the output of transistor 3400 goes to −10.5 volts, the diode CD3401 conducts, and point E is brought suddenly back to −10.5 volts. The voltage of point D continues to rise until the capacitor voltage reaches −5.25 volts, set by the division ratio of the two resistors R3402 and R3403.

During a dial impulse break interval, the finder cut-through potential remains at ground, and the output voltage of transistor 3400 rises to ground. This cuts off diode CD3401 and point E charges toward the potential of point D. Point E is connected through capacitor C3402 and small resistor R3404 to ground, and will charge exponentially during the dial break. The time constant is chosen short enough that the charge is fully completed during a normal ten pulses per second dial break interval, but is long enough to allow differentiation between dial break intervals and momentary interruptions due to line transients and the like. Incident to the make of the dial contacts, the output voltage of transistor 3400 returns to −10.5 volts, diode CD3401 conducts, and point E is suddenly brought back to −10.5 volts. This sudden voltage change appears in full across resistor R3404, which is connected in series with the capacitor C3402, and is coupled to the input base of dial pulse follower transistor 3410 which is normally operated near cutoff. Transistor 3410 may be type CK722.

The small potential rises encountered during the dial break intervals are not transmitted by transistor 3410 since they are in a positive direction and drive transistor 3410 further into its cutoff region. The large negative pulse generated incident to the dial make, however, is transmitted by transistor 3410 to the output conductor DPF which connects to the emitter of transistor 3410. It will be noted that no output is obtained from transistor 3410 incident to seizure of the link due to the tie-in with the finder cut-through lead. A series of pulses, each pulse occurring in coincidence with each dial make of the impulse springs of the calling line telephone, is thus obtained from the output of transistor 3410.

At the end of the call, the output voltage of transistor 3400 returns to ground potential and point E charges to point D as was the case during a dial impulse break. After the release delay interval, the finder cut-through potential drops back to −10.5 volts. This causes point E to drop back toward the potential of point D. Due to the effect of capacitor C3401, which is connected from point D to ground, this potential would, without the provision of diode CD3402, charge at a slow rate to the idle finder cut-through potential of −10.5 volts. If, during this interval, the link was taken into use by a new calling line, point D would still be appreciably positive and when the output of transistor 3400 dropped to −10.5 volts, a sufficiently large negative pulse would be developed at point F to trigger transistor 3410 and thus would be recognized as a single dial impulse. To avoid this condition, diode CD3402 is placed across charging resistor R3403 in such a direction that it will conduct and charge the capacitor almost instantly when the finder cut-through potential drops to −10.5 volts. This, in effect, provides an instant reset for the dial pulse integrator which enables it to handle a new incoming call at the instant of release of the link from an old call.

In order to clarify the operation of the dial pulse integrator circuit, a waveform chart is included in Fig. 48(*b*). The waveform chart shows the voltages existing at various points throughout the dial pulse integrator circuit. For simplicity, the waveforms are shown to illustrate the voltages existing in the connector as a result of a line coming off hook, dialing two interruptions, and then hanging up.

The negative dial impulses from transistor 3410 are conducted over conductor DPF to the tens register gate, which is shown in Fig. 36, and the units register gate, which is shown in Fig. 41, located in the register section of the connector. It will be recalled that conductor DPF normally stands at ground potential and carries negative-going pulses corresponding to each dial impulse make of any and all digits dialed by the calling line.

In order to obtain an over-all picture of the operation of the dial pulse register circuits of the connector, it should be pointed out that the eleven circuits tens register gate, tens register pulser, tens register chain, tens register reset, units register gate, units register pulser, units register chain, sequence timing gate, sequence timing circuit, digit counting pulser, and digit counting chain, are all interconnected to perform the function of registering the three dialed digits and to initiate operation of further circuits in the connector. The basic functions of these eleven circuits are tabulated below:

The tens register gate serves to gate through the first two dialed digits to the tens register pulser. The third and any succeeding digits are blocked.

The tens register pulser serves to step the tens register chain in response to the individual dial impulses received from the calling line.

The tens register chain, comprising the individual stages primer, tens 1-tens 0, inclusive, serves to count the number of impulses corresponding to the first digit dialed, and to count and store the number of impulses corresponding to the second digit dialed. The chain is reset between the first and second digits.

The tens register reset stage serves to reset the tens register at the conclusion of the first digit. It additionally sends a signal to the ringing control circuits of the connector to indicate the time when examination of the setting of the tens register should be made. In other words, it controls read-out of the party selection information contained in the tens register and simultaneously resets the register.

The units register gate serves to gate through the third dialed digit to the units register pulser. The first two digits, and any digits following the third digit, are blocked.

The units register pulser serves to step the units register chain in response to the individual dial impulses received from the calling line. As controlled by the units register gate, only the impulses of the third digit are presented to the units register pulser.

The units register chain, comprising the individual stages primer, units 1-units 0, inclusive, serves to count and store the number of impulses corresponding to the third dialed digit. It will be shown in a later paragraph that the units register chain may also be stepped in response to signals originating in the trunk hunting circuit.

The sequence timing gate serves to gate through to the sequence timing circuit signals representative of each dial impulse and interdigit period in such a way that the sequence timing circuit is operated three times, once after each of the three dialed digits. Further dialed digits cause no response from the sequence timing gate.

The sequence timing circuit serves to differentiate between the make periods between individual dial impulse breaks and the make periods occurring between successive digits. The sequence timing circuit responds to an interdigit period by transmitting an operate signal to the digit counting pulser.

The digit counting pulser responds to an operate signal transmitted thereto by the sequence timing circuit by generating a single short pulse suitable to drive the digit counting chain. In operation, the digit counting pulser generates one short pulse after each of the three dialed digits.

The digit counting chain, comprising the individual stages digit primer, digit counting 1-digit counting 3, inclusive, serves to count and store information relative to the numerical identity of the digit which has just been completed. In other words, the digit counting chain counts the three successive digits dialed into the connector from the calling line and advances one step at the conclusion of each of the digits.

During periods when the link is idle, release pulses on conductor RP are impressed on the tens, units, and digit counting register primer stages comprising transistors 3730, 4000, and 4040, respectively. These pulses serve to render these primer stages conductive, which in turn, extinguishes all other stages in the respective counting chain. These counting chains are basically identical to the previously described tens and units ring circuits except that they are not endless rings. No coupling is provided between the output of the last stage of the chain and the input of the first, but instead, a reset pulse input is provided on the first stage. Each of the digit register chains employs eleven stages, comprising a primer and ten counting stages, whereas the digit counter chain employs four stages, comprising a primer and three counting stages.

When the finder-connector link is seized by a calling line, the release pulses on the conductor RP are terminated, as previously described. Due to the bistable nature of the primer stages, all three primer transistors 3730, 4000, and 4040 remain conductive. As discussed previously, no signal is received over conductor DPF until the first digit is dialed. Thus no signal is transmitted by the tens register gate and the tens register pulser to the tens register chain to cause it to step. In a like manner, no signal is transmitted to the units register chain to cause it to step. It will be shown that no signal is transmitted by the sequence timing gate, the sequence timing circuit, and the digit counting pulser which might cause the digit counter to step, incident to seizure of the link. Hence, the register section of the connector is fully primed and ready for incoming dial impulses.

The operation of the sequence timing gate depends upon the joint action of the forward reconstructor circuit, the tens register chain, the units register chain, and the digit counter. These circuits in turn depend for their proper operation on the action of the sequence timing gate. Since this condition approximates a closed feedback loop, it can best be explained in detail by assuming the proper operation of one key circuit, and then by following through the description of the dependent circuits until the input of the key circuit has been reached. It seems expedient in this particular instance to assume that the outputs of the sequence timing gate, the sequence timing circuit, and the digit counting pulser are correct and follow the pattern outlined above in the functional discussion of these circuits. Explanation of the operation of these circuits will therefore be deferred until the other circuits have been fully discussed.

As indicated above, the output of the digit counting pulser transistor 3930 consists of a single pulse generated at the end of the first dialed digit, a single pulse generated at the end of the second dialed digit, and a single pulse generated at the end of the third dialed digit. Succeeding digits cause no further output from the digit counting pulser.

Operation of the digit counting pulser in this manner causes the digit counting chain to step from stage to stage. Between the instants of link seizure and the end of the first digit, the primer transistor 4040 is conductive. At the end of the first digit, a pulse is received from the digit counting pulser transistor 3930 which advances the digit counting chain so that digit counting 1 transistor 4050 is conductive. This stage remains conductive during the dialing of the second digit, and at the conclusion of the digit, a second pulse is received from transistor 3930 which advances the chain to digit counting 2 transistor 4060. At the end of the third digit, a third pulse is received from transistor 3930 which advances the chain to digit counting 3 transistor 4070. This stage remains conductive during the remainder of the call since no further pulses are transmitted to the chain from the digit counting pulser. Abandonment of the call at any time during or after the dialing of the three digits causes release pulses to be transmitted to primer stage transistor 4040, which responds by firing and in turn, extinguishing whatever stage of the counter that may be conductive at the time.

The output voltages derived from the several digit counter stages are used to operate the tens register gate, the units register gate, and the sequence timing gate circuits, as well as the tens register reset stage. The output voltage of digit counting 3 transistor 4070 is additionally inverted in the digit counting 3 amplifier transistor 4080 and applied to conductor DC–3A which is connected to circuits in the control section of the connector. When one of the stages of the digit counter is conductive, the output voltage of that particular stage stands at ground potential. When one of the stages is non-conductive, the output voltage of that particular stage stands at −10.5 volts.

A waveform chart is included in Figs. 49 and 50 of the drawings which will clarify the operation of the register section of the connector. It is assumed that a calling line comes off hook, dials the digits 9, 1, and 2, then hangs up. The chart includes waveforms of the potentials existing on conductor FRA, conductor RP, conductor DPF, the digit counting chain emitter bus, and the collectors of the four digit counter stages digit counting primer, digit counting 1, digit counting 2 and digit counting 3.

The tens register gate comprises a group of four diodes arranged to combine the voltages on conductor DPF and the outputs of digit counting 2 and digit counting 3 transistors 4060 and 4070, respectively, in such a way that the first two digits dialed by the calling line are transmitted through to the tens register pulser transistor 3630. The tens register gate is composed of two sections, namely, an "or" gate section comprising diodes CD3601 and CD3602, and an "and" gate section comprising diodes CD3603 and CD3604. The output of the "or" gate section, which is indicated as point A, contains the combined information from the digit counter stages digit counting 2 and digit counting 3. This "or" gate section delivers a positive output when either digit transistor 4060 or transistor 4070 is conductive. As shown on the waveform chart, point A is positive between the end of the second digit and the time of disconnect. Capacitor C3601, which is connected from point A to ground, is provided to cover the brief time interval involved during the switch from transistor 4060 to transistor 4070 as the digit counting chain is pulsed.

The "and" section of the tens register gate combines the output of the "or" gate section with the pulses on conductor DPF. An output signal is obtained at the "and" gate output, indicated as point B, only when both of these signals are negative. As shown on the waveform chart, this condition prevails during the pulses of the first two digits dialed, so that the tens register gate will transmit pulses corresponding to the first and second digits dialed. Point A goes positive at the end of the second digit, thus blocking the "and" gate section for the remainder of the call.

The output of the tens register gate is coupled through capacitor C3602 to the base circuit of tens register pulser transistor 3630. Transistor 3630, which may be type CK722, is connected as a blocking oscillator designed to generate one short negative output pulse in response to each DPF pulse gated to it by the tens register gate. The stage is conventional in design except for the manner in which cutoff bias is obtained. It will be noted that the base of transistor 3630 is returned to ground through diode CD3605 and winding 3641 of transformer T3640, and that the emitter is returned to a silicon junction diode CD3606 and biasing resistor R3601. Diode CD3606 is poled so that it presents is forward impedance to the circuit at all times. The silicon diode characteristic in the forward direction exhibits a sharp break point at about 0.6 volt, below which little forward current flows, and above which the current conduction increases rapidly. This provides a characteristic similar to a voltage regulator tube, and through the use of a suitable current supply biasing resistor, such as R3601, a stable source of 0.6 volt can be obtained. This voltage is applied as a cutoff bias for transistor 3630, and is overcome by signals transmitted by the tens register gate. When the transistor fires, the buildup of the field in collector winding 3642 is induced in winding 3641 and a very large current flows both in the base circuit and the emitter circuit. The current in the base circuit is made to flow through the forward impedance of diode CD3605 and the pulse transformer winding 3641 to ground. The current in the emitter circuit flows through the forward impedance of the silicon diode CD3606 to ground. Since the dynamic forward impedance of this diode is very low, the proper operation of the oscillator itself is not impaired as a result of emitter degeneration. The negative output pulse from the oscillator is derived from the tertiary winding 3643 of transformer T3640.

The output pulses from transistor 3630 are coupled through diode CD3607 and capacitor C3603 and appear across the common emitter resistor R3701 of the tens register chain so that the chain advances one step for each pulse input. It will be remembered that primer transistor 3730 is conductive when the register is idle. With transistor 3730 conducting, the potential of the common emitter circuit is held well below the peak point of the other ring transistors. The first negative impulse impressed on the common emitter circuit drives the common emitter circuit sufficiently negative to render transistor 3730 non-conductive. The potential of the collector of transistor 3730 is immediately lowered to —10.5 volts. The negative swing is coupled through capacitor C3701 to the base of tens 1 transistor 3740. When the negative pulse disappears from the common emitter, the common emitter potential rises toward +24 volts and transistor 3740 conducts since it is the only transistor with negative base potential. The first string of dial impulses, corresponding with the first dialed digit, act to step the ring to a setting corresponding to the number of impulses in the digit. Since the assumed called line number is "912," tens 9 transistor 3750 will remain conductive at the end of the digit.

Prior to the dialing of the second digit, the tens register reset transistor 3900 fires, which resets the tens register chain to its primed position. This is accomplished by coupling the voltage drop at the collector of digit counting register primer transistor 4040 to the base of transistor 3900. As seen on the pulse chart, the digit counting primer transistor 4040 is extinguished at the end of the first digit, and hence its collector potential drops from ground to —10.5 volts. This waveform is peaked by the peaker circuit comprising capacitor C3901 and resistor R3901 to form a negative pulse which is then applied to the base of the normally cutoff transistor 3900. Transistor 3900 is connected as a monostable oscillator which is identical in operation to those previously described. It responds to the negative input pulse by generating a large negative output pulse which is terminated when capacitor C3902 becomes charged. The output pulse is coupled through capacitor C3903 and diode CD3608, which comprises one input of an "or" gate, to the base of the tens register primer transistor 3730, which responds in turn by firing and resetting the tens register. Release pulses on conductor RP are coupled through capacitor C3604 and diode CD3609, which serves as the other output of this same "or" gate, during periods when the link is idle, thus resetting the tens register chain at the end of a call. The negative output of tens register reset transistor 3900 is additionally applied to the ringing control storage circuit, to be described in more detail in a later paragraph.

Pulses corresponding to the second dialed digit are now impressed on the common emitter of the tens register chain by the tens register pulser transistor 3630, so that the chain is once more advanced to a setting corresponding to the number of impulses of the digit. Since digit counting primer transistor 4040 remains off for the remainder of the call, no signal is derived to operate the tens register reset transistor 3900, and the tens register is not reset. No further pulses are transmitted by the tens register gate so that the tens register is allowed to remain at the setting just reached for the duration of the call. All transistors of the tens register chain and tens register reset transistor 3900 may be type G11A.

The units register gate, which is shown in Fig. 41, comprises a group of five diodes arranged to combine the DPF, digit counting primer, digit counting 1, and digit counting 3 voltages in such a way that the third digit dialed by the calling line is transmitted through to the units register pulser transistor 3910. The units register gate is composed of two sections, namely, an "or" gate section comprising diodes CD4103, CD4104, and CD4105 and an "and" gate section comprising diodes CD4106 and CD4107. The output of the "or" gate section contains the combined information from the digit counter stages digit counting primer, digit counting 1, and digit counting 3, indicated in Fig. 41 as point C. This "or" gate section delivers a positive output when any one of the transistors 4040, 4050, or 4070 is conductive. As shown on the waveform chart, point C is positive except during the period between the end of the second digit and the end of the third digit. Like the tens register gate, a capacitor C4101, is provided to cover the brief time intervals involved during the switch from stage to stage of the digit counter.

The "and" section of the units register gate combines the output of the "or" section with the dial pulses on conductor DPF. An output is obtained only when both of these signals are negative. As shown on the waveform chart, this condition prevails during the period corresponding to the impulses of the third dialed digit. During the third digit, therefore, dial pulses are transmitted through the units register gate. Point C goes positive at the end of the third digit, thus blocking the "and" gate section for the remainder of the call.

The output of the units register gate, which is indicated as point D, is coupled to the units register pulser transistor 3910 through capacitor C3907. Transistor 3910, which may be type CK722, is connected as a blocking oscillator, designed to generate one short negative output pulse in response to each DPF pulse gated to it by the units register gate. Operation of this circuit is identical to that of the tens register pulser transistor 3630 which was previously described. The negative output pulses appearing in winding 3953 of pulse transformer T3950 are coupled through diode CD3901 and capacitor C3904 to the common emitter of the units register chain. The operation of the units register is identical to the operation of the tens register. Each negative impulse coupled to the common emitter serves to render the conducting transistor non-conductive and to trigger the next transistor of the ring. The third digit dialed into the connector serves to step the ring to a setting corresponding to the number of impulses in the digit. All transistors in the units register chain may also be type G11A.

The sequence timing gate, which is shown in Fig. 39, controls the operation of the digit counting circuit in response to signals derived from the forward reconstructor amplifier transistor 3320, the tens register primer transistor 3730, the units register primer transistor 4000, and the digit counting stage 2 and 3 transistors 4060 and 4070, respectively. The sequence timing gate is made up of six diodes and comprises two "and" gating sections. A first "and" gate, which comprises diodes CD3902 and CD3903, is used to combine the signals derived from transistor 4000, and digit counting 2 transistor 4060, the output appearing at point E. The output of this gate section is combined, through diode CD3904, with the signals derived from conductor FRA through diode CD3906, from tens register primer transistor 3730 through diode CD3907, and from digit counting 3 transistor 4070 through diode CD3905 in the second "and" gate, the output of which appears at point F.

Referring to the pulse chart, it can be seen that the output potential from units register primer transistor 4000 is at ground until the first dial impulse of the third digit is received over conductor DPF, as gated by the units register gate. At this time, which corresponds to the instant of the dial make at the end of the first interruption, the collector of transistor 4000 drops to −10.5 volts, where it remains until link release. The collector of digit counting 2 transistor 4060 stands at −10.5 volts until the instant of changeover between the second and third digits. Transistor 4060 then remains at ground potential until changeover again occurs at the end of the third digit, at which time the −10.5 volt potential is resumed for the remainder of the call. When these two signals are combined in the first "and" gate, a positive (ground) output is derived whenever both of the input signals are simultaneously at ground potential. The potential of point E, therefore, is −10.5 volts until transistor 4060 fires, when the potential changes to ground. Upon receipt of the first interruption of the third dialed digit, transistor 4000 is extinguished and point E returns to −10.5 volts.

As previously mentioned, the output waveform of the sequence timing gate, point F, shown in the pulse chart, is derived by combining the output waveform at point E, the waveform on conductor FRA, the potential derived from transistor 3730, and the potential derived from transistor 4070 in a manner similar to that used in deriving the point E waveform. In this case, however, a negative output is derived whenever all of the input waveforms are simultaneously negative. If desired, this second "and" gate may be considered an "or" gate for positive signals; giving a ground potential output whenever any of the input waveforms are at ground potential. The composite output waveform at point F comprises negative portions occurring during the dial make intervals separating successive dial break intervals, as well as longer negative portions occurring at the end of each dialed digit and persisting until changeover occurs.

Sequence timing transistor 3920, which may be type CK722, serves to amplify and invert the output of the sequence timing gate. Transistor 3920 is normally biased beyond cutoff by the ground potential output of the sequence timing gate which appears across gate load resistor R3902 and thus on its base. The emitter of transistor 3920 is biased at −7.5 volts. During periods of cutoff, the output collector potential stands at −16.5 volts, and when negative signals are applied to the base of transistor 3920 from the sequence timing gate, the output rises to −7.5 volts. Diode CD3908, attached to the collector of transistor 3920, serves to discharge timing capacitor C3905 to −16.5 volts whenever transistor 3920 is cut off. The potential of point G, as shown on the pulse chart, normally stands at −16.5 volts. When transistor 3920 is rendered conductive, diode CD3908 is cut off, and point G charges toward −7.5 volts along an exponential curve determined by the time constant of timing capacitor C3905 and the resistance offered by the back impedance of the discharging diode CD3908 in parallel with the back impedance of the cutoff emitter of the digit counting pulser transistor 3930.

Transistor 3930, which may be type G11A, derives its operating bias from point G. During normal dial make intervals, point G does not charge sufficiently positive to allow transistor 3930 to conduct. At the end of each digit, however, point G rises to about −7.5 volts and transistor 3930 responds by firing and generating a single negative output pulse. Point contact transistor 3930 is connected as a monostable oscillator which operates in an identical manner to the many monostable oscillators previously described. In response to the positive going signal applied to its emitter, the transistor is triggered into the saturation region where it remains for the charge time of capacitor C3906. The produced negative impulse is coupled through capacitor C3906 to the common emitter circuit of the digit counting ring. As previously described, the negative impulses appearing across common emitter resistor R3904 serve to cut off the conducting ring stage and to trigger the next stage. Thus the pulse advances the digit counter which changes the input signal to the sequence timing gate to ground once more, thereby to cut off transistor 3920 which discharges point G back to −16.5 volts.

Finder start transistor 3940, which may be type CK722, serves to amplify and invert the collector potential of primer transistor 4040. When the connector is reset, transistor 4040 is conductive, and transistor 3940 is cut off by virtue of base bias through resistor R3906 and positive potential on the collector of transistor 4040 through coupling resistor R3905, and the reset lead RS assumes a potential of about −10.5 volts, as determined by the collector bleeder circuit comprising resistors R3907 and R3908. This signal informs the line finder of the reset condition of the connector, so that the finder is conditioned to seize incoming calling lines. If the connector is not reset, transistor 4040 will not be conductive, transistor 3940 is conductive since the −10.5 volt potential on the collector of transistor 4040 is coupled through resistor R3905 to its base circuit, and a ground potential is presented to the RS lead. This signal informs the line finder that it must not seize the incoming call until such time as the connector is reset. Normally, since about four release pulses are generated per frame during periods when the line finder is idle, the connector will reset within a fraction of a frame after the instant of finder release. In the event of connector failure or release pulse generator failure, the connector may not reset at the conclusion of a call. Conductor RS, in this case, remains at −10.5 volts, and the finder is permanently blocked. The emergency pulse generating circuit in the allotter is then operated, causing the next idle link to be allotted.

Diode gating circuits are provided for each of the two register chains in the connector. The collector of each stage is coupled through a resistor to a diode in such a way that the diode is blocked when the stage is non-conductive. For example, the collector of tens 1 transistor 3740 is coupled through resistor R3702 to the anode of diode CD3701. Diode CD3701 is cut off by −10.5 volts on its anode, when transistor 3740 is non-conductive, and ground potential on its cathode because of the conduction of common output diode CD3801 through resistor R3703 to battery. Also coupled to each diode is the appropriate tens or units pulse received from the tens and units rings in the common equipment, in a manner similar to that of the line finder. In particular, the ten tens pulses are connected to the gates of the tens register in sequential order, and the ten units pulses are connected to the gates of the units register in sequential order. It can be seen that the positive tens conductor PT1 is coupled by capacitor C3702 to the anode of diode CD3701. The outputs of each set of register gates are mixed together on a common output bus. As the stages of the registers are stepped along under control of the calling line dial impulses, it is seen that the common output leads will carry one of the ten units pulses or one of the ten tens pulses at a time; the particular pulse depending upon the setting of the register at that instant. When the registers are driven to their final setting, a particular tens pulse is selected by the tens register and a particular units pulse is selected by the units register. These two pulses will correspond to the magnitude of the second and third dialed digit; i. e., if the calling line has dialed the number "912," the tens register will release the first tens pulse PT1 to the common output conductor, and the units register will release the second units pulse PU2 to the common output conductor. Gating of tens pulses during the dialing of the first digit has no effect on the operation of the connector.

The selected units pulse, PU2, and the selected tens pulse, PT1, which appear on the two common output pulse buses, are applied to an "and" gate which comprises diodes CD3802 and CD3803. The output of this connector gate is a single pulse having a duration of one time channel and having a repetition rate of one pulse frame. This channel pulse is in the time position of the called line, which is assumed to be 12, as selected by the calling line. Connector gate follower transistor 3830 and connector gate amplifier transistor 3840 serve to amplify and shape the selected pulse. Transistor 3830 is normally cut off since its base is held slightly negative with respect to its emitter as determined by the base bleeder circuit comprising resistors R3801 and R3802. A positive pulse coupled through capacitor C3801 to its base circuit drives transistor 3830 to saturation and the potential at its emitter rises from —7.5 volts to ground potential. Transistor 3840 is also normally cut off with base bias being supplied through the bleeder circuit comprising resistors R3804, R3805, and R3803. When transistor 3830 is driven to conduction, the resulting positive pulse is coupled through capacitor C3802 to the base circuit of transistor 3840 and transistor 3840 is driven to saturation. The selected pulse thus appears on the collector primary winding 3851 of pulse transformer T3850 as a negative connector gate pulse (coupled to conductor NCG), and on the secondary winding 3852 as a positive connector gate pulse. The negative connector gate pulse is coupled to the ringing trip circuit, the switch-through circuit, the trunk hunting circuit, and the busy circuit, all contained in the control section of the connector. The positive connector gate pulse is coupled to the link gate circuit, the ring-ring gate, and the ring tip gate in the register section of the connector. Transistor 3830 may be type TI202 and transistor 3840 may be type TI201.

A dial tone gate, shown in Fig. 38, is provided which controls the transmission of dial tone to the link multiple point. The dial tone conductor from the dial tone generator in the common equipment is connected to diode CD3804, which serves as one input of the three-input "and" gate. The potential on the collector of digit counting primer transistor 4040 is coupled to diode CD3806 which serves as another input of this gate, and the potential on the collector of tens register primer transistor 3730 is coupled to diode CD3805 which serves as the third input of this gate. With the connector in a reset condition, transistors 4040 and 3730 are conductive and serve to unblock the gate so that dial tone is transmitted to the tone gate conductor TG which routes through the connector control section to the link multiple point. When either or both of these two stages are non-conductive, a negative signal is derived which serves to block the gate against further transmission of dial tone. When the first interruption of the first digit is received from the calling line, transistor 3730 is extinguished so that dial tone is terminated at once. At the end of the digit, transistor 4040 is extinguished, and the tens register chain is reset which refires transistor 3730. Dial tone is now blocked through the action of transistor 4040, so that no tone will be transmitted even though transistor 3730 is again conductive. Succeeding digits will cause transistor 3730 to extinguish once more so that dial tone is permanently disabled for the remainder of the call.

A ringing storage circuit is included in the register section of the connector which functions to determine which party on the called line is to be rung in accordance with information gained from the first dialed digit. It supplied information as to the chosen party to the ringing control circuits of the connector, which act to control the ringing of the proper party on the called line. The ringing storage circuit comprises point contact transistors, which may be type G11A, ringing control amplifier 4100, ring tip storage 4110, and ring-ring storage 4120. Transistors 4110 and 4120 are connected as a two-stage counting chain with transistor 4110 acting as the primer, and transistor 4120 acting as the counting stage. This chain is driven by transistor 4100, which is connected as a monostable blocking oscillator. During periods when the link is idle, release pulses are transmitted by the release pulse generator over conductor RP and are impressed upon the base of transistor 4110 through capacitor C4002. These negative pulses serve to render transistor 4110 conductive, and because of the common emitter bus connection, transistor 4120 is rendered non-conductive. It should be pointed out that transistor 4120 would be conductive only if the called party selected on the preceding call was rung on the ring side of the line. When the link is seized, the release pulses are terminated. The chain remains in the reset condition with transistor 4110 on and transistor 4120 off, due to the bistable nature of the two stages.

Two signals are applied to the driver stage, or ringing control amplifier 4100. These are the potential from the tens 9 transistor 3750 of the tens register and the output of the tens register reset transistor 3900. The collector of transistor 3750 is coupled through an integrator, which comprises resistor R4102 and capacitor C4103, and voltage limiting diode CD4108 to the emitter circuit of transistor 4100. When transistor 3750 is off, its collector potential is —10.5 volts, and transistor 4100 is blocked against firing. When transistor 3750 is conductive, its collector potential rises to ground or higher. The limiting diode CD4108 conducts at ground potential so that a standardized positive signal of zero is presented to the emitter of transistor 4100, which serves to enable the stage without danger of firing it prematurely. The base of transistor 4100 is, of course, biased at +7.5 volts through resistor R4103. At the end of the first digit, the tens register chain is reset as a result of the firing of tens register reset transistor 3900. The large negative pulse generated by transistor 3900 is applied not only to the tens register primer transistor 3730, but to the base of transistor 4100, through capacitor C4104, as well. If transistor 3750 was just previously conductive, transistor 4100 is enabled and the pulse from transistor 3900 serves to fire transistor 4100. It will be understood that transistor 3750 is extinguished at precisely the same time that transistor 4100 is fired, so that the collector potential of transistor 3750 returns to —10.5 volts at the same time that the firing pulse is presented to transistor 4100. To permit reliable firing of transistor 4100, the integrator circuit coupling transistor 3750 with the emitter of transistor 4100 is employed to retain, or hold over, the enabling potential from transistor 3750 long enough to insure that the pulse from transistor 3900 will fire transistor 4100. The time constant of this integrator is quite short, so that if a digit of "0" is dialed as a first digit, the enabling potential from transistor 3750 will return to —10.5 volts long before transistor 3900 fires to reset the tens register and cause readout of the party selection information.

As a result of the circuit action just described, transistor 4100 will fire once at the end of the first digit provided a digit of "9" was dialed by the calling line. If a digit other than "9" was dialed, transistor 4100 will not fire since the enabling potential is not present in the emitter circuit. If transistor 4100 is not fired, the ring tip storage transistor 4110 remains conductive and the ring-ring storage transistor 4120 remains non-conductive for the remainder of the call. If transistor 4100 is fired at the end of the first digit, the produced negative pulse is coupled through capacitor C4105 to the common emitter of transistors 4110 and 4120. Thus, the counting chain advances one step so that transistor 4120 is rendered conductive and transistor 4110 is made non-conductive for the remainder of the call. In this case, transistor 4110 is refired in response to release pulses generated when the link is released at the end of the call.

The collector of transistor 4110 is coupled to diode CD4109, which serves as one input to the ring tip gate, and the collector of transistor 4120 is coupled to diode CD4110, which serves as one input to the ring-ring gate. When the connector switches through to the called line at the end of the third digit, these gates operate to transmit ringing control signals to the called line circuit in such a way that the ring side of the line is rung if transistor 4120 is conductive, and the tip side of the line is rung if transistor 4110 is conductive. Details of this portion of the connector will be described fully in a later paragraph.

At the end of the third digit, digit counting 3 transistor 4070 is fired, and remains conductive for the remainder of the call. Digit counting 3 amplifier transistor 4080, which may be type TI201, serves to amplify and invert the output of transistor 4070 and transmit it over conductor DC–3A to the trunk hunting gate, the cut-through gate, and the busy gate in the control section of the connector. When transistor 4070 is non-conductive, its collector stands at −10.5 volts, and transistor 4080 is cut off by action of the base bleeder circuit comprising resistors R4001 and R4002. A ground potential therefore appears on the output conductor DC–3A during times when the link is idle, and during the dialing of the three digits. When all digits are dialed, transistor 4070 fires, its collector rises to a positive potential, transistor 4080 conducts, and the output potential on conductor DC–3A drops to about −10.5 volts. This particular signal is the one which initiates the action of the control section of the connector.

Turning now to the control section of the connector, it will be observed that there are eleven basic circuits, comprising the forward in gate, the forward reconstructor, the dial pulse integrator, the executive-cut-in circuit, the return in gate, the tone amplifier, the reset circuit, the trunk hunting circuit, the switch-through circuit, the busy circuit, and the ringing trip circuit. The forward in gate, the forward reconstructor, and the dial pulse integrator have been previously described in conjunction with the register section of the connector.

Before considering the action of the control section of the connector in response to the start signal received over conductor DC–3A from the register section, attention is invited to the operation of the executive-cut-in circuits which include the executive-cut-in gate, executive-cut-in amplifier transistor 3600, reconstructor transistor 3610 and reconstructor amplifier transistor 3620. These circuits respond as soon as the finder-connector link is seized and serve to generate signals which control connector operation during the period following the start signal. In one respect, therefore, these circuits act much like the ringing storage circuits, in that they operate and generate controlling signals prior to the time when the signals are actually required. The signals persist until the link is released, so that other connector circuits may operate under control of these signals at any desired time during the progress of the call.

The executive-cut-in gate is of "and" configuration and comprises diodes CD3610, CD3611, and CD3612. The gate receives signals from the executive-cut-in marking conductor ECI which connects to the anode of diode CD3612, the negative finder gate conductor NFG which connects to the anode of diode CD3610, and the sampling pulse conductor SP which connects to the anode of diode CD3611. It will be recalled that executive-cut-in lines are marked with ten microsecond negative pulses on conductor ECI, which occur in the various time positions assigned to these lines. The sampling pulses from the sampling pulse generator and amplifier are negative-going, have a width of approximately two microseconds, and appear near the center of every ten-microsecond channel pulse interval. The negative finder gate pulse is a ten-microsecond pulse appearing in the time position of the calling line. If the calling line is an executive-cut-in line, the finder gate pulse will coincide with one of the executive-cut-in marking pulses and a short output pulse will be obtained from the executive-cut-in gate, occurring near the center of the time position allotted to the line. All three of these input pulses persist for the duration of the call, so that an uninterrupted series of output pulses is derived from the executive-cut-in gate for the duration of the call.

The output of the executive-cut-in gate is amplified in the executive-cut-in amplifier transistor 3600 which is connected as a monostable blocking oscillator. The output of transistor 3600, which may be type CK721, drives the executive-cut-in reconstructor transistor 3610, which in turn, drives the executive-cut-in reconstructor amplifier transistor 3620. The operation of these three stages is identical in every respect to the operation of the forward in gate and reconstructor circuits, comprising transistors 3300, 3310, and 3320 which have been previously described. Briefly, transistor 3310 is normally operated in a saturated condition and transistor 3320 is cut off. Negative impulses, which occur in the time position of a calling line having the executive-cut-in feature, cause transistor 3600 to produce corresponding positive output pulses. Transistor 3610 conducts for the duration of each pulse and is held below cutoff for the entire period separating succeeding pulses. The output of transistor 3610 is filtered and then applied to the base of transistor 3620. Thus, transistor 3620 conducts for the duration of the call. The output of transistor 3620 stands at ground potential when the finder gate pulse does not coincide with an executive-cut-in marking pulse, and stands at −10.5 volts whenever the finder gate pulse does coincide with a marking pulse, indicating that the line finder-connector link is associated with an executive-cut-in calling line. Transistors 3610 and 3620 may be type TI201.

The five point contact transistor stages comprising reset transistor 3330, trunk hunt transistor 3430, ring trip transistor 3500, cut-through transistor 3540, and busy transistor 3810 constitute a pentastable circuit in which one and only one of the five stages may be conductive at any one time. This circuit is basic to the operation of the connector and the remainder of the control section comprises circuits which are concerned with the handling of input and output signals from it. Briefly to consider the operation of the pentastable circuit as a whole, it is seen to be made up of five bistable stages with a common emitter bus, which is shown as a heavy line in the drawings, very much like a ring circuit or counting chain. No interstage coupling is provided, however, so that the circuit may be switched from any one stage directly to any other stage, in response to driving signals individual to each stage. To switch from one stage to another, it is only necessary to apply a negative operating pulse to the base of the stage which is to be fired. In firing, this selected stage automatically extinguishes the stage that was on previously, through the action of the common emitter connection. The transistors used in the pentastable circuit may be type G11A.

During periods when the link is idle, release pulses are applied over conductor RP and through coupling capacitor C3308 to the base of the reset transistor 3330, the first of the five pentastable circuit stages. Transistor 3330 responds by firing which extinguishes whichever pentastable circuit stage may have been left operative at the end of the previous call. It will be remembered from the description of the units ring circuit that the common emitter load resistor, R3501 in this case, and the emitter bias voltage are so chosen that the load line intersects the emitter characteristics in the saturation region above the valley point of the ring transistor having the highest valley point. With one transistor conducting, the emitter voltage is lowered to the point where no other transistors of the ring may conduct in the absence of triggering pulses. When a negative impulse of sufficient value is applied to the base of transistor 3330, or to any other transistor of the pentastable circuit, that transistor conductors. The common emitter potential is thereby further lowered so that the previously conducting transistor is rendered non-conductive.

As can be readily appreciated, the action of the control section of the connector depends upon a number of factors, and the operation of the various circuits in response to one call may differ considerably from the operation in response to another. It seems best, therefore, to assume various possible call conditions where they may best explain the operation of individual circuits. Assume first of all that a non-executive cut-in line has initiated a call to line 912, which is already engaged with another call. The called line is therefore in time position 12, so that a negative connector gate pulse in that time position is transmitted to the control section over conductor NCG from the register section. Assuming also that 912 is not in a trunk group, no trunk hunting marking pulses will appear in time position 12 on either the positive trunk hunting or negative trunk hunting conductors PTH or NTH, respectively. Since 912 is busy, a negative connector busy pulse in time position 12 appears on the connector busy conductor CB. It will now be shown that, upon presentation of the start signal over conductor DC–3A, the busy circuit operates to fire the pentastable circuit busy transistor 3810, which throws the connector into a permanent busy condition until the link is released.

Since the calling line is not an executive-cut-in line, the output potential of the executive-cut-in reconstructor amplifier transistor 3620 is at ground, as previously described. The output of transistor 3620 couples to the anode of diode CD3702 which serves as one input of an "inhibitor" gate, called the executive-cut-in modifier gate. The other input to this gate is the positive trunk hunting conductor PTH which connects to the anode of diode CD3703. During time position 12, conductor PTH stands at —10.5 volts, and the ground potential from the collector of transistor 3620 is transmitted to the output of the gate by virtue of the conduction of diode CD3702 which has ground potential on its anode and —24 volts through resistors R3705 and R3704 on its cathode. Gate amplifier transistor 3700, which may be type TI201, responds to this ground potential by saturating, and provides an output voltage of about —10.5 volts. During the call in question, a continuous —10.5 volt signal is derived from transistor 3700, regardless of trunk hunting signals on conductor PTH, since the executive-cut-in modifier gate is provided with a continuous ground potential signal from transistor 3620.

The output of transistor 3700 is coupled to the anode of diode CD3704 which serves as one input of a second "inhibitor" gate, called the connector busy modifier gate. Connector busy pulses on conductor CB are coupled to the anode of diode CD3705 which serves as the other input of this gate. The connector busy modifier gate is so arranged that the connector busy pulses will be transmitted without change so long as the output potential of transistor 3700 is negative. This is the situation which prevails in the present call condition, so that the output of the connector busy modifier gate contains negative connector busy pulses, including the one in time position 12.

The output negative pulses of the gate are coupled through capacitor C3703 to the base of connector busy modifier gate follower transistor 3720, which may be type CK722. The output of transistor 3720, which is taken from across emitter load resistor R3706, therefore is normally at ground potential, and during periods when lines are marked busy, —7.5 volt pulses are generated. The output of transistor 3720 is coupled to the anode of diode CD3811 which serves as one of the six inputs of the busy gate.

A second input to the busy gate is the positive trunk hunting conductor PTH which connects to the anode of diode CD3812. During time position 12, conductor PTH stands at —10.5 volts. A third input to the busy gate is the negative connector gate appearing on conductor NCG which connects to the anode of diode CD3810. Since line 12 was dialed, the negative connector gate appears in time position 12, applying a —7.5 volt signal to this third busy gate input. A fourth input to the busy gate is the sampling pulse conductor SP, which connects to the anode of diode CD3807 and contains short negative pulses at the approximate center of each and every time channel. A fifth input to the busy gate is the start signal, consisting of a negative-going potential on conductor DC–3A, which connects to the anode of diode CD3808 and appears at the end of the third dialed digit, as discussed previously.

The sixth and last input to the busy gate is the switch-through potential derived from the switch-through follower transistor 3550 and connected to the anode of diode CD3809. The switch-through potential normally stands at about —10.5 volts. If switch-through occurs, the potential rises to ground, in a manner described in more detail in a later paragraph. Thus, during time position 12 and after the start signal is derived on conductor DC–3A, all six inputs to the busy gate are negative. The exact length of time is determined by the sampling pulses, so that a relatively short pulse is therefore derived on the output of the busy gate, which is connected as an "and" gate for negative signals. It should be obvious that ground potential on any one of the input conductors will be transmitted through its associated diode and appear across the gate load resistor R3813. All of the other diodes of the gate are thereby cut off and the gate output remains at ground.

The output of the busy gate is coupled through capacitor C3803 to the base of busy gate amplifier transistor 3800 which is normally biased for non-conduction by the voltage division across resistors R3806, and R3807 and R3811 in its base circuit and —7.5 volts through resistor R3810 in its emitter circuit. Transistor 3800, which may be type G11A, is connected as a monostable oscillator which responds to a negative pulse on its base by generating a negative output pulse which persists for the charge time of capacitor C3804. The short negative output pulse is coupled through capacitor C3805 to the base of the busy transistor 3810 of the pentastable circuit. Transistor 3810 responds to this negative input pulse by firing, which extinguishes the reset transistor 3330 of the pentastable circuit.

The collector of busy transistor 3810 is coupled to three points; the base circuit of busy gate amplifier transistor 3800, the busy tone gate circuit diode CD3813, and to the anode of diode CD3506 which serves as one of the inputs of the cut-through gate. The feedback connection to the base circuit of transistor 3800 is provided to paralyze the amplifier, not only during the time that transistor 3810 is conductive, but for a short time after transistor 3810 is de-energized at the end of the call. When transistor 3810 fires, the positive potential rise is coupled through resistor R3807 to the base of transistor 3800, which acts to disable the stage. The coupling capacitor C3803 between the busy gate and transistor 3800, in charging to this positive potential, acts to integrate, or store, the potential for a short time after transistor 3810 is extinguished. It was found that when transistor 3810 was extinguished at the end of a call, a positive potential rise was derived from the base of transistor 3810 of sufficient magnitude to fire transistor 3800 through the emitter connection. If transistor 3800 was allowed to fire in this manner, transistor 3810 would be refired, reset transistor 3330 would extinguish, the next release pulse would fire transistor 3330 and extinguish transistor 3810, and the cycle would repeat indefinitely. By provision of the feedback connection with the integration network as described, this undesirable condition is prevented, since the base of transistor 3800 is held positive long enough to cover the short pulse backing up from the base of transistor 3810 to the emitter of transistor 3800, generated when transistor 3810 is extinguished.

As previously mentioned, the collector of busy transistor 3810 is also connected to the anode of diode CD3506 which serves as one of the inputs of the cut-through gate. This serves to disable the cut-through gate when transistor 3810 is fired so that the connector is permanently locked into the busy condition, and cannot subsequently switch through in response to disappearance of the busy condition of the selected line. In this connection, it should be made clear that the converse connection wherein the switch-through circuit is connected back to the busy gate is provided so that the busy circuit is disabled against functioning in response to the connector busy pulse released by the subject connector and transmitted back over conductor CB to the busy gate if the selected line had tested idle incident to application of the start signal.

A connection is also made between the collector of busy transistor 3810 and diode CD3813 which serves as one input of the busy tone gate. This is an "and" gate for positive-going signals, and firing of transistor 3810 causes the gate to transmit the busy tone signal which is continuously applied to the busy tone lead by the busy tone generator. The output of the busy tone gate is coupled to the anode of diode CD3815 which serves as one input of the tone gate, which is connected as an "or" gate for positive signals. Dial tone, gated by the dial tone gate in the register section of the connector, is impressed upon the anode of diode CD3816 which serves as a second input of the tone gate. The tone gate functions to transmit either signal to the input of the tone amplifier transistor 3820. Transistor 3820, which may be type TI201, is biased well below cutoff in the absence of either dial tone or busy tone signals. In this manner, any tone leakage signals from the busy tone gate or the dial tone gate are clipped and are not passed on to the link multiple point. When either dial tone or busy tone is gated through to transistor 3820, this amplifier is driven to saturation and provides a rectangular output waveform of fixed amplitude. The amplitude of the output signal is approximately −10.5 volts as determined by the emitter bleeder circuit which comprises resistors R3808 and R3809. The output signal, which is taken from across collector load resistor R3812, is transmitted over the "tones out" lead to the link multiple point, which is in turn connected by way of the diode switch associated with the calling line back to the calling line. In this manner, the calling line is given an audible indication of the condition of the finder-connector link. When dial tone is received, the calling line is informed that the link is seized and that dialing may commence. When busy tone is received, the calling line is informed that the connector has locked into the busy condition, and that he must hang up.

Assume now that the calling line of the previous example reseizes the link at a later time and calls 912 at a time when it is idle. This time the busy circuits of the connector should not operate, but instead, the switch-through circuits should function. A cut-through gate is provided to determine when the connector should go into the condition of switch-through. When signals are derived from the cut-through gate, the cut-through transistor 3540 of the pentastable circuit is operated and serves to generate an operating signal on the connector cut-through conductor CCT and to saturate switch-through follower transistor 3550 which, in turn, connects a switch-through potential to conductor SW. At this time, the called line 912 is rung, and upon answering, a return multiplexer pulse is generated which acts to operate the ringing trip circuit, including the ringing trip transistor 3500 of the pentastable circuit. This causes the cut-through transistor 3540 to be extinguished and remove the connector cut-through signal from conductor CCT. To maintain the switch-through potential on conductor SW, the outputs of transistors 3540 and 3500 are mixed in an "or" gate so that transistor 3550 will conduct when either transistors 3540 or 3500 are conducting. Thus, there is provided a cut-through conductor CCT which is energized when switch-through occurs and is de-energized when ringing trip occurs, and there is provided a switch-through conductor SW which is energized when switch-through occurs and is maintained energized for the remainder of the call.

The cut-through gate comprises six input diodes connected in such a way that an output signal is derived whenever an idle called line is selected by the calling line. The first diode, CD3501, is connected to conductor DC–3A, so that a negative start signal is received from the register section for the gate at the end of the third dialed digit. The second diode, CD3502, is connected to the switch-through conductor SW, normally at −10.5 volts until switch-through occurs. The third diode, CD3503, is connected to the negative connector gate conductor NCG, which carries a negative ten-microsecond pulse in time position 12, the time channel allotted to the called line 912, and selected by the register chains in the register section of the connector. The fourth diode, CD3504, is connected to the sampling pulse conductor SP, carrying negative sampling pulses occurring at the approximate center of each and every time channel of the frame.

Since the calling line is a non-executive cut-in line, a steady −10.5 volt signal is derived from the executive-cut-in modifier gate amplifier transistor 3700, as previously described. Thus the connector busy modifier gate is biased to pass any and all negative connector busy pulses occurring on conductor CB. During time position 12 in question, no busy pulses are present, so that a ground potential is derived in the output of the connector busy modifier gate. The connector busy modifier gate follower transistor 3720 repeats this ground potential signal and applies it to diode CD3811, which is one of the busy gate inputs, thus blocking the busy gate circuits and preventing busy transistor 3810 from operating. The output of transistor 3720 is also coupled through capacitor C3704 to the connector busy modifier gate amplifier transistor 3710. Transistor 3710, which may be type CK722, serves to invert the signals from transistor 3720. When the output of transistor 3720 is at ground, the output of transistor 3710, which is taken from across collector load resistor R3707, is at −7.5 volts and vice versa. A −7.5 volt signal is derived from transistor 3710 in the call in question, and this negative signal is coupled to the fifth diode, CD3505, of the cut-through gate.

The sixth diode, CD3506, of the cut-through gate is coupled to the collector of the busy transistor 3810, which stands normally at −10.5 volts. Thus, during the sampling pulse interval, all six inputs to the cut-through gate are negative, and a short negative output pulse is derived. This pulse is coupled through capacitor C3501 to the base of cut-through gate amplifier 3530. Transistor 3530, which may be type G11A, is connected as a monostable oscillator and serves to amplify the input pulse and impress it upon the base circuit of cut-through transistor 3540 of the pentastable circuit. The operation of transistors 3530 and 3540 is identical in every respect to the operation of busy gate amplifier transistor 3800 and busy transistor 3810 in the busy circuit. A feedback connection is provided between the collector of transistor 3540 and the base circuit of transistor 3530, through resistor R3502, to prevent undesired operation of the two stages during idle periods of the finder-connector link, as described under the description of the busy circuits.

When cut-through transistor 3540 fires, the reset transistor 3330 is extinguished, and a ground potential is derived on the collector of transistor 3540, which is connected to the connector cut-through conductor CCT. This conductor is coupled to the anode of diode CD3507 which serves as one input of the switch-through "or" gate, which passes the ground potential to the switch-through follower transistor 3550. Transistor 3550, which may be type TI201, is connected as an emitter follower which is normally biased below cutoff. Transistor 3550 responds to the ground potential signal coupled to its base by saturating and applying a ground potential signal to switch-through conductor SW. Conductor SW normally stands at a potential of −10.5 volts, as determined by the emitter bleeder circuit comprising resistors R3503 and R3504 so that the busy and cut-through gates are normally enabled from this source until switch-through occurs. When conductor SW goes to ground potential, both the busy and the cut-through gates are blocked, and since conductor SW remains at ground for the remainder of the call, neither transistor 3810 nor transistor 3540 can be re-operated. It will be shown that transistor 3540 is extinguished incident to ringing trip.

At the instant of switch-through, the called line 12 is made busy to prevent intrusion from other incoming calls, and to prevent the calling in of another line finder when station 912 comes off hook in answer to the call in question. The switch-through conductor SW is coupled to the cathode of diode CD3817 which serves as one input of the link gate circuit, contained in the register section of the connector. This gate is an "and" gate for positive signals, and serves to release the positive connector gate pulse, which is derived from the secondary winding 3852 of transformer T3850 and coupled to the cathode of diode CD3818, to the link gate output. The output of the link gate is connected to the anode of diode CD3819. Diode CD3819 is one input of a two input "or" gate, the other input being in the associated line finder 17A. Thus a positive pulse in the time position of line 12 is released to conductor LG which is coupled to the switch control circuit 16A, where the connector gate pulse is amplified and passed on to the busy lead converter circuit 21. From there, the connector gate pulse is transmitted to both the connector busy conductor CB and the finder busy conductor FB. The released connector gate pulse in time position 12 is additionally transmitted by the switch control pulse amplifier to the diode switches associated with the link. In response to this pulse, diode switch 12A is triggered on, thereby connecting the talking path from line 12 to the link multiple point 13A, to which the calling line 11 has already been coupled through diode switch 11A as a result of the action of the finder gate pulse, released when the finder-connector link was seized by the calling line 11.

The cut-through conductor CCT is coupled to the ringing control circuits in the register section of the connector so that ringing may be initiated on the called line. Conductor CCT normally stands at −10.5 volts, and when the cut-through transistor 3450 fires, conductor CCT rises to ground potential. Incident to ringing trip, transistor 3540 is extinguished and conductor CCT returns to −10.5 volts. The ringing control circuits comprise two gates and two amplifiers, one gate and amplifier being used to control ringing of the tip party, the other gate and amplifier being used to control ringing of the ring party.

It will be recalled that if a first digit of "9" is dialed by the calling line, the ring-ring storage transistor 4120 is left conductive and the ring tip storage transistor 4110 is left non-conductive for the remainder of the call. In the call in question, the first digit was "9" so that transistor 4120 is on and transistor 4110 is off. A ring tip gate is provided which is arranged to act as an "and" gate for positive signals. If transistor 4110 is off, this gate is blocked by the −10.5 volt collector potential of transistor 4110 transmitted through diode CD4109 and no output can be obtained from the ring tip gate. A ring-ring gate is provided which is also arranged to act as an "and" gate for positive signals. With transistor 4120 on, this gate is enabled from this source by the applied ground potential signal from the collector of transistor 4120, which is connected to the cathode of diode CD4110. A second input to the ring-ring gate is the connector cut-through potential, connected to the diode CD4111, which goes to ground incident to switch-through. A third input to the ring-ring gate is the positive connector gate pulse derived from transformer T3850 and connected to diode CD4112. Thus the gate is enabled from this source during the time position 12 of the called line. The fourth input to the ring-ring gate is the ring-ring control signal carried by conductor RRC. This signal is generated in the common equipment circuits and stands at −10.5 volts for three seconds and rises to ground potential for the one second during which the ring-ring power conductor is energized to the line circuits of the system, called the ring-ring interval. Thus an output is obtained from the ring-ring gate in time position 12 during the ring-ring interval, and persisting so long as the connector cut-through conductor CCT is energized. These positive output pulses are repeated by the ring-ring gate follower transistor 4140, which may be type TI201, and are transmitted through diode CD4101, which is one input of an "or" gate having an input in each connector of the group, to the ringing control out conductor RCO. Conductor RCO carries the ringing control pulses in time position 12 to the ringing control driver circuit 27, where they are mixed with other ringing control pulses which may be involved with calls set up by other links of the link group, and are then transmitted to the line circuits of the group. Only line circuit 12 will respond to the ringing control pulse in time position 12, so that the ringing control circuits in that line circuit respond to the pulses by applying ringing potential to the ring side of line 12.

If the calling line had dialed 212 instead of 912, the ring tip storage transistor 4110 would remain conductive and the ring-ring storage transistor 4120 would remain non-conductive at the conclusion of dialing. In this case, the ring tip gate would function to transmit a ringing control pulse in time position 12 during the ring tip interval incident to cut-through, and the ring-ring gate would be blocked. This ringing control pulse would then be amplified by ringing tip gate follower transistor 4130 and connected to conductor RCO for transmittal to the ringing control driver circuit 27 and thence to the line circuits of the group. Line circuit 12 would respond by applying ringing potential to the tip side of line 12.

The cut-through potential on conductor CCT is also coupled to the base circuit of the cut-through amplifier transistor 3520, which is located in the control section of the connector. Transistor 3520, which may be type CK722, acts to invert the cut-through potential. When cut-through transistor 3540 is off and conductor CCT stands at −10.5 volts, transistor 3520 conducts and its output potential is at ground. When transistor 3540 is on, transistor 3520 is cut off and thus applies a −10.5 volt operating signal to the return in gate input diode CD3509. The negative connector gate pulse on conductor NCG is coupled to a second input diode, CD3510, of this "and" gate, so that incident to switch-through, this gate is enabled during time position 12. The third input to the return in gate is the multiplexer conductor MPX, carrying negative multiplexer pulses in the time positions of all lines which are off hook and connected to diode CD3511. When the called line answers, therefore, a multiplexer pulse is generated in time position 12, and is gated through the return in gate to the return in gate amplifier transistor 3510.

Transistor 3510, which may be type G11A, is a point contact monostable oscillator, and responds to the answering multiplexer pulse by generating a short negative pulse which is terminated when emitter capacitor C3502 becomes charged. The negative pulse is coupled through capacitor C3503 to the base of ring trip transistor 3500 of the penta-stable circuit. In response to this triggering pulse, transistor 3500 becomes conductive and thus extinguishes cut-through transistor 3540. The potential on conductor CCT drops to −10.5 volts, and the ringing control gates in the register section are blocked, preventing further transmission of ringing control pulses to the line circuit 12. The line circuit responds by terminating the application of ringing power to the tip or ring conductors for the remainder of the call. It will be recalled that ringing is temporarily tripped directly in the line circuit as soon as the answering party comes off hook so that ringing power is terminated even though the ring trip circuits of the connector may not operate as a result of circuit defects. However, ringing would start again if the calling line remained off hook for a period of time after the called line went on hook at the end of the call. The connector ringing trip circuit normally functions to prevent this by providing a permanent ringing trip action.

A completed connection is now set up from the calling line 11 to the called line 12. Voice signals are transmitted by way of the diode switch circuits 11A and 12A and the link multiple point 13A. The line finder 17A generates a continuous series of finder gate pulses in the time position of the calling line and the connector 18A generates a continuous series of connector gate pulses in the time position of the called line. These two sets of pulses are mixed in the switch control circuit 16A and are transmitted to the busy lead converter circuit 21. This circuit operates on these pulses in accordance with the requirements of emergency service number operation, then routes them back to all of the finders and connectors of the link group over the finder busy and connector busy conductors FB and CB, respectively. These two sets of busy pulses persist for the entire call, and terminate when the finder-connector link is released in response to a hang-up on the calling line.

Assume now that a non-executive cut-in line initiates a call to a trunk group. Assume that lines 31, 32, and 33 are members of a three-line trunk group and that the calling line dials the digits "231" to reach this group. Assume also that lines 31 and 33 of the group are busy and that the second line 32 is idle. Observed on the finder and connector busy conductors will be, among others, busy pulses in time positions 31 and 33. On the trunk hunting conductors PTH and NTH will be, among others, marking pulses in time positions 31 and 32 generated by the trunk hunting marker in circuit 40.

Referring now to the previously described executive-cut-in modifier gate of Fig. 37, it should be observed that since the calling line is not given the executive-cut-in service, a continuous ground potential is applied to the gate from the executive-cut-in reconstructor amplifier transistor 3620. Presence or absence of trunk hunting marking pulses on conductor PTH has no effect on the gate at this time, so that a continuous ground signal is transmitted by this gate to gate amplifier transistor 3700, the output of which is a continuous −10.5 volt potential. This signal biases the connector busy modifier gate so that all connector busy pulses are transmitted therethrough and are repeated by transistor 3720 and amplified by transistor 3710 to provide negative and positive connector busy pulses, respectively. In the call in question, connector busy pulses in time positions 31 and 33 will appear in the output of these two transistors.

After the calling line has dialed the digits "231," the register section of the connector responds by generating a connector pulse in time position 31, and a negative-going start signal on conductor DC–3A, all as previously described. Examining first the action of the busy gate of Fig. 38, it is seen that all of the inputs are negative during time position 31, except for the PTH input. A ground potential exists on this lead due to the positive trunk marking pulse in time position 31 so that the busy gate is prevented from transmitting a signal to the busy gate amplifier transistor 3800. Examining next the action of the cut-through gate of Fig. 35, it is seen that all of the inputs are negative during time position 31, except for the one input connected to the output of the connector busy gate amplifier transistor 3710, which carries the positive connector busy pulse in time position 31. Thus, no output is obtained from the cut-through gate to operate the cut-through amplifier transistor 3530. The connector, therefore, neither goes busy nor switches through.

Examining now the action of the six-input trunk hunting gate of Fig. 34, we find a negative potential on the DC–3A input diode CD3403, a negative potential on the switch-through conductor SW input diode CD3404, a negative connector gate in time position 31 on the NCG input diode CD3405, a negative trunk hunting pulse in time position 31 on the NTH input diode CD3406, a negative connector busy pulse in time position 31 on the CB input diode CD3407, and a negative sampling pulse in the center of the time channel on the SP input diode CD3408. Hence, since all inputs are negative, an output pulse at the center of time position 31 is obtained from the trunk hunting "and" gate for negative pulses. This negative pulse is coupled through capacitor C3403 to the trunk hunting gate amplifier transistor 3440. Transistor 3440, which may be type G11A, is a point contact monostable oscillator which operates in an identical manner to the many monostable oscillators previously described. A short negative output pulse is derived from transistor 3440 which serves to fire the trunk hunt transistor 3430 of the pentastable circuit.

When transistor 3440 fires in the manner described above, the reset transistor 3330 is extinguished. The positive collector potential on transistor 3430 is coupled back through resistor R3405 to the input of transistor 3440 to prevent undesired operation of the two stages during idle periods of the finder-connector link, as described in the description of the busy circuit of the connector. The output of transistor 3430 is amplified and inverted in transistor 3420, the trunk hunting amplifier. Transistor 3420, which may be type CK722, is normally operated in a saturated condition so that a ground potential is transmitted to the units register advancer gate. When transistor 3430 is made conductive, transistor 3420 is driven to cutoff, and a negative signal is transmitted to the units register advancer gate.

The units register advancer gate comprises two diodes connected as an "and" gate for negative signals. The signal from transistor 3420 is applied to one input diode, CD3305, while negative register drive pulses are applied over conductor RDP to the other input diode, CD3306. The gate is normally blocked by the ground signal from transistor 3420 so that the register drive pulses are not passed, but during periods when transistor 3430 is conductive, the gate is unblocked and one or more register drive pulses are transmitted through to the units register advancer transistor 3340.

Point contact transistor 3340, which may be type G11A, is connected as a monostable oscillator which conducts once in response to each register drive pulse transmitted thereto by the units register advancer gate through capacitor C3309. The output of transistor 3340 is a large negative pulse which is coupled through emitter capacitor C3310 and an "or" gate diode CD3307 to conductor URA, which in turn, couples to the common emitter of the units register, located in the register section of the connector. This negative pulse persists for the charge time of capacitor C3310. The output of the units register pulser transistor 3910 couples through a second diode, CD3901, to the units register common emitter. The units register, therefore, may be advanced by pulses generated either by the units register pulser or the units register advancer. As previously described, transistor 3910 generates pulses in response to the dialing impulses of the third dialed digit, corresponding to the units designation of the called line, and transistor 3340 generates pulses in response to register drive pulses gated during the trunk hunting interval.

Since the calling line had dialed the digits "231," the third tens register transistor, not shown, is conductive, causing a release of the third tens pulse, and the units register 1 transistor 4010 is conductive, causing a release of the first units pulse. In this way, the called line time position 31 is established. According to the present example, 31 is both in a trunk group and is busy, so that the connector neither switches through nor goes busy, but instead, energizes the trunk hunting circuits and causes the units register advancer transistor 3340 to generate a pulse which serves to advance the units register from transistor 4010 to units register 2 transistor 4020. This changes the setting of the register section so that a new connector gate pulse in time position 32 is generated. Since the register drive pulses occur once at the beginning of every third frame, a total of three connector gate pulses in time position 32 are generated by the register section. If at the end of that time the trunk hunting circuit is still activated, transistor 3340 fires again and advances the units register to units 3, not shown, causing the connector gate pulse to change to time position 33. In this manner, trunk hunting can proceed at the same rate as line finding, which is 333 steps per second.

In the particular example chosen, however, the line 32 of the trunk group is idle, so that the connector should stop trunk hunting after the units register has advanced from transistor 4010 to transistor 4020. This is done by disabling the units register advancer transistor 3340 after it has responded to a single register drive pulse.

Examination of the trunk hunting gate in the control section shows that all inputs are negative during time position 32, except the connector busy input CB. This lead stands at ground potential since there is no busy pulse during time position 32. No output is derived from the trunk hunting gate to operate the trunk hunting circuit, but due to the bistable locking nature of trunk hunt transistor 3430, this cessation of input pulses is not sufficient to terminate trunk hunting since transistor 3430 remains continuously conductive until extinguished through firing of one of the other pentastable circuit stages.

Examination of the busy gate shows that all inputs are negative during time position 32 with the exception of the busy pulse input from the connector busy modifier gate follower transistor 3720. No busy pulse exists during time position 32 so that the output of transistor 3720 stands at ground potential. No output is obtained from the busy gate, therefore, to operate the busy circuits of the connector.

Examination of the cut-through gate shows that all six inputs are negative during time position 32 since no inhibiting busy pulse is applied from the connector busy modifier gate amplifier transistor 3710. An output pulse is therefore generated during time position 32 which serves to fire the cut-through transistor 3540 of the pentastable circuit. This action in turn, extinguishes trunk hunt transistor 3430, disables the trunk hunting gate, the cut-through and the busy gate, enables the return in gate, and initiates the switch-through action of the connector, as described in a previous paragraph. Ringing of line 32 is initiated, and a busy pulse in that time position is released by way of the busy lead converter to all of the finders and connectors of the link group. Incident to the answering of the call by line 32, the ringing trip transistor 3500 operates as before, and ringing of the called line is terminated.

When transistor 4530 fires, transistor 3430 is extinguished so that the units register advancer transistor 3340 is no longer provided with register drive pulses, and cannot act to advance the units register beyond the second stage. Thus in the particular example, transistor 3340 was made to fire once to advance the units register one step from the busy trunk group line 31 to the idle trunk group line 32.

If, in the above example, a plurality of successive busy lines were encountered within the trunk group, the trunk hunting circuit would remain activated and the units register advancer transistor 3340 would continue stepping the units register until such time as an idle line was reached. It should be noted that trunk hunting persists until terminated by the action of the cut-through circuit, or, as will be shown, by the action of the busy circuit.

Assume now that in the trunk group of the previous example all of the lines of the group are busy and that a non-executive cut-in calling line initiates a call to the first line 231 of the group. The trunk hunting marking lead still carries pulses in time positions 31 and 32 as before, but the connector busy conductor CB carries negative busy pulses in time positions 31, 32, and 33. At the time that a start signal is received over conductor DC–3A, a connector gate pulse is present on conductor NCG in time position 31, as before. The cut-through gate will not pass a signal at this time since a busy pulse is present in time position 31. The busy gate will not pass a signal since a trunk hunting pulse is present in time position 31. The trunk hunting gate, however, does pass a pulse, the trunk hunting transistor 3430 fires, and the units register advancer transistor 3340 responds by driving the units register to the second stage. Since line 32 is also busy, the cut-through stage cannot operate as yet, so trunk hunting continues to line 33.

Line 33 is the last line in the trunk group and trunk hunting should stop at this point, whether the line is busy or not. If the line were idle, the cut-through transistor 3540 would operate as before. In the present example, however, line 33 is busy and the cut-through transistor 3540 cannot operate. Examining the busy gate it is seen that all inputs are negative during time position 33 since the trunk hunting pulses mark only lines 31 and 32, leaving time position 33 unguarded. A signal is passed by the busy gate, therefore, and the busy transistor 3810 responds by firing. This in turn, serves to extinguish trunk hunting transistor 3430, terminating trunk hunting, and the connector is placed in its permanent busy condition.

Assume now that line 21 is given the executive-cut-in feature, and that line 21 seizes the finder-connector link and initiates a call to an idle line, such, for example, as line 12. Line 21 is marked by a negative pulse on the executive-cut-in conductor ECI, occurring in time position 21, and generated by the executive-cut-in marking generator contained in circuit 40.

When the line finder seizes line 21, it transmits a negative finder gate in time position 21 over conductor NFG to the executive-cut-in gate of Fig. 36 in the control section of the connector. As previously described, this is a three-input "and" gate for negative signals, and the negative executive-cut-in pulse 21 and the sampling pulses are applied to the other two inputs. All three inputs are therefore negative during time position 21, and the gate responds by delivering a negative output pulse once each frame for the duration of the call to the executive-cut-in gate amplifier transistor 3600. This amplifier responds by providing a positive output pulse for each input pulse, and drives the executive-cut-in reconstructor transistor 3610. Transistor 3610 responds by providing a positive-going output signal which is coupled through a low-pass filter to the executive-cut-in reconstructor amplifier transistor 3620. The output of transistor 3620, as was described previously, normally stands at ground potential. When an executive-cut-in line seizes the link, transistor 3620 is driven to saturation, and the output potential drops to −10.5 volts. This potential is maintained from the instant of seizure of the link until the end of the call.

The executive-cut-in modifier gate is now provided with two negative input signals; one being the output of transistor 3620, and the other being the normally negative potential existing on the trunk hunting conductor PTH. During the time period 12 in question, no trunk hunting marking pulses are present. The output of the executive-cut-in modifier gate is therefore a negative potential, which is amplified and inverted in the gate amplifier transistor 3700. The output of transistor 3700, which normally stands at −10.5 volts, now stands at ground potential for the remainder of the call since the call was originated at an executive-cut-in line.

The connector busy modifier gate is an "inhibitor" gate, so arranged that the ground potential signal applied to one of its inputs from transistor 3700 blocks it from transmitting any connector busy pulses appearing on the connector busy conductor CB. A continuous ground potential signal is derived on the output of the connector busy modifier gate, which is repeated as a ground potential signal by the connector busy modifier gate follower transistor 3720, and is inverted to a negative 7.5 volt signal by the connector busy modifier gate amplifier transistor 3710. The ground potential from transistor 3720 serves to block the busy gate and the −7.5 volt signal from transistor 3710 serves to unblock the cut-through gate. Incident to the application of the start signal from DC–3A, therefore, the connector responds by cutting through, whether the line 12 is busy or not, since all connector busy pulses are blocked by the executive-cut-in signal.

Assume now that the executive-cut-in line 21 calls the trunk group 31, 32, and 33 referred to above, and that all three lines of the group are busy. Under these conditions, it is desirable to permit trunk hunting to take place in the normal fashion so that an idle line will be chosen for the call if it is available. If all the lines in the group are busy, then the executive-cut-in line is allowed to cut through on the last line of the group where a non-executive cut-in line would not cut through and would merely receive a busy tone.

Examining the inputs to the executive-cut-in modifier gate, it is seen that a continuous negative potential is presented to one input from transistor 3620, and that the positive trunk hunting pulses are applied to the other input over conductor PTH. These positive pulses will overcome the negative potential from transistor 3620 by blocking diode CD3702, and the output will contain positive trunk hunting pulses for the two time positions 31 and 32. Transistor 3700 repeats these pulses as negative pulses to the input of the connector busy modifier gate so that the gate is allowed to pass busy pulses appearing on conductor CB during those two intervals. It will be remembered that during periods not marked by trunk hunting pulses, however, a negative signal is derived from transistor 3700 which serves to block the connector busy modifier gate against transmission of busy pulses. To put it another way, the positive trunk hunting pulses on conductor PTH serve to cancel the executive-cut-in signal for all time positions corresponding to all trunk group lines other than the last line of each group. In this way, the connector operation is normal with respect to trunk hunting even though the calling line may be given the executive-cut-in feature.

If all three lines 31, 32, and 33 are busy in the present example, busy pulses will be transmitted in time positions 31 and 32 so that trunk hunting will take place and drive the connector to line 33. Although line 33 is busy, the busy pulse on conductor CB in time position 33 is canceled by the executive-cut-in potential, so that the connector will cut through. Operation of the remainder of the connector is the same as before, and is unaffected by the executive-cut-in circuits.

*Switch control circuit 16A*

This circuit is shown in Fig. 9. It will be recalled that the finder gate pulse and the connector gate pulse are mixed in a two-input "or" gate, the output of which is called the link gate conductor LG. This conductor is coupled through capacitor C902 to the grid of amplifier 920, which may be a 6AG7. Tube 920, which is normally biased for non-conduction through resistor R903, responds to the positive input pulses by generating negative pulses in the primary winding 931 of plate transformer T930. The purpose of the amplifier is to increase the power of the finder and connector gate pulses to the point where they may be delivered at a suitable low impedance level to the one hundred diode switch circuits 11A–00A associated with link A. Two outputs are obtained from the secondary side of the transformer; secondary winding 932 providing positive output pulses and secondary winding 933 providing negative output pulses. Winding 932 is coupled to diode CD903 which serves as one input of an "or" gate. The other inputs comprise the other finder-connector link switch control circuits such as 16B and 16C, and the auxiliary pulse amplifier 20. The output of this gate is the link busy conductor LB, which is coupled to the input of the busy lead converter circuit 21.

Secondary winding 933 is coupled to diode CD904 which is one input of a two-diode "and" gate. Sampling pulses from the sampling pulse amplifier 29 are applied to diode CD905 which is the other input of this gate, so that two narrow pulses appear at the output; one corresponding to the finder gate pulse, and the other corresponding to the connector gate pulse. These narrow pulses are called switch control pulses and are coupled by way of the switch control conductor SC to all of the diode switch circuits associated with link A. As previously described, these pulses serve to operate the diode switches associated with the calling and called lines.

While there has been disclosed what is at present considered to be the preferred embodiment of the invention, other modifications will readily occur to those skilled in the art. For example, it should be apparent that the invention can be utilized not only in telephone systems but in telegraph and other communication circuits as well. It is not, therefore, desired that the invention be limited to the specific arrangement shown and described, and it is intended to cover in the appended claims all such modifications as fall within the true spirit and scope of the invention.

What is claimed is:

1. In a telephone system, a plurality of lines having individually assigned thereto different time positions which recur in repetitive time position frames, said lines being divided into first and second classes, a plurality of directively controllable line selecting links common to said lines, each of said links including means for marking as busy calling and called ones of said lines to said links as said lines are taken into use, and time position controlled means responsive only when a call is initiated on a line of said first class for completing a communication connection to a busy line.

2. In a telephone system, a plurality of lines having individually assigned thereto different time positions which recur in repetitive time position frames, said lines being divided into first and second classes, a plurality of directively controllable line selecting links common to said lines, means in each of said links for marking as busy calling and called ones of said lines to said links as said lines are taken into use, and time position controlled means responsive only on calls initiated by lines of said first class for controlling the establishment of a communication connection between the calling and called lines irrespective of the idle or busy condition of the called line.

3. In a telephone system, a plurality of lines having individually assigned thereto different time positions which recur in repetitive time position frames, said lines being divided into first and second classes, a plurality of directively controllable line selecting links common to said lines, means common to said links for developing class marking pulses in the time positions of lines of said first class, each of said links including means for marking as busy calling and called ones of said lines to said links as said lines are taken into use, and means in each link operative to control the establishment of a communication connection between the calling line and a selected busy one of said lines, said last named means being operated only when the calling line coincides in time position with one of said class marking pulses.

4. In a telephone system, a plurality of lines which may be idle or busy, said lines having individually assigned thereto different time positions which recur in repetitive time position frames, a connector, means for transmitting input pulses in the time position of a calling line to said connector, means for modulating said input pulses in accordance with dial impulses received over the calling line, means in said connector responsive to modulated input pulses for selecting a called line, means for developing class marking pulses in the time positions of certain ones of said lines, means in said connector for comparing the time position of said input pulses with the time positions of said class marking pulses, cut-through means in said connector operable to control the establishment of a communication connection between the calling and called lines, means for operating said cut-through means only when the called line is idle if the input pulses do not coincide in time position with the class marking pulses, and means for operating said cut-through means whether the called line is idle or busy if the input pulses coincide in time position with the class marking pulses.

5. In a telephone system, a plurality of lines having individually assigned thereto different time positions which recur in repetitive time position frames, said lines being divided into first and second classes, a connector having connected thereto an input conductor, a busy marking conductor, and an executive-cut-in conductor, means for applying pulses in the time position of a calling line to said input conductor, means for modulating said pulses in the time position of the calling line in accordance with dial impulses received over the calling line, means in said connector responsive to dial impulse modulations for selecting a called line and for developing connector gate pulses in the time position of the called line, means for applying busy marking pulses in the time positions of busy lines of the system to said busy marking conductor, means for applying class marking pulses in the time positions of lines of said first class to said executive-cut-in conductor, cut-through means in said connector operative to control the establishment of a communication connection between a calling line and a called line, means for operating said cut-through means only when said connector gate pulses do not coincide in time position with the busy marking pulses on said busy marking conductor if the calling line pulses on said input conductor do not coincide in time position with the class marking pulses on said executive-cut-in conductor, and means for operating said cut-through means even when said connector gate pulses coincide in time position with the busy marking pulses on said busy marking conductor if the calling line pulses on said input conductor coincide in time position with the class marking pulses on said executive-cut-in conductor.

6. In a telephone system, a plurality of lines having individually assigned thereto different time positions which recur in repetitive time position frames, said lines being divided into first and second classes, a connector having connected thereto an input conductor, a busy marking conductor, and an executive-cut-in conductor, means for applying pulses in the time position of a calling line to said input conductor, means for modulating said pulses in the time position of the calling line in accordance with dial impulses received over the calling line, means in said connector responsive to dial impulse modulations for selecting a called line and for developing connector gate pulses in the time position of the called line, means for applying busy marking pulses in the time positions of busy lines of the system to said busy marking conductor, a cut-through circuit in said connector for comparing the time position of said connector gate pulses and the busy marking pulses on said busy marking conductor, means for operating said cut-through circuit to control the establishment of a communication connection between the calling and called lines only if the connector gate pulses do not coincide in time position with busy marking pulses on said busy marking conductor, means for applying class marking pulses in the time positions of lines of said first class to said executive-cut-in conductor, means in said connector for comparing the time position of the calling line pulses on said input conductor and the class marking pulses on said executive-cut-in conductor, and means operative to block the transmission of busy marking pulses to said cut-through circuit if the calling line coincides in time position with a class marking pulse, whereby said cut-through circuit is operated even though the called line is busy.

7. In a telephone system, a plurality of lines having individually assigned thereto different time positions which recur in repetitive time position frames, a plurality of directively controllable line selecting links common to said lines, means common to said links for developing class marking pulses in the time positions of certain ones of said lines to mark said lines as executive-cut-in lines, means common to said links for developing trunk marking pulses in the time positions of certain of said lines to mark said lines as trunk lines, each of said links including means for marking as busy calling and called lines to said links as said lines are taken into use, and means in each link operative to control the establishment of a communication connection between the calling line and a selected busy one of said lines, said last named means being effective only when the calling line coincides in time position with said class marking pulses and the called line does not coincide in time position with said trunk marking pulses.

8. In a telephone system, a plurality of lines having individually assigned thereto different time positions which recur in repetitive time position frames, a connector having connected thereto an input conductor, a busy marking conductor, an executive-cut-in conductor, and a trunk hunting conductor, means for applying pulses in the time position of a calling line to said input conductor, means for modulating said pulses in the time position of the calling line in accordance with dial impulses received over the calling line, means in said connector responsive to dial impulse modulations for selecting a called line and for developing connector gate pulses in the time position of the called line, means for applying busy marking pulses in the time positions of busy lines of the system to said busy marking conductor, means for applying class marking pulses in the time positions of certain of said lines to said executive-cut-in conductor, means for applying trunk marking pulses in the time positions of certain of said lines to said trunk hunting conductor, cut-through means in said connector operative to control the establishment of a communication connection between a calling line and a called line, means for operating said cut-through means only when said connector gate pulses do not coincide in time position with the busy marking pulses on said busy marking conductor if the calling line pulses on said input conductor do not coincide in time position with the class marking pulses on said executive-cut-in conductor, and means for operating said cut-through means even when said connector gate pulses coincide in time position with the busy marking pulses on said busy marking conductor if the calling line pulses on said input conductor coincide in time position with the class marking pulses on said executive-cut-in conductor provided that the connector gate pulses do not coincide in time position with the trunk marking pulses on said trunk hunting conductor.

9. In a telephone system, a plurality of lines having individually assigned thereto different time positions which recur in repetitive time position frames, a connector having connected thereto an input conductor, a busy marking conductor, an executive-cut-in conductor, and a trunk hunting conductor, means for applying pulses in the time position of a calling line to said input conductor, means for modulating said pulses in the time position of the calling line in accordance with dial impulses received over the calling line, means in said connector responsive to dial impulse modulations for selecting a called line and for developing connector gate pulses in the time position of the called line, means for applying busy marking pulses in the time positions of busy lines of the system to said busy marking conductor, a cut-through circuit in said connector for comparing the time position of said connector gate pulses and the busy marking pulses on said busy marking conductor, means for operating said cut-through circuit to control the establishment of a communication connection between the calling and called lines only if the connector gate pulses do not coincide in time position with busy marking pulses on said busy marking conductor, means for applying class marking pulses in the time positions of certain of said lines to said executive-cut-in conductor, means for applying trunk marking pulses in the time positions of certain of said lines to said trunk hunting conductor to mark said lines as trunk lines, means for comparing the time position of the calling line pulses on said input conductor and the time position of the class marking pulses on said executive-cut-in conductor, a connector busy modifier gate interposed in a connection between said busy marking conductor and said cut-through circuit, means in said connector busy modifier gate for permitting the transmission of busy marking pulses to said cut-through circuit if the calling line does not coincide in time position with the class marking pulses on said executive-cut-in conductor, and means in said connector busy modifier gate for blocking the transmission of all busy marking pulses except those which coincide in time position with the trunk marking pulses to said cut-through circuit if the calling line coincides in time position with the class marking pulses on the executive-cut-in conductor.

10. In a telephone system, a plurality of lines having individually assigned thereto different time positions which recur in repetitive time position frames, a plurality of directively controllable line selecting links common to said lines, means common to said links for developing class marking pulses in the time positions of certain ones of said lines to mark said lines as executive-cut-in lines, means common to said links for developing trunk marking pulses in the time positions of certain ones of said lines to mark said lines as trunk lines, each trunk group including those lines marked with trunk marking pulses which have adjacent time positions assigned thereto plus the line having a time position immediately succeeding the time position of the last line so marked, means in each link for marking as busy calling and called lines to said links as said lines are taken into use, trunk hunting means in each link, means for operating said trunk hunting means in response to the selection of a busy line which coincides in time position with said trunk marking pulses to control the selection of the next succeeding line, means in each link operative to control the establishment of a communication connection between the calling line and a selected busy one of said lines, said last named means being effective only when the calling line coincides in time position with said class marking pulses and the called line does not coincide in time position with said trunk marking pulses, whereby if all trunk lines of a selected trunk line group are busy a communication connection is completed between a calling executive-cut-in line and the last trunk line of the trunk line group.

11. In a telephone system, a plurality of lines having individually assigned thereto different time positions which recur in repetitive time position frames, a connector having connected thereto an input conductor, a busy marking conductor, an executive-cut-in conductor, and a trunk hunting conductor, means for connecting applying pulses in the time position of a calling line to said input conductor, means for modulating said pulses in the time position of the calling line in accordance with dial impulses received over the calling line, means in said connector responsive to dial impulse modulations for selecting a called line and for developing connector gate pulses in the time position of the called line, means for applying busy marking pulses in the time positions of busy lines of the system to said busy marking conductor, means for applying class marking pulses in the time positions of certain of said lines to said executive-cut-in conductor, means for applying trunk marking pulses in the time positions of certain of said lines to said trunk hunting conductor, each trunk group including those lines marked with trunk marking pulses which have adjacent time positions assigned thereto plus the line having a time position immediately succeeding the time position of the last line so marked, trunk hunting means in said connector, means for operating said trunk hunting means to control the selection of the next succeeding line when the connector gate pulses coincide in time position with busy marking pulses on said busy marking conductor and with trunk marking pulses on said trunk hunting conductor, cut-through means in said connector operative to control the establishment of a communication connection between a calling line and a called line, means for operating said cut-through means only when said connector gate pulses do not coincide in time position with the busy marking pulses on said busy marking conductor if the calling line pulses on said input conductor do not coincide in time position with the class marking pulses on said executive-cut-in conductor, and means for operating said cut-through means even when said connector gate pulses coincide in time position with the busy marking pulses on said busy marking conductor if the calling line pulses on said input conductor coincide in time position with the class marking pulses on said executive-cut-in conductor provided that the connector gate pulses do not coincide in time position with the trunk marking pulses on said trunk hunting conductor, whereby if all trunk lines of a selected trunk line group are busy, a communication connection is completed between a calling executive-cut-in line and the last trunk line of the trunk line group.

12. In a telephone system, a plurality of subscriber lines, said subscriber lines being divided into first and second classes, an emergency service line accessible to said subscriber lines, a plurality of directively controllable line selecting links common to said subscriber lines, each of said links including means for marking as busy calling and called ones of said lines to said links as said lines are taken into use, cut-through means in each link normally operative to control the establishment of a communication connection between a calling subscriber line and a selected idle one of said subscribed lines, means for operating said cut-through means when the selected subscriber line is busy, said last mentioned means being effective only if the calling subscriber line is of said first class, and means for operating said cut-through means when the emergency service line is selected, said last mentioned means being effective whether the emergency service line is idle or busy and whether the calling line is of said first or said second class.

13. In a telephone system, a plurality of subscriber lines and an emergency service line, each of said lines having individually assigned thereto different time positions which recur in repetitive time position frames, said subscriber lines being divided into first and second classes, a plurality of directively controllable line selecting links common to said lines, means common to said links for developing class marking pulses in the time positions of said lines of said first class, each of said links including means for marking as busy calling and called ones of said lines to said links as said lines are taken into use, cut-through means in each link normally operative to control the establishment of a communication connection between a calling subscriber line and a selected idle one of said subscriber lines, means for operating said cut-through means when the selected subscriber line is busy, said last mentioned means being effective only when the calling line coincides in time position with one of said class marking pulses, and means for operating said cut-through means when the emergency service line is selected, said last mentioned means being effective whether the emergency service line is idle or busy and whether or not the calling line coincides in time position with one of said class marking pulses.

14. In a telephone system, a plurality of subscriber lines and an emergency service line, each of said lines having individually assigned thereto different time positions which recur in repetitive time position frames, a plurality of connectors common to said lines, means for operatively associating said connectors individually with calling ones of said lines, each of said connectors being directively controlled over its associated calling line to select a called line, means in each connector for developing connector gate pulses in the time position of its selected called line, cut-through means in each connector operative to control the establishment of a communication connection between its associated calling line and an idle selected called line, a busy lead converter circuit, means in each connector responsive to the operation of its cut-through means for transmitting the connector gate pulses in the time position of its selected called line to said busy lead converter circuit, a connector busy marking conductor common to said connectors, means in said busy lead converter circuit for repeating connector gate pulses appearing in the time positions of subscriber lines to said connector busy marking conductor, means in said busy lead converter circuit for absorbing connector gate pulses in the time position of the emergency service line, and means in each connector for preventing the operation of its cut-through means if any of the pulses originating in other connectors and appearing on said connector busy marking conductor coincide in time position with its selected called line.

15. In a telephone system, a plurality of subscriber lines and an emergency service line, each of said lines having individually assigned thereto different time positions which recur in repetitive time position frames, a plurality of links common to said lines, each of said links comprising a line finder and a directively controllable connector, each of said line finders including means for generating finder gate pulses in the time position of a calling line when said calling line is seized, each of said connectors including means for generating connector gate pulses in the time position of a called line when the called line is seized, a busy lead converter circuit, means for transmitting said finder gate pulses and said connector gate pulses to said busy lead converter circuit, a finder busy marking conductor common to said line finders, a connector busy marking conductor common to said connectors, means in said busy lead converter circuit for repeating said finder gate pulses and said connector gate pulses to said finder busy marking conductor, means for continuously developing pulses in the time position of said emergency service line, means for applying said last mentioned pulses to said finder busy marking conductor, means in said busy lead converter circuit for repeating finder gate pulses and connector gate pulses appearing in the time positions of any line except said emergency service line to said connector busy marking conductor, means in each line finder for preventing the line finder from seizing a line which coincides in time position with any pulse on said finder busy marking conductor, and means in each connector for preventing the connector from seizing a line which coincides in time position with any pulse on said connector busy marking conductor.

16. In a telephone system, a plurality of lines, first and second line circuits associated with one of said lines, a plurality of line circuits individually associated with each of the remaining lines, a plurality of connectors having access to all of said line circuits, each of said connectors being arranged to be directively controlled by a calling one of said lines to select a called line circuit and to control the extension of a communication connection between the calling line and the called line if the line circuit associated with the called line is marked as idle, means for marking said first line circuit as idle to said connectors at all times, and means for marking said second line circuit as busy to said connectors when said first line circuit is selected by any one of said connectors.

17. In a telephone system, a plurality of lines, first and second line circuits associated with one of said lines, a plurality of line circuits individually associated with each of the remaining lines, each of said line circuits havng individually assigned thereto different time positions which recur in repetitive time position frames, a plurality of connectors having access to all of said line circuits, means for operatively associating said connectors individually with calling ones of said lines, each of said connectors being directively controlled over its associated calling line to select a called line circuit, means in each connector for developing connector gate pulses in the time position of its selected called line circuit, cut-through means in each connector operative to control the establishment of a communication connection between its associated calling line and the line associated with an idle selected line circuit, a busy lead converter circuit, means in each connector responsive to the operation of its cut-through means for transmitting the connector gate pulses in the time position of its selected called line circuit to said busy lead converter circuit, a connector busy marking conductor common to said connectors, means in said busy lead converter circuit for repeating connector gate pulses appearing in the time position of any line circuit except said first line circuit to said connector busy marking conductor, means in said busy lead converter circuit responsive to the receipt of connector gate pulses in the time position of said first line circuit for developing pulses in the time position of said second line circuit and for connecting said developed pulses to said connector busy marking conductor, and means in each connector for preventing the operation of its cut-through means if any of the pulses appearing on said connector busy marking conductor coincide in time position with its selected called line circuit.

18. In a telephone system, a plurality of lines, first and second line circuits associated with one of said lines, a plurality of line circuits individually associated with each of the remaining lines, a plurality of line finder-connector links having access to all of said line circuits, means for assigning a particular link to handle a call, means in the assigned line finder for seizing a calling line circuit, means in the assigned connector responsive to directive control over the calling line for selecting a called line circuit, means in the assigned connector operative to control the extension of a communication connection between the calling line and the called line if the line circuit associated with the called line is idle, means for marking said first line circuit as idle to said connectors at all times, means for preventing the mark- of said first line circuit as a calling line to said line finders at any time, means for marking said second line circuit as busy to said connectors when said first line circuit is selected by any one of said connectors, and means for preventing the marking of said second line circuit as a calling line to said line finders when a call to said first line circuit is answered.

19. In a telephone system, a plurality of lines, first and second line circuits associated with one of said lines, a plurality of line circuits individually associated with each of the remaining lines, each of said line circuits having individually assigned thereto different time positions which recur in repetitive time position frames, a plurality of links common to said lines, each of said links comprising a line finder and a directively controllable connector, each of said line finders including means for generating finder gate pulses in the time position of the line circuit associated with a calling line when the line circuit is seized, each of said connectors including means for generating connector gate pulses in the time position of the selected called line circuit when the line circuit is seized, a busy lead converter circuit, means for transmitting said finder gate pulses and said connector gate pulses to said busy lead converter circuit, a finder busy marking conductor common to said line finders, a connector busy marking conductor common to said connectors, means in said busy lead converter circuit for repeating finder gate pulses and connector gate pulses appearing in the time position of any line circuit to said finder busy marking conductor, means for continuously developing pulses in the time position of said first line circuit, means for applying said last mentioned pulses to said finder busy marking conductor, means in said busy lead converter circuit for repeating finder gate pulses and connector gate pulses appearing in the time position of any line circuit except said first line circuit to said connector busy marking conductor, means in said busy lead converter circuit responsive to the receipt of connector gate pulses in the time position of said first line circuit for developing pulses in the time position of said second line circuit, means for applying said last mentioned pulses to both said finder busy marking conductor and said connector busy marking conductor, means in each line finder for preventing the line finder from seizing a line which coincides in time position with any pulse on said finder busy marking conductor, and means in each connector for preventing the connector from seizing a line which coincides in time position with any pulse on said connector busy marking conductor.

20. In a telephone system, a plurality of lines, first and second line circuits associated with one of said lines, a plurality of line circuits individually associated with each of the remaining lines, each of said line circuits having individually assigned thereto different time positions which recur in repetitive time position frames, a plurality of line finder-connector links having access to all of said line circuits, means for assigning a particular link to handle a call, an input conductor common to said links, means for applying input pulses in the time positions of all line circuits which are originating or terminating calls to said input conductor, seizing means in the assigned line finder responsive to the receipt of input pulses in the time position of a line circuit which has not been previously seized by one of said other links for associating the assigned link with that calling line circuit, a busy lead converter circuit, means in the assigned line finder for generating finder gate pulses in the time position of the calling line circuit, means for transmitting said finder gate pulses to said busy lead converter circuit, means in the assigned connector responsive to dial impulses received over the calling line for selecting a called line circuit, means in the assigned connector for developing connector gate pulses in the time position of the called line circuit, cut-through means in the assigned connector for controlling the establishment of a communication connection between the calling line and the line associated with an idle called line circuit, means in the assigned connector responsive to the operation of its cut-through means for transmitting said connector gate pulses to said busy lead converter circuit, a finder busy marking conductor common to said line finders, a connector busy marking conductor common to said connectors, means in said busy lead converter for repeating finder gate pulses and connector gate pulses appearing in the time position of any line circuit to said finder busy marking conductor, means for continuously developing pulses in the time position of said first line circuit, means for applying said last mentioned pulses to said finder busy marking conductor, means in said busy lead converter circuit for repeating finder gate pulses and connector gate pulses appearing in the time position of any line circuit except said first line circuit to said connector busy marking conductor, means in said busy lead converter circuit responsive to the receipt of connector gate pulses in the time position of said first line circuit for developing pulses in the time position of said second line circuit, means for connecting said last mentioned pulses to both said finder busy marking conductor and said connector busy marking conductor, means in each line finder for preventing the operation of its seizing means if the input pulses on said input conductor coincide in time position with any of the pulses on said finder busy marking conductor, and means in each of said connectors for preventing the operation of its cut-through means if any of the pulses on said connector busy marking conductor coincide in time position with the connector gate pulses developed by the connector in the time position of the selected called line circuit.

21. In a telephone system, a plurality of lines which may be idle or busy, said lines having individually assigned thereto different time positions which recur in repetitive time position frames, a connector, means for transmitting input pulses in the time position of a calling line to said connector, means for modulating said input pulses in accordance with dial impulses received over the calling line, means in said connector responsive to dial impulse modulations for selecting a called line, a reset circuit in said connector, a cut-through circuit in said connector, each of said circuits comprising bi-stable means having first and second operated conditions, first and second terminals associated with each of said bi-stable means, a common connection between the first terminals of said bi-stable means, said circuits being arranged such that only one of said bi-stable means is operated to its first operated condition at any one time and controlled so that the reset circuit bi-stable means is operated to its first operated condition at the time that input pulses are received by the connector, means for developing class marking pulses in the time positions of certain ones of said lines, means in said connector for comparing the time position of said class marking pulses and said input pulses, means for connecting an operating signal to the second terminal of said cut-through circuit bi-stable means only when the called line is idle if the input pulses do not coincide in time position with said class marking pulses, means for connecting an operating signal to the second terminal of said cut-through circuit bi-stable means whether the called line is idle or busy if the input pulses coincide in time position with the class marking pulses, said cut-through circuit bi-stable means being operated to its first operated condition responsive to said operating signal to control the establishment of a communication connection between the calling and called lines, and means including said common connection for operating said reset circuit bi-stable means to its second operated condition responsive to the operation of said cut-through circuit bi-stable means to its first operated condition.

22. In a telephone system, a plurality of lines which may be idle or busy, a connector directively controllable by a calling one of said lines to select a called line, a cut-through circuit in said connector, a busy marking circuit in said connector, a reset circuit in said connector, each of said circuits comprising bi-stable means having first and second operated conditions, first and second terminals associated with each of said bi-stable means, a common connection between said first terminals, said circuits being arranged such that only one of said bi-stable means is operated to its first operated condition at any one time and controlled so that the reset circuit bi-stable means is operated to its first operated condition at the time that the connector is taken into use by a calling line, means responsive to the selection of an idle called line for connecting an operating signal to the second terminal of said cut-through circuit bi-stable means, said cut-through circuit bi-stable means being operated to its first operated condition responsive to said operating signal to control the establishment of a communication connection between the calling and called lines, a source of busy tone, means responsive to the selection of a busy called line for connecting an operating signal to the second terminal of said busy marking circuit bi-stable means, said busy marking circuit bi-stable means being operated to its first operated condition responsive to said operating signal to control the connection of said busy tone source to the calling line, and means including said common connection for operating said reset circuit bi-stable means to its second operated condition responsive to the operation of either said cut-through circuit bi-stable means or said busy marking circuit bi-stable means to its first operated condition.

23. In a telephone system, a plurality of lines which may be idle or busy, a connector directively controllable by a calling one of said lines to select a called line, a cut-through circuit in said connector, a busy marking circuit in said connector, a reset circuit in said connector, each of said circuits comprising a semi-conductor device having first and second electrodes, a common connection between said first electrodes, said circuits being arranged such that only one of said devices is conductive at any one time and controlled so that the reset circuit device is conductive at the time that the connector is taken into use by a calling line, means responsive to the selection of an idle called line for connecting an operating signal to the second electrode of said cut-through circuit device, said cut-through circuit device becoming conductive responsive to said operating signal to control the establishment of a communication connection between the calling and called lines, a source of busy tone, means responsive to the selection of a busy called line for connecting an operating signal to the second electrode of said busy marking circuit device, said busy marking circuit device becoming conductive responsive to said operating signal to control the connection of said busy tone source to the calling line, and means including said common connection for rendering said reset circuit device non-conductive responsive to the conduction of either said cut-through circuit device or said busy circuit device.

24. The telephone system of claim 23 in which the semi-conductor device is a transistor.

25. The telephone system of claim 23 in which the semi-conductor device is a transistor, the first electrode is an emitter electrode, and the second electrode is a base electrode.

26. In a telephone system, a plurality of lines which may be idle or busy, means for marking some of said lines as trunk lines, a connector directively controllable by a calling one of said lines to select a called line, a trunk hunting circuit in said connector, a cut-through circuit in said connector, a busy marking circuit in said connector, a reset circuit in said connector, each of said circuits comprising bi-stable means having first and second operated conditions, first and second terminals associated with each of said bi-stable means, a common connection between said first terminals, said circuits being arranged such that only one of said bi-stable means is operated to its first operated condition at any one time and controlled so that the reset circuit bi-stable means is operated to its first operated condition at the time that the connector is taken into use by a calling line, means responsive to the selection of a busy called line which is marked as a trunk line for connecting an operating signal to the second terminal of said trunk hunting circuit bi-stable means, said trunk hunting circuit bi-stable means being operated to its first operated condition responsive to said operating signal to control the selection of the next succeeding line, means including said common connection for operating said reset circuit bi-stable means to its second operated condition responsive to the operation of said trunk hunting circuit bi-stable means to its first operated condition, means responsive to the selection of an idle called line for connecting an operating signal to the second terminal of said cut-through circuit bi-stable means, said cut-through circuit bi-stable means being operated to its first operated condition responsive to said operating signal to control establishment of a communication connection between the calling and called lines, a source of busy tone, means responsive to the selection of a busy called line which is not marked as a trunk line for connecting an operating signal to the second terminal of said busy marking circuit bi-stable means, said busy marking circuit bi-stable means being operated to its first operated condition responsive to said operating signal to control the connection of said busy tone source to the calling line, means including said common connection for operating said reset circuit bi-stable means or said trunk hunting bi-stable means to its second operated condition responsive to the operation of either said cut-through circuit bi-stable means or said busy marking circuit bi-stable means to its first operated condition.

27. In a telephone system, a plurality of lines which may be idle or busy, means for marking some of said lines as trunk lines, a connector directively controllable by a calling one of said lines to select a called line, a trunk hunting circuit in said connector, a cut-through circuit in said connector, a busy marking circuit in said connector, a reset circuit in said connector, each of said circuits comprising a semi-conductor device having first and second electrodes, a common connection between said first electrodes, said circuits being arranged such that only one of said devices is conductive at any one time and controlled so that the reset circuit device is conductive at the time that the connector is taken into use by a calling line, means responsive to the selection of a busy called line which is marked as a trunk line for connecting an operating signal to the second electrode of said trunk hunting circuit device, said trunk hunting circuit device becoming conductive responsive to said operating signal to control the selection of the next succeeding line, means including said common connection for rendering said reset circuit device non-conductive if said trunk hunting circuit device becomes conductive, means responsive to the selection of an idle called line for connecting an operating signal to the second electrode of said cut-through circuit device, said cut-through circuit device becoming conductive responsive to said operating signal to control the establishment of a communication connection between the calling and called lines, a source of busy tone, means responsive to the selection of a busy called line which is not marked as a trunk line for connecting an operating signal to the second electrode of said busy marking circuit device, said busy marking circuit device becoming conductive responsive to said operating signal to control the connection of said busy tone source to the calling line, and means including said common connection for rendering said reset circuit device or said trunk hunting circuit device non-conductive responsive to the conduction of either said cut-through circuit device or said busy marking circuit device.

28. The telephone system of claim 27 in which the semi-conductor device is a transistor.

29. The telephone system of claim 27 in which the semi-conductor device is a transistor, the first electrode is an emitter electrode, and the second electrode is a base electrode.

30. In a telephone system, a plurality of lines having individually assigned thereto different time positions which recur in repetitive time position frames, a connector having connected thereto an input conductor and a busy marking conductor, means for applying pulses in the time position of a calling line to said input conductor, means for modulating said pulses in accordance with dial impulses received over the calling line, means in said connector responsive to said dial impulse modulations for selecting a called line and for developing connector gate pulses in the time position of the called line, means for applying busy marking pulses in the time positions of busy lines of the system to said busy marking conductor, a reset circuit in said connector, a cut-through circuit in said connector, a busy marking circuit in said connector, each of said circuits comprising bi-stable means having first and second operated conditions, first and second terminals associated with each of said bi-stable means, a common connection between the first terminals of said bi-stable means, said circuits being arranged such that only one of said bi-stable means is operated to its first operated condition at any one time and controlled so that the reset circuit bi-stable means is operated to its first operated condition at the time that pulses in the time position of a calling line are connected to said input conductor, a source of busy tone, means for connecting an operating signal to the second terminal of said busy marking circuit bi-stable means if the connector gate pulses coincide in time position with the busy marking pulses on said busy marking conductor, said busy marking circuit bi-stable means being operated to its first operated condition responsive to said operating signal to control the connection of said busy tone source to the calling line, means for connecting an operating signal to the second terminal of said cut-through circuit bi-stable means if the connector gate pulses do not correspond in time position with the busy marking pulses on said busy marking conductor, said cut-through circuit bi-stable means being operated to its first operated condition responsive to said operating signal to control the establishment of a communication connection between the calling and called lines, and means including said common connection for operating said reset circuit bi-stable means to its second operated condition responsive to the operation of either said busy marking circuit bi-stable means or said cut-through circuit bi-stable means to its first operated condition.

31. In a telephone system, a plurality of lines having individually assigned thereto different time positions which recur in repetitive time position frames, a connector having connected thereto an input conductor and a busy marking conductor, means for applying pulses in the time position of a calling line to said input conductor, means for modulating said pulses in accordance with dial impulses received over the calling line, means in said connector responsive to said dial impulse modulations for selecting a called line and for developing connector gate pulses in the time position of the called line, means for applying busy marking pulses in the time positions of busy lines of the system to said busy marking conductor, a reset circuit in said connector, a cut-through circuit in said connector, a busy marking circuit in said connector, each of said circuits comprising a semi-conductor device having first and second electrodes, a common connection between the first electrodes of said devices, said circuits being arranged such that only one of said devices is conductive at any one time and controlled so that the reset circuit device is conductive at the time that pulses in the time position of a calling line are connected to said input conductor, a source of busy tone, means for connecting an operating signal to the second electrode of said busy marking circuit device if the connector gate pulses coincide in time position with the busy marking pulses on said busy marking conductor, said busy marking circuit device becoming conductive responsive to said operating signal to control the connection of said source of busy tone to the calling line, means for connecting an operating signal to the second electrode of said cut-through circuit device if the connector gate pulses do not correspond in time position with the busy marking pulses on said busy marking conductor, said cut-through circuit device becoming conductive responsive to said operating signal to control the establishment of a communication connection between the calling and called lines, and means including said common connection for rendering said reset circuit device non-conductive responsive to the conduction of either said busy marking circuit device or said cut-through circuit device.

32. The telephone system of claim 31 in which the semi-conductor device is a transistor.

33. The telephone system of claim 31 in which the semi-conductor device is a transistor, the first electrode is an emitter electrode, and the second electrode is a base electrode.

34. In a telephone system, a plurality of lines having individually assigned thereto different time positions which recur in repetitive time position frames, a connector having connected thereto an input conductor, a busy marking conductor, and a trunk hunting conductor, means for applying pulses in the time position of a calling line to said input conductor, means for modulating said pulses in accordance with dial impulses received over the calling line, means in said connector responsive to said dial impulse modulations for selecting a called line and for developing connector gate pulses in the time position of the called line, means for applying busy marking pulses in the time positions of busy lines of the system to said busy marking conductor, means for applying trunk marking pulses in the time position of certain of said lines to said trunk hunting conductor, a reset circuit in said connector, a cut-through circuit in said connector, a trunk hunting circuit in said connector, a busy marking circuit in said connector, each of said circuits comprising bi-stable means having first and second operated conditions, first and second terminals associated with each of said bi-stable means, a common connection between the first terminals of said bi-stable means, said circuits being arranged such that only one of said bi-stable means is operated to its first operated condition at any one time and controlled so that the reset circuit bi-stable means is operated to its first operated condition at the time that pulses in the time position of a calling line are connected to said input conductor, means for connecting an operating signal to the second terminal of said trunk hunting circuit bi-stable means if the connector gate pulses coincide in time position with the busy marking pulses on said busy marking conductor and with the trunk marking pulses on said trunk hunting conductor, said trunk hunting circuit bi-stable means being operated to its first operated condition responsive to said operating signal to control the selection of the next succeeding line, means including said common connection for operating said reset circuit bi-stable means to its second operated condition if said trunk hunting circuit bi-stable means is operated to its first operated condition, a source of busy tone, means for connecting an operating signal to the second terminal of said busy marking circuit bi-stable means if the connector gate pulses coincide in time position with the busy marking pulses on said busy marking conductor and do not coincide in time position with the trunk marking pulses on said trunk hunting conductor, said busy marking circuit bi-stable means being operated to its first operated condition responsive to said operating signal to control the connection of said busy tone source to the calling line, means for connecting an operating signal to the second terminal of said cut-through circuit bi-stable means if the connector gate pulses do not correspond in time position with the busy marking pulses on said busy marking conductor, said cut-through circuit bi-stable means being operated to its first operated condition responsive to said operating signal to control the establishment of a communication connection between the calling and called lines, and means including said common connection for operating said reset circuit bi-stable means or said trunk hunting bi-stable means to its second operated condition responsive to the operation of either said busy marking circuit bi-stable means or said cut-through circuit bi-stable means to its first operated condition.

35. In a telephone system, a plurality of lines having individually assigned thereto different time positions which recur in repetitive time position frames, a connector having connected thereto an input conductor, a busy marking conductor, and a trunk hunting conductor, means for applying pulses in the time position of a calling line to said input conductor, means for modulating said pulses in accordance with dial impulses received over the calling line, means in said connector responsive to said dial impulse modulations for selecting a called line and for developing connector gate pulses in the time position of the called line, means for applying busy marking pulses in the time positions of busy lines of the system to said busy marking conductor, means for applying trunk marking pulses in the time position of certain of said lines to said trunk hunting conductor, a reset circuit in said connector, a cut-through circuit in said connector, a trunk hunting circuit in said connector, a busy marking circuit in said connector, each of said circuits comprising a semi-conductor device having first and second electrodes, a common connection between the first electrodes of said devices, said circuits being arranged such that only one of said devices is conductive at any one time and controlled so that the reset circuit device is conductive at the time that pulses in the time position of a calling line are connected to said input conductor, means for connecting an operating signal to the second electrode of said trunk hunting circuit device if the connector gate pulses coincide in time position with the busy marking pulses on said busy marking conductor and with the trunk marking pulses on said trunk hunting conductor, said trunk hunting circuit device becoming conductive responsive to said operating signal to control the selection of the next succeeding line, means including said common connection for rendering said reset circuit device non-conductive if said trunk hunting circuit device becomes conductive, a source of busy tone, means for connecting an operating signal to the second electrode of said busy marking circuit device if the connector pulses gate coincide in time position with the busy marking pulses on said busy marking conductor and do not coincide in time position with the trunk marking pulses on said trunk hunting conductor, said busy marking circuit device becoming conductive responsive to said operating signal to control the connection of said busy tone source to the calling line, means for connecting an operating signal to the second electrode of said cut-through circuit device if the connector gate pulses do not correspond in time position with the busy marking pulses on said busy marking conductor, said cut-through circuit device becoming conductive responsive to said operating signal to control the establishment of a communication connection between the calling and called lines, and means including said common connection for rendering either said reset circuit device or said trunk hunting circuit device non-conductive responsive to the conduction of either said busy marking circuit device or said cut-through circuit device.

36. The telephone system of claim 35 in which the semi-conductor device is a transistor.

37. The telephone system of claim 35 in which the semi-conductor device is a transistor, the first electrode is an emitter electrode, and the second electrode is a base electrode.

38. In a telephone system, a plurality of lines having individually assigned thereto different time positions which recur in repetitive time position frames, directively controllable switching apparatus common to said lines, and time position responsive emergency service means for controlling said switching apparatus to complete a connection from a calling one of said lines to a particular called one of said lines irrespective of the idle or busy condition of the called line.

39. In a telephone system, a plurality of lines having individually assigned thereto different time positions which recur in repetitive time position frames, said lines being divided into first and second classes, directively controllable switching apparatus common to said lines, and time position responsive means operative only when the calling line is of said first class for controlling said switching apparatus to complete a connection from said calling line to a called line irrespective of the idle or busy condition of the called line.

40. In a telephone system, a plurality of lines having individually assigned thereto different time positions which recur in repetitive time position frames, means for identifying certain ones of said lines as executive lines, time position responsive directively controllable switching apparatus common to said lines, and executive right of way means operative only when the calling line is an executive line for controlling said switching apparatus to complete a connection from said calling line to a called line irrespective of the idle or busy condition of the called line.

41. In a telephone system, first and second classes of subscriber lines, an emergency service line, each of said lines having individually assigned thereto a time position which recurs in repetitive time position frames, directively controllable switching apparatus common to said lines, time position responsive means operative only when the calling line is of said first class for controlling said switching apparatus to complete a connection from the calling line to a called line of either said first or second class irrespective of the idle or busy condition of the called line, and time position responsive means operative irrespective of the class of the calling line for controlling said switching apparatus to complete a connection from the calling line to the emergency service line irrespective of the idle or busy condition of the emergency line.

References Cited in the file of this patent

UNITED STATES PATENTS 2,506,613 Ransom ---------------- May 9, 1950

UNITED STATES PATENT OFFICE
CERTIFICATE OF CORRECTION

Patent No. 2,830,123 April 8, 1958

Robert B. Trousdale

It is hereby certified that error appears in the printed specification of the above numbered patent requiring correction and that the said Letters Patent should read as corrected below.

Column 32, line 9, strike out the period and insert -- RRP and RTP, respectively, to ground potential. --; column 39, line 48, for "pole" read -- pulse --; column 44, line 67, for "+7.5" read -- -7.5 --; column 80, line 9, for "4530" read -- 3540 --; column 86, line 22, strike out "connecting"; column 87, line 1, for "subscribed" read -- subscriber --; column 88, line 38, for "havng" read -- having --; column 95, lines 63 and 64, for "connector pulses gate" read -- connector gate pulses --.

Signed and sealed this 17th day of February 1959.

(SEAL)
Attest:

KARL H. AXLINE
Attesting Officer

ROBERT C. WATSON
Commissioner of Patents